(12) United States Patent
Yoon

(10) Patent No.: US 11,646,926 B2
(45) Date of Patent: *May 9, 2023

(54) METHOD AND APPARATUS FOR TRANSMITTING AND RECEIVING DEMODULATION REFERENCE SIGNAL

(71) Applicant: Innovative Technology Lab Co., Ltd., Seoul (KR)

(72) Inventor: Sung Jun Yoon, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/237,693

(22) Filed: Apr. 22, 2021

(65) Prior Publication Data
US 2021/0258119 A1    Aug. 19, 2021

Related U.S. Application Data

(63) Continuation of application No. 16/827,432, filed on Mar. 23, 2020, now Pat. No. 11,018,823, which is a
(Continued)

(30) Foreign Application Priority Data

Mar. 23, 2017  (KR) .................. 10-2017-0037049
Aug. 10, 2017  (KR) .................. 10-2017-0101597
Nov. 17, 2017  (KR) .................. 10-2017-0153553

(51) Int. Cl.
*H04W 88/02* (2009.01)
*H04W 72/04* (2009.01)
(Continued)

(52) U.S. Cl.
CPC ........ *H04L 27/2613* (2013.01); *H04L 5/0048* (2013.01); *H04L 5/0051* (2013.01);
(Continued)

(58) Field of Classification Search
CPC .... H04B 7/062; H04B 7/0452; H04B 7/0469; H04L 1/0013; H04L 5/001; H04L 5/0007;
(Continued)

(56) References Cited

U.S. PATENT DOCUMENTS

2004/0246886 A1   12/2004  Mege et al.
2010/0085866 A1    4/2010  Li et al.
(Continued)

FOREIGN PATENT DOCUMENTS

CN   102742176 A   10/2012
CN   102804630 A   11/2012
(Continued)

OTHER PUBLICATIONS

Huawei et al., "Design of DL DMRS for data transmission", 3GPP TSG RAN WG1 #89, R1-1706933, Hangzhou, China, May 15-19, 2017, pp. 1-6.
(Continued)

*Primary Examiner* — Khaled M Kassim
*Assistant Examiner* — Jason A Harley

(57) ABSTRACT

Methods, apparatuses, and systems described herein generally relate to a reference signal generation and mapping. For example, a method comprises determining a first set of antenna ports for a demodulation reference signal (DM-RS) transmission; determining, based on the first set, a frequency index associated with four adjacent resource elements, wherein the four adjacent resource elements correspond to two adjacent symbols in a time axis and to two adjacent subcarriers in a frequency axis; generating, based on a first orthogonal cover code and a second orthogonal cover code, a DM-RS associated with the first set of antenna ports; and transmitting, via a mapping to the four adjacent resource elements, the DM-RS associated with the first set of antenna ports.

22 Claims, 29 Drawing Sheets

Related U.S. Application Data continuation of application No. 15/933,823, filed on Mar. 23, 2018, now Pat. No. 10,644,849.

(51) Int. Cl.

| | | |
|---|---|---|
| *H04L 27/26* | (2006.01) | |
| *H04L 1/00* | (2006.01) | |
| *H03M 13/00* | (2006.01) | |
| *H04B 17/309* | (2015.01) | |
| *H04J 11/00* | (2006.01) | |
| *H04J 13/18* | (2011.01) | |
| *H04J 13/16* | (2011.01) | |
| *H04B 10/50* | (2013.01) | |
| *H04B 7/08* | (2006.01) | |
| *H04B 7/02* | (2018.01) | |
| *H04L 5/00* | (2006.01) | |
| *H04B 7/0452* | (2017.01) | |

(52) U.S. Cl.
CPC .......... *H04B 7/0452* (2013.01); *H04L 5/0053* (2013.01); *H04L 27/26132* (2021.01)

(58) Field of Classification Search
CPC . H04W 72/0453; H03M 13/6516; H04J 11/00
USPC ........................................................ 370/277
See application file for complete search history.

(56) References Cited

U.S. PATENT DOCUMENTS

| | | | |
|---|---|---|---|
| 2011/0105171 A1 | 5/2011 | Luschi et al. | |
| 2011/0176517 A1 | 7/2011 | Hu et al. | |
| 2011/0228735 A1 | 9/2011 | Lee et al. | |
| 2013/0188569 A1* | 7/2013 | He ................. | H04L 5/0035 370/329 |
| 2014/0016681 A1 | 1/2014 | Muruganathan et al. | |
| 2014/0050190 A1* | 2/2014 | Shimezawa ........... | H04L 5/0053 370/329 |
| 2014/0376479 A1 | 12/2014 | Imamura et al. | |
| 2015/0327118 A1 | 11/2015 | Yoon | |
| 2016/0087709 A1 | 3/2016 | Horiuchi et al. | |
| 2017/0078006 A1 | 3/2017 | Liu et al. | |
| 2017/0238312 A1 | 8/2017 | Chen et al. | |
| 2018/0020335 A1 | 1/2018 | Yin et al. | |
| 2019/0098608 A1 | 3/2019 | Yi et al. | |

FOREIGN PATENT DOCUMENTS

| | | |
|---|---|---|
| CN | 102844991 A | 12/2012 |
| CN | 102972074 A | 3/2013 |
| CN | 104158574 A | 11/2014 |
| CN | 106416095 A | 2/2017 |
| FR | 2831359 A1 | 4/2003 |

OTHER PUBLICATIONS

ZTE, "Discussion on downlink DMRS design", 3GPP TSG RAN WG1 #AH, R1-1710196, Qingdao, P.R. China Jun. 27-30, 2017, pp. 1-22.

Extended European Search report for Application No. 18770951.4_PCT/KR2018003485, dated Nov. 26, 2020.

ITL, "DMRS pattern configuration for NR", 3GPP TSG RAN WG1 #AH, 3GPP, 3GPP TSG RAN WG1 NR Ad-Hoc#2, R1-1711350, Qingdao, China, Jun. 27-30, 2017, pp. 1-4.

Pantech, "Overhead reduction on UE-specific RS for small cell", 3GPP TSG RA WG1 Meeting #72-bis, R1-131525, Chicago, USA, Apr. 15-19, 2013, pp. 1-4.

Extended European Search Report for European Patent Application No. 18 770 951.4.

ITL, "Remaining details on DMRS configuration for NR", 3GPP TSG RAN WG1 Meeting #90 R1-1714464, Prague, Czech Republic, Aug. 21-25, 2017, pp. 1-8.

"3rd Generation Partnership Project; Technical Specification Group Radio Access Network; NR; Physical channels and modulation (Release 15)," 3GPP TS 38.211 V0.0.0 May 2017, pp. 1-10, 3GPP Organizational Partners.

"3rd Generation Partnership Project; Technical Specification Group Radio Access Network; NR; Multiplexing and channel coding (Release 15)," 3GPP TS 38.212 V0.0.0 May 2017, pp. 1-10, 3GPP Organizational Partners.

"3rd Generation Partnership Project; Technical Specification Group Radio Access Network; NR; PPhysical layer procedures for data (Release 15)," 3GPP TS 38.214 V0.0.1 Jul. 2017, pp. 1-20, 3GPP Organizational Partners.

\* cited by examiner

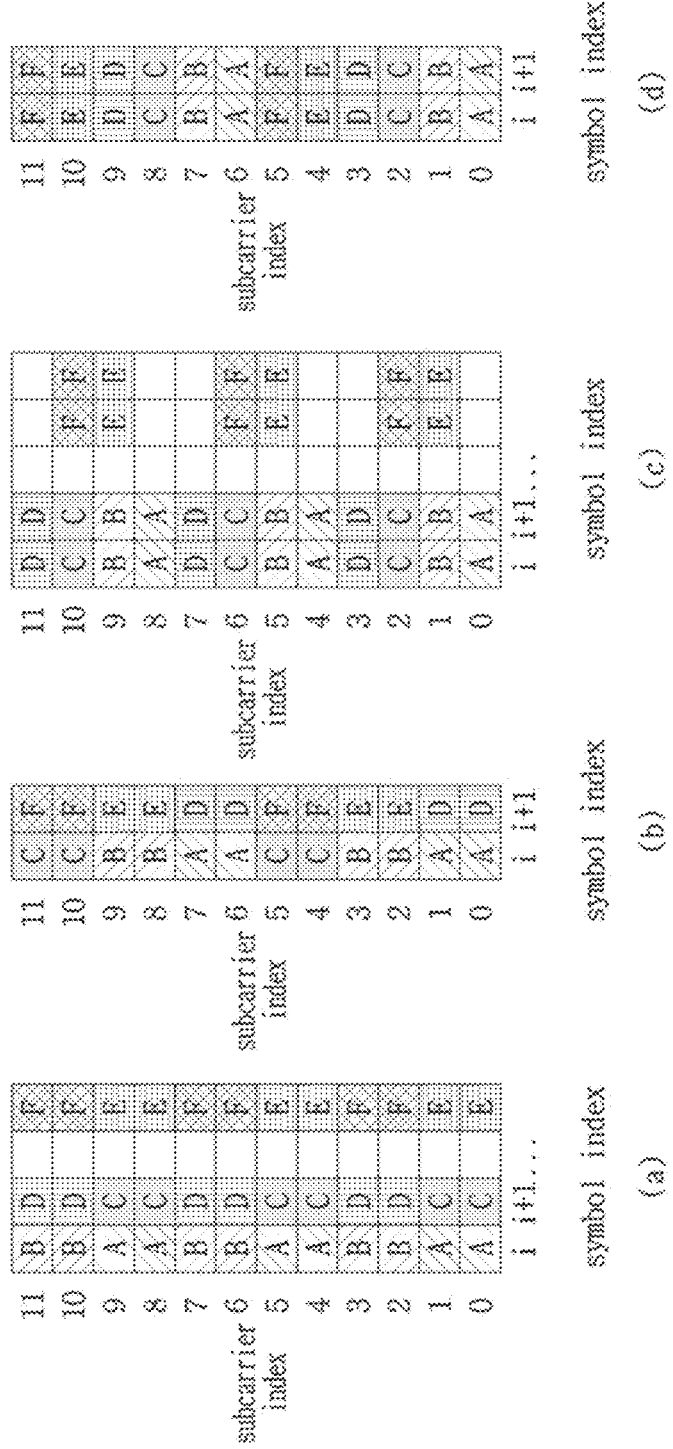
[FIG. 1]

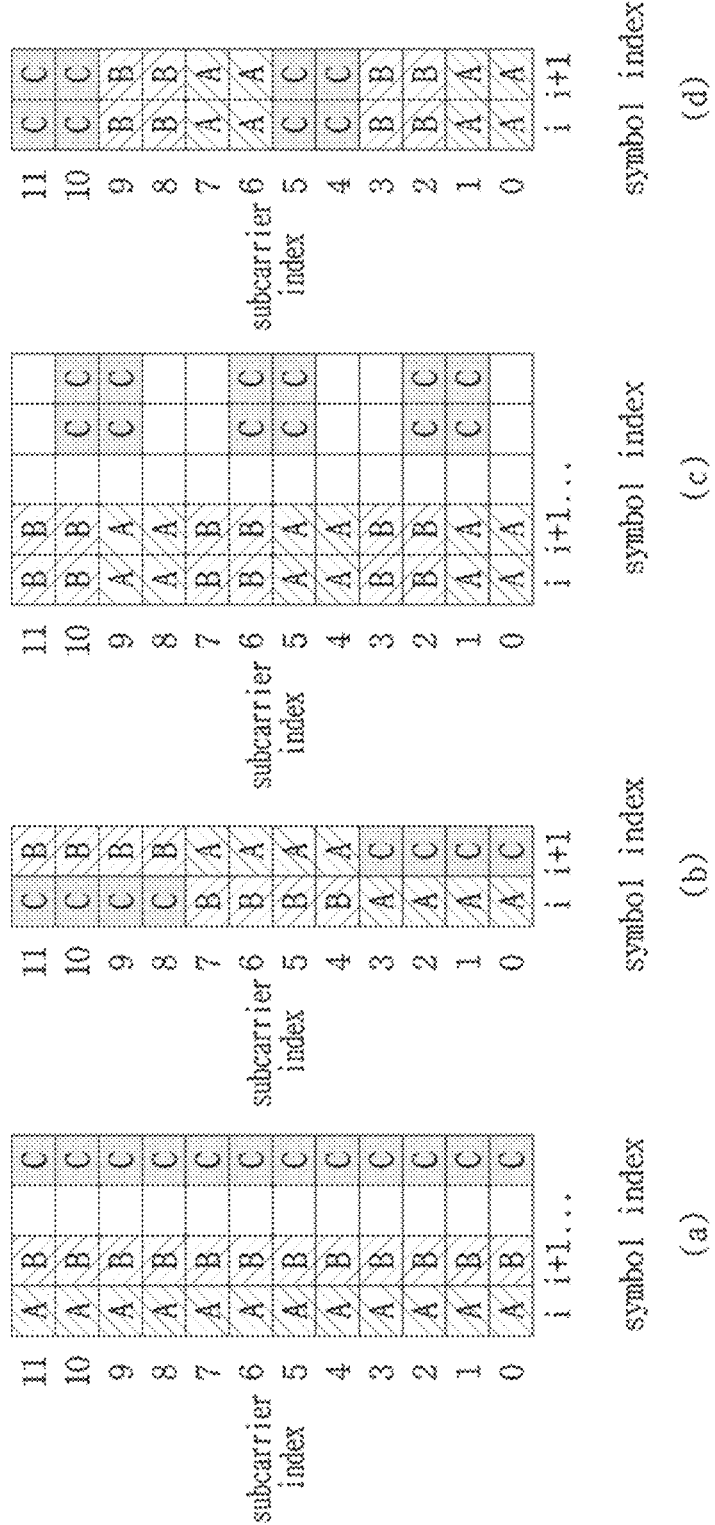
[FIG. 2]

[FIG. 3]
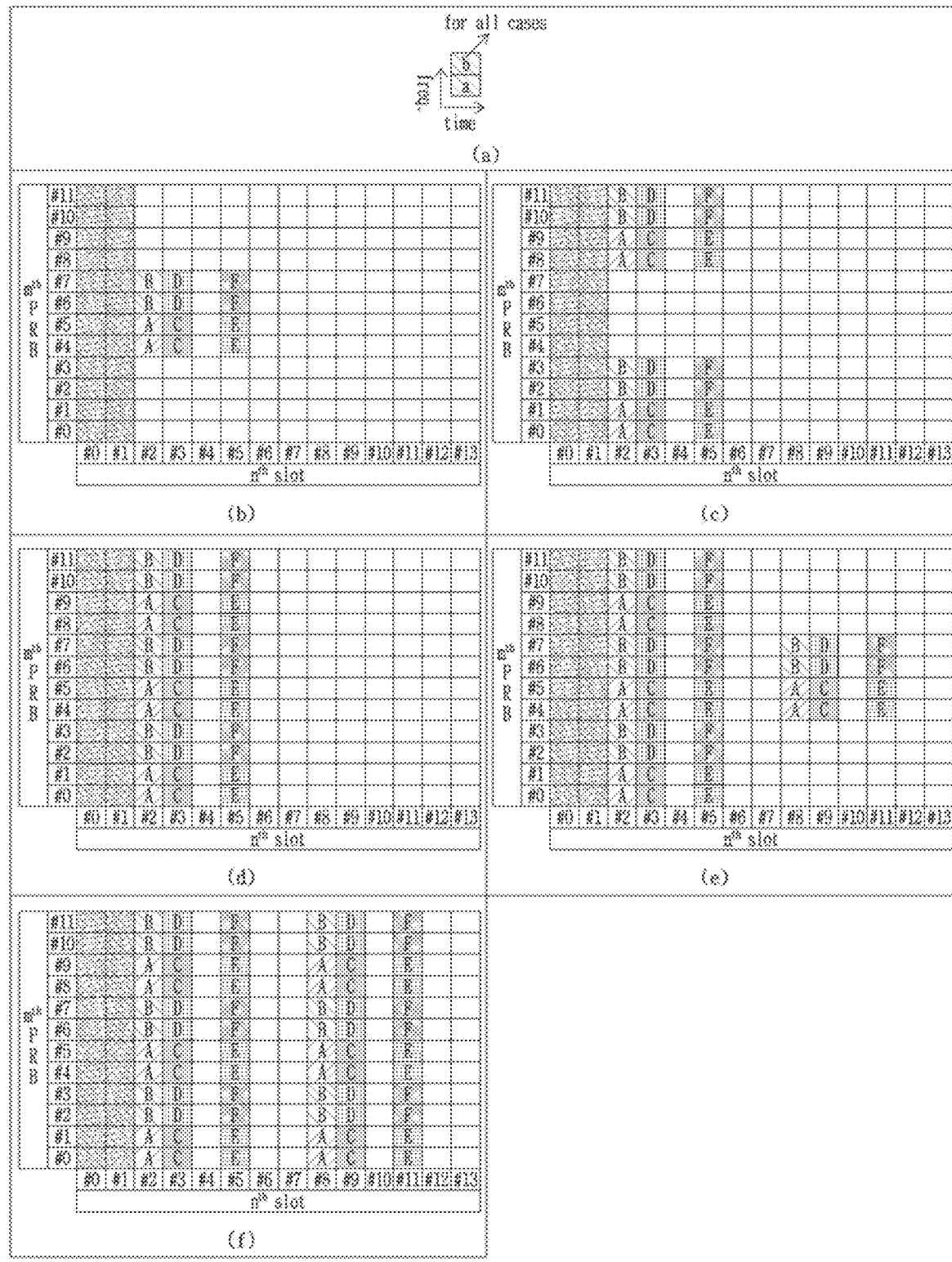

[FIG. 4]
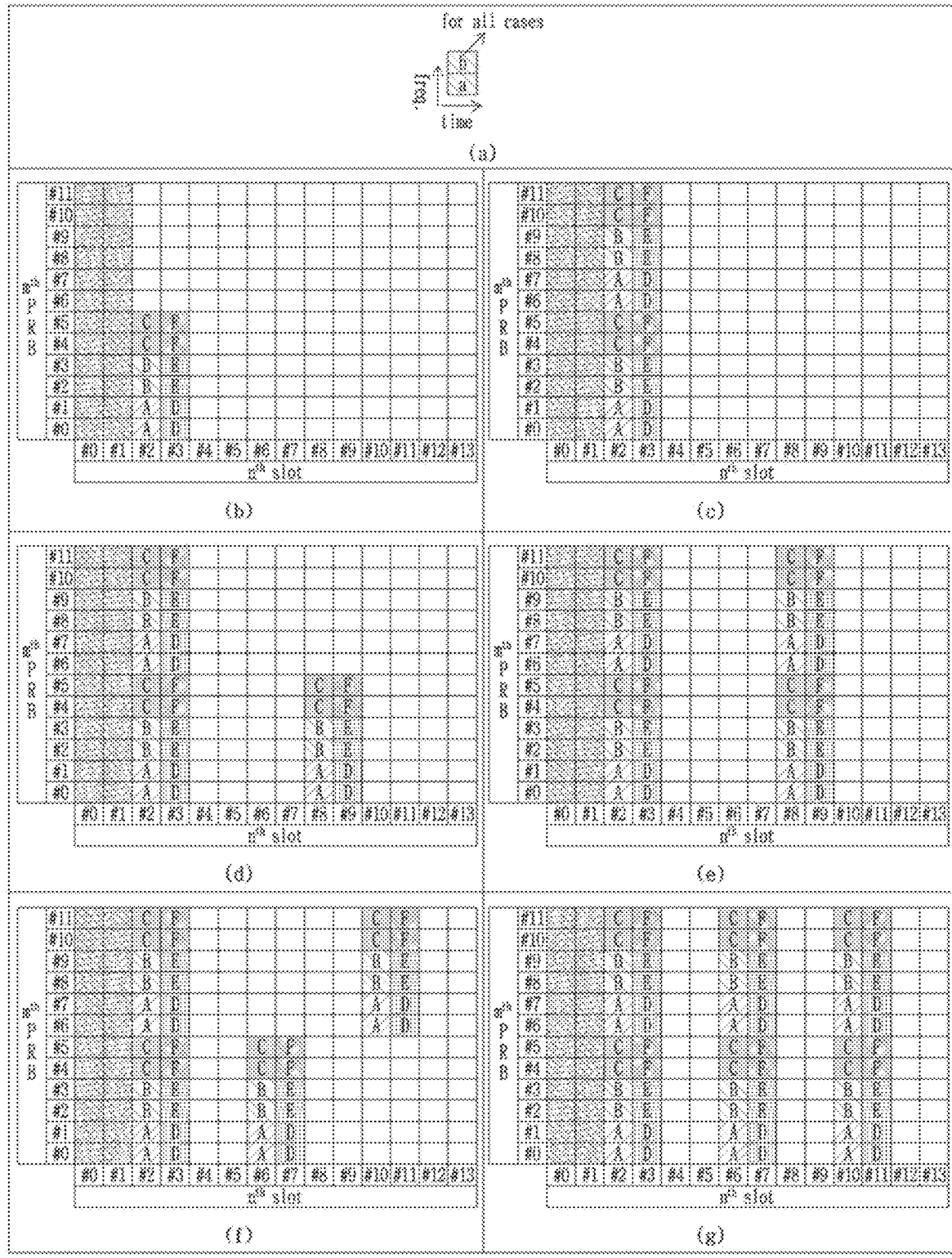

[FIG. 5]
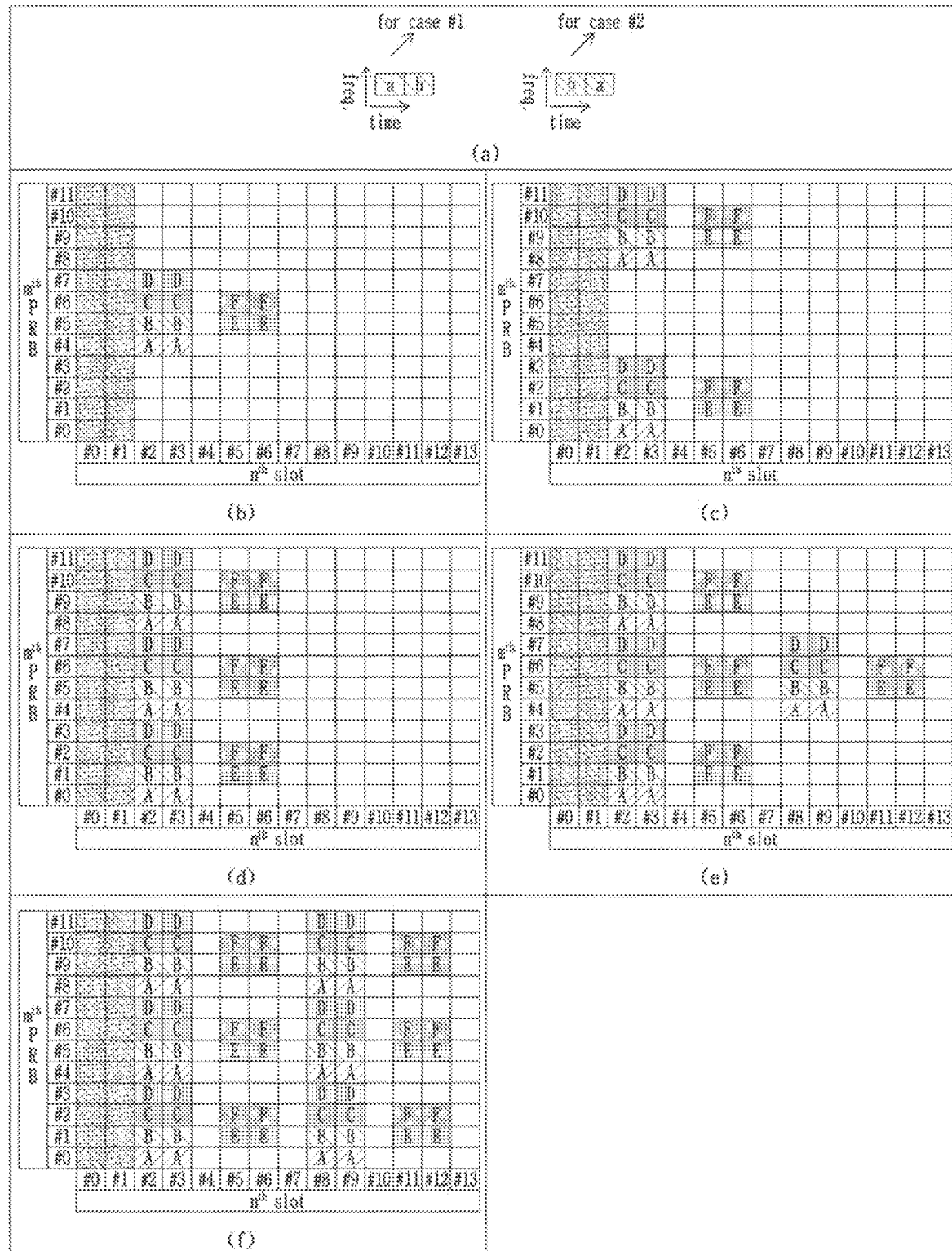

[FIG. 6]
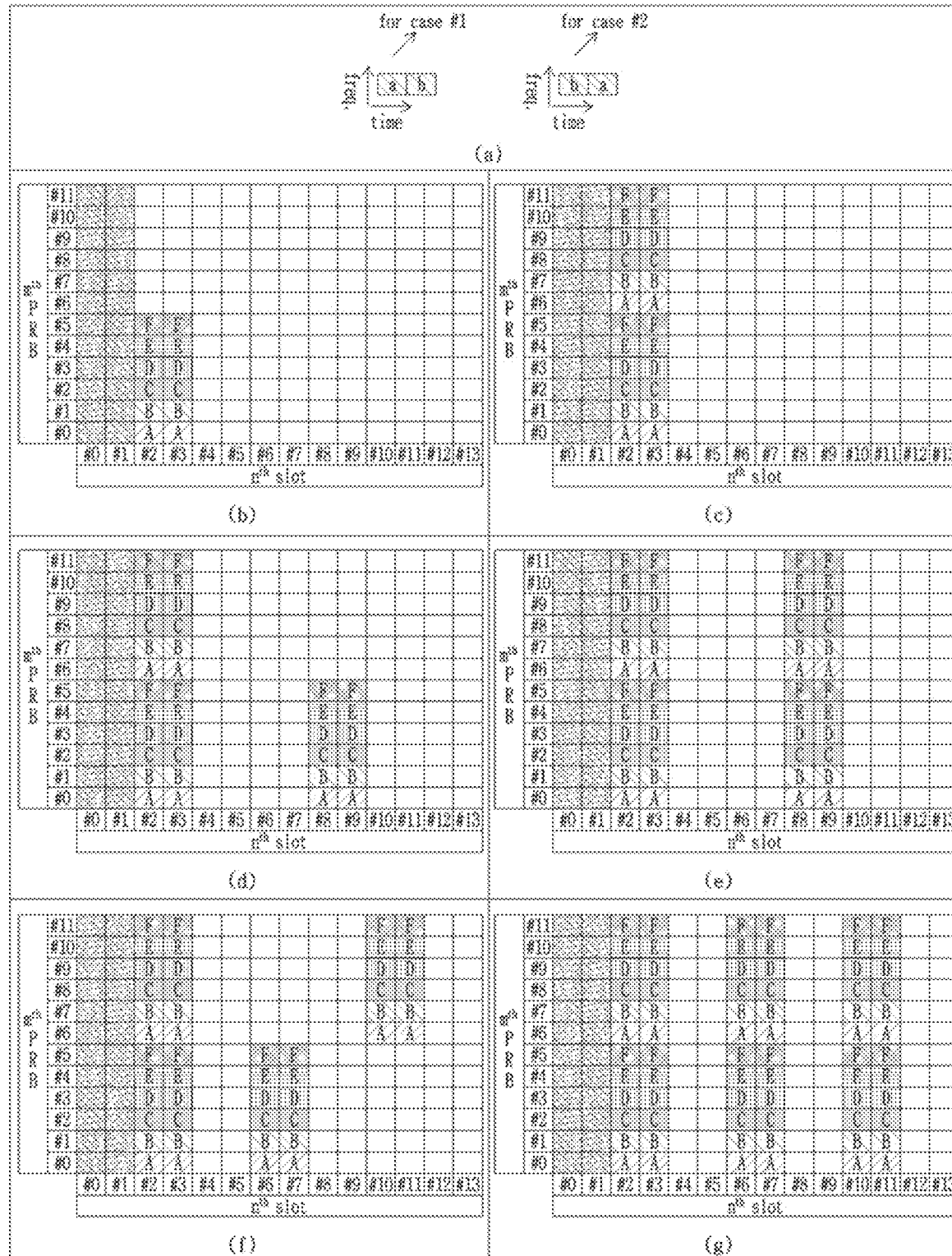

[FIG. 7]
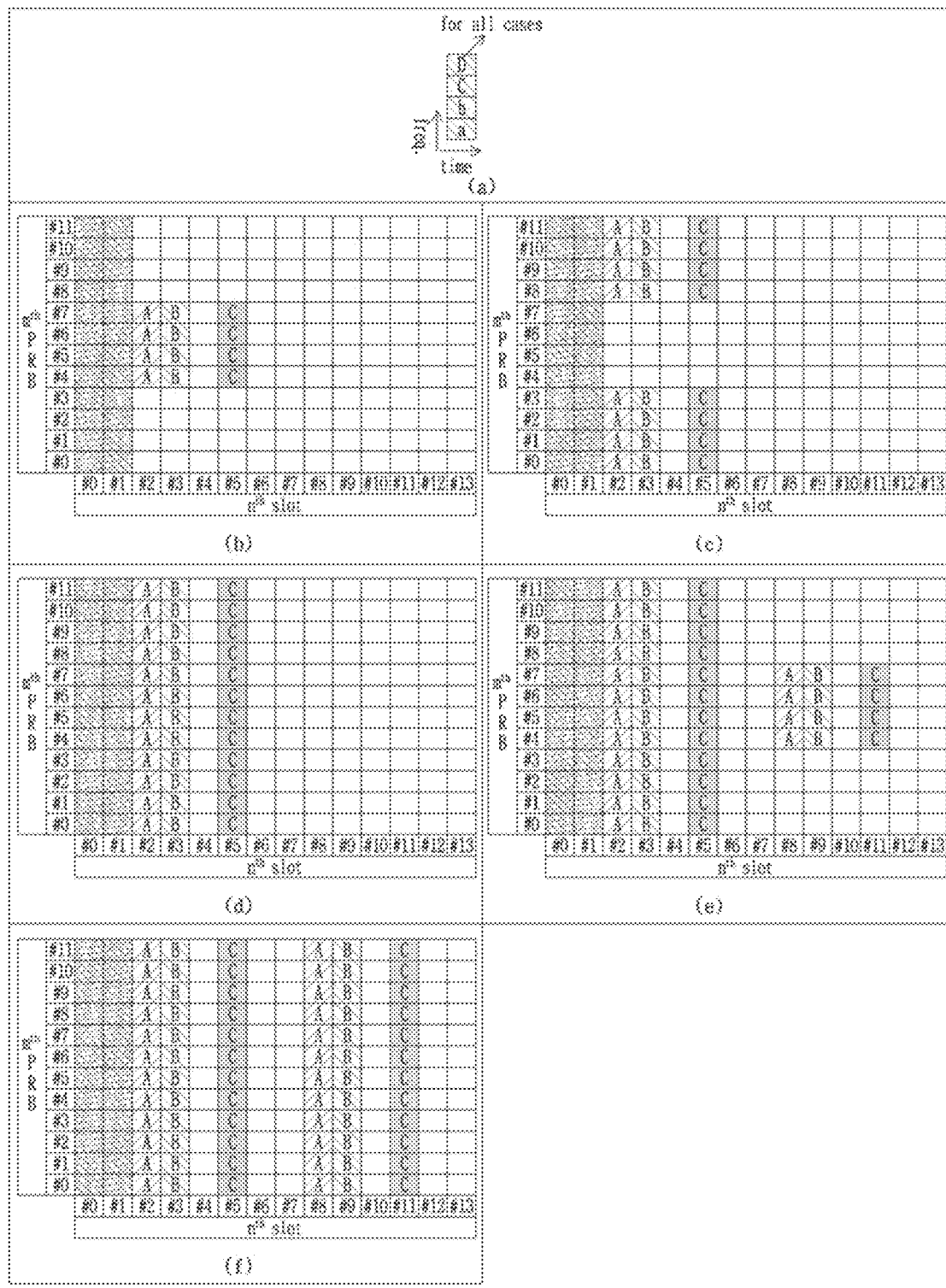

[FIG. 8]
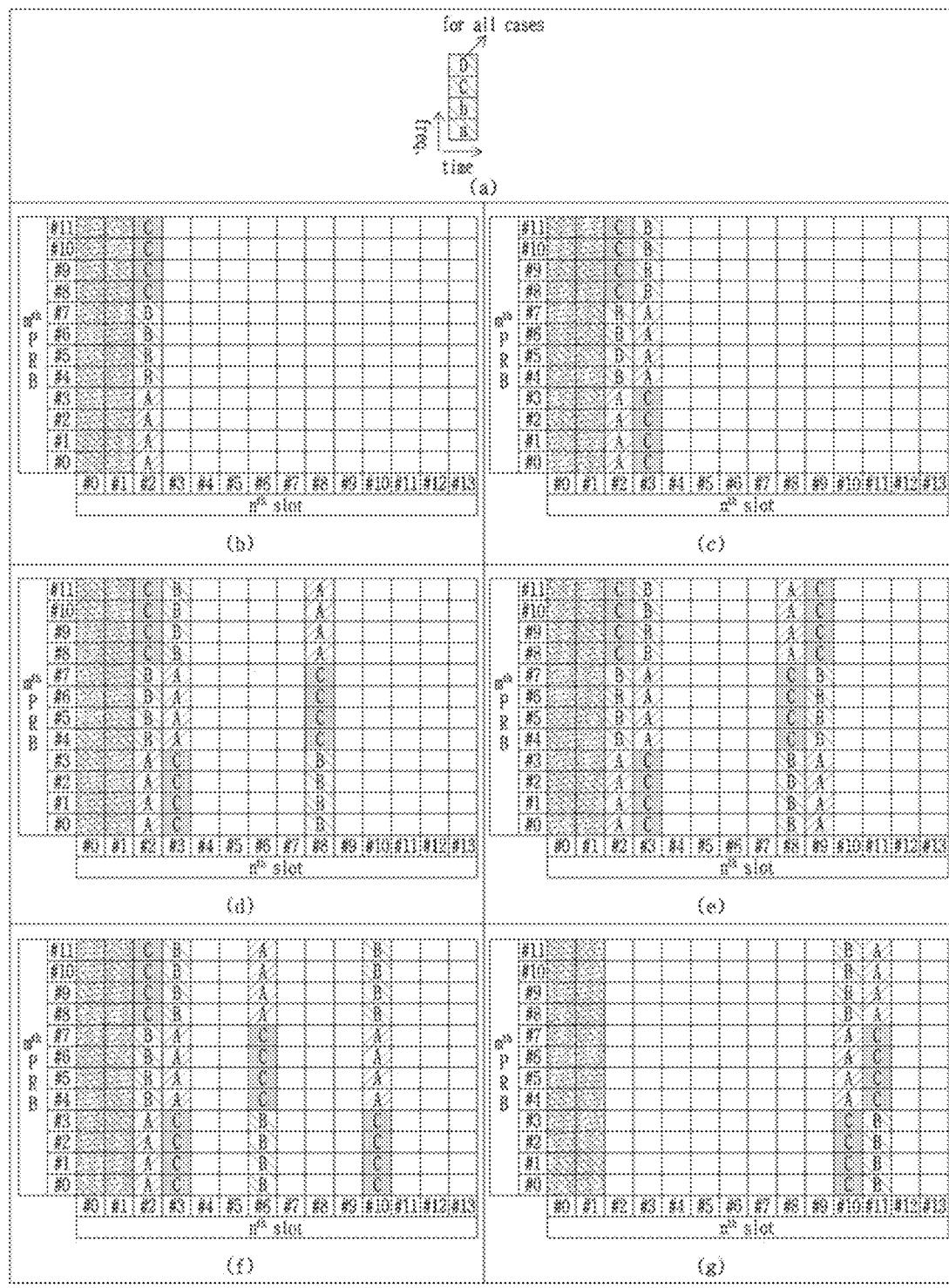

[FIG. 9]
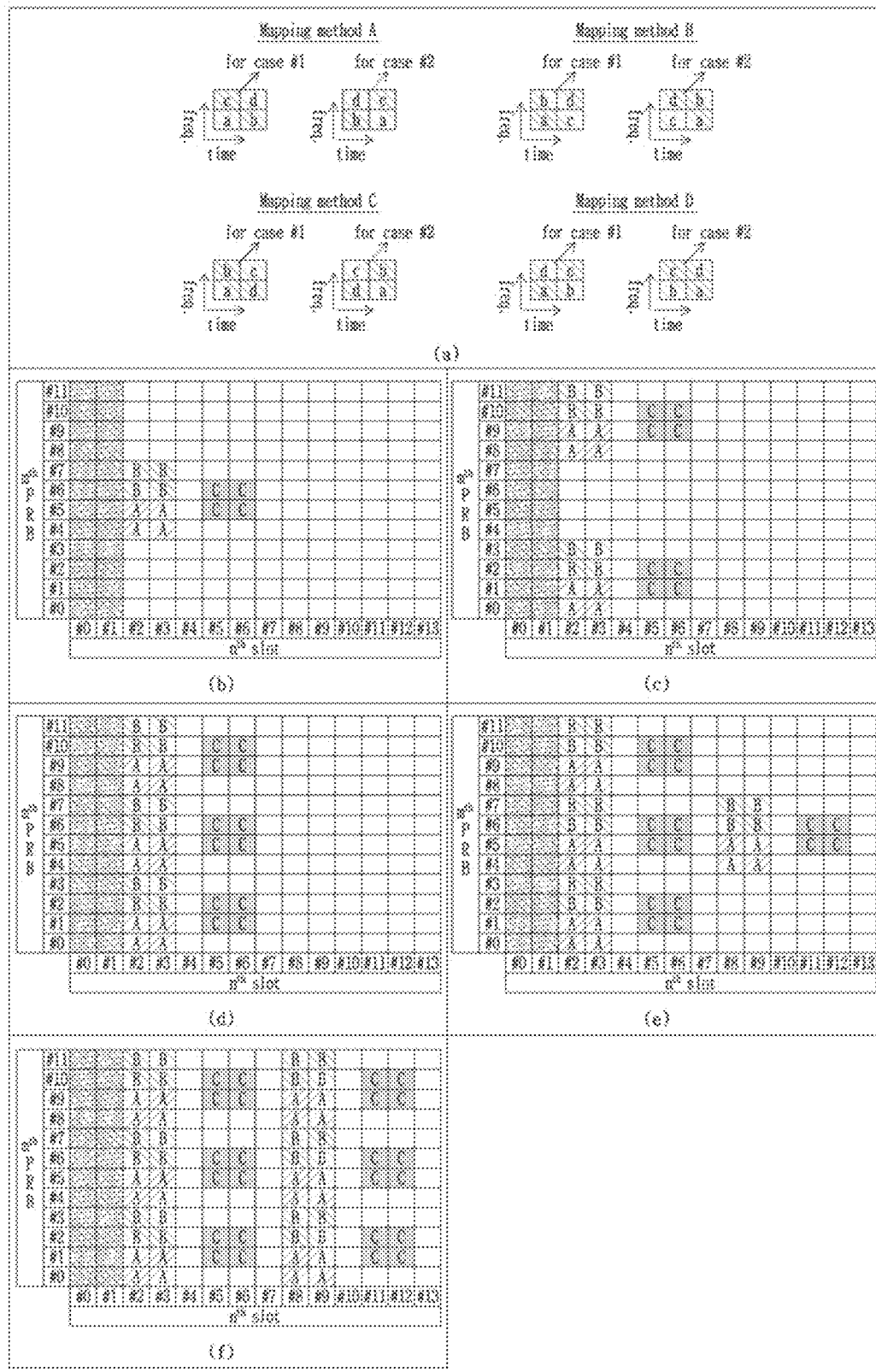

[FIG. 10]
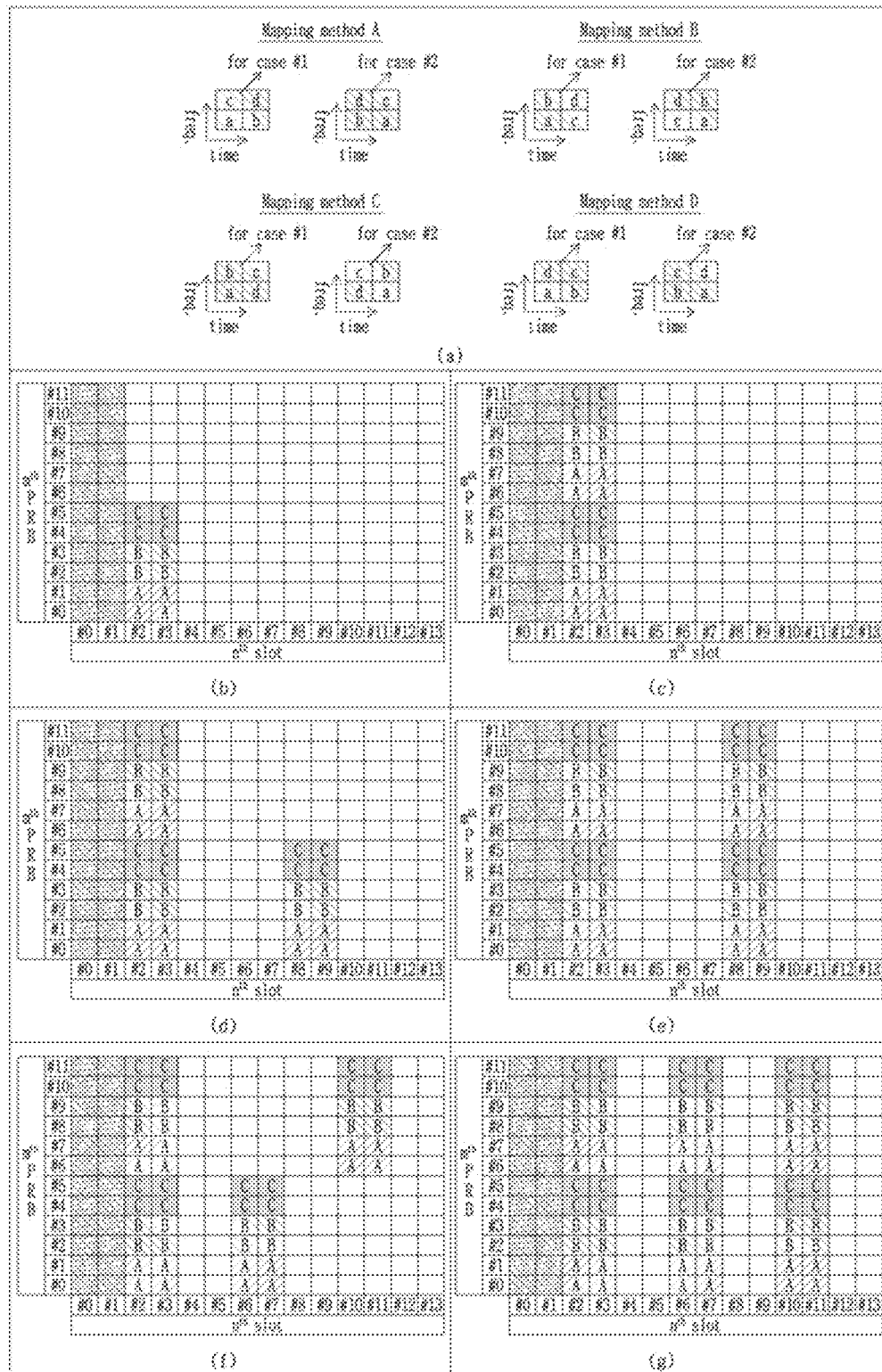

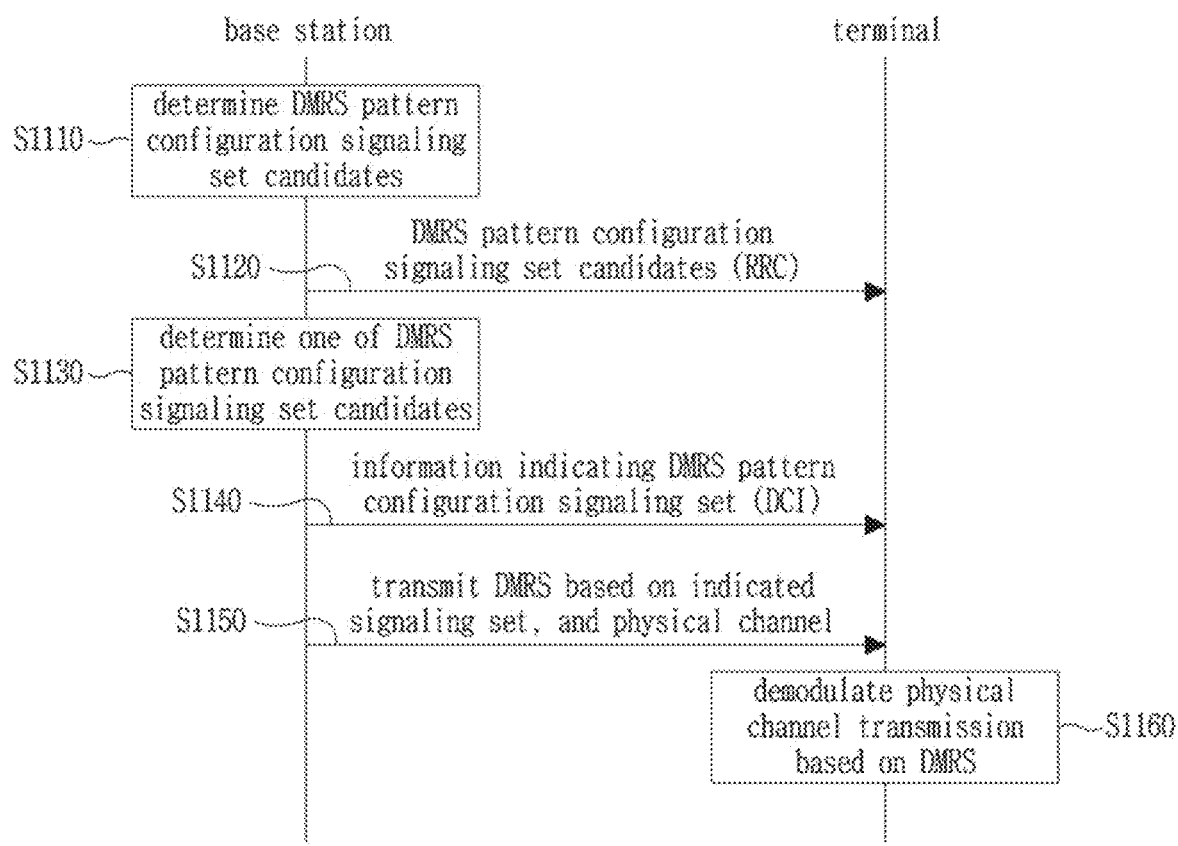
[FIG. 11]

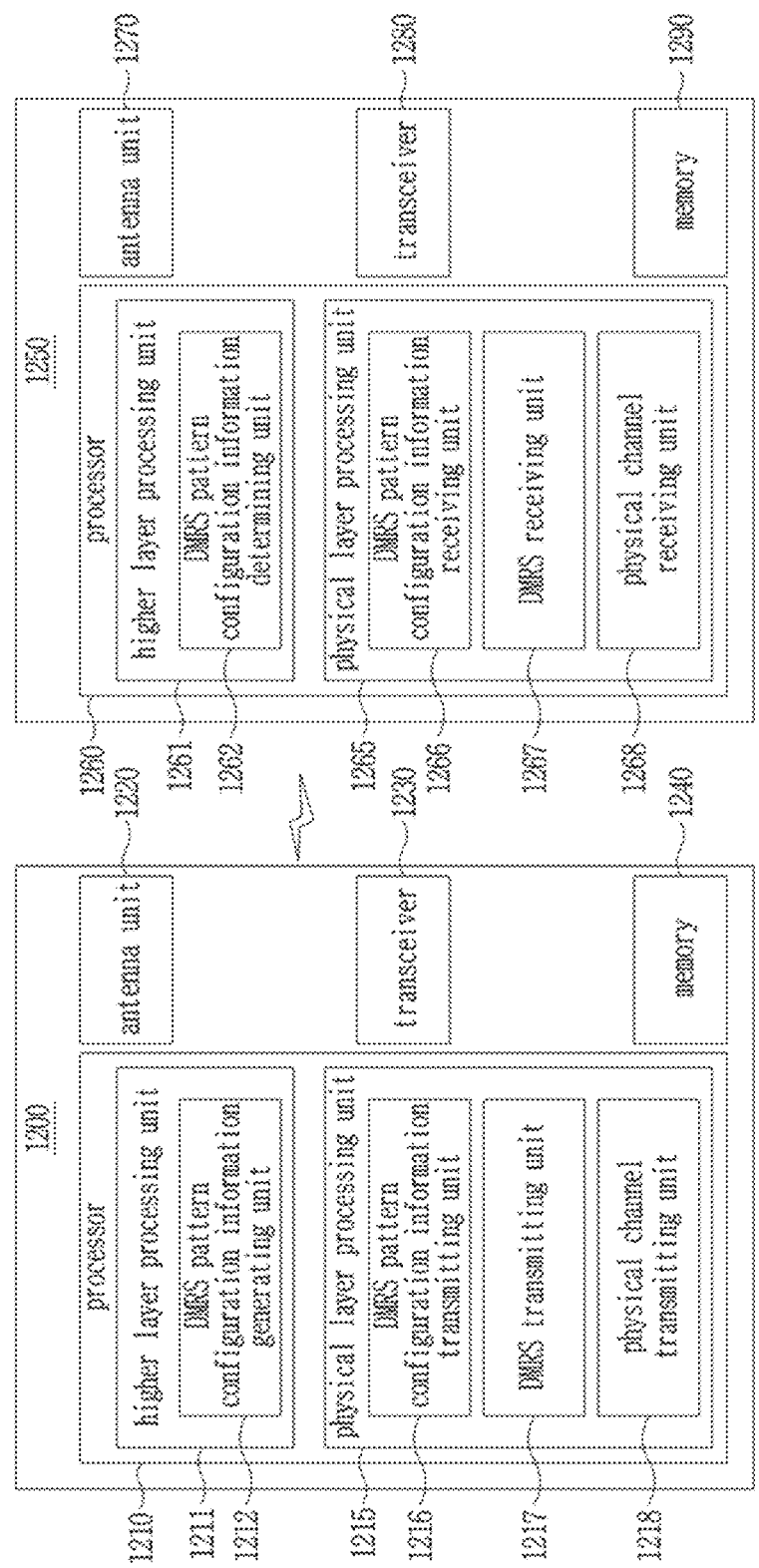
[FIG. 12]

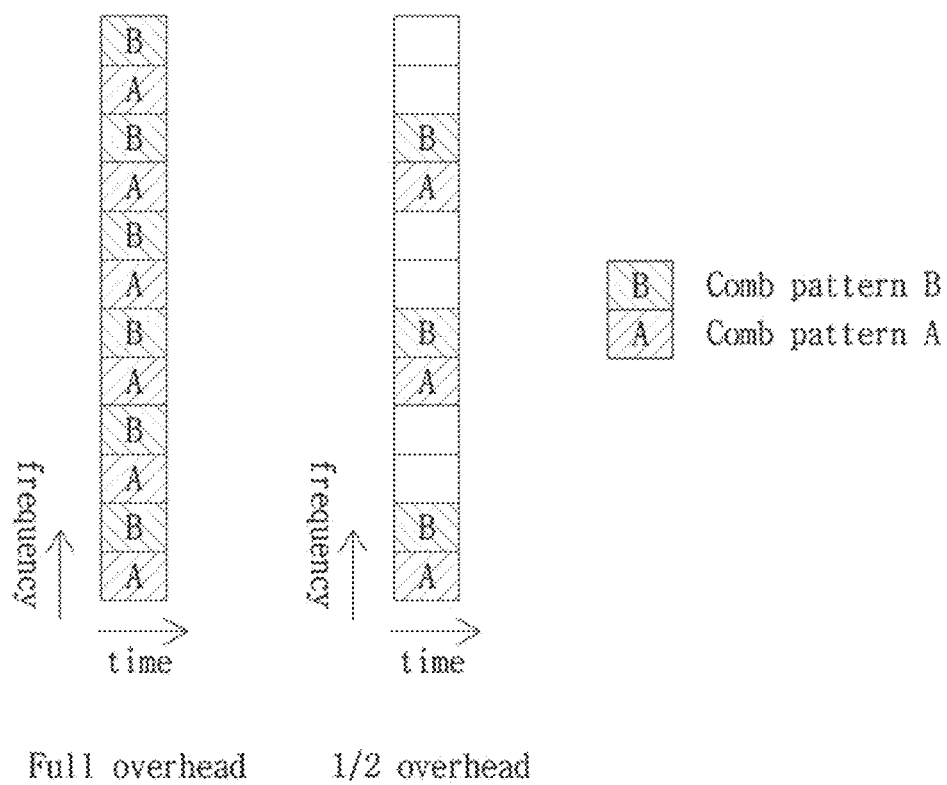
[FIG. 13]

[FIG. 14]
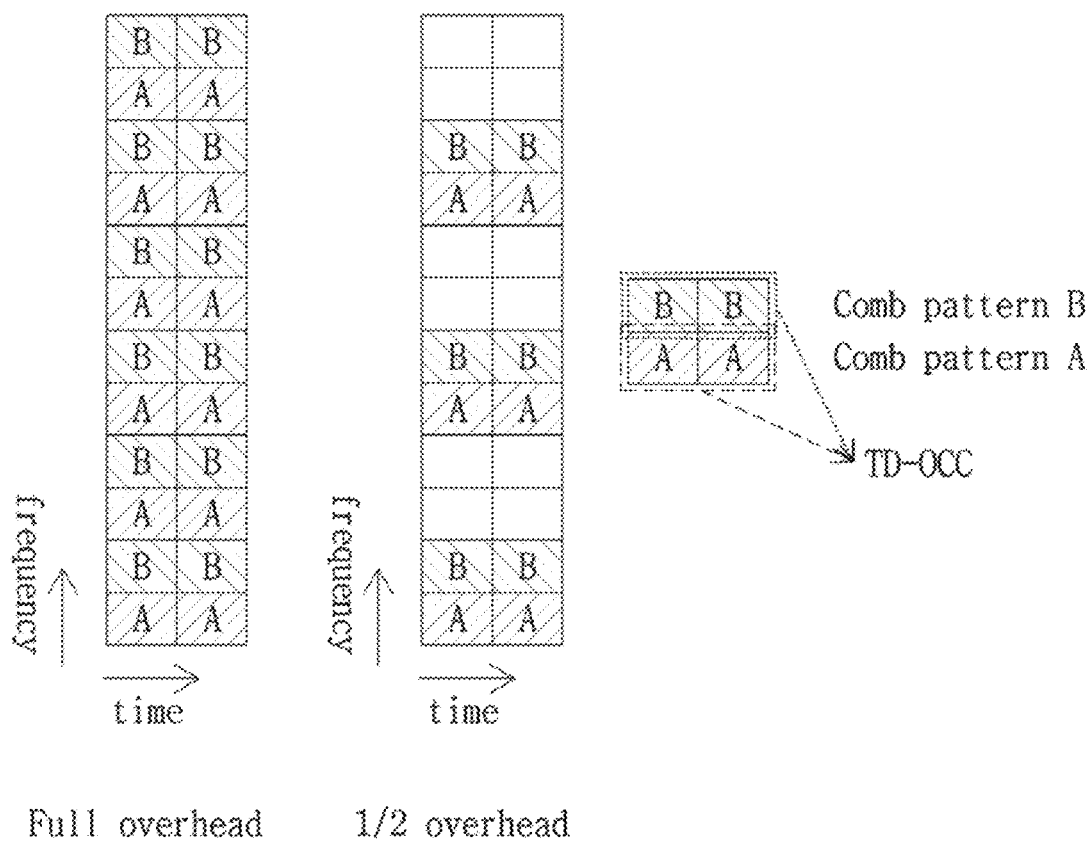

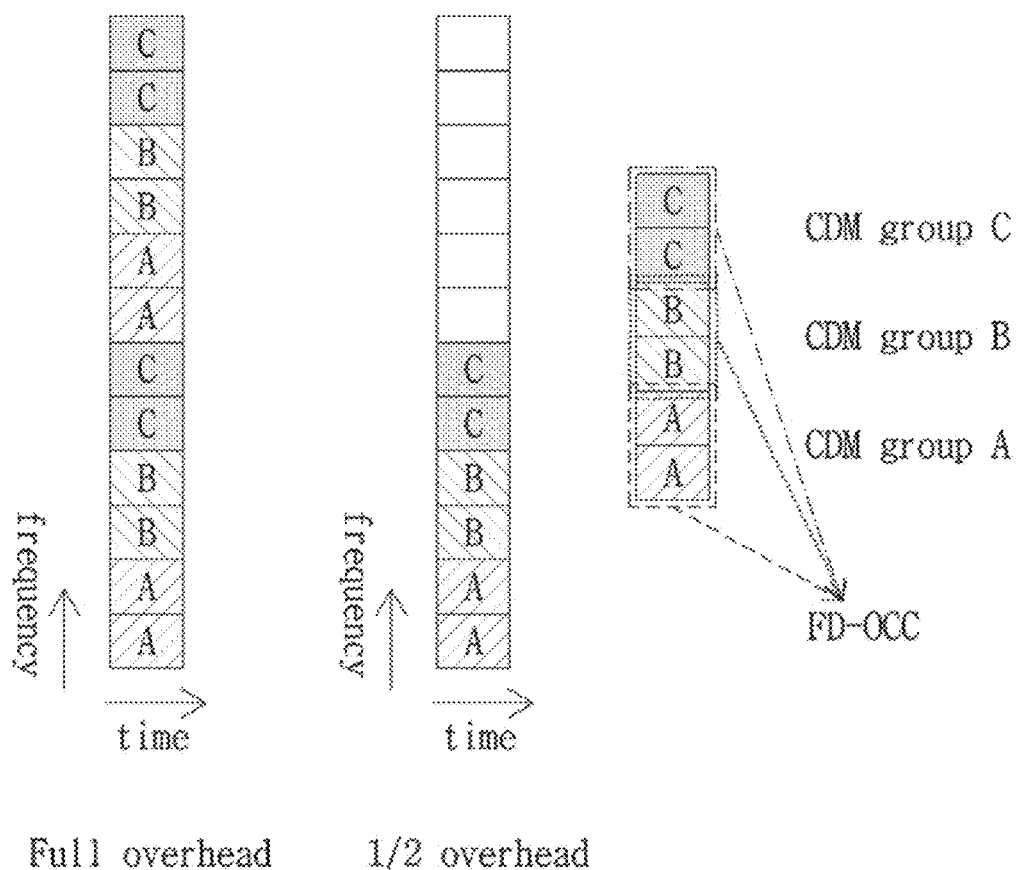

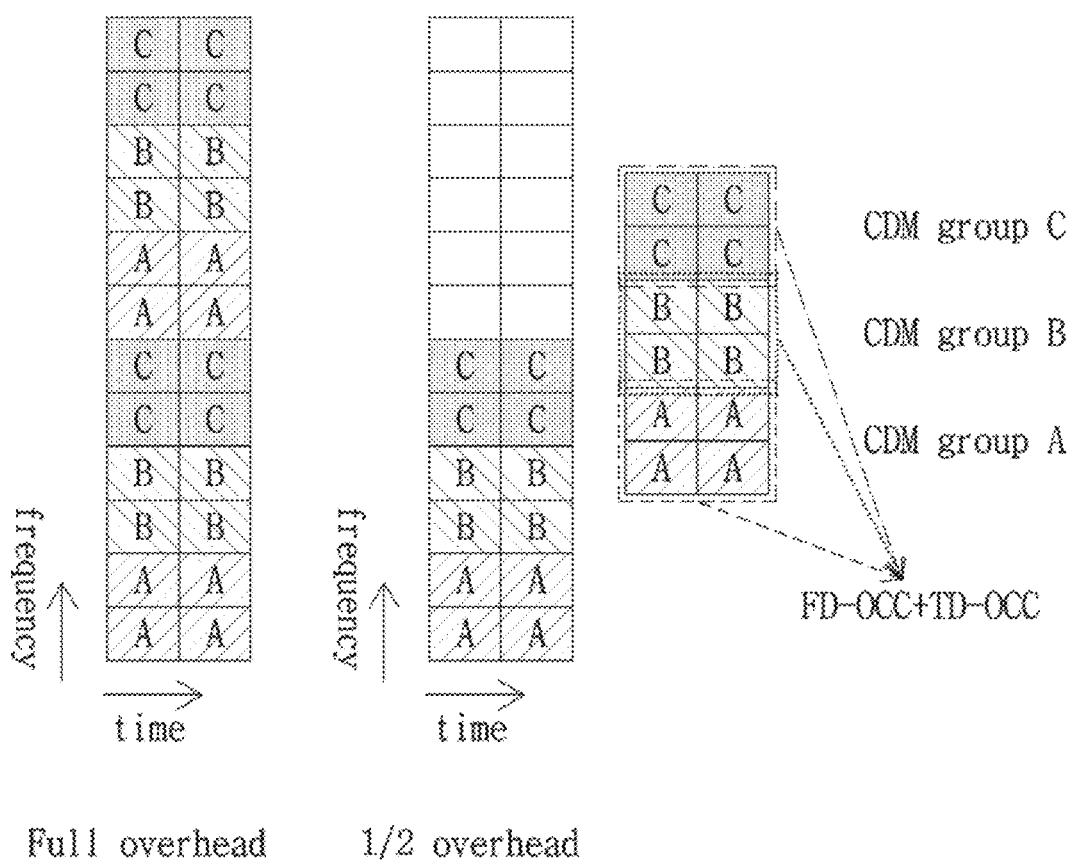
[FIG. 16]

[FIG. 17]
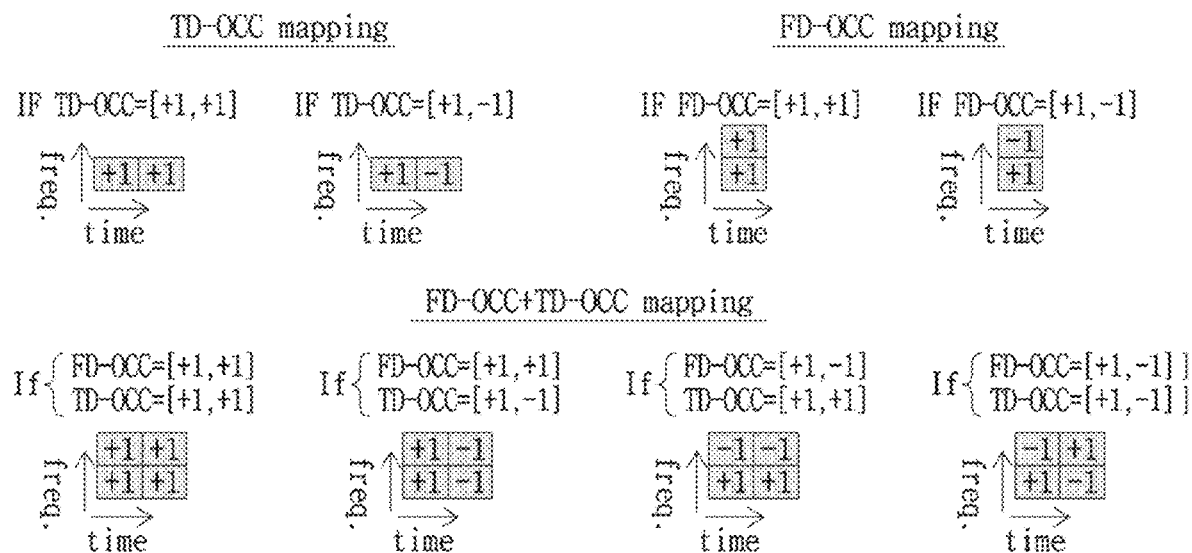

[FIG. 18]
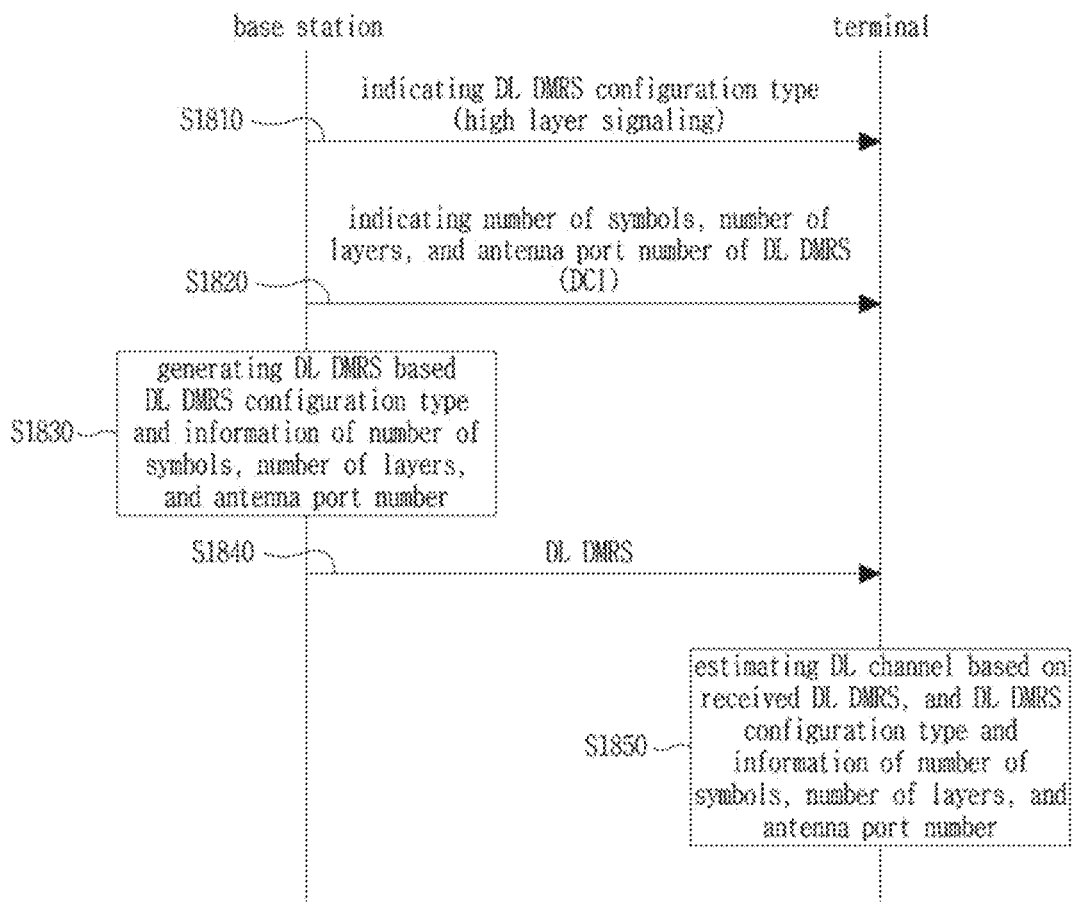

[FIG. 19]
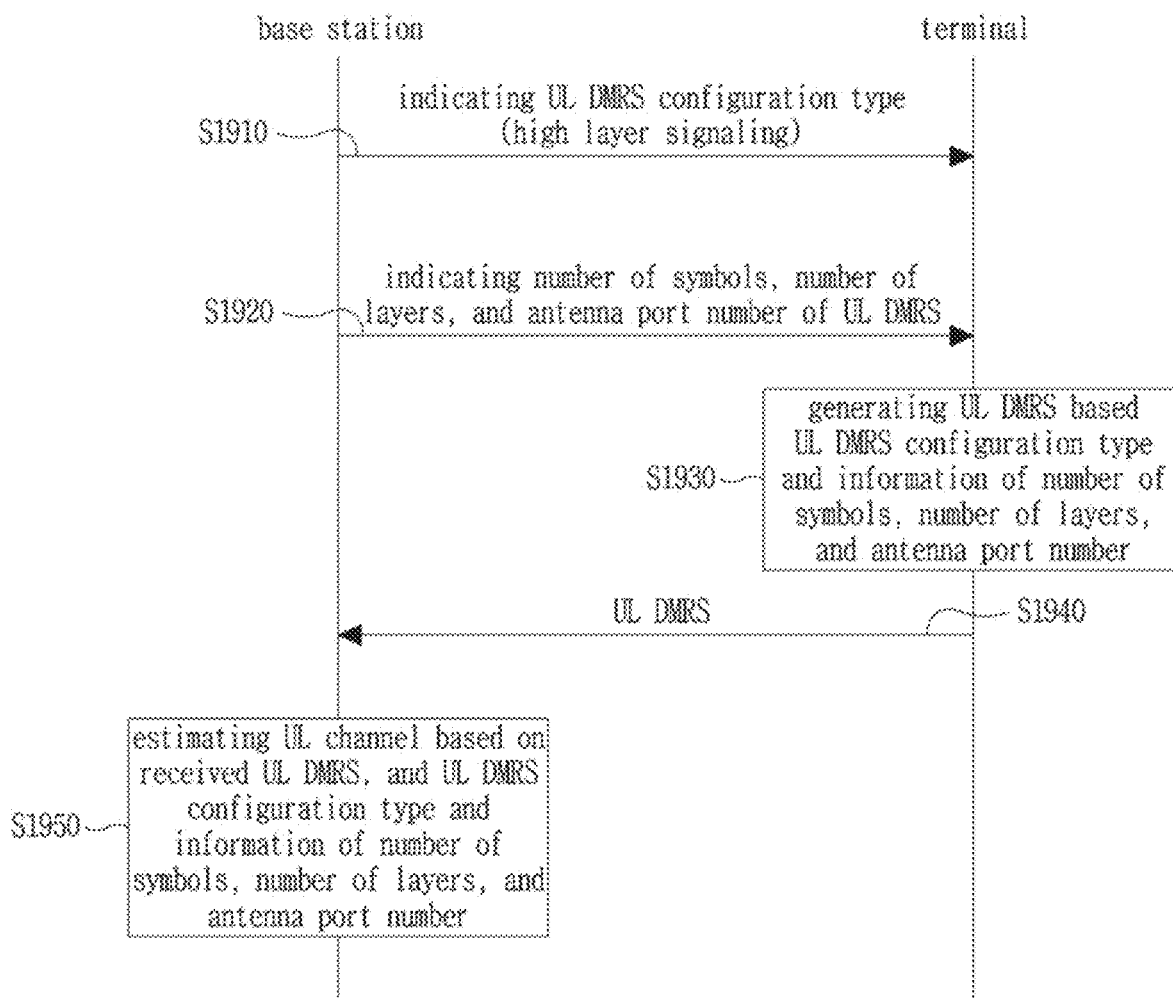

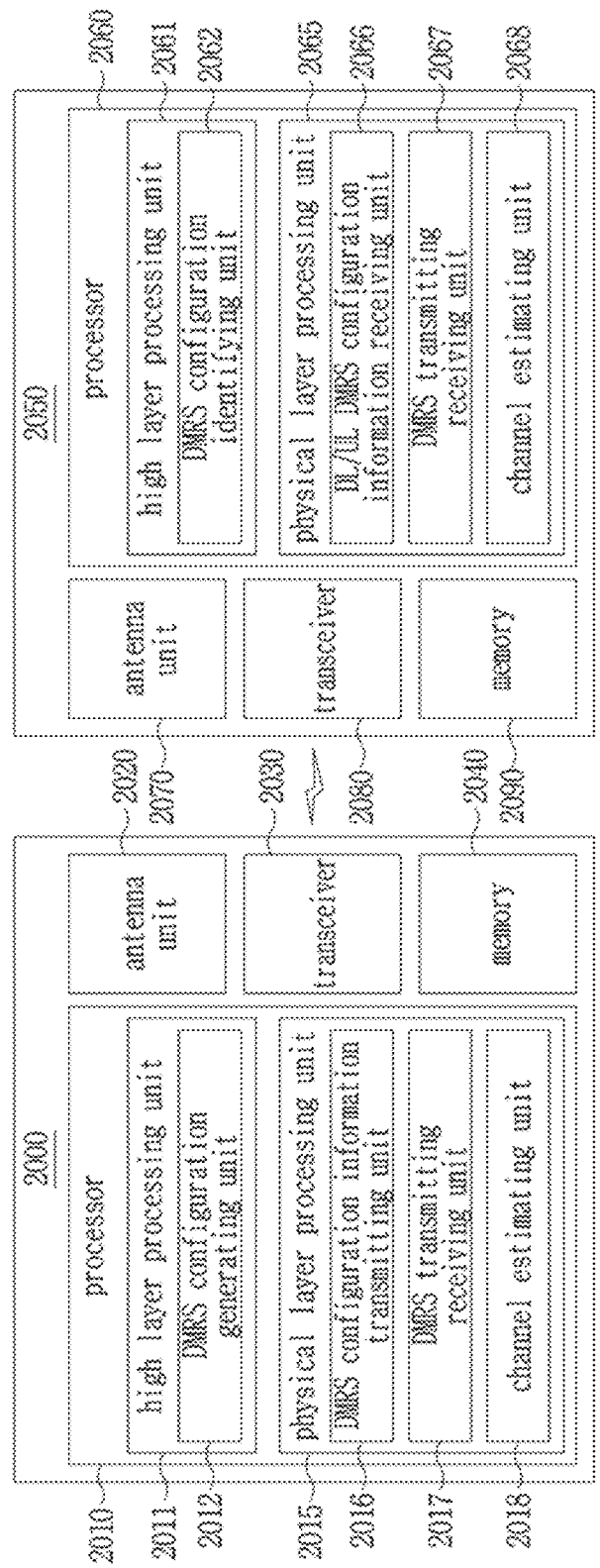
[FIG. 20]

[FIG. 21]
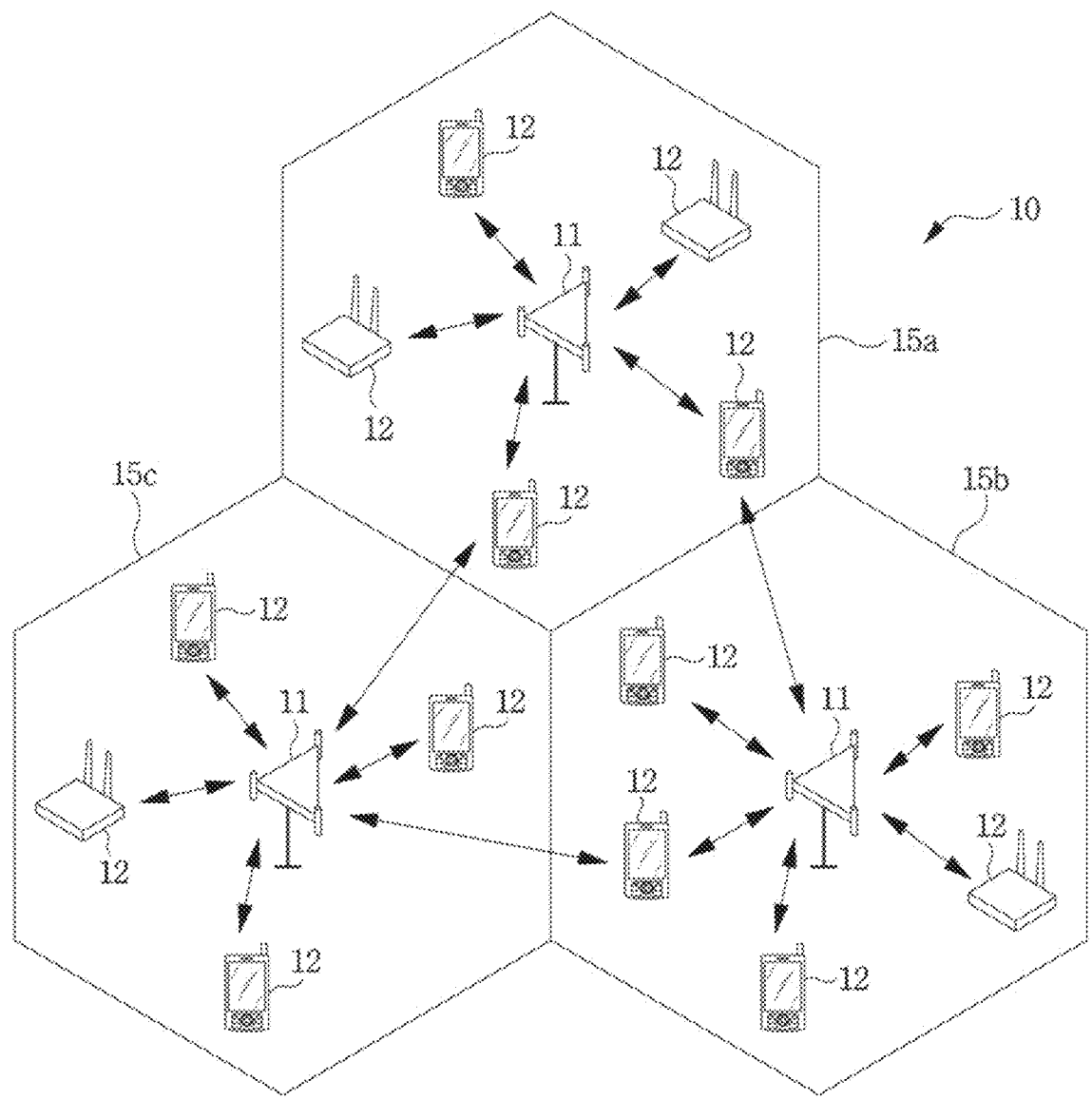

[FIG. 22]
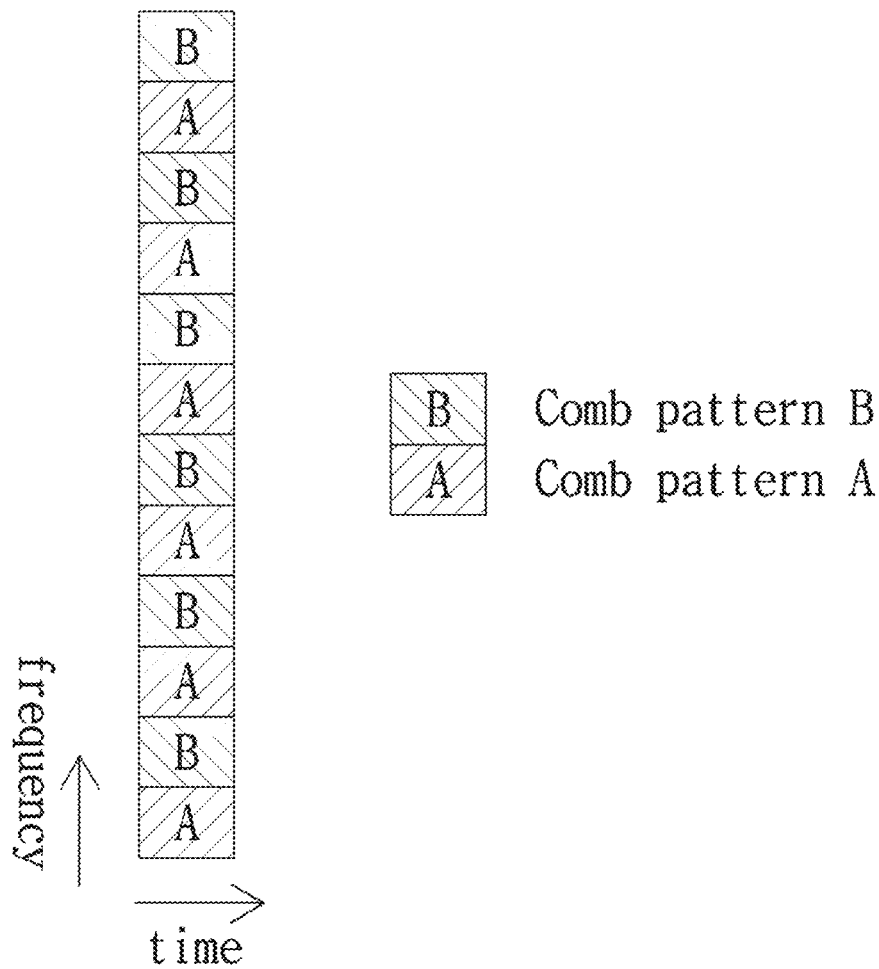

[FIG. 23]
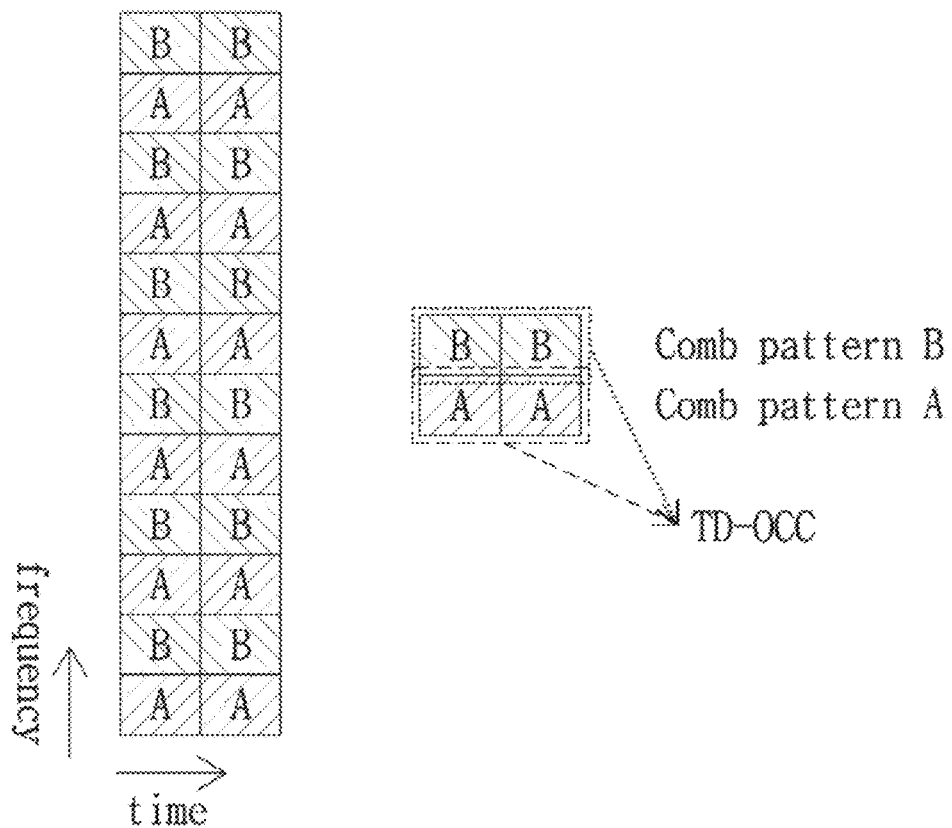

[FIG. 24]
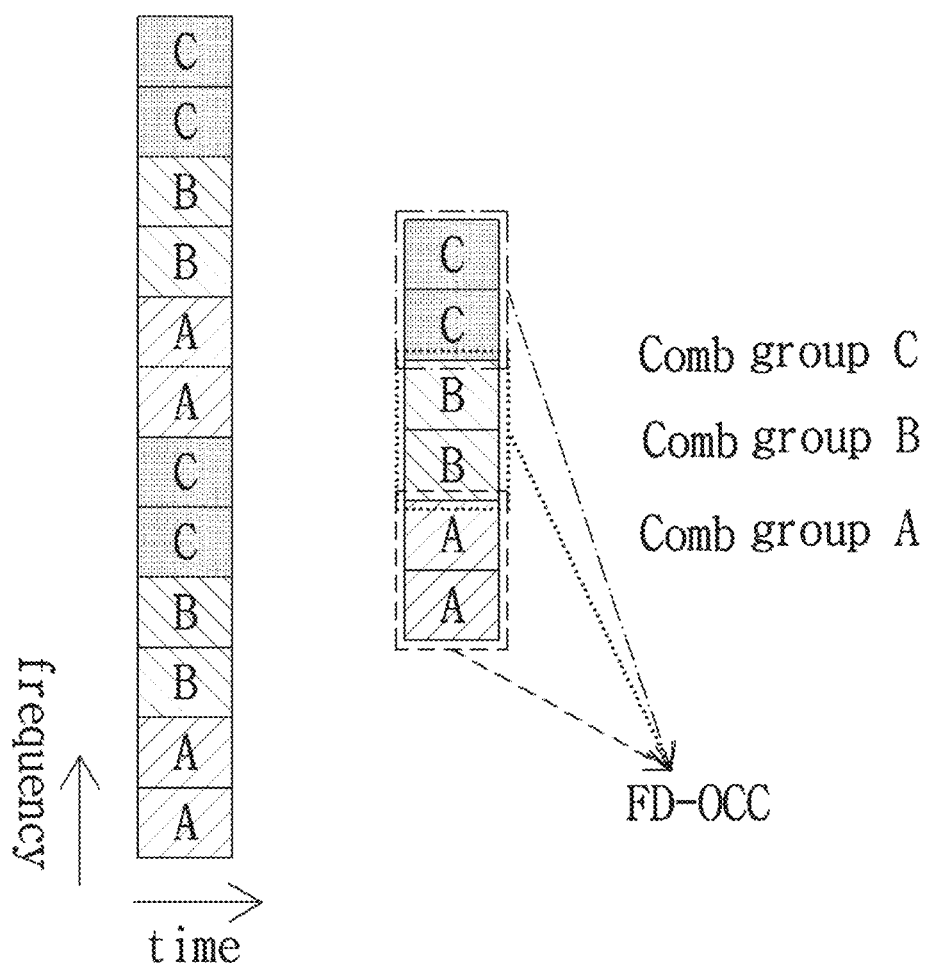

[FIG. 25]
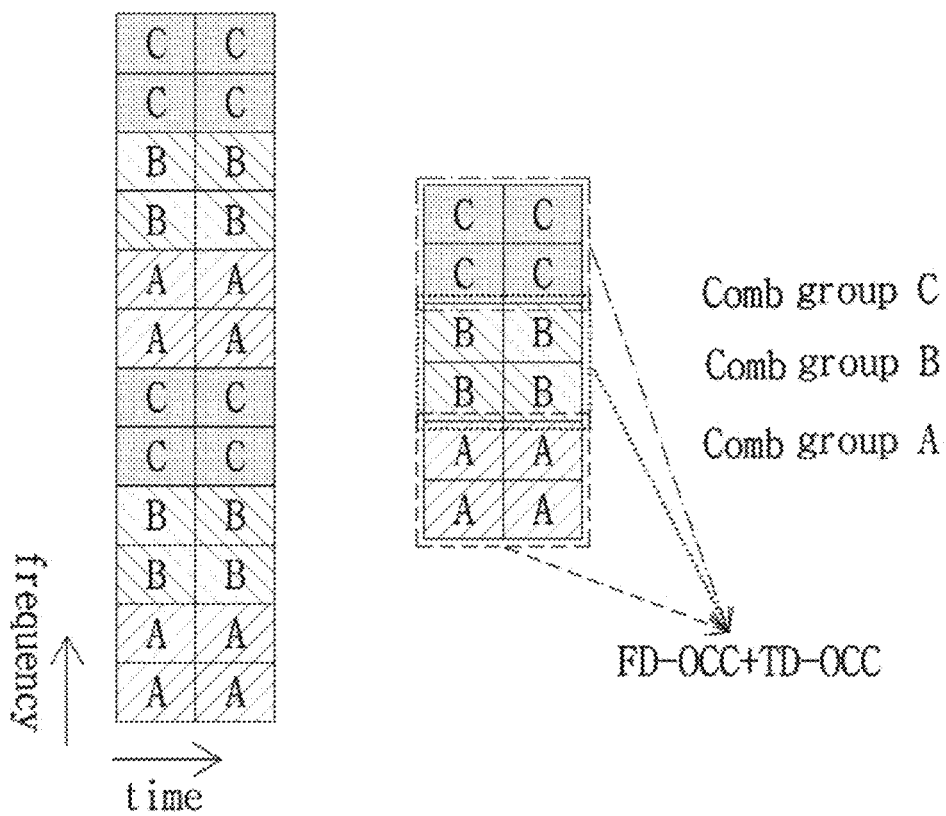

[FIG. 26]
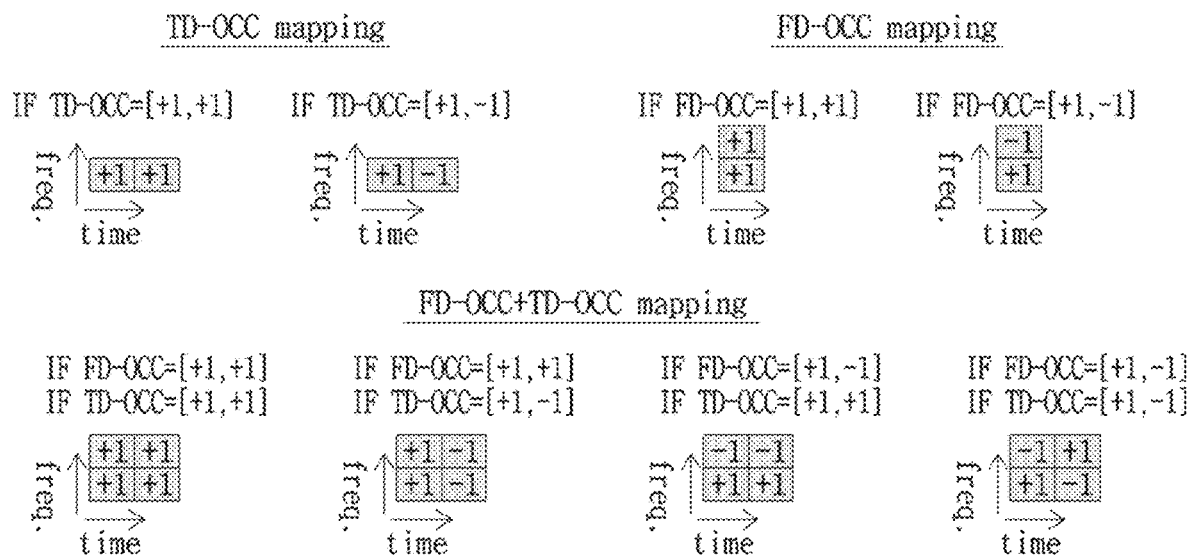

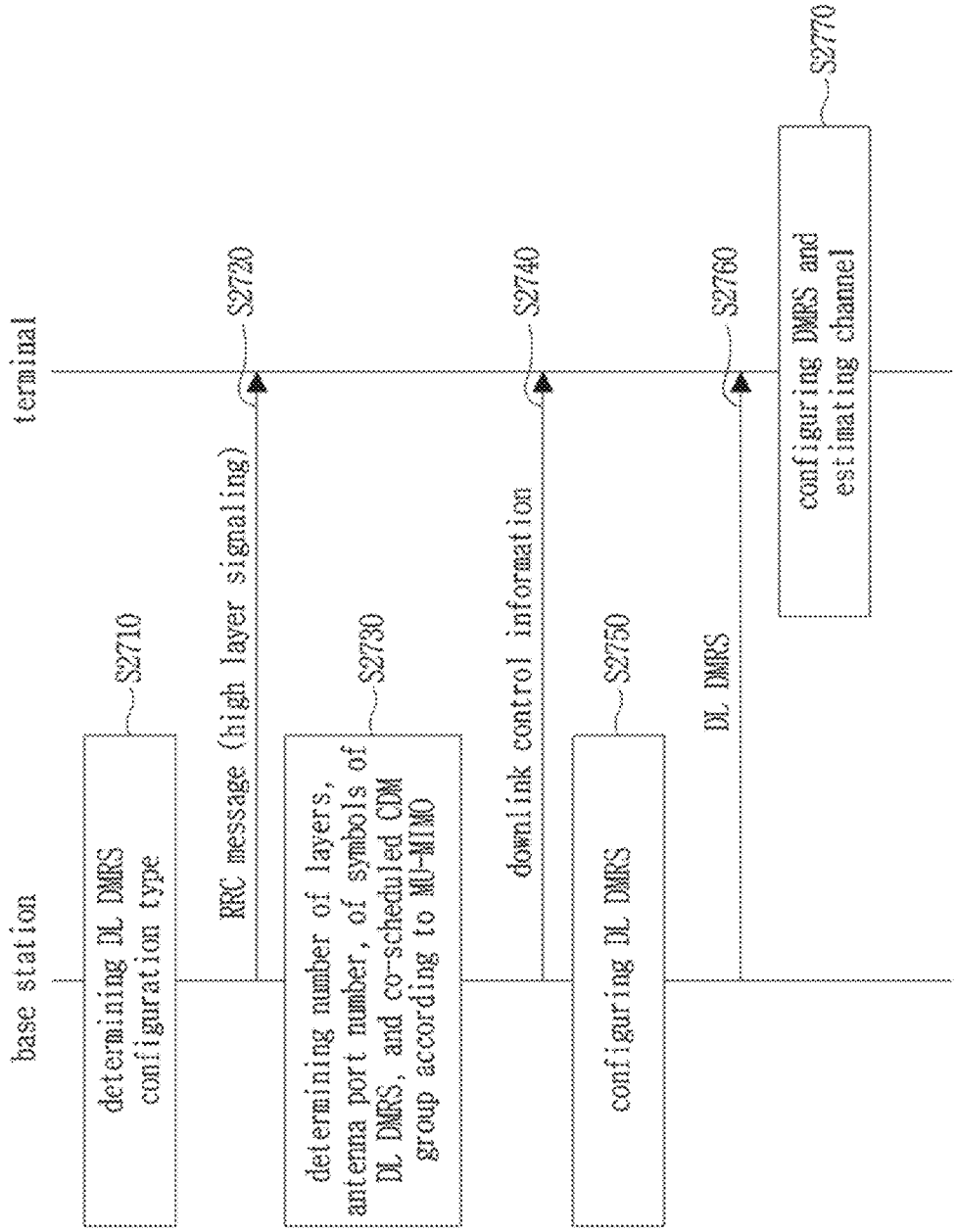

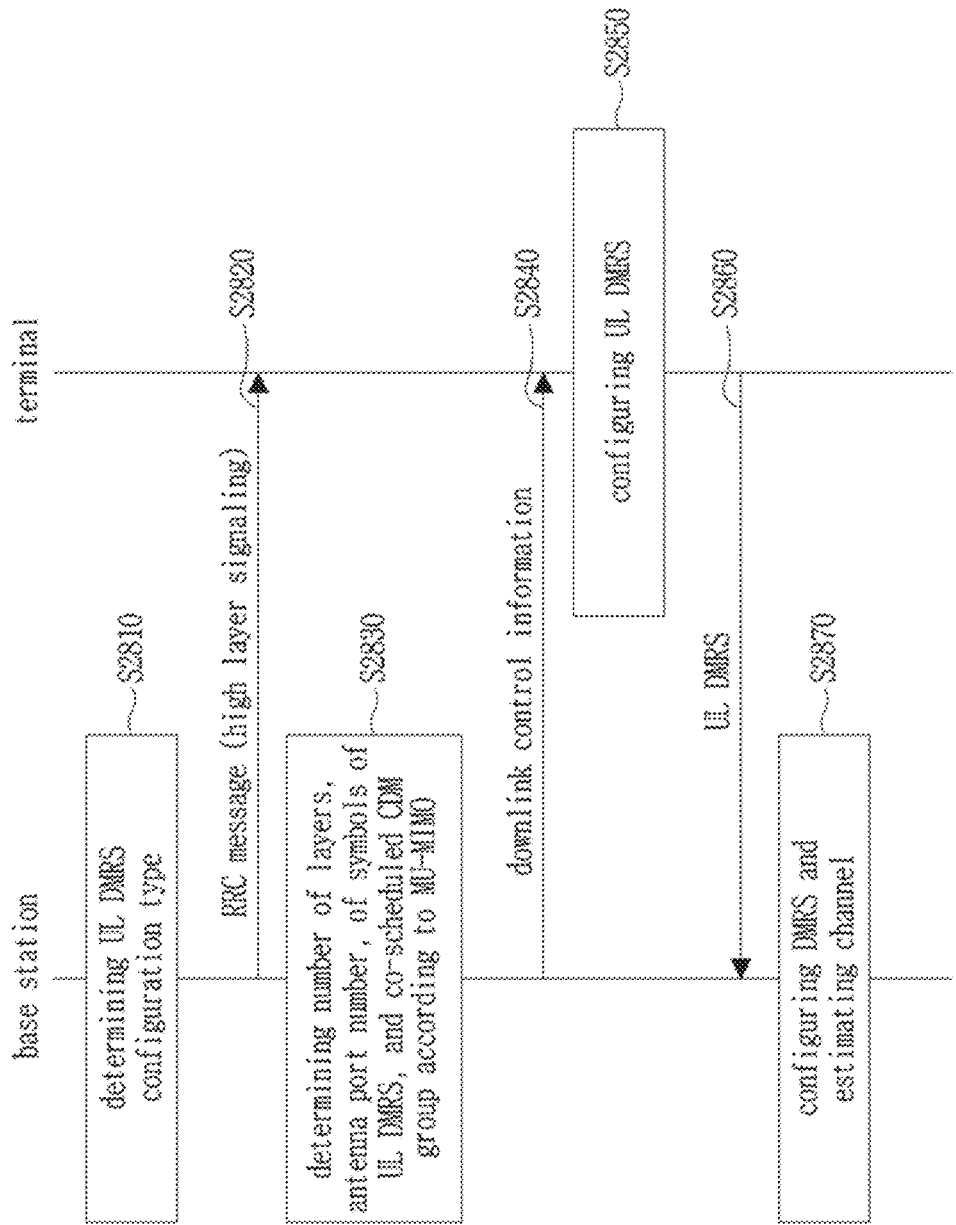

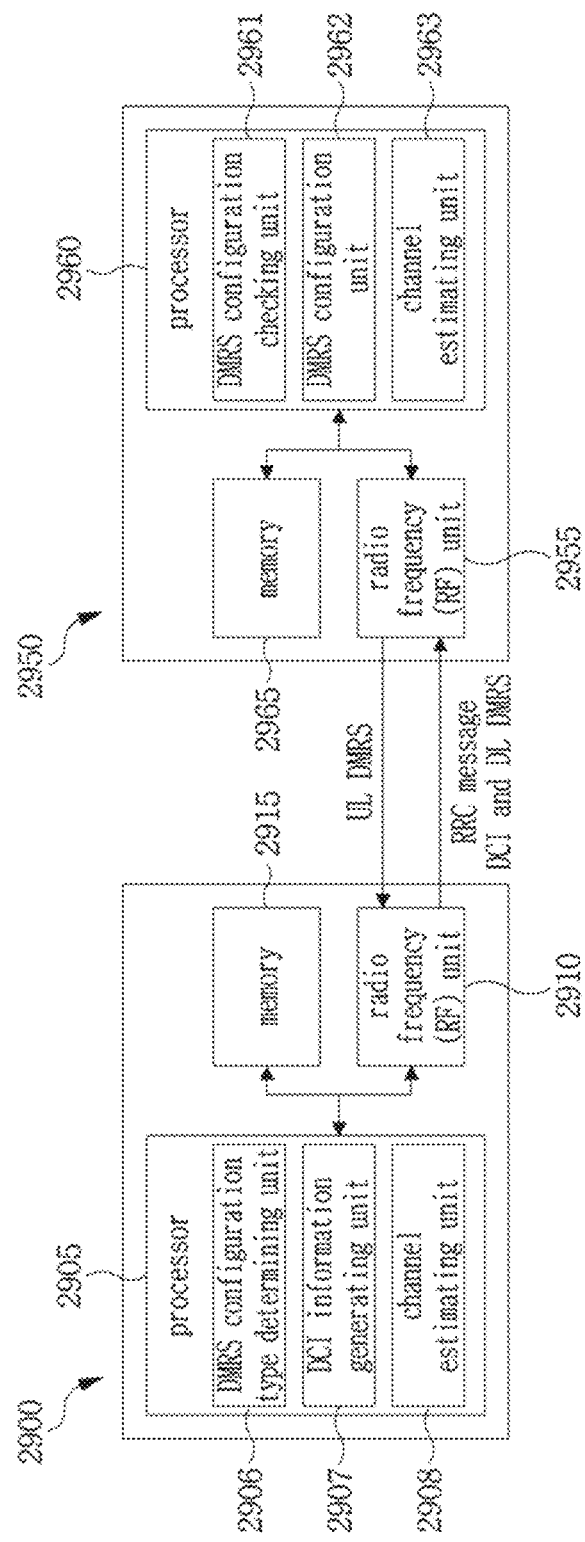

METHOD AND APPARATUS FOR TRANSMITTING AND RECEIVING DEMODULATION REFERENCE SIGNAL

CROSS-REFERENCE TO RELATED APPLICATIONS

This application is a continuation of U.S. application Ser. No. 16/827,432, filed on Mar. 23, 2020, which is a continuation of U.S. application Ser. No. 15/933,823, filed on Mar. 23, 2018, which claims priority from and the benefit of Korean Patent Application Nos. 10-2017-0037049, filed on Mar. 23, 2017, 10-2017-0101597, filed on Aug. 10, 2017, and 10-2017-0153553, filed on Nov. 17, 2017, each of which is hereby incorporated by reference in its entirety.

BACKGROUND

1. Field

The present disclosure relates to a wireless communication system, and particularly, to a method and apparatus for transmitting and receiving a reference signal.

2. Discussion of the Background

The IMT (International Mobile Telecommunication) frameworks and standards have been developed by ITU (International Telecommunication Union) and, recently, the 5th generation (5G) communication has been discussed through a program called "IMT for 2020 and beyond".

In order to satisfy requirements from "IMT for 2020 and beyond", the discussion is in progress about a way for enabling the 3rd Generation Partnership Project (3GPP) New Radio (NR) system to support various numerologies by taking into consideration various scenarios, various service requirements, potential system compatibility, or the like.

However, a method of configuring a pattern for a Demodulation Reference signal (DMRS) that supports an increased number of layers, an increased number of antenna ports, and Multi User-Multiple Input Multiple Output (MU-MIMO) for terminals in various operation modes in the NR system, and a method of signaling pattern configuration information have not yet been defined.

SUMMARY

An aspect of the present disclosure is to provide a method and apparatus for signaling pattern configuration information of a demodulation reference signal, which supports an increased number of layers and an increased number of antenna ports.

Another aspect of the present disclosure is to provide a method and apparatus for dynamically signaling pattern configuration information of a demodulation reference signal based on signaling set candidates of demodulation reference signal configuration.

An example method comprises determining a first set of antenna ports for a demodulation reference signal (DM-RS) transmission; determining, based on the first set, a frequency index associated with four adjacent resource elements, wherein the four adjacent resource elements correspond to two adjacent symbols in a time axis and to two adjacent subcarriers in a frequency axis; generating, based on a first orthogonal cover code and a second orthogonal cover code, a DM-RS associated with the first set of antenna ports; and transmitting, via a mapping to the four adjacent resource elements, the DM-RS associated with the first set of antenna ports.

Another example method comprises determining, by a base station, a type of demodulation reference signal (DM-RS) configuration; determining two adjacent orthogonal frequency division multiplexing (OFDM) symbols for mapping DM-RSs for at least three code division multiplexing (CDM) groups; determining a first set of antenna ports for a demodulation reference signal (DM-RS) transmission to a first user equipment (UE), wherein a first CDM group, among the at least three CDM groups, comprises the first set of antenna ports; determining, based on the first set, a frequency index associated with first four adjacent resource elements, wherein the first four adjacent resource elements correspond to the two adjacent OFDM symbols in a time axis and to first two adjacent subcarriers in a frequency axis; and mapping, based on a first orthogonal cover code and a second orthogonal cover code, a first DM-RS to the first four adjacent resource elements, wherein the first DM-RS is associated with the first set of antenna ports.

Another example method comprises receiving, by a user equipment (UE) and from a base station, a type of demodulation reference signal (DM-RS) configuration, a first set of antenna ports for a DM-RS transmission from the UE, and information indicating a quantity of code division multiplexing (CDM) groups scheduled for a DM-RS transmission; determining two adjacent symbols for mapping a DM-RS; determining, based on the first set, a frequency index associated with first four adjacent resource elements, wherein the first four adjacent resource elements correspond to the two adjacent symbols in a time axis and to first two adjacent subcarriers in a frequency axis; generating, based on a first orthogonal cover code and a second orthogonal cover code, a DM-RS associated with the first set of antenna ports; and transmitting, via a mapping to the first four adjacent resource elements, the DM-RS associated with the first set of antenna ports.

This Summary is submitted with the understanding that it will not be used to interpret Or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 is a diagram illustrating examples of a Demodulation Reference Signal (DMRS) pattern according to the present disclosure;

FIG. 2 is a diagram illustrating additional examples of a DMRS pattern according to the present disclosure;

FIGS. 3 to 10 are diagrams illustrating various examples of a DMRS pattern in one PRB according to the present disclosure;

FIG. 11 is a diagram illustrating a method of signaling DMRS pattern configuration information according to the present disclosure; and FIG. 12 is a diagram illustrating the configurations of a base station device and a terminal device according to the present disclosure.

FIGS. 13 to 16 are views showing examples of a DMRS pattern to which the present invention may be applied.

FIG. 17 is a view showing an application example of a TD-OCC and a FD-OCC to which the present invention may be applied.

FIG. 18 is a view showing a flowchart illustrating a method of transmitting and receiving a downlink DMRS according to the present disclosure.

FIG. 19 is a view showing a flowchart illustrating a method of transmitting and receiving an uplink DMRS according to the present disclosure.

FIG. 20 is a view showing a configuration of a wireless device according to the present disclosure.

FIG. 21 is a view showing a wireless communication system to which the present invention is applied.

FIG. 22 is a view showing a DMRS pattern when a first DMRS configuration type is applied and one symbol is used for a DMRS.

FIG. 23 is a view showing a DMRS pattern when a first DMRS configuration type is applied and two symbols are used for a DMRS.

FIG. 24 is a view showing a DMRS pattern when a second DMRS configuration type is applied and one symbol is used for a DMRS.

FIG. 25 is a view showing a DMRS pattern when a second DMRS configuration type is applied and two symbols are used for a DMRS.

FIG. 26 is a view showing a mapping example of an OCC which is applied to the present invention.

FIG. 27 is a view showing a method of transmitting a downlink DMRS in an embodiment of the present invention.

FIG. 28 is a view showing a method of transmitting an uplink DMRS in an embodiment of the present invention.

FIG. 29 is a showing a block diagram of a wireless communication system according to an embodiment of the present invention.

DETAILED DESCRIPTION

Various examples will be described more fully hereinafter with reference to the accompanying drawings. Throughout the drawings and the detailed description, unless otherwise described, the same drawing reference numerals are understood to refer to the same elements, features, and structures. In describing the examples, detailed description on known configurations or functions may be omitted for clarity and conciseness.

Further, the terms, such as first, second, A, B, (a), (b), and the like may be used herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present. In contrast, when an element is referred to as being "directly on," "directly connected to" or "directly coupled to" another element, there are no intervening elements present.

In the described exemplary system, although methods are described based on a flowchart as a series of steps or blocks, aspects of the present invention are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present invention. When an embodiment is embodied as software, the described scheme may be embodied as a module (process, function, or the like) that executes the described function. The module may be stored in a memory and may be executed by a processor. The memory may be disposed inside or outside the processor and may be connected to the processor through various well-known means.

Further, the description described herein is related to a wireless communication network, and an operation performed in a wireless communication network may be performed in a process of controlling a network and transmitting data by a system that controls a wireless network, e.g., a base station, or may be performed in a user equipment connected to the wireless communication network.

It is apparent that a base station or other network nodes other than the base station may be capable of performing various operations performed for communication with a terminal in a network including a plurality of network nodes including the base station. The 'BS (Base Station)' may be replaced with the terms, such as, a fixed station, a Node B, an eNode B (eNB), a gNodeB (gNB), an AP (Access Point), and the like. Also, the 'terminal' may be replaced with the terms, such as a UE (User Equipment), an MS (Mobile Station), an MSS (Mobile Subscriber Station), an SS (Subscriber Station), a non-AP STA (non-AP station), and the like.

In the present disclosure, transmitting or receiving a channel may include the meaning of transmitting or receiving a signal or information through the corresponding channel. For example, transmitting a control channel may indicate that a control signal or control information is transmitted through the control channel. Similarly, transmitting a data channel may indicate that transmitting a data signal or data information is transmitted through the data channel.

Hereinafter, the term "NR system" is used to distinguish a system to which various embodiments of the present disclosure are applied from the conventional system. However, the scope of the present disclosure may not be limited by the term. Also, the term "NR system" in the present specification is used as an example of a wireless communication system that is capable of supporting various numerologies. However, the term "NR system" is not limited to a wireless communication system that supports a plurality of SCSs.

First, a numerology that is considered by the NR system will be described.

An NR numerology may indicate the numerical value of the basic element or factor that generates a resource grid in the time-frequency domain for designing the NR system. For example, as an example of the numerology of the 3GPP LTE/LTE-A system, subcarrier spacing corresponds to 15 kHz (or 7.5 kHz in the case of MBSFN (Multicast-Broadcast Single-Frequency Network)). In this instance, the term "numerology" is not limited to subcarrier spacing, and may include the length of CP (Cyclic Prefix), the length of a TTI (Transmit Time Interval), the number of OFDM (Orthogonal Frequency Division Multiplexing) symbols within a predetermined time interval, the duration of a single OFDM symbol, or the like, which is associated with subcarrier spacing (or which is determined based on subcarrier spacing). That is, different numerologies may be distinguished by a difference in at least one of subcarrier spacing, a CP length, a TTI length, the number of OFDM symbols within a predetermined time interval, or the duration of a single OFDM symbol.

In order to satisfy the requirements from "IMT for 2020 and beyond", the current 3GPP NR system considers a plurality of numerologies by taking into consideration various scenarios, various service requirements, compatibility with a potential new system, or the like. More particularly, the numerology of the conventional wireless communication system is difficult to support a high frequency band, a fast moving speed, a low latency, or the like which required from "IMT for 2020 and beyond", and thus, it is needed to define a new numerology.

For example, the NR system is capable of supporting applications, such as eMBB (enhanced Mobile Broadband), mMTC (massive Machine Type Communications)/uMTC (Ultra Machine Type Communications), URLLC (Ultra-Reliable and Low Latency Communications), and the like. Particularly, the requirement associated with a user plane latency for URLLC and eMBB services is 0.5 ms in an uplink and is 4 ms in both uplink and downlink, which requires a significant decrease in the latency when compared to 10 ms, which is the requirement associated with the latency of 3GPP LTE (Long Term Evolution) and LTE-A (LTE-Advanced) system.

To enable a single NR system to satisfy various scenarios and various requirements, the NR system needs to support various numerologies. Particularly, the NR system needs to support a plurality of SCSs, unlike the conventional LTE/LTE-A system that supports a single subcarrier spacing (SCS) basically.

A new numerology for the NR system including supporting of a plurality of SCSs may be determined by assuming a wireless communication system that operates in a frequency range or carrier, such as 6 GHz or 40 GHz, in order to overcome the problems in that a broadband cannot be used in the conventional frequency range or carrier, such as 700 MHz or 2 GHz. However, the scope of the present disclosure may not be limited thereto.

In the NR system as described above, a Demodulation Reference Signal (DMRS) for demodulating a predetermined physical channel is required. For example, a DMRS for demodulating a physical data channel, a DMRS for demodulating a physical control channel, or the like may be defined in the NR system.

Particularly, the NR system may support a maximum of 8 layers or a maximum of 16 layers for a Single User (SU)-MIMO and may support a maximum of 12 orthogonal layers for Multiple User (MU)-MIMO transmission. Such layers may be mapped onto antenna ports (i.e., logical antennas), and may be transmitted via a physical channel. In order to correctly demodulate a signal transmitted via each layer or antenna port of the physical channel, a reference signal for the corresponding layer or the corresponding antenna port is needed, which is referred to as a DMRS.

The present disclosure will describe examples associated with determining DMRS mapping time-frequency resource, determining a new DMRS configuration for multiplexing a DMRS for different antenna ports mapped onto the same time-frequency resource, and signaling the DMRS configuration to each terminal by a base station, in order to support an increased number of layers and an increased number of antenna ports in the NR system.

Hereinafter, various examples associated with a DMRS layer, an antenna port, a sequence, and multiplexing for the NR system will be described. The examples are associated with new DMRS configuration which is capable of supporting the requirements of both SU-MIMO and MU-MIMO in the NR system. Also, the examples may correspond to the method of configuring a DMRS by taking into consideration basic DL transmission from a base station to a terminal in the NR system, or may correspond to the method of configuring a DMRS for MU-MIMO, which takes into consideration both SL and DL (i.e., configuration for an SL DMRS and configuration for a DL DMRS). The present disclosure is not limited thereto, and may include examples of DMRS configuration for various purposes, which can be supported by the NR system.

In the following examples, it is assumed that a maximum of 12 DMRS orthogonal antenna ports (hereinafter, DMRS antenna ports) are used. For example, DMRS antenna port numbers #1, #2, #3, #4, #5, #6, #7, #8, #9, #10, #11, and #12 are defined. However, a different number may be actually given as a DMRS antenna port number in order to distinguish the DMRS antenna port number from a different type of RS antenna port number. When #p is given as a first DMRS antenna port number, #p, #p+1, #p+2, #p+3, #p+4, #p+5, #p+6, #p+7, #p+8, #p+9, #p+10, and #p+11 may be given as the 12 DMRS antenna port numbers.

Also, it is assumed that the maximum number of DMRS layers that may be allocated to each terminal is 16 or 8.

When the number of DMRS layers that may be allocated to each terminal is 16, each layer may correspond to a combination of an antenna port and a type of sequence. The sequence type may be identified based on a scrambling ID (SCID) used for generating a sequence that is used as a DMRS. For example, a DMRS sequence generated using A as an SCID value may be distinguished from a DMRS sequence generated using B as an SCID value. For example, the antenna port-SCID combination for a DMRS may be defined as list in Table 1, each of the 16 layers may correspond to one of the combinations.

TABLE 1

| combination | antenna port | scrambling ID |
| --- | --- | --- |
| #1 | #1 | A |
| #2 | #2 | A |
| #3 | #3 | A |
| #4 | #4 | A |
| #5 | #5 | A |
| #6 | #6 | A |
| #7 | #7 | A |
| #8 | #8 | A |
| #9 | #9 | A |
| #10 | #10 | A |
| #11 | #11 | A |
| #12 | #12 | A |
| #13 | #9 | B |
| #14 | #10 | B |
| #15 | #11 | B |
| #16 | #12 | B |

In Table 1, DMRS antenna port numbers #1 to #8 may use a sequence generated based on one SCID (e.g., A), and DMRS antenna port numbers #9 to #12 may use sequences generated based on two SCIDs (e.g., A and B).

Also, as the SCID value, A=0 and B=1. However, the SCID value is not limited thereto. For example, when a DMRS is based on a Pseudo-random Noise (PN) sequence, the initial value of the PN sequence may include the SCID. Alternatively, the initial value of the PN sequence may include a value specific to one of a cell (or a terminal group), a time, and a frequency, but the initial value is not limited thereto.

When the number of DMRS layers that may be allocated to each terminal is 8, each layer may correspond to one of the eight DMRS antenna ports selected from among the DMRS antenna ports #1, #2, #3, #4, #5, #6, #7, #8, #9, #10, #11, and #12.

Hereinafter, examples of a DMRS pattern for the NR system will be described.

The DMRS pattern may include a time-frequency resource to which a DMRS is mapped, and a method of multiplexing different DMRS antenna ports that are mapped onto the same time-frequency resource.

In the NR system, a DMRS mapping resource may be defined based on a Physical Resource Block (PRB) unit, which is defined by one slot in the time-domain and 12 subcarriers in the frequency-domain. Here, one slot indicates a time unit corresponding to a total of seven symbols and a total of 14 symbols according to SCS in the time-domain. Also, a physical resource unit corresponding to one symbol and one subcarrier is a Resource Element (RE). Therefore, one PRB may include 7*12 REs or 14*12 REs according to SCS.

A DMRS for the NR system may be disposed in one or two consecutive OFDM symbols in the front part of one slot from the perspective of time, and an additional DMRS (e.g., a DMRS used when a channel that dramatically changes over time due to fast movement speed needs to be supported) may be disposed in the rear part of the slot.

The additional DMRS may be applied to a high Doppler scenario, and may have the same or lower density on the frequency domain than that of the DMRS disposed in the front part of the slot.

Also, at least, in the case of Cyclic Prefix (CP)-OFDM, a DMRS structure that is common to DL and UL may be supported in the NR system. For example, DMRSs for the same link or DMRSs for different links may be configured to be orthogonal to each other.

For DL DMRS antenna port multiplexing, at least one of Frequency Division Multiplexing (FDM), Time Division Multiplexing (TDM), and Code Division Multiplexing (CDM) may be applied. As multiplexing resources for CDM, code resources, such as a Orthogonal Cover Code (OCC), Cyclic Shift (CS), or the like may be used. Also, CDM may be applied in the time-domain, the frequency-domain, or the time-frequency domain.

FIG. 1 is a diagram illustrating examples of a DMRS pattern according to the present disclosure.

FIG. 1 illustrates the case in which 12 DMRS antenna ports are configured as six Code Division Multiplexing (CDM) groups. For example, two DMRS antenna ports may be included in one CDM group, as listed in Table 2 provided below.

TABLE 2

| CDM group | antenna port |
|---|---|
| #A | #1, #2 |
| #B | #3, #4 |
| #C | #5, #6 |
| #D | #7, #8 |
| #E | #9, #10 |
| #F | #11, #12 |

In Table 2, different CDM groups may be separated by one or more of different frequency resources and different time resources. Here, the frequency resources may be subcarriers, and the time resources may be symbols. That is, DMRS antenna ports included in different CDM groups may be mapped onto different subcarriers, thereby being multiplexed according to Frequency Division Multiplexing (FDM) scheme, may be mapped onto different OFDM symbols, thereby being multiplexed according to Time Division Multiplexing (TDM) scheme, or may be mapped onto different subcarriers and different OFDM symbols, thereby being multiplexed according to the FDM and TDM schemes.

Two DMRS antenna ports included in the same CDM group may be distinguished by an Orthogonal Cover Code (OCC). An OCC having a length of 2 may be used to distinguish two antenna ports. Also, the OCC may be applied in the time-domain, or to the frequency-domain. For example, the length-2 OCC may be applied to two OFDM symbols, or two subcarriers.

FIG. 1 illustrates REs onto which a DMRS is mapped in one PRB. The symbol index l may correspond to the index of a first symbol remaining after excluding a control region from one slot (e.g., l=2). Also, 12 subcarriers in the frequency-domain may be subcarriers belonging to an $m^{th}$ PRB.

In FIG. 1, (a) illustrates the case in which a DMRS is mapped onto a maximum of 3 symbols (i.e., l, l+1, and l+l') in one slot. Here, l' may be a value greater than 2.

Also, (a) of the FIG. 1 illustrates an example in which a length-2 OCC is applied in the frequency-domain. Particularly, CDM groups #A and #B may be mapped onto the symbol index l, and they are distinguished according to the FDM scheme. CDM groups #C and #D may be mapped onto the symbol index l+1, and they are distinguished according to the FDM scheme. CDM groups #E and #F may be mapped onto the symbol index l+l', and they are distinguished according to the FDM scheme.

Each CDM group may be repeated a maximum of three times within one PRB in the frequency-axis. That is, the maximum overhead occupied by one port in one PRB may be three REs.

(b) of the FIG. 1 illustrates the case in which a DMRS is mapped onto a maximum of 2 symbols (i.e., l and l+1) in one slot.

Also, (b) of the FIG. 1 illustrates an example in which a length-2 OCC is applied in the frequency-domain. Particularly, CDM groups #A, #B, and #C may be mapped onto the symbol index l, and they are distinguished according to the FDM scheme. CDM groups #D, #E, and #F may be mapped onto the symbol index l+l', and they are distinguished according to the FDM scheme.

Each CDM group may be repeated a maximum of two times within one PRB in the frequency-axis. That is, the maximum overhead occupied by one port in one PRB may be two REs.

(c) of the FIG. 1 illustrates the case in which a DMRS is mapped onto a maximum of 4 symbols (i.e., l, l+1, l+l', and l+l'+1) in one slot.

Also, (c) in FIG. 1 illustrates an example in which a length-2 OCC is applied in the time-domain. Particularly, CDM groups #A, #B, #C, and #D may be mapped onto the symbol indices l and l+1, and they are distinguished according to the FDM scheme. CDM groups #E and #F may be mapped onto the symbol indices l+l' and l+l'+1, and they are distinguished according to the FDM scheme.

Each CDM group may be repeated a maximum of three times within one PRB in the frequency-axis. That is, the maximum overhead occupied by one port in one PRB may be three REs.

(d) of the FIG. 1 illustrates the case in which a DMRS is mapped onto a maximum of 2 symbols (i.e., l and l+1) in one slot.

Also, (d) of the FIG. 1 illustrates an example in which a length-2 OCC is applied in the time-domain. Particularly, CDM groups #A, #B, #C, #D, #E, and #F may be mapped onto the symbol indices l and l+1, and they are distinguished according to the FDM scheme.

Each CDM group may be repeated a maximum of two times within one PRB in the frequency-axis. That is, the maximum overhead occupied by one port in one PRB may be two REs.

FIG. 2 is a diagram illustrating additional examples of a DMRS pattern according to the present disclosure.

FIG. 2 illustrates the case in which 12 DMRS antenna ports are configured as three CDM groups (e.g., each of the 12 DMRS antenna ports is classified into one of the three CDM groups). For example, four DMRS antenna ports may be included in one CDM group, as listed in Table 3 provided below.

TABLE 3

| CDM group | antenna port |
|---|---|
| #A | #1, #2, #3, #4 |
| #B | #5, #6, #7, #8 |
| #C | #9, #10, #11, #12 |

In Table 3, different CDM groups may be separated by one or more of different frequency resources and/or different time resources. Here, the frequency resources may be subcarriers, and the time resources may be symbols. That is, DMRS antenna ports included in different CDM groups may be mapped onto different subcarriers, thereby being multiplexed according to the FDM scheme, may be mapped onto different OFDM symbols, thereby being multiplexed according to the TDM scheme, or may be mapped onto different subcarriers and different OFDM symbols, thereby being multiplexed according to the FDM and TDM schemes.

Four DMRS antenna ports included in the same CDM group may be distinguished by an OCC. An OCC having a length of 4 may be used to distinguish four antenna ports. Also, the OCC may be applied in the time-domain, the frequency-domain, or the time-frequency domains. For example, the length-4 OCC may be applied to i) four OFDM symbols, ii) four subcarriers, or iii) two OFDM symbols and two subcarriers.

FIG. 2 illustrates REs onto which a DMRS is mapped in one PRB. The symbol index l may correspond to the index of a first symbol remaining after excluding a control region from one slot (e.g., l=2). Also, 12 subcarriers in the frequency-domain may be subcarriers belonging to an $m^{th}$ PRB.

In FIG. 2, (a) illustrates the case in which a DMRS is mapped onto a maximum of 3 symbols (i.e., l, l+1, and l+l') in one slot. Here, l' may be a value greater than 2.

Also, (a) of the FIG. 2 illustrates an example in which a length-4 OCC is applied in the frequency-domain. Particularly, CDM group #A may be mapped onto the symbol index l, and CDM group #B may be mapped onto the symbol index l+1, and the CDM group #C may be mapped onto the symbol index l+l'.

Each CDM group may be repeated a maximum of times within one PRB in the frequency-axis. That is, the maximum overhead occupied by one port in one PRB may be three REs.

(b) of the FIG. 2 illustrates the case in which a DMRS is mapped onto a maximum of 2 symbols (i.e., l and l+1) in one slot.

Also, (b) of the FIG. 2 illustrates an example in which a length-4 OCC is applied in the frequency-domain.

For example, CDM groups #A, #B, and #C may be mapped onto the symbol index l, and they are distinguished according to the FDM scheme. For example, CDM groups #A, #B, and #C may be mapped onto the symbol index l+1, and they are distinguished according to the FDM scheme. Here, corresponding CDM groups may be configured in only one symbol or in both two symbols according to overhead.

That is, each of the CDM group #A, the CDM group #B, and the CDM group #C may be configured in the symbol index l, and may be additionally configured in the symbol index l+1 according to overhead. Alternatively, the CDM group #A may be configured in only the symbol index l once or repeatedly two times according to overhead. The CDM group #B may be configured in only the symbol index l+1 once or repeatedly two times according to overhead. The CDM group #C may be configured in only the symbol index l or may be configured in both the symbol index l and symbol index l+1, according to overhead.

Each CDM group may be repeated a maximum of two times within one PRB in the frequency-axis. That is, the maximum overhead occupied by one port in one PRB may be two REs.

(c) of the FIG. 2 illustrates the case in which a DMRS is mapped onto a maximum of 4 symbols (i.e., l, l+1, l+l', and l+l'+1) in one slot.

Also, (c) of the FIG. 2 illustrates an example in which a length-4 OCC is applied in the frequency-domain. Particularly, CDM groups #A and #B may be mapped onto the symbol indices l and l+1, and they are distinguished according to the FDM scheme. The CDM group #C may be mapped onto the symbol indices l+l' and l+l'+1.

Each CDM group may be repeated a maximum of three times within one PRB in the frequency-axis. That is, the maximum overhead occupied by one port in one PRB may be three REs.

(d) of the FIG. 2 illustrates the case in which a DMRS is mapped onto a maximum of 2 symbols (i.e., l and l+1) in one slot.

Also, (d) of the FIG. 2 illustrates an example in which a length-4 OCC is applied in the frequency-domain. Particularly, CDM groups #A, #B, and #C may be mapped onto the symbol indices l and l+1, and they are distinguished according to the FDM scheme.

Each CDM group may be repeated a maximum of two times within one PRB in the frequency-axis. That is, the maximum overhead occupied by one port in one PRB may be two REs.

Hereinafter, examples of a DMRS pattern according to the present disclosure will be described in detail. The examples of a DMRS pattern described in the following description may correspond to a DMRS pattern in one PRB (e.g., an $m^{th}$ PRB) corresponding to one slot (an $n^{th}$ slot) in the time-domain and 12 subcarriers in the frequency domain. The DMRS pattern may be repeated in one or more additional slots or one or more PRBs.

In the examples of FIGS. 3 to 6 described below, two DMRS antenna ports may be mapped onto one CDM group, and a total of 6 CDM groups may be configured for a total of 12 DMRS antenna ports, as shown in FIG. 1 and Table 2.

FIG. 3 is a diagram illustrating an example of a DMRS pattern in one PRB according to the present disclosure.

The examples of FIG. 3 may correspond to detailed examples similar to the DMRS pattern of (a) of the FIG. 1. That is, basically, in the DMRS pattern of FIG. 3, CDM groups #A and #B, which are distinguished according to the FDM scheme, may be mapped onto a first symbol. CDM groups #C and #D, which are distinguished according to the FDM scheme, may be mapped onto a second symbol. CDM groups #E and #F, which are distinguished according to the FDM scheme, may be mapped onto a third symbol.

The OCC mapping scheme will be described with reference to (a) of the FIG. 3.

As illustrated in (a) of FIG. 3, in all cases, with respect to two REs in the frequency axis within one symbol to which corresponding CDM groups are mapped, a is applied to a first RE (e.g., an RE having a low subcarrier index) as an OCC value. b is applied to a second RE (e.g., an RE having a high subcarrier index) as an OCC value. The OCC values, a and b, may be given as listed in Table 4 provided below.

TABLE 4

| OCC value | 1st antenna port in each CDM group | 2nd antenna port in each CDM group |
|---|---|---|
| a | + 1 | +1 |
| b | + 1 | −1 |

For example, for the DMRS antenna port #1 of the CDM group #A, OCCs of +1 and +1 may be applied to two REs in the frequency axis. For the DMRS antenna port #2 of the CDM group #A, OCCs of +1 and −1 may be applied to two REs in the frequency axis.

Each CDM group may be repeated once for the (b), two times of the (c), or three times of the (d) of the in the FIG. 3 within a PRB in the frequency axis.

As illustrated in (b) of the FIG. 3, when a DMRS mapping pattern is repeated once within one PRB, DMRS overhead may be expressed as 1 RE per 1 port and 1 PRB. That is, one CDM group is mapped onto a total of two REs in one PRB, and two DMRS antenna ports are included in one CDM group and thus, it is expressed that one DMRS antenna port has overhead corresponding to one RE.

(b) of the FIG. 3 illustrates an example in which each CDM group applies a length-2 OCC-based CDM (i.e., CDM2) in the frequency axis to two contiguous or discontiguous REs in the frequency axis within one symbol, and repeats this once within one PRB in the frequency axis (i.e., two REs are used for two DMRS antenna ports within one PRB). A specific symbol index in a slot and a subcarrier position in the PRB for DMRS REs of (b) of the FIG. 3 are not limited, and may be determined according to a previously fixed position or a position obtained from signaling by a base station.

As illustrated in (c) of the FIG. 3, when a DMRS mapping pattern is repeated two times within one PRB, DMRS overhead may be expressed as 2 REs per 1 port and 1 PRB. That is, one CDM group is mapped onto a total of four REs in one PRB, and two DMRS antenna ports are included in one CDM group and thus, it is expressed that one DMRS antenna port has overhead corresponding to two REs.

The (c) of the FIG. 3 illustrates an example in which each CDM group applies a length-2 OCC-based CDM (i.e., CDM2) in the frequency-axis to two contiguous or discontiguous REs in the frequency axis within one symbol, and repeats this two times within one PRB in the frequency axis (i.e., four REs are used for two DMRS antenna ports within one PRB). A specific symbol index in a slot and a subcarrier position in a PRB for DMRS REs of (c) of the FIG. 3 are not limited, and may be determined according to a previously fixed position or a position obtained from signaling by a base station.

As illustrated in (d) of the FIG. 3, when a DMRS mapping pattern is repeated three times within one PRB, DMRS overhead may be expressed as 3 REs per 1 port and 1 PRB. That is, one CDM group is mapped onto a total of six REs in one PRB, and two DMRS antenna ports are included in one CDM group and thus, it is expressed that one DMRS antenna port has overhead corresponding to three REs.

The (d) of the FIG. 3 illustrates an example in which each CDM group applies a length-2 OCC-based CDM (i.e., CDM2) in the frequency axis to two contiguous or discontiguous REs in the frequency axis within one symbol, and repeats this three times within one PRB in the frequency axis (i.e., six REs are used for two DMRS antenna ports within one PRB). A specific symbol index in a slot and a subcarrier position in a PRB for DMRS REs of (d) of the FIG. 3 are not limited, and may be determined according to a previously fixed position or a position obtained from signaling by a base station.

An additional DMRS may be mapped onto the rear part of the slot by taking into consideration a high Doppler scenario, using the basic patterns of the (b) to (d) in FIG. 3.

Particularly, the patterns onto which a DMRS is mapped in the (b) to (d) in FIG. 3 (patterns indicating relative positions of REs onto which a DMRS is mapped in the time-frequency domain, excluding a specific symbol index and a specific subcarrier index as illustrated in (a) in the FIG. 1) may be defined as patterns 1–1, 1–2, and 1–3, respectively. Based on the above, a DMRS according to a basic pattern may be mapped onto the front part in one slot from the perspective of time, and a DMRS according to an additional pattern may be mapped onto the rear part in the same slot, as shown in Table 5 provided below.

TABLE 5

| DMRS pattern embodiments | Basic pattern (front part of slot) | Additional pattern (rear part of slot) |
|---|---|---|
| 1 | 1-1 | None |
| 2 | 1-2 | None |
| 3 | 1-3 | None |
| 4 | 1-1 | 1-1 |
| 5 | 1-1 | 1-2 |
| 6 | 1-1 | 1-3 |
| 7 | 1-2 | 1-1 |
| 8 | 1-2 | 1-2 |
| 9 | 1-2 | 1-3 |
| 10 | 1-3 | 1-1 |
| 11 | 1-3 | 1-2 |
| 12 | 1-3 | 1-3 |

The examples of (e) and (f) in the FIG. 3 may correspond to DMRS pattern embodiments 10 and 12 of Table 5.

FIG. 4 is a diagram illustrating an additional example of a DMRS pattern in one PRB according to the present disclosure.

The examples of FIG. 4 may correspond to detailed examples similar to the DMRS pattern of (b) of the FIG. 1. That is, basically, in the DMRS pattern of FIG. 4, CDM groups #A, #B, and #C, which are distinguished according to the FDM scheme, may be mapped onto a first symbol. CDM groups #D, #E, and #F, which are distinguished according to the FDM scheme, may be mapped onto a second symbol.

The OCC mapping scheme will be described with reference to (a) of the FIG. 4.

As illustrated in (a) of the FIG. 4, in all cases, with respect to two REs in the frequency axis within one symbol to which corresponding CDM groups are mapped, A is applied to a first RE (e.g., an RE having a low subcarrier index) as an OCC value. B is applied to a second RE (e.g., an RE having a high subcarrier index) as an OCC value. The OCC values a and b may be given as listed in Table 6 provided below.

TABLE 6

| OCC value | 1st antenna port in each CDM group | 2nd antenna port in each CDM group |
|---|---|---|
| A | +1 | +1 |
| B | +1 | −1 |

For example, for the DMRS antenna port #1 of the CDM group #A, OCCs of +1 and +1 may be applied to two REs in the frequency direction. For the DMRS antenna port #2 of the CDM group #A, OCCs of +1 and −1 may be applied to two REs in the frequency axis.

Each CDM group may be repeated once of the (b) or two times of the (c) in FIG. 4 within one PRB in the frequency axis.

As illustrated in (b) in the FIG. 4, when a DMRS mapping pattern is repeated once within one PRB, DMRS overhead may be expressed as 1 RE per 1 port and 1 PRB. That is, one CDM group is mapped onto two REs in one PRB, and two DMRS antenna ports are included in one CDM group and thus, it is expressed that one DMRS antenna port has overhead corresponding to one RE.

(b) in the FIG. 4 illustrates an example in which each CDM group applies a length-2 OCC-based CDM (i.e., CDM2) in the frequency axis to two contiguous or discontinuous REs in the frequency axis within one symbol, and repeats this once within one PRB in the frequency axis (i.e., two REs are used for two DMRS antenna ports within one PRB). A specific symbol index in a slot and a subcarrier position in a PRB for DMRS REs of (b) in the FIG. 4 are not limited, and may be determined according to a previously fixed position or a position obtained from signaling by a base station.

As illustrated in (c) of the FIG. 4, when a DMRS mapping pattern is repeated two times within one PRB, DMRS overhead may be expressed as 2 REs per 1 port and 1 PRB. That is, one CDM group is mapped onto a total of four REs in one PRB, and two DMRS antenna ports are included in one CDM group and thus, it is expressed that one DMRS antenna port has overhead corresponding to two REs.

The (c) of the FIG. 4 illustrates an example in which each CDM group applies a length-2 OCC-based CDM (i.e., CDM2) in the frequency axis to two contiguous or discontiguous REs in the frequency axis within one symbol, and repeats this two times within one PRB in the frequency axis (i.e., four REs are used for two DMRS antenna ports within one PRB). A specific symbol index in a slot and a subcarrier position in a PRB for DMRS REs of the (c) of the FIG. 4 are not limited, and may be determined according to a previously fixed position or a position obtained from signaling by a base station.

An additional DMRS may be mapped onto the rear part of the slot by taking into consideration a high Doppler scenario, using the basic patterns of the (b) and (c) in the FIG. 4.

Particularly, the patterns onto which a DMRS is mapped in FIGS. 4B and 4C (patterns indicating relative positions of REs onto which a DMRS is mapped in the time-frequency domain, excluding a specific symbol index and a specific subcarrier index as illustrated in the (b) in the FIG. 1 may be defined as patterns 2-1 and 2-2, respectively. Based on the above, a DMRS according to a basic pattern may be mapped onto the front part in one slot from the perspective of time, and a DMRS according to an additional pattern may be mapped onto the rear part in the same slot, as shown in Table 7 provided below.

TABLE 7

| DMRS pattern embodiments | Basic pattern (front part of slot) | Additional pattern (rear part of slot) |
|---|---|---|
| 13 | 2-1 | None |
| 14 | 2-2 | None |
| 15 | 2-1 | 2-1 |
| 16 | 2-1 | 2-2 |
| 17 | 2-2 | 2-1 |
| 18 | 2-2 | 2-2 |

The examples of (d) and (e) in the FIG. 4 may correspond to DMRS pattern embodiments 17 and 18 of Table 7, respectively.

As an additional example, based on patterns 2-1 and 2-2, a DMRS according to the basic pattern is mapped onto the front part of one slot from the perspective of time, and DMRSs according to a first additional pattern and a second additional pattern may be mapped onto the rear part of one slot, as list in Table 8 provided below.

TABLE 8

| DMRS pattern embodiments | Basic pattern (front part of slot) | First additional pattern (rear part of slot) | Second additional pattern (rear part of slot) |
|---|---|---|---|
| 19 | 2-1 | None | None |
| 20 | 2-2 | None | None |
| 21 | 2-1 | 2-1 | None |
| 22 | 2-1 | 2-2 | None |
| 23 | 2-2 | 2-1 | None |
| 24 | 2-2 | 2-2 | None |
| 25 | 2-1 | 2-1 | 2-1 |
| 26 | 2-1 | 2-1 | 2-2 |
| 27 | 2-1 | 2-2 | 2-1 |
| 28 | 2-1 | 2-2 | 2-2 |
| 29 | 2-2 | 2-1 | 2-1 |
| 30 | 2-2 | 2-1 | 2-2 |
| 31 | 2-2 | 2-2 | 2-1 |
| 32 | 2-2 | 2-2 | 2-2 |

The examples of (f) and (g) of the FIG. 4 may correspond to DMRS pattern embodiments 29 and 32 of Table 8, respectively.

FIG. 5 is a diagram illustrating an additional example of a DMRS pattern in one PRB according to the present disclosure.

The examples of FIG. 5 may correspond to detailed examples similar to the DMRS pattern of (c) in the FIG. 1. That is, basically, in the DMRS pattern of FIG. 5, CDM groups #A, #B, #C, and #D, which are distinguished according to the FDM scheme, may be mapped onto a first symbol and a second symbol. CDM groups #E and #F, which are distinguished according to the FDM scheme, may be mapped onto a third symbol and a fourth symbol. The OCC mapping scheme will be described with reference to (a) in the FIG. 5.

As illustrated in (a) in the FIG. 5, mapping scheme case #1 and mapping scheme case #2 may be alternately applied in the frequency axis with respect to two REs, which are in the same position or different positions in the frequency axis in two symbols to which corresponding CDM groups are mapped. According to the mapping scheme case #1, a may be applied to a first RE (e.g., an RE having a low symbol index) as an OCC value. b may be applied to a second RE (e.g., an RE having a high symbol index) as an OCC value. According to the mapping scheme case #2, b may be applied to a first RE (e.g., an RE having a low symbol index) as an OCC value, and a may be applied to a second RE (e.g., an RE having a high symbol index) as an OCC value. When the same OCC value (e.g., a) is mapped onto one symbol, power balancing problem may occur. Accordingly, as described above, the case #1 and the case #2 are alternately applied in the frequency domain, so as to alternately map different OCC values a and b, onto one symbol. For example, in the case in which a CDM group is repeated C times in the frequency axis with respect to two symbols to which corresponding CDM groups are mapped, when the repetition indices are 0, 1, . . . , and C−1, the case #1 may be applied to an index corresponding to even-numbered repetition, and the case #2 may be applied to an index corresponding to an odd-numbered repetition.

The OCC values a and b may be given as listed in Table 9 provided below.

TABLE 9

| OCC value | 1st antenna port in each CDM group | 2nd antenna port in each CDM group |
| --- | --- | --- |
| a | +1 | +1 |
| b | +1 | −1 |

For example, for the DMRS antenna port #1 of the CDM group #A, OCCs of +1 and +1 may be applied to two REs in the time axis. For the DMRS antenna port #2 of the CDM group #A, OCCs of +1 and −1 may be applied to two REs in the time axis.

Each CDM group may be repeated once of the (b), two times of the (c), or three times of the (d) of the FIG. 5 within one PRB in the frequency axis.

As illustrated in (b) in the FIG. 5, when a DMRS mapping pattern is repeated once within one PRB, DMRS overhead may be expressed as 1 RE per 1 port and 1 PRB. That is, one CDM group is mapped onto two REs in one PRB, and two DMRS antenna ports are included in one CDM group and thus, it is expressed that one DMRS antenna port has overhead corresponding to one RE.

The (b) in the FIG. 5 illustrates an example in which each CDM group applies a length-2 OCC-based CDM (i.e., CDM2) in the time axis with respect to two REs, which are in the same position or different positions in the frequency axis in two contiguous or discontiguous symbols, and repeats this once within one PRB (i.e., two REs are used for two DMRS antenna ports within one PRB). A specific symbol index in a slot and a subcarrier position in a PRB for DMRS REs of the (b) of the FIG. 5 are not limited, and may be determined according to a previously fixed position or a position obtained from signaling by a base station.

As illustrated in (c) of the FIG. 5, when a DMRS mapping pattern is repeated two times within one PRB, DMRS overhead may be expressed as 2 REs per 1 port and 1 PRB. That is, one CDM group is mapped onto a total of four REs in one PRB, and two DMRS antenna ports are included in one CDM group and thus, it is expressed that one DMRS antenna port has overhead corresponding to two REs.

The (c) in the FIG. 5 illustrates an example in which each CDM group applies a length-2 OCC-based CDM (i.e., CDM2) in the time axis with respect to two REs, which are in the same position or different positions in the frequency axis in two contiguous or discontiguous symbols, and repeats this two times within one PRB (i.e., four REs are used for two DMRS antenna ports within one PRB). A specific symbol index in a slot and a subcarrier position in one PRB for DMRS REs of the (c) in the FIG. 5 are not limited, and may be determined according to a previously fixed position or a position obtained from signaling by a base station.

As illustrated in (d) in the FIG. 5, when a DMRS mapping pattern is repeated three times within one PRB, DMRS overhead may be expressed as 3 REs per 1 port and 1 PRB. That is, one CDM group is mapped onto a total of six REs in one PRB, and two DMRS antenna ports are included in one CDM group and thus, it is expressed that one DMRS antenna port has overhead corresponding to three REs.

The (d) in the FIG. 5 illustrates an example in which each CDM group applies a length-2 OCC-based CDM (i.e., CDM2) to two REs in the time axis, which are in the same position or different positions in the frequency axis in two contiguous or discontiguous symbols, and repeats this three times within one PRB in the frequency axis (i.e., six REs are used for two DMRS antenna ports within one PRB). A specific symbol index in a slot and a subcarrier position in a PRB for DMRS REs of (b) in the FIG. 5 are not limited, and may be determined according to a previously fixed position or a position obtained from signaling by a base station.

An additional DMRS may be mapped onto the rear part of the slot by taking into consideration a high Doppler scenario, using the basic patterns of (b) to (d) in the FIG. 5.

Particularly, the patterns onto which a DMRS is mapped in the (b) to (d) in the FIG. 5 (patterns indicating relative positions of REs onto which a DMRS is mapped in the time-frequency domain, excluding a specific symbol index and a specific subcarrier index as illustrated in (c) of the FIG. 1) may be defined as patterns 3-1, 3-2, and 3-3, respectively. Based on the above, a DMRS according to a basic pattern may be mapped onto the front part in one slot from the perspective of time, and a DMRS according to an additional pattern may be mapped onto the rear part in the same slot, as shown in Table 10 provided below.

TABLE 10

| DMRS pattern embodiments | Basic pattern (front part of slot) | Additional pattern (rear part of slot) |
| --- | --- | --- |
| 33 | 3-1 | None |
| 34 | 3-2 | None |
| 35 | 3-3 | None |
| 36 | 3-1 | 3-1 |
| 37 | 3-1 | 3-2 |
| 38 | 3-1 | 3-3 |
| 39 | 3-2 | 3-1 |
| 40 | 3-2 | 3-2 |
| 41 | 3-2 | 3-3 |
| 42 | 3-3 | 3-1 |
| 43 | 3-3 | 3-2 |
| 44 | 3-3 | 3-3 |

The examples of (e) and (f) in the FIG. 5 may correspond to DMRS pattern embodiments 42 and 44 of Table 10, respectively.

FIG. 6 is a diagram illustrating an additional example of a DMRS pattern in one PRB according to the present disclosure.

The examples of FIG. 6 may correspond to detailed examples similar to the DMRS pattern of (d) of FIG. 1. That is, basically, in the DMRS pattern of FIG. 6, CDM groups #A, #B, #C, #D, #E, and #F, which are distinguished according to the FDM scheme, may be mapped onto a first symbol and a second symbol.

The OCC mapping scheme will be described with reference to (a) the FIG. 6.

As illustrated in the (a) in the FIG. 6, mapping scheme case #1 and mapping scheme case #2 may be alternately applied in the frequency axis with respect to two REs, which are in the same position or different positions in the frequency axis in two symbols to which corresponding CDM groups are mapped. According to the mapping scheme case #1, a may be applied to a first RE (e.g., an RE having a low symbol index) as an OCC value. b may be applied to a second RE (e.g., an RE having a high symbol index) as an OCC value. According to the mapping scheme case #2, b may be applied to a first RE (e.g., an RE having a low symbol index) as an OCC value, and a may be applied to a second RE (e.g., an RE having a high symbol index) as an OCC value.

When the same OCC value (e.g., a) is mapped onto one symbol, power balancing problem may occur. Accordingly, as described above, the case #1 and the case #2 are alternately applied in the frequency axis, so as to alternately map different OCC values a and b onto one symbol.

For example, in the case in which a CDM group is repeated C times in the frequency axis with respect to two symbols to which corresponding CDM groups are mapped, when the repetition indices are 0, 1, . . . , and C−1, the case #1 may be applied to an index corresponding to even-numbered repetition, and the case #2 may be applied to an index corresponding to add-numbered repetition.

The OCC values a and b may be given as listed in Table 11 provided below.

TABLE 11

| OCC value | 1st antenna port in each CDM group | 2nd antenna port in each CDM group |
|---|---|---|
| a | +1 | +1 |
| b | +1 | −1 |

For example, for the DMRS antenna port #1 of the CDM group #A, OCCs of +1 and +1 may be applied to two REs in the time axis. For the DMRS antenna port #2 of the CDM group #A, OCCs of +1 and −1 may be applied to two REs in the time axis.

Each CDM group may be repeated once of the (b), or two times of the (c) in the FIG. 6 within one PRB in the frequency axis.

As illustrated in (b) in the FIG. 6, when a DMRS mapping pattern is repeated once within one PRB, DMRS overhead may be expressed as 1 RE per 1 port and 1 PRB. That is, one CDM group is mapped onto a total of two REs in one PRB, and two DMRS antenna ports are included in one CDM group and thus, it is expressed that one DMRS antenna port has overhead corresponding to one RE.

The (b) in the FIG. 6 illustrates an example in which each CDM group applies a length-2 OCC-based CDM (i.e., CDM2) in the time axis with respect to two REs, which are in the same position or different positions in the frequency axis in two continuous or discontiguous symbols, and repeats this once within one PRB (i.e., two REs are used for two DMRS antenna ports within one PRB). A specific symbol index in a slot and a subcarrier position in a PRB for DMRS REs of the (b) in the FIG. 6 are not limited, and may be determined according to a previously fixed position or a position obtained from signaling by a base station.

As illustrated in (c) of the FIG. 6, when a DMRS mapping pattern is repeated two times within one PRB, DMRS overhead may be expressed as 2 REs per 1 port and 1 PRB. That is, one CDM group is mapped onto a total of four REs in one PRB, and two DMRS antenna ports are included in one CDM group and thus, it is expressed that one DMRS antenna port has overhead corresponding to two REs.

The (c) of the FIG. 6 illustrates an example in which each CDM group applies a length-2 OCC-based CDM (i.e., CDM2) in the time axis with respect to two REs, which are in the same position or different positions in the frequency axis in two contiguous or discontiguous symbols, and repeats this two times within one PRB (i.e., four REs are used for two DMRS antenna ports within one PRB). A specific symbol index in a slot and a subcarrier position in a PRB for DMRS REs of (c) of the FIG. 6 are not limited, and may be determined according to a previously fixed position or a position obtained from signaling by a base station.

An additional DMRS may be mapped onto the rear part of the slot by taking into consideration a high Doppler scenario, using the basic patterns of (b) and (c) in the FIG. 6.

Particularly, the patterns onto which a DMRS is mapped in (b) and (c) in the FIG. 6 (patterns indicating relative positions of REs onto which a DMRS is mapped in the time-frequency domain, excluding a specific symbol index and a specific subcarrier index as illustrated in (a) in the FIG. 1) may be defined as patterns 4-1 and 4-2, respectively. Based on the above, a DMRS according to the basic pattern may be mapped onto the front part in one slot from the perspective of time, and a DMRS according to an additional pattern may be mapped onto the rear part in the same slot, as shown in Table 12 provided below.

TABLE 12

| DMRS pattern embodiments | Basic pattern (front part of slot) | Additional pattern (rear part of slot) |
|---|---|---|
| 45 | 4-1 | None |
| 46 | 4-2 | None |
| 47 | 4-1 | 4-1 |
| 48 | 4-1 | 4-2 |
| 49 | 4-2 | 4-1 |
| 50 | 4-2 | 4-2 |

The examples of (d) and (e) in the FIG. 6 may correspond to DMRS pattern embodiments 49 and 50 of Table 12, respectively.

As an additional example, based on patterns 4-1 and 4-2, a DMRS according to a basic pattern is mapped onto the front part of one slot from the perspective of time, and DMRSs according to a first additional pattern and a second additional pattern may be mapped onto the rear part of one slot.

TABLE 13

| DMRS pattern embodiments | Basic pattern (front part of slot) | First additional pattern (rear part of slot) | Second additional pattern (rear part of slot) |
|---|---|---|---|
| 51 | 4-1 | None | None |
| 52 | 4-2 | None | None |
| 53 | 4-1 | 4-1 | None |
| 54 | 4-1 | 4-2 | None |
| 55 | 4-2 | 4-1 | None |
| 56 | 4-2 | 4-2 | None |
| 57 | 4-1 | 4-1 | 4-1 |
| 58 | 4-1 | 4-1 | 4-2 |
| 59 | 4-1 | 4-2 | 4-1 |
| 60 | 4-1 | 4-2 | 4-2 |
| 61 | 4-2 | 4-1 | 4-1 |
| 62 | 4-2 | 4-1 | 4-2 |
| 63 | 4-2 | 4-2 | 4-1 |
| 64 | 4-2 | 4-2 | 4-2 |

The examples of (f) and (g) in the FIG. 6 may correspond to DMRS pattern embodiments 61 and 64 of Table 13, respectively.

In the examples of FIGS. 7 to 10 described below, four DMRS antenna ports may be mapped onto one CDM group, and a total of 3 CDM groups may be configured for a total of 12 DMRS antenna ports, as shown in FIG. 2 and Table 3.

FIG. 7 is a diagram illustrating an additional example of a DMRS pattern in one PRB according to the present disclosure.

The examples of FIG. 7 may correspond to detailed examples similar to the DMRS pattern of (a) in the FIG. 2. That is, in the DMRS pattern of FIG. 7, basically, CDM group #A may be mapped onto a first symbol, CDM group #B may be mapped onto a second symbol, and CDM group #C may be mapped onto a third symbol.

The OCC mapping scheme will be described with reference to (a) in the FIG. 7.

As illustrated in (a) in the FIG. 7, in all cases, with respect to four REs in the frequency axis within one symbol to which corresponding CDM groups are mapped, a is applied to a first RE (e.g., an RE having the lowest subcarrier index) as an OCC value. b is applied to a second RE (e.g., an RE having the second lowest subcarrier index) as an OCC value. c is applied to a third RE (e.g., an RE having the third lowest subcarrier index) as an OCC value. d is applied to a fourth RE (e.g., an RE having the highest subcarrier index) as an OCC value.

The OCC values a, b, c, and d may be given as listed in Table 12 provided below.

TABLE 14

| OCC value | 1st antenna port in each CDM group | 2nd antenna port in each CDM group | 3rd antenna port in each CDM group | 4th antenna port in each CDM group |
| --- | --- | --- | --- | --- |
| a | +1 | +1 | +1 | +1 |
| b | +1 | −1 | +1 | −1 |
| c | +1 | +1 | −1 | −1 |
| d | +1 | −1 | −1 | +1 |

For example, for the DMRS antenna port #1 of the CDM group #A, OCCs of +1, +1, +1, and +1 may be applied to four REs in the frequency axis. For the DMRS antenna port #2 of the CDM group #A, OCCs of +1, −1, +1, and −1 may be applied to four REs in the frequency axis. For the DMRS antenna port #3 of the CDM group #A, OCCs of +1, +1, −1, and −1 may be applied to four REs in the frequency axis. For the DMRS antenna port #4 of the CDM group #A, OCCs of +1, −1, −1, and +1 may be applied to four REs in the frequency axis.

Each CDM group may be repeated once of the (b), two times of (c), or three times of the (d) in the (FIG. 7) within one PRB in the frequency axis.

As illustrated in (b) in the FIG. 7, when a DMRS mapping pattern is repeated once within one PRB, DMRS overhead may be expressed as 1 RE per 1 port and 1 PRB. That is, one CDM group is mapped onto a total of four REs in one PRB, and four DMRS antenna ports are included in one CDM group and thus, it is expressed that one DMRS antenna port has overhead corresponding to one RE.

The (b) in the FIG. 7 illustrates an example in which each CDM group applies a length-4 OCC-based CDM (i.e., CDM4) in the frequency axis with respect to four contiguous or discontiguous REs in the frequency axis within one symbol, and repeats this once within one PRB in the frequency axis (i.e., four REs are used for four DMRS antenna ports within one PRB). A specific symbol index in a slot and a subcarrier position in a PRB for DMRS REs of (b) the FIG. 7 are not limited, and may be determined according to a previously fixed position or a position obtained from signaling by a base station.

As illustrated in (c) in the FIG. 7, when a DMRS mapping pattern is repeated two times within one PRB, DMRS overhead may be expressed as 2 REs per 1 port and 1 PRB. That is, one CDM group is mapped onto a total of eight REs in one PRB, and four DMRS antenna ports are included in one CDM group and thus, it is expressed that one DMRS antenna port has overhead corresponding to two REs.

The (c) of the FIG. 7 illustrates an example in which each CDM group applies a length-4 OCC-based CDM (i.e., CDM4) in the frequency axis with respect to four contiguous or discontinuous REs in the frequency axis within one symbol, and repeats this two times within one PRB in the frequency axis (i.e., eight REs are used for four DMRS antenna ports within one PRB). A specific symbol index in a slot and a subcarrier position in a PRB for DMRS REs of (c) of the FIG. 7 are not limited, and may be determined according to a previously fixed position or a position obtained from signaling by a base station.

As illustrated in (d) in the FIG. 7, when a DMRS mapping pattern is repeated three times within one PRB, DMRS overhead may be expressed as 3 REs per 1 port and 1 PRB. That is, one CDM group is mapped onto a total of 12 REs in one PRB, and four DMRS antenna ports are included in one CDM group and thus, it is expressed that one DMRS antenna port has overhead corresponding to three REs.

The (d) in the FIG. 7 illustrates an example in which each CDM group applies a length-4 OCC-based CDM (i.e., CDM4) in the frequency axis with respect to four contiguous or discontiguous REs in the frequency axis within one symbol, and repeats this three times within one PRB (i.e., 12 REs are used for four DMRS antenna ports within one PRB). A specific symbol index in a slot and a subcarrier position in a PRB for DMRS REs of (d) of the FIG. 7 are not limited, and may be determined according to a previously fixed position or a position obtained from signaling by a base station.

An additional DMRS may be mapped onto the rear part of the slot by taking into consideration a high Doppler scenario, using the basic patterns of (b) and (d) in the FIG. 7.

Particularly, the patterns onto which a DMRS is mapped in (b) and (d) in the FIG. 7 (patterns indicating relative positions of REs onto which a DMRS is mapped in the time-frequency domain, excluding a specific symbol index and a specific subcarrier index as illustrated in (a) in the FIG. 2) may be defined as patterns 5-1, 5-2, and 5-3, respectively. Based on the above, a DMRS according to a basic pattern may be mapped onto the front part in one slot from the perspective of time, and a DMRS according to an additional pattern may be mapped onto the rear part in the same slot, as shown in Table 15 provided below.

TABLE 15

| DMRS pattern embodiments | Basic pattern (front part of slot) | Additional pattern (rear part of slot) |
| --- | --- | --- |
| 65 | 5-1 | None |
| 66 | 5-2 | None |
| 67 | 5-3 | None |
| 68 | 5-1 | 5-1 |
| 69 | 5-1 | 5-2 |
| 70 | 5-1 | 5-3 |
| 71 | 5-2 | 5-1 |

TABLE 15-continued

| DMRS pattern embodiments | Basic pattern (front part of slot) | Additional pattern (rear part of slot) |
|---|---|---|
| 72 | 5-2 | 5-2 |
| 73 | 5-2 | 5-3 |
| 74 | 5-3 | 5-1 |
| 75 | 5-3 | 5-2 |
| 76 | 5-3 | 5-3 |

The examples of (e) and (f) in the FIG. 7 may correspond to DMRS pattern embodiments 74 and 76 of Table 15, respectively.

FIG. 8 is a diagram illustrating an additional example of a DMRS pattern in one PRB according to the present disclosure.

The examples of FIG. 8 may correspond to detailed examples similar to the DMRS pattern of (b) in the FIG. 2. That is, basically, in the DMRS pattern of FIG. 8, CDM groups #A, #B, and #C, which are distinguished according to the FDM scheme, may be mapped onto a first symbol. Alternatively, basically, in the DMRS pattern of FIG. 8, CDM groups #A, #B, and #C, which are distinguished according to the FDM scheme, may be mapped onto a first symbol. CDM groups #A, #B, and #C, which are distinguished according to the FDM scheme, may also be mapped onto a second symbol. As described above, corresponding CDM groups may be mapped onto only the first symbol or may be mapped onto both the first symbol and the second symbol, according to overhead.

As an additional example, the CDM group #A may be mapped onto the first symbol, and the CDM group #C may be mapped onto the second symbol. The CDM group #B may be mapped onto only the first symbol, or may be mapped onto both the first symbol and the second symbol, according to overhead.

The OCC mapping scheme will be described with reference to (a) in the FIG. 8.

As illustrated in the (a) in the FIG. 8, in all cases, with respect to four REs in the frequency axis within one symbol to which corresponding CDM groups are mapped, a is applied to a first RE (e.g., an RE having the lowest subcarrier index) as an OCC value. b is applied to a second RE (e.g., an RE having the second lowest subcarrier index) as an OCC value. c is applied to a third RE (e.g., an RE having the third lowest subcarrier index) as an OCC value. d is applied to a fourth RE (e.g., an RE having the highest subcarrier index) as an OCC value.

The OCC values a, b, c, and d may be given as listed in Table 16 provided below

TABLE 16

| OCC value | 1st antenna port in each CDM group | 2nd antenna port in each CDM group | 3rd antenna port in each CDM group | 4th antenna port in each CDM group |
|---|---|---|---|---|
| a | +1 | +1 | +1 | +1 |
| b | +1 | −1 | +1 | −1 |
| c | +1 | +1 | −1 | −1 |
| d | +1 | −1 | −1 | +1 |

For example, for the DMRS antenna port #1 of the CDM group #A, OCCs of +1, +1, +1, and +1 may be applied to four REs in the frequency axis. For the DMRS antenna port #2 of the CDM group #A, OCCs of +1, −1, +1, and −1 may be applied to four REs in the frequency axis. For the DMRS antenna port #3 of the CDM group #A, OCCs of +1, +1, −1, and −1 may be applied to four REs in the frequency axis. For the DMRS antenna port #4 of the CDM group #A, OCCs of +1, −1, −1, and −1 may be applied to four REs in the frequency axis.

Each CDM group may be repeated once of (b), or two times of (c) in the FIG. 8 within a PRB in the frequency axis.

As illustrated in (b) in the FIG. 8, when a DMRS mapping pattern is repeated once within one PRB, DMRS overhead may be expressed as 1 RE per 1 port and 1 PRB. That is, one CDM group is mapped onto a total of four REs in one PRB, and four DMRS antenna ports are included in one CDM group and thus, it is expressed that one DMRS antenna port has overhead corresponding to one RE.

The (b) in the FIG. 8 illustrates an example in which each CDM group applies a length-4 OCC-based CDM (i.e., CDM4) in the frequency axis with respect to four contiguous or discontiguous REs in the frequency axis within one symbol, and repeats this once within one PRB in the frequency axis (i.e., four REs are used for four DMRS antenna ports within one PRB). A specific symbol index in a slot and a subcarrier position in a PRB for DMRS REs of (b) in the FIG. 8 are not limited, and may be determined according to a previously fixed position or a position obtained from signaling by a base station.

As illustrated in (c) in the FIG. 8, when a DMRS mapping pattern is repeated two times within one PRB, DMRS overhead may be expressed as 2 REs per 1 port and 1 PRB. That is, one CDM group is mapped onto a total of eight REs in one PRB, and four DMRS antenna ports are included in one CDM group and thus, it is expressed that one DMRS antenna port has overhead corresponding to two REs.

The (c) in the FIG. 8 illustrates an example in which each CDM group applies a length-4 OCC-based CDM (i.e., CDM4) in the frequency axis with respect to four contiguous or discontiguous REs in the frequency axis within one symbol, and repeats this two times within one PRB in the frequency axis (i.e., eight REs are used for four DMRS antenna ports within one PRB). A specific symbol index in a slot and a specific subcarrier in a PRB for DMRS REs of the (c) in the FIG. 8 are not limited, and may be determined according to a previously fixed position or a position obtained from signaling by a base station.

An additional DMRS may be mapped onto the rear part of the slot by taking into consideration a high Doppler scenario, using the basic patterns of the (b) and (c) in the FIG. 8.

Particularly, the patterns onto which a DMRS is mapped in the (b) and (c) in the FIG. 8 (patterns indicating relative positions of REs onto which a DMRS is mapped in the time-frequency domain, excluding a specific symbol index and a specific subcarrier index as illustrated in (b) in the FIG. 2) may be defined as patterns 6-1 and 6-2, respectively. Based on the above, a DMRS according to a basic pattern may be mapped onto the front part in one slot from the perspective of time, and a DMRS according to an additional pattern may be mapped onto the part in the same slot, as shown in Table 17 provided below.

TABLE 17

| DMRS pattern embodiments | Basic pattern (front part of slot) | Additional pattern (rear part of slot) |
|---|---|---|
| 77 | 6-1 | None |
| 78 | 6-2 | None |
| 79 | 6-1 | 6-1 |
| 80 | 6-1 | 6-2 |
| 81 | 6-2 | 6-1 |
| 82 | 6-2 | 6-2 |

The examples of (d) and (e) in the FIG. 8 may correspond to DMRS pattern embodiments 81 and 82 of Table 17, respectively.

As an additional example, based on patterns 6-1 and 6-2, a DMRS according to the basic pattern is mapped onto the front part of one slot from the perspective of time, and DMRSs according to a first additional pattern and a second additional pattern may be mapped onto the rear part of one slot.

TABLE 18

| DMRS pattern embodiments | Basic pattern (front part of slot) | First additional pattern (rear part of slot) | Second additional pattern (rear part of slot) |
|---|---|---|---|
| 83 | 6-1 | None | None |
| 84 | 6-2 | None | None |
| 85 | 6-1 | 6-1 | None |
| 86 | 6-1 | 6-2 | None |
| 87 | 6-2 | 6-1 | None |
| 88 | 6-2 | 6-2 | None |
| 89 | 6-1 | 6-1 | 6-1 |
| 90 | 6-1 | 6-1 | 6-2 |
| 91 | 6-1 | 6-2 | 6-1 |
| 92 | 6-1 | 6-2 | 6-2 |
| 93 | 6-2 | 6-1 | 6-1 |
| 94 | 6-2 | 6-1 | 6-2 |
| 95 | 6-2 | 6-2 | 6-1 |
| 96 | 6-2 | 6-2 | 6-2 |

The examples of (f) and (g) in the FIG. 8 may correspond to DMRS pattern embodiments 93 and 96 of Table 18, respectively.

FIG. 9 is a diagram illustrating an additional example of a DMRS pattern in one PRB according to the present disclosure.

The examples of FIG. 9 may correspond to detailed examples similar to the DMRS pattern of (c) in the FIG. 2. That is, basically, in the DMRS pattern of FIG. 9, CDM groups #A and #B, which are distinguished according to the FDM scheme, may be mapped onto a first symbol and a second symbol. CDM group #C may be mapped onto a third symbol and a fourth symbol.

The OCC mapping scheme will be described with reference to (a) in the FIG. 9.

As shown in the OCC mapping schemes A, B, C, and D in the (a) FIG. 9, mapping scheme case #1 and mapping scheme case #2 may be alternately applied in the frequency axis with respect to a total of four REs in the frequency axis and in the time axis in two symbols to which corresponding CDM groups are mapped. The OCC mapping at the first symbol of the case #1 may be the same as the OCC mapping at the second symbol of the case #2. The OCC mapping at the second symbol of the case #1 may be the same as the OCC mapping at the first symbol of the case #2.

When the same OCC value (e.g., a and b) is mapped onto one symbol, power balancing problem may occur. Accordingly, as described above, the case #1 and the case #2 are alternately applied in the frequency axis, so as to alternately map different OCC values (a and b, and c and d) onto one symbol.

For example, in the case in which a CDM group is repeated C times in the frequency axis with respect to two symbols to which corresponding CDM groups are mapped, when the repetition indices are 0, 1, . . . , and C−1, the case #1 may be applied to an index corresponding to even-numbered repetition, and the case #2 may be applied to an index corresponding to odd-numbered repetition.

The differences in the OCC mapping schemes A, B, C, and D will be described from the perspective of the case #1. The OCC mapping scheme A maps OCC values (a and b) in the time axis first, and then map OCC values (c and d) in the time axis at a subsequent frequency resource. The OCC mapping scheme B maps OCC values (a and b) in the frequency axis first, and then maps OCC values (c and d) in the frequency axis at a subsequent time resource. The OCC mapping scheme C maps OCC values (a, b, c, and d) clockwise from a time-and-frequency resource having the lowest index value. The OCC mapping scheme D maps OCC values (a, b, c, and d) counterclockwise from a time-and-frequency resource having the lowest index value.

The OCC values a, b, c, and d may be given as listed in Table 19 provided below.

TABLE 19

| OCC value | 1st antenna port in each CDM group | 2nd antenna port in each CDM group | 3rd antenna port in each CDM group | 4th antenna port in each CDM group |
|---|---|---|---|---|
| a | +1 | +1 | +1 | +1 |
| b | +1 | −1 | +1 | −1 |
| c | +1 | +1 | −1 | −1 |
| d | +1 | −1 | −1 | +1 |

For example, for the DMRS antenna port #1 of the CDM group #A, OCCs of +1, +1, +1, and +1 may be applied to four REs in the frequency axis. For the DMRS antenna port #2 of the CDM group #A, OCCs of +1, −1, +1, and −1 may be applied to four REs in the frequency axis. For the DMRS antenna port #3 of the CDM group #A, OCCs of +1, +1, −1, and −1 may be applied to four REs in the frequency axis. For the DMRS antenna port #4 of the CDM group #A, OCCs of +1, −1, −1, and −1 may be applied to four REs in the frequency axis.

Each CDM group may be repeated once of (b), two times of (c), or three times of (d) in the (FIG. 9) within one PRB in the frequency axis.

As illustrated in (b) in the FIG. 9, when a DMRS mapping pattern is repeated once within one PRB, DMRS overhead may be expressed as 1 RE per 1 port and 1 PRB. That is, one CDM group is mapped onto a total of four REs in one PRB, and four DMRS antenna ports are included in one CDM group and thus, it is expressed that one DMRS antenna port has overhead corresponding to one RE.

The (b) in the FIG. 9 illustrates an example in which each CDM group applies length-4 OCC-based CDM (i.e., CDM4) in the time axis and the frequency axis with respect to a total of four REs disposed in two contiguous or discontiguous subcarriers in each of two contiguous or discontiguous symbols, and repeats this once within one PRB in the frequency axis (i.e., four REs are used for four DMRS antenna ports within one PRB). A specific symbol index in a slot and a subcarrier position in a PRB for DMRS REs of (b) in the FIG. 9 are not limited, and may be determined according to a previously fixed position or a position obtained from signaling by a base station.

As illustrated in (c) in the FIG. 9, when a DMRS mapping pattern is repeated two times within one PRB, DMRS overhead may be expressed as 2 REs per 1 port and 1 PRB. That is, one CDM group is mapped onto a total of eight REs in one PRB, and four DMRS antenna ports are included in one CDM group and thus, it is expressed that one DMRS antenna port has overhead corresponding to two REs.

The (c) in the FIG. 9 illustrates an example in which each CDM group applies length-4 OCC-based CDM (i.e., CDM4) in the time axis and the frequency axis with respect to a total of four REs disposed in two contiguous or discontiguous subcarriers in each of two contiguous or discontiguous symbols, and repeats this two times within one PRB in the frequency axis (i.e., eight REs are used for four DMRS antenna ports within one PRB). A specific symbol index in a slot and a subcarrier position in one PRB for DMRS REs of (c) in the FIG. 9 are not limited, and may be determined according to a previously fixed position or a position obtained from signaling by a base station.

As illustrated in (d) in the FIG. 9, when a DMRS mapping pattern is repeated three times within one PRB, DMRS overhead may be expressed as 3 REs per 1 port and 1 PRB. That is, one CDM group is mapped onto a total of 12 REs in one PRB, and four DMRS antenna ports are included in one CDM group and thus, it is expressed that one DMRS antenna port has overhead corresponding to three REs.

The (d) in the FIG. 9 illustrates an example in which each CDM group applies length-4 OCC-based CDM (i.e., CDM4) in the time axis with respect to a total of four REs disposed in two contiguous or discontiguous subcarriers in each of two contiguous or discontiguous symbols, and repeats this three times within one PRB in the frequency axis (i.e., 12 REs are used for four DMRS antenna ports within one PRB). A specific symbol index in a slot and a subcarrier position in a PRB for DMRS REs of (d) in the FIG. 9 are not limited, and may be determined according to a previously fixed position or a position obtained from signaling by a base station.

An additional DMRS may be mapped onto the rear part of the slot by taking into consideration a high Doppler scenario, using the basic patterns of (b) and (d) in the FIG. 9.

Particularly, the patterns onto which a DMRS is mapped in the (b) and (d) in the FIG. 9 (patterns indicating relative positions of REs onto which a DMRS is mapped in the time-frequency domain, excluding a specific symbol index and a specific subcarrier index as illustrated in (c) in the FIG. 2) may be defined as patterns 7-1, 7-2, and 7-3, respectively. Based on the above, a DMRS according to the basic pattern may be mapped onto the front part in one slot from the perspective of time, and a DMRS according to an additional pattern may be mapped onto the rear part in the same slot, as shown in Table 20 provided below.

TABLE 20

| DMRS pattern embodiments | Basic pattern (front part of slot) | Additional pattern (rear part of slot) |
| --- | --- | --- |
| 97 | 7-1 | None |
| 98 | 7-2 | None |
| 99 | 7-3 | None |
| 100 | 7-1 | 7-1 |
| 101 | 7-1 | 7-2 |
| 102 | 7-1 | 7-3 |
| 103 | 7-2 | 7-1 |
| 104 | 7-2 | 7-2 |
| 105 | 7-2 | 7-3 |
| 106 | 7-3 | 7-1 |
| 107 | 7-3 | 7-2 |
| 108 | 7-3 | 7-3 |

The examples of (e) and (f) in the FIG. 9 may correspond to DMRS pattern embodiments 106 and 108 of Table 20, respectively.

FIG. 10 is a diagram illustrating an additional example of a DMRS pattern in one PRB according to the present disclosure.

The examples of FIG. 10 may correspond to detailed examples similar to the DMRS pattern of (d) in the FIG. 2. That is, basically, in the DMRS pattern of FIG. 10, CDM groups #A, #B, and #C which are distinguished according to the FDM scheme, may be mapped onto a first symbol and a second symbol.

The OCC mapping scheme will be described with reference to (a) in the FIG. 10.

As shown in the OCC mapping schemes A, B, C, and D in (a) in the FIG. 10, mapping scheme case #1 and mapping scheme case #2 may be alternately applied in the frequency axis with respect to a total of four REs in the frequency axis and in the time axis in two symbols to which corresponding CDM groups are mapped. The OCC mapping at the first symbol of the case #1 may be the same as the OCC mapping at the second symbol of the case #2. The OCC mapping at the second symbol of the case #1 may be the same as the OCC mapping at the first symbol of the case #2.

When the same OCC value (e.g., a and b) is mapped onto one symbol, power balancing problem may occur. Accordingly, as described above, the case #1 and the case #2 are alternately applied in the frequency axis, so as to alternately map different OCC values (a and b, and c and d) onto one symbol.

For example, in the case in which a CDM group is repeated C times in the frequency axis with respect to two symbols to which corresponding CDM groups are mapped, when the repetition indices are 0, 1, . . . , and C−1, the case #1 may be applied to an index corresponding to even-numbered repetition, and the case #2 may be applied to an index corresponding to odd-numbered repetition.

The differences in the OCC mapping schemes A, B, C, and D will be described from the perspective of the case #1. The OCC mapping scheme A maps OCC values (a and b) in the time axis first, and then maps OCC values (c and d) in the time axis at a subsequent frequency resource. The OCC mapping scheme B maps OCC values (a and b) in the frequency axis first, and then maps OCC values (c and d) in the frequency axis at a subsequent time resource. The OCC mapping scheme C maps OCC values (a, b, c, and d) clockwise from the RE "a" (where time-and-frequency resource having the lowest index value). The OCC mapping scheme D maps OCC values (a, b, c, and d) counterclockwise from a time-and-frequency resource having the lowest index value.

The OCC values a, b, c, and d may be given as listed in Table 21 provided below.

TABLE 21

| OCC value | 1st antenna port in each CDM group | 2nd antenna port in each CDM group | 3rd antenna port in each CDM group | 4th antenna port in each CDM Group |
| --- | --- | --- | --- | --- |
| a | +1 | +1 | +1 | +1 |
| b | +1 | −1 | +1 | −1 |
| c | +1 | +1 | −1 | −1 |
| d | +1 | −1 | −1 | +1 |

For example, for the DMRS antenna port #1 of the CDM group #A, OCCs of +1, +1, +1, and +1 may be applied to four Res (a, b, c, d) in the frequency axis. For the DMRS antenna port #2 of the CDM group #A, OCCs of +1, −1, +1, and −1 may be applied to the four REs in the frequency axis. For the DMRS antenna port #3 of the CDM group #A, OCCs of +1, +1, −1, and −1 may be applied to the four REs in the frequency axis. For the DMRS antenna port #4 of the CDM group #A, OCCs of +1, −1, −1, and −1 may be applied to the four REs in the frequency axis.

Each CDM group may be repeated once of (b), or two times of (c) in the (FIG. 10) within one PRB in the frequency axis.

As illustrated in (b) in the FIG. 10, when a DMRS mapping pattern is repeated once within one PRB, DMRS overhead may be expressed as 1 RE per 1 port and 1 PRB. That is, one CDM group is mapped onto a total of four REs in one PRB, and four DMRS antenna ports are included in one CDM group and thus, it is expressed that one DMRS antenna port has overhead corresponding to one RE.

The (b) of the FIG. 10 illustrates an example in which each CDM group applies length-4 OCC-based CDM (i.e., CDM4) in the time axis with respect to a total of four REs disposed in two contiguous or discontiguous subcarriers in each of two contiguous or discontiguous symbols, and repeats this once within one PRB in the frequency axis (i.e., four REs are used for four DMRS antenna ports within one PRB). A specific symbol index in a slot and a subcarrier position in a PRB for DMRS REs of (b) in the FIG. 10 are not limited, and may be determined according to a previously fixed position or a position obtained from signaling by a base station.

As illustrated in (c) in the FIG. 10, when a DMRS mapping pattern is repeated two times within one PRB, DMRS overhead may be expressed as 2 REs per 1 port and 1 PRB. That is, one CDM group is mapped onto a total of eight REs in one PRB, and four DMRS antenna ports are included in one CDM group and thus, it is expressed that one DMRS antenna port has overhead corresponding to two REs.

The (c) of the FIG. 10 illustrates an example in which each CDM group applies length-4 OCC-based CDM (i.e., CDM4) in the time axis with respect to a total of four REs disposed in two contiguous or discontiguous subcarriers in each of two contiguous or discontiguous symbols, and repeats this two times within one PRB in the frequency axis (i.e., eight REs are used for four DMRS antenna ports within one PRB). A specific symbol index in a slot and a subcarrier position in a PRB for DMRS REs of (c) of the FIG. 10 are not limited, and may be determined according to a previously fixed position or a position obtained from signaling by a base station.

An additional DMRS may be mapped onto the rear part (additional part) of the slot by taking into consideration a high Doppler shift scenario, using the basic patterns of the (b) and (c) in the FIG. 10.

Particularly, the patterns onto which a DMRS is mapped in the (b) and (c) in the FIG. 10 (patterns indicating relative positions of REs onto which a DMRS is mapped in the time-frequency domain, excluding a specific symbol index and a specific subcarrier index as illustrated in (d) in the FIG. 2) may be defined as patterns 8-1 and 8-2, respectively. Based on the above, a DMRS according to a basic pattern may be mapped onto the front part in one slot from the perspective of time, and a DMRS according to an additional pattern may be mapped onto the rear part in the same slot, as shown in Table 22 provided below.

TABLE 22

| DMRS patterns | Basic pattern (front part of slot) | Additional pattern (rear part of slot) |
|---|---|---|
| 109 | 8-1 | None |
| 110 | 8-2 | None |

TABLE 22-continued

| DMRS patterns | Basic pattern (front part of slot) | Additional pattern (rear part of slot) |
|---|---|---|
| 111 | 8-1 | 8-1 |
| 112 | 8-1 | 8-2 |
| 113 | 8-2 | 8-1 |
| 114 | 8-2 | 8-2 |

The examples of (d) and (e) in the FIG. 10 may correspond to DMRS pattern embodiments 113 and 114 of Table 22, respectively.

As an additional example, based on patterns 8-1 and 8-2, a DMRS according to the basic pattern is mapped onto the front part of one slot from the perspective of time, DMRSs according to a first additional pattern and a second additional pattern may be mapped onto the rear part of one slot, as shown in Table 23 provided below.

TABLE 23

| DMRS pattern embodiments | Basic pattern (front part of slot) | First additional pattern (rear part of slot) | Second additional pattern (rear part of slot) |
|---|---|---|---|
| 115 | 8-1 | None | None |
| 116 | 8-2 | None | None |
| 117 | 8-1 | 8-1 | None |
| 118 | 8-1 | 8-2 | None |
| 119 | 8-2 | 8-1 | None |
| 120 | 8-2 | 8-2 | None |
| 121 | 8-1 | 8-1 | 8-1 |
| 122 | 8-1 | 8-1 | 8-2 |
| 123 | 8-1 | 8-2 | 8-1 |
| 124 | 8-1 | 8-2 | 8-2 |
| 125 | 8-2 | 8-1 | 8-1 |
| 126 | 8-2 | 8-1 | 8-2 |
| 127 | 8-2 | 8-2 | 8-1 |
| 128 | 8-2 | 8-2 | 8-2 |

The examples of (f) and (g) in the FIG. 10 may correspond to DMRS pattern embodiments 125 and 128 of Table 23, respectively.

In the above-described DMRS pattern embodiments, DMRS patterns may be determined according to whether the DMRS antenna overhead is 1 RE per 1 port and 1 PRB, 2 REs per 1 port and 1 PRB, and 3 REs per 1 port and 1 PRB in the case in which a total of 12 DMRS antenna ports are divided into a maximum of six or three CDM groups. Also, an additional pattern may be applied to one slot.

Hereinafter, a method of indicating a DMRS pattern, that is, a method of signaling DMRS pattern configuration information to a terminal by a base station will be described according to embodiments of the present disclosure.

Factors that need to be taken into consideration in order to indicate a DMRS pattern may include: i) basic pattern overhead (including information associated with the existence of a basic pattern); ii) additional pattern overhead (including information associated with the existence of an additional pattern); iii) the position of an RE in a slot of the basic pattern (i.e., a symbol position and/or a subcarrier position); iv) the position of an RE in a slot of the additional pattern (i.e., a symbol position and/or a subcarrier position); and v) virtual cell identification.

First, the method of signaling i) basic pattern overhead will be described.

A DMRS may be transmitted together in a slot in which a physical channel that requires demodulation is transmitted. However, when DMRS bundling is applied in the time domain, there may exist a slot in which a physical channel is transmitted and a basic DMRS pattern does not exist. DMRS bundling indicates a scheme of demodulating a physical channel in multiple slots based on channel information estimated using a DMRS transmitted in one of the multiple slots.

For example, as illustrated in FIGS. 3, 5, 7, and 9, basic DMRS pattern overhead may be signaled using 1-bit information. For example, the case in which a basic DMRS pattern does not exist, or the case in which a basic DMRS pattern has the maximum overhead when the basic DMRS pattern exists may be indicated. For example, a bit value of 0 may indicate that the DMRS overhead is 0 (zero) (i.e., a DMRS does not exist in a corresponding slot). A bit value of 1 may indicate that the basic pattern DMRS overhead is 3 (i.e., a CDM group of the basic pattern is repeated three times in one PRB).

As an additional example, as illustrated in FIGS. 4, 6, 8, and 10, basic DMRS pattern overhead may be signaled using 1-bit information. For example, the case in which a basic DMRS pattern does not exist, or the case in which a basic DMRS pattern has the maximum overhead when the basic DMRS pattern exists may be indicated. For example, a bit value of 0 may indicate that the DMRS overhead is 0 (zero) (i.e., the fact that a DMRS does not exist in a corresponding slot). A bit value of 1 may indicate that the basic pattern DMRS overhead is 2 (i.e., a CDM group of the basic pattern is repeated two times in one PRB).

As another example, as illustrated in FIGS. 3, 5, 7, and 9, basic DMRS pattern overhead may be signaled using 2-bit information. For example, the fact that a basic DMRS pattern does not exist, or a specific DMRS overhead value may be indicated. For example, a bit value of 0 may indicate that the DMRS overhead is 0 (zero) (i.e., the fact that a DMRS does not exist in a corresponding slot). A bit value of 1 may indicate that the basic pattern DMRS overhead is 1 (i.e., a CDM group of the basic pattern is repeated once in one PRB). A bit value of 2 may indicate that the basic pattern DMRS overhead is 2 (i.e., a CDM group of the basic pattern is repeated two times in one PRB). A bit value of 3 may indicate that the basic pattern DMRS overhead is 3 (i.e., a CDM group of the basic pattern is repeated three times in one PRB).

As an additional example, as illustrated in FIGS. 4, 6, 8, and 10, basic DMRS pattern overhead may be signaled using 2-bit information. For example, the fact that a basic DMRS pattern does not exist, or a specific DMRS overhead value may be indicated. For example, a bit value of 0 may indicate that the DMRS overhead is 0 (zero) (i.e., the fact that a DMRS does not exist in a corresponding slot). A bit value of 1 may indicate that the basic DMRS pattern overhead is 1 (i.e., a CDM group of the basic pattern is repeated once in one PRB). A bit value of 2 may indicate that the basic DMRS pattern overhead is 2 (i.e., a CDM group of the basic pattern is repeated two times in one PRB). A bit value of 3 may be reserved.

Subsequently, the method of signaling ii) additional pattern overhead will be described.

When a basic DMRS pattern does not exist in a slot, an additional pattern may also not exist in the slot. Also, when a high Doppler scenario is not taken into consideration, an additional pattern may not exist in a slot in which a basic DMRS pattern exists.

For example, as illustrated in FIGS. 3, 5, 7, and 9, additional DMRS pattern overhead may be signaled using 1-bit information. For example, the case in which an additional DMRS pattern does not exist, or the case in which an additional DMRS pattern has the maximum overhead when the additional DMRS pattern exists may be indicated. For example, a bit value of 0 may indicate that the additional DMRS pattern overhead is 0 (zero) (i.e., the fact that an additional DMRS pattern does not exist in a corresponding slot). A bit value of 1 may indicate that the additional DMRS pattern overhead is 3 (i.e., a CDM group of the additional pattern is repeated three times in one PRB).

As an additional example, as illustrated in FIGS. 4, 6, 8, and 10, additional DMRS pattern overhead may be signaled using 1-bit information. For example, the case in which an additional DMRS pattern does not exist, or the case in which an additional DMRS pattern has the maximum overhead when the additional DMRS pattern exists may be indicated. For example, a bit value of 0 may indicate that the additional DMRS pattern overhead is 0 (zero) (i.e., a first additional DMRS pattern and a second additional DMRS pattern do not exist in a corresponding slot). A bit value of 1 may indicate that the first additional DMRS pattern overhead is 2 (i.e., a CDM group of the first additional pattern is repeated two times in one PRB) and that the second additional DMRS pattern overhead is 2 (i.e., a CDM group of the second additional pattern is repeated two times in one PRB).

As another example, as illustrated in FIGS. 3, 5, 7, and 9, additional DMRS pattern overhead may be signaled using 2-bit information. For example, the fact that an additional DMRS pattern does not exist, or a specific additional DMRS pattern overhead value may be indicated. For example, a bit value of 0 may indicate that the additional DMRS pattern overhead is 0 (zero) (i.e., the fact that an additional DMRS pattern does not exist in a corresponding slot). A bit value of 1 may indicate that the additional DMRS pattern overhead is 1 (i.e., a CDM group of the additional pattern is repeated once in one PRB). A bit value of 2 may indicate that the additional pattern DMRS overhead is 2 (i.e., a CDM group of the additional pattern is repeated two times in one PRB). A bit value of 3 may indicate that the additional DMRS pattern overhead is 3 (i.e., a CDM group of the additional pattern is repeated three times in one PRB).

As an additional example, as illustrated in FIGS. 4, 6, 8, and 10, additional DMRS pattern overhead may be signaled using 3-bit information. For example, the fact that an additional DMRS pattern does not exist, or a specific additional DMRS pattern overhead value may be indicated. For example, a bit value of 0 may indicate that the additional DMRS pattern overhead is 0 (zero) (i.e., a first additional DMRS pattern and a second additional DMRS pattern do not exist in a corresponding slot). A bit value of 1 may indicate that the first additional DMRS pattern overhead is 1 (i.e., a CDM group of the first additional pattern is repeated once in one PRB) and that the second additional DMRS pattern overhead is 0 (i.e., the second additional DMRS pattern does not exist in a corresponding slot). A bit value of 2 may indicate that the first additional DMRS pattern overhead is 2 (i.e., a CDM group of the first additional pattern is repeated two times in one PRB) and that the second additional DMRS pattern overhead is 0 (i.e., the second additional DMRS pattern does not exist in a corresponding slot). A bit value of 3 may indicate that the first additional DMRS pattern overhead is 1 (i.e., a CDM group of the first additional pattern is repeated once in one PRB) and that the second additional DMRS pattern overhead is 1 (i.e., a CDM group of the second additional pattern is repeated once in one PRB). A bit value of 4 may indicate that the first additional DMRS pattern overhead is 2 (i.e., a CDM group of the first additional pattern is repeated two times in one PRB) and that the second additional DMRS pattern overhead is 2 (i.e., a CDM group of the second additional pattern is repeated once in one PRB). A bit value of 5 may indicate that the first additional DMRS pattern overhead is 2 (i.e., a CDM group of the first additional pattern is repeated two times in one PRB) and that the second additional DMRS pattern overhead is 2 (i.e., a CDM group of the second additional pattern is repeated two times in one PRB). A bit value of 6 and a bit value of 7 may be reserved.

The above-described example assumes the case in which the second additional pattern overhead is set to be less than or equal to the first additional pattern overhead (i.e., the second additional pattern overhead is set not to be higher than the first additional pattern overhead). When it is assumed that the second additional pattern overhead is always 0, the first additional pattern overhead may be indicated using only bit values of 0, 1, and 2.

As another example, as illustrated in FIGS. 3, 5, 7, and 9, additional DMRS pattern overhead may be signaled using 1-bit information. For example, the case in which an additional DMRS pattern does not exist, or the case in which an additional DMRS pattern has predetermined overhead as opposed to the maximum overhead when the additional DMRS pattern exists may be indicated. For example, a bit value of 0 may indicate that the additional DMRS pattern overhead is 0 (zero) (i.e., the fact that an additional DMRS pattern does not exist in a corresponding slot). A bit value of 1 may indicate that the additional DMRS pattern overhead is 2 (i.e., a CDM group of the additional pattern is repeated two times in one PRB).

As an additional example, as illustrated in FIGS. 4, 6, 8, and 10, additional DMRS pattern overhead may be signaled using 1-bit information. For example, the case in which an additional DMRS pattern does not exist, or the case in which an additional DMRS pattern has predetermined overhead as opposed to the maximum overhead when the additional DMRS pattern exists may be indicated. For example, a bit value of 0 may indicate that the additional DMRS pattern overhead is 0 (zero) (i.e., a first additional DMRS pattern and a second additional DMRS pattern do not exist in a corresponding slot). A bit value of 1 may indicate that the first additional DMRS pattern overhead is 1 (i.e., a CDM group of the first additional pattern is repeated once in one PRB) and that the second additional DMRS pattern overhead is 1 (i.e., a CDM group of the second additional pattern is repeated once in one PRB).

As another example, as illustrated in FIGS. 3, 5, 7, and 9, additional DMRS pattern overhead may be signaled using 1-bit information. For example, the case in which an additional DMRS pattern does not exist, or the case in which an additional DMRS pattern has predetermined overhead as opposed to the maximum overhead when the additional DMRS pattern exists may be indicated. For example, a bit value of 0 may indicate that the additional DMRS pattern overhead is 0 (zero) (i.e., the fact that an additional DMRS pattern does not exist in a corresponding slot). A bit value of 1 may indicate that the additional DMRS pattern overhead is 1 (i.e., a CDM group of the additional pattern is repeated once in one PRB).

As an additional example, as illustrated in FIGS. 4, 6, 8, and 10, additional DMRS pattern overhead may be signaled using 1-bit information. For example, the case in which an additional DMRS pattern does not exist, or the case in which an additional DMRS pattern has predetermined overhead as opposed to the maximum overhead when the additional DMRS pattern exists may be indicated. For example, a bit value of 0 may indicate that the additional DMRS pattern overhead is 0 (zero) (i.e., a first additional DMRS pattern and a second additional DMRS pattern do not exist in a corresponding slot). A bit value of 1 may indicate that the first additional DMRS pattern overhead is 1 (i.e., a CDM group of the first additional pattern is repeated once in one PRB) and that the second additional DMRS pattern overhead is 0 (i.e., the second additional pattern does not exist).

Subsequently, the method of signaling iii) the position of an RE (i.e., a symbol position and/or a subcarrier position) in a slot of a basic pattern will be described.

In order to signal an RE position of a basic pattern, candidate positions onto which a basic DMRS pattern may be mapped, may be determined in consideration of the position of a control region in the slot (i.e., an RE position to which a control channel is mapped), basic DMRS pattern overhead, the position of a data region in the slot (i.e., an RE position onto which a data channel is mapped), and the like. A position that is used from among the candidate positions may be signaled. In the case in which the number of candidate positions is 1, a terminal may be aware of an RE position even though the RE position of the basic pattern is not signaled. The RE position of the basic pattern may be indicated based on a symbol index value and/or a subcarrier index value.

Subsequently, the method of signaling iv) the position of an RE (i.e., a symbol position and/or a subcarrier position) in a slot of an additional pattern will be described.

In order to signal an RE position of an additional pattern, candidate positions onto which an additional DMRS pattern may be mapped, may be determined in consideration of the position of a basic DMRS pattern, additional pattern overhead, the position of a data region (e.g., the position and the transmission interval of a downlink data channel in a Time Division Duplex (TDD) mode), and the like. A position that is used from among the candidate positions may be signaled. In the case in which the number of candidate positions is 1, a terminal may be aware of an RE position even though the RE position of the basic pattern is not signaled. The RE position of the basic pattern may be indicated based on a symbol index value and/or a subcarrier index value, and may be defined as a relative value determined based on the position the basic pattern.

Subsequently, the method of signaling v) virtual cell identification will be described.

Unlike the physical ID of a cell, virtual cell ID (VCID) may be set to perform coordinated transmission with another cell (e.g., Coordinated Multi-Point (CoMP) transmission). Two VCIDs or three or more VCIDs may be set. For example, VCID for Transmission Reception Points (TRPs) that perform operation by sharing the same cell-specific ID or the same group-specific ID when operating as CoMP, VCID for TRPs that perform operation based on different cell-specific IDs or different group-specific IDs when operating as CoMP or not, or the like may be set. In this instance, a base station may report a VCID value to be used when a terminal receives a DMRS (i.e., a VCID value used as an initial value for generating a DMRS sequence or the like). Also, VCID is not a factor that is directly associated with DMRS pattern configuration. However, the values of the DMRS pattern configuration factors i) to iv) may be set based on VCID (when DMRS pattern configuration is set for each terminal in MU-MIMO environment, the same VCID may be configured for the terminals operating in MU-MIMO), VCID may be considered as a factor that is indirectly associated with DMRS pattern configuration.

Hereinafter, the method of signaling DMRS pattern configuration information will be described.

As an example of the signaling method, the factors of the DMRS configuration information such as i) to v) may be separately or independently signaled.

For example, configuration information associated with i) basic pattern overhead (including information indicating the existence of a basic pattern) may be dynamically indicated in the state of being explicitly or implicitly included in downlink control information (DCI) or the like. Alternatively, the configuration information associated with i) basic pattern overhead (information indicating the existence of a basic pattern) may be semi-statically indicated in the state of being explicitly or implicitly included in a higher layer signaling (e.g., Radio Resource Control (RRC) layer signaling or the like).

For example, configuration information associated with ii) additional pattern overhead (information indicating the existence of an additional pattern) may be dynamically indicated in the state of being explicitly or implicitly included in DCI or the like. Alternatively, the configuration information associated with ii) additional pattern overhead (information information the existence of an additional pattern) may be semi-statically indicated in the state of being explicitly or implicitly included in higher layer signaling (e.g., RRC signaling or the like).

For example, iii) an RE position in a slot of a basic pattern (i.e., a symbol position and/or a subcarrier position) may be previously defined as a fixed value, and may not be signaled separately. Alternatively, the configuration information associated with iii) an RE position in a slot of a basic pattern (i.e., a symbol position and/or a subcarrier position) may be dynamically indicated in the state of being explicitly or implicitly included in DCI or the like. Alternatively, the configuration information associated with iii) an RE position in a slot of a basic pattern (i.e., a symbol position and/or a subcarrier position) may be semi-statically indicated in the state of being explicitly or implicitly included in higher layer signaling (e.g., RRC signaling or the like).

For example, iv) an RE position in a slot of an additional pattern (i.e., a symbol position and/or a subcarrier position) may be previously defined as a fixed value, and may not be signaled separately. Alternatively, the configuration information associated with iv) an RE position in a slot of an additional pattern (i.e., a symbol position and/or a subcarrier position) may be dynamically indicated in the state of being explicitly or implicitly included in DCI or the like. Alternatively, the configuration information associated with iv) an RE position in a slot of an additional pattern (i.e., a symbol position and/or a subcarrier position) may be semi-statically indicated in the state of being explicitly or implicitly included in higher layer signaling (e.g., RRC signaling or the like).

For example, configuration information associated with v) virtual cell identification may be dynamically indicated in the state of being explicitly or implicitly included in DCI or the like. Alternatively, the configuration information associated with v) virtual cell identification (VCID) may be semi-statically indicated in the state of being explicitly or implicitly included in higher layer signaling (e.g., RRC signaling or the like).

In the case of signaling DMRS pattern configuration information using DCI or the like among the above-described examples, the DMRS pattern configuration information may be immediately and dynamically signaled when needed. However, when the amount of information included in the DCI is changed or increased, the whole system throughput may deteriorate. Alternatively, in the case of signaling DMRS pattern configuration information using RRC signaling or the like, even when the amount of information included in RRC signaling is increased, serious problems, such as deterioration of system throughput, does not occur. However, the DMRS pattern configuration information may not be immediately signaled when needed.

As an additional example of the signaling method, two or more of the factors of the DMRS configuration information such as i) to v) may be signaled in the manner of joint encoding. That is, signaling set candidates determined in consideration of two or more of the factors of the DMRS configuration information may be set via higher layer signaling, and one of the signaling set candidates may be indicated via DCI.

The method of semi-statically setting signaling set candidates via higher layer signaling may be based on the descriptions for each of the factors of the DMRS configuration information such as i) to v).

Also, one of the multiple signaling set candidates may be dynamically indicated via a 1-bit indicator or 2-bit indicator included in DCI.

Also, in regard to a factor that is not included in a signaling set candidate from among the factors of the DMRS configuration information such as i) to v), a separate or independent signaling method may be applied as described above.

Embodiment 1

The present embodiment describes a method of setting signaling set candidates including factors: i) basic pattern overhead (including information indicating the existence of a basic pattern; ii) additional pattern overhead (including information indicating the existence of an additional pattern); and v) virtual cell identification. One of the candidates may be dynamically indicated using 1-bit information or 2-bit information included in DCI.

Table 24 provided below shows an example of dynamically indicating DMRS pattern configuration information using 1-bit information included in DCI.

TABLE 24

| DCI bit value | RRC parameter #A | RRC parameter #B | RRC parameter #C |
|---|---|---|---|
| 0 (RRC set candidate #1) | basic DMRS pattern overhead #1 | additional DMRS pattern overhead #1 | VCID #1 |
| 1 (RRC set candidate #2) | basic DMRS pattern overhead #2 | additional DMRS pattern overhead #2 | VCID #2 |

In the example of Table 24, basic DMRS pattern overhead #1 and basic DMRS pattern overhead #2 may be respectively set via RRC signaling as described in the method of signaling basic pattern overhead. The basic DMRS pattern overhead #1 and the basic DMRS pattern overhead #2 may be set as the same value or different values.

As described in the method of signaling ii) additional pattern overhead, additional DMRS pattern overhead #1 and additional DMRS pattern overhead #2 may be respectively set via RRC signaling. The additional DMRS pattern overhead #1 and the additional DMRS pattern overhead #2 may be set as the same value or different values.

As described in the method of signaling v) virtual cell identification, VCID #1 and VCID #2 may be respectively set via RRC signaling. The VCID #1 and the VCID #2 may be set as the same value or different values.

Table 25 provided below shows an example of dynamically indicating DMRS pattern configuration information using 2-bit information included in DCI.

TABLE 25

| DCI bit value | RRC parameter #A | RRC parameter #B | RRC parameter #C |
|---|---|---|---|
| 0 (RRC set candidate #1) | basic DMRS pattern overhead #1 | additional DMRS pattern overhead #1 | VCID #1 |
| 1 (RRC set candidate #2) | basic DMRS pattern overhead #2 | additional DMRS pattern overhead #2 | VCID #2 |
| 2 (RRC set candidate #3) | basic DMRS pattern overhead #3 | additional DMRS pattern overhead #3 | VCID #3 |
| 3 (RRC set candidate #4) | basic DMRS pattern overhead #4 | additional DMRS pattern overhead #4 | VCID #4 |

In the example of Table 25, basic DMRS pattern overhead #1, #2, #3, and #4 may be respectively set via RRC signaling as described in the method of signaling basic pattern overhead. The basic DMRS pattern overhead #1, #2, #3, and #4 may be set as different values, or some or all of the basic DMRS pattern overhead #1, #2, #3, and #4 may be set as the same value.

As described in the method of signaling ii) additional pattern overhead, additional DMRS pattern overhead #1, #2, #3, and #4 may be respectively set via RRC signaling. The additional DMRS pattern overhead #1, #2, #3, and #4 may be set as different values, or some or all of the additional DMRS pattern overhead #1, #2, #3, and #4 may be set as the same value.

As described in the method of signaling v) virtual cell identification, VCIDs #1, #2, #3, and #4 may be respectively set via RRC signaling. The VCIDs #1, #2, #3, and #4 may be set as different values, or some or all of the VCIDs #1, #2, #3, and #4 may be set as the same value.

Each of iii) an RE position (i.e., a symbol position and/or a subcarrier position) in a slot of a basic pattern and iv) an RE position (i.e., a symbol position and/or a subcarrier position) in a slot of an additional pattern, which are not included in a higher layer signaling set candidate, may be separately or independently set via DCI or RRC signaling.

Embodiment 2

The present embodiment describes a method of setting signaling set candidates including factors: i) basic pattern overhead (including information indicating the existence of a basic pattern); and ii) additional pattern overhead (including information indicating the existence of an additional pattern). One of the candidates may be dynamically indicated using 1-bit information or 2-bit information included in DCI.

Table 26 provided below shows an example of dynamically indicating DMRS pattern configuration information using 1-bit information included in DCI.

TABLE 26

| DCI bit value | RRC parameter #A | RRC parameter #B |
|---|---|---|
| 0 (RRC set candidate #1) | basic DMRS pattern overhead #1 | additional DMRS pattern overhead #1 |
| 1 (RRC set candidate #2) | basic DMRS pattern overhead #2 | additional DMRS pattern overhead #2 |

In the example of Table 26, basic DMRS pattern overhead #1 and basic DMRS pattern overhead #2 may be respectively set via RRC signaling as described in the method of signaling i) basic pattern overhead. The basic DMRS pattern overhead #1 and the basic DMRS pattern overhead #2 may be set as the same value or different values.

As described in the method of signaling ii) additional pattern overhead, additional DMRS pattern overhead #1 and additional DMRS pattern overhead #2 may be respectively set via RRC signaling. The additional DMRS pattern overhead #1 and the additional DMRS pattern overhead #2 may be set as the same value or different values.

Table 27 provided below shows an example of dynamically indicating DMRS pattern configuration information using 2-bit information included in DCI.

TABLE 27

| DCI bit value | RRC parameter #A | RRC parameter #B |
|---|---|---|
| 0 (RRC set candidate #1) | basic DMRS pattern overhead #1 | additional DMRS pattern overhead #1 |
| 1 (RRC set candidate #2) | basic DMRS pattern overhead #2 | additional DMRS pattern overhead #2 |
| 2 (RRC set candidate #3) | basic DMRS pattern overhead #3 | additional DMRS pattern overhead #3 |
| 3 (RRC set candidate #4) | basic DMRS pattern overhead #4 | additional DMRS pattern overhead #4 |

In the example of Table 27, basic DMRS pattern overhead #1, #2, #3, and #4 may be respectively set via RRC signaling as described in the method of signaling i) basic pattern overhead. The basic DMRS pattern overhead #1, #2, #3, and #4 may be set as different values, or some or all of the basic DMRS pattern overhead #1, #2, #3, and #4 may be set as the same value.

As described in the method of signaling ii) additional pattern overhead, additional DMRS pattern overhead #1, #2, #3, and #4 may be respectively set via RRC signaling. The additional DMRS pattern overhead #1, #2, #3, and #4 may be set as different values, or some or all of the additional DMRS pattern overhead #1, #2, #3, and #4 may be set as the same value.

Each of iii) an RE position in a slot of a basic pattern (i.e., a symbol position and/or a subcarrier position), iv) an RE position in a slot of an additional pattern (i.e., a symbol position and/or a subcarrier position), and v) virtual cell identification, which are not included in a higher layer signaling set candidate, may be separately or independently set via DCI or RRC signaling.

Embodiment 3

The present embodiment describes a method of setting signaling set candidates including factors: i) basic pattern overhead (including information indicating the existence of a basic pattern); ii) additional pattern overhead (including information indicating the existence of an additional pattern); iii) an RE position (i.e., a symbol position and/or a subcarrier position) in a slot of the basic pattern; iv) an RE position (i.e., a symbol position and/or a subcarrier position) in a slot of the additional pattern; and v) virtual cell identification. One of the candidates may be dynamically indicated using 1-bit information or 2-bit information included in DCI.

Table 28 provided below shows an example of dynamically indicating DMRS pattern configuration information using 1-bit information included in DCI.

TABLE 28

| DCI bit value | RRC parameter #A | RRC parameter #B | RRC parameter #C | RRC parameter #D | RRC parameter #E |
|---|---|---|---|---|---|
| 0 (RRC set candidate #1) | basic DMRS pattern overhead #1 | additional DMRS pattern overhead #1 | VCID #1 | basic DMRS pattern position #1 | additional DMRS pattern position #1 |
| 1 (RRC set candidate #2) | basic DMRS pattern overhead #2 | additional DMRS pattern overhead #2 | VCID #2 | basic DMRS pattern position #2 | additional DMRS pattern position #2 |

In the example of Table 28, basic DMRS pattern overhead #1 and basic DMRS pattern overhead #2 may be respectively set via RRC signaling as described in the method of signaling i) basic pattern overhead. The basic DMRS pattern overhead #1 and the basic DMRS pattern overhead #2 may be set as the same value or different values.

As described in the method of signaling ii) additional pattern overhead, additional DMRS pattern overhead #1 and additional DMRS pattern overhead #2 may be respectively set via RRC signaling. The additional DMRS pattern overhead #1 and the additional DMRS pattern overhead #2 may be set as the same value or different values.

As described in the method of signaling iii) an RE position (i.e., a symbol position and/or a subcarrier position) in a slot of a basic pattern, each of the basic DMRS pattern position #1 and the basic DMRS pattern position #2 may be respectively set via RRC signaling. The basic DMRS pattern position #1 and the basic DMRS pattern position #2 may be set as the same value or different values.

As described in the method of signaling iv) an RE position (i.e., a symbol position and/or a subcarrier position) in a slot of an additional pattern, each of the additional DMRS pattern position #1 and the additional DMRS pattern position #2 may be respectively set via RRC signaling. The additional DMRS pattern position #1 and the additional DMRS pattern position #2 may be set as the same value or different values.

As described in the method of signaling v) virtual cell identification, VCID #1 and VCID #2 may be respectively set via RRC signaling. The VCID #1 and the VCID #2 may be set as the same value or different values.

Table 29 provided below shows an example of dynamically indicating DMRS pattern configuration information using 2-bit information included in DCI.

DMRS pattern overhead #1, #2, #3, and #4 may be set as the same value.

As described in the method of signaling ii) additional pattern overhead, additional DMRS pattern overhead #1, #2, #3, and #4 may be respectively set via RRC signaling. The additional DMRS pattern overhead #1, #2, #3, and #4 may be set as different values, or some or all of the additional DMRS pattern overhead #1, #2, #3, and #4 may be set as the same value.

As described in the method of signaling iii) an RE position (i.e., a symbol position and/or a subcarrier position) in a slot of a basic pattern, each of the basic DMRS pattern positions #1, #2, #3, and #4 may be set via RRC signaling. The basic DMRS pattern positions #1, #2, #3, and #4 may be set as different values, or some or all of the basic DMRS pattern positions #1, #2, #3, and #4 may be set as the same value.

As described in the method of signaling iv) an RE position in a slot of an additional pattern (i.e., a symbol position and/or a subcarrier position), each of the additional DMRS pattern positions #1, #2, #3, and #4 may be set via RRC signaling. The additional DMRS pattern positions #1, #2, #3, and #4 may be set as different values, or some or all of the additional DMRS pattern positions #1, #2, #3, and #4 may be set as the same value.

As described in the method of signaling v) virtual cell identification, VCIDs #1, #2, #3, and #4 may be respectively set via RRC signaling. The VCIDs #1, #2, #3, and #4 may be set as different values, or some or all of the VCIDs #1, #2, #3, and #4 may be set as the same value.

Embodiment 4

The present embodiment describes a method of setting signaling set candidates including factors: i) basic pattern

TABLE 29

| DCI bit value | RRC parameter #A | RRC parameter #B | RRC parameter #C | RRC parameter #D | RRC parameter #E |
|---|---|---|---|---|---|
| 0 (RRC set #1) | basic DMRS pattern overhead #1 | additional DMRS pattern overhead #1 | VCID #1 | basic DMRS pattern position #1 | additional DMRS pattern position #1 |
| 1 (RRC set #2) | basic DMRS pattern overhead #2 | additional DMRS pattern overhead #2 | VCID #2 | basic DMRS pattern position #2 | additional DMRS pattern position #2 |
| 2 (RRC set #3) | basic DMRS pattern overhead #3 | additional DMRS pattern overhead #3 | VCID #3 | basic DMRS pattern position #3 | additional DMRS pattern position #3 |
| 3 (RRC set #4) | basic DMRS pattern overhead #4 | additional DMRS pattern overhead #4 | VCID #4 | basic DMRS pattern position #4 | additional DMRS pattern position #4 |

In the example of Table 29, basic DMRS pattern overhead #1, #2, #3, and #4 may be respectively set via RRC signaling as described in the method of signaling i) basic pattern overhead. The basic DMRS pattern overhead #1, #2, #3, and #4 may be set as different values, or some or all of the basic overhead (including information indicating the existence of a basic pattern); ii) additional pattern overhead (including information indicating the existence of an additional pattern); iii) an RE position (i.e., a symbol position and/or a subcarrier position) in a slot of the basic pattern; and iv) an RE position (i.e., a symbol position and/or a subcarrier position) in a slot of the additional pattern. One of the candidates may be dynamically indicated using 1-bit information or 2-bit information included in DCI.

Table 30 provided below shows an example of dynamically indicating DMRS pattern configuration information using 1-bit information included in DCI.

TABLE 30

| DCI bit value | RRC parameter #A | RRC parameter #B | RRC parameter #C | RRC parameter #D |
| --- | --- | --- | --- | --- |
| 0 (RRC set candidate #1) | basic DMRS pattern overhead #1 | additional DMRS pattern overhead #1 | basic DMRS pattern position #1 | additional DMRS pattern position #1 |
| 1 (RRC set candidate #2) | basic DMRS pattern overhead #2 | additional DMRS pattern overhead #2 | basic DMRS pattern position #2 | additional DMRS pattern position #2 |

In the example of Table 30, basic DMRS pattern overhead #1 and basic DMRS pattern overhead #2 may be respectively set via RRC signaling as described in the method of signaling i) basic pattern overhead. The basic DMRS pattern overhead #1 and the basic DMRS pattern overhead #2 may be set as the same value or different values.

As described in the method of signaling ii) additional pattern overhead, additional DMRS pattern overhead #1 and additional DMRS pattern overhead #2 may be respectively set via RRC signaling. The additional DMRS pattern overhead #1 and the additional DMRS pattern overhead #2 may be set as the same value or different values.

As described in the method of signaling iii) an RE position (i.e., a symbol position and/or a subcarrier position) in a slot of a basic pattern, each of the basic DMRS pattern position #1 and the basic DMRS pattern position #2 may be respectively set via RRC signaling. The basic DMRS pattern position #1 and the basic DMRS pattern position #2 may be set as the same value or different values.

As described in the method of signaling iv) an RE position (i.e., a symbol position and/or a subcarrier position) in a slot of an additional pattern, each of the additional DMRS pattern position #1 and the additional DMRS pattern position #2 may be respectively set via RRC signaling. The additional DMRS pattern position #1 and the additional DMRS pattern position #2 may be set as the same value or different values.

Table 31 provided below shows an example of dynamically indicating DMRS pattern configuration information using 2-bit information included in DCI.

In the example of Table 31, basic DMRS pattern overhead #1, #2, #3, and #4 may be respectively set via RRC signaling as described in the method of signaling i) basic pattern overhead. The basic DMRS pattern overhead #1, #2, #3, and #4 may be set as different values, or some or all of the basic DMRS pattern overhead #1, #2, #3, and #4 may be set as the same value.

As described in the method of signaling ii) additional pattern overhead, additional DMRS pattern overhead #1, #2, #3, and #4 may be respectively set via RRC signaling. The additional DMRS pattern overhead #1, #2, #3, and #4 may be set as different values, or some or all of the additional DMRS pattern overhead #1, #2, #3, and #4 may be set as the same value.

As described in the method of signaling iii) an RE position (i.e., a symbol position and/or a subcarrier position) in a slot of a basic pattern, each of the basic DMRS pattern positions #1, #2, #3, and #4 may be set via RRC signaling. The basic DMRS pattern positions #1, #2, #3, and #4 may be set as different values, or some or all of the basic DMRS pattern positions #1, #2, #3, and #4 may be set as the same value.

As described in the method of signaling iv) an RE position (i.e., a symbol position and/or a subcarrier position) in a slot of an additional pattern, each of the additional DMRS pattern positions #1, #2, #3, and #4 may be set via RRC signaling. The additional DMRS pattern positions #1, #2, #3, and #4 may be set as different values, or some or all of the additional DMRS pattern positions #1, #2, #3, and #4 may be set as the same value.

v) virtual cell identification which is not included in a higher layer signaling set candidate may be set separately or independently via DCI or RRC signaling.

FIG. 11 is a diagram illustrating a method of signaling DMRS pattern configuration information according to the present disclosure.

TABLE 31

| DCI bit value | RRC parameter #A | RRC parameter #B | RRC parameter #C | RRC parameter #D |
| --- | --- | --- | --- | --- |
| 0 (RRC set #1) | basic DMRS pattern overhead #1 | additional DMRS pattern overhead #1 | basic DMRS pattern position #1 | additional DMRS pattern position #1 |
| 1 (RRC set #2) | basic DMRS pattern overhead #2 | additional DMRS pattern overhead #2 | basic DMRS pattern position #2 | additional DMRS pattern position #2 |
| 2 (RRC set #3) | basic DMRS pattern overhead #3 | additional DMRS pattern overhead #3 | basic DMRS pattern position #3 | additional DMRS pattern position #3 |
| 3 (RRC set #4) | basic DMRS pattern overhead #4 | additional DMRS pattern overhead #4 | basic DMRS pattern position #4 | additional DMRS pattern position #4 |

In operation S1110, a base station may determine signaling set candidates for DMRS pattern configuration to be allocated to a terminal. One signaling set candidate may include configuration information associated with a combination of two or more factors from among basic pattern overhead (information indicating the existence of a basic pattern), additional pattern overhead (information indicating the existence of an additional pattern), an RE position in a slot of the basic pattern (i.e., a symbol position and/or subcarrier position), an RE position in a slot of the additional pattern (i.e., a symbol position and/or subcarrier position), or virtual cell identification.

In operation S1120, the base station may inform the terminal of DMRS pattern configuration signaling set candidates via higher layer signaling (e.g., RRC signaling).

In operation S1130, the base station may determine one of the DMRS pattern configuration signaling set candidates, which is to be actually allocated to the terminal.

In operation S1140, the base station may inform the terminal of information indicating the DMRS pattern configuration signaling set (i.e., one determined in operation S1130 from among the candidates) via dynamic signaling (e.g., DCI).

In operation S1150, the base station may map a DMRS onto a physical resource according to a DMRS pattern corresponding to the indicated signaling set, and may transmit the same to the terminal. In this instance, the base station may also transmit a physical channel together in a slot in which the DMRS is transmitted.

In operation S1160, the terminal may demodulate a signal received via the physical channel using channel information estimated based on the DMRS received from the base station.

In the example of FIG. 11, the factor that is not included in the DMRS pattern configuration signaling set candidates may be separately or independently set for the terminal via RRC signaling or DCI.

FIG. 12 is a diagram illustrating the configurations of a base station device and a terminal device according to the present disclosure.

The base station device 1200 may include a processor 1210, an antenna unit 1220, a transceiver 1230, and a memory 1240.

The processor 1210 may perform signal processing associated with a baseband, and may include an higher layer processing unit 1211 and a physical layer processing unit 1215. The higher layer processing unit 1211 may process operation of a Medium Access Control (MAC) layer, a Radio Resource Control (RRC), or a higher layer. The physical layer processing unit 1215 may process operation of a physical (PHY) layer (e.g., uplink reception signal processing and downlink transmission signal processing). The processor 1210 may control the overall operation of the base station device 1200, in addition to performing baseband-related signal processing.

The antenna unit 1220 may include one or more physical antennas, and may support Multiple Input Multiple Output (MIMO) transmission and reception when a plurality of antennas is included. The transceiver 1230 may include an radio frequency (RF) transmitter and an RF receiver. The memory 1240 may store processed information of the processor 1210, software associated with the operations of the base station device 1200, an operating system, applications, or the like, and may include elements such as a buffer or the like.

The processor 1210 of the base station device 1200 may be configured to implement the operations of the base station described in the embodiments of the present disclosure.

For example, the higher layer processing unit 1211 of the processor 1210 of the base station device 1200 may include a DMRS configuration generating unit 1212.

The DMRS pattern configuration information generating unit 1212 may determine DMRS configuration information signaling set candidates (e.g., combinations of two or more factors from among basic pattern overhead (information indicating the existence of a basic pattern), additional pattern overhead (information indicating the existence of an additional pattern), an RE position (i.e., a symbol position and/or a subcarrier position) in a slot of the basic pattern, an RE position (i.e., a symbol position and/or a subcarrier position) in a slot of the additional pattern, and virtual cell identification), for a DMRS transmitted in order to demodulate a physical channel to be transmitted to a terminal, and may indicate the signaling set candidates to the terminal.

The physical layer processing unit 1215 of the processor 1210 of the base station device 1200 may include a DMRS pattern configuration information transmitting unit 1216, a DMRS transmitting unit 1217, and a physical channel transmitting unit 1218.

The DMRS pattern configuration information transmitting unit 1216 may configure downlink control information (DCI) including DMRS configuration that is allocated to the terminal, and may transmit the same via the transceiver 1230.

For example, the DMRS pattern configuration information transmitting unit 1216 may transmit DCI to the terminal, the DCI including information indicating one of the DMRS pattern configuration information signaling set candidates generated by the DMRS pattern configuration information generating unit 1212 of the higher layer processing unit 1210.

The DMRS transmitting unit 1217 may map a DMRS onto a physical resource based on the DMRS configuration allocated to the terminal, and may transmit the same via the transceiver 1230.

The physical channel transmitting unit 1217 may map a physical channel (e.g., a downlink data channel) onto the physical resource, together with the DMRS transmitted to the terminal, and may transmit the same via the transceiver 1230.

The terminal device 1250 may include a processor 1260, an antenna unit 1270, a transceiver 1280, and a memory 1290.

The processor 1260 may perform signal processing associated with a baseband, and may include a higher layer processing unit 1261 and a physical layer processing unit 1265. The higher layer processing unit 1261 may process operation of a MAC layer, an RRC layer, or a higher layer. The physical layer processing unit 1265 may process operation of a PHY layer (e.g., downlink reception signal processing and uplink transmission signal processing). The processor 1260 may control the overall operation of the terminal device 1250, in addition to performing baseband-related signal processing.

The antenna unit 1270 may include one or more physical antennas, and may support MIMO transmission and reception when a plurality of antennas is included. The transceiver 1280 may include an RF transmitter and an RF receiver. The memory 1290 may store processed information of the processor 1260, software associated with the operations of the terminal device 1250, an operating system, applications, or the like, and may include elements such as a buffer or the like.

The processor 1260 of the terminal device 1250 may be configured to implement the operations of the terminal described in the embodiments of the present disclosure.

The higher layer processing unit 1261 of the processor 1260 of the terminal device 1250 may include a DMRS pattern configuration information determining unit 1262.

The DMRS pattern configuration information determining unit 1262 may determine DMRS configuration information signaling set candidates (e.g., combinations of two or more factors from among basic pattern overhead (information indicating the existence of a basic pattern), additional pattern overhead (information indicating the existence of an additional pattern), an RE position (i.e., a symbol position and/or a subcarrier position) in a slot of the basic pattern, an RE position (i.e., a symbol position and/or a subcarrier position) in a slot of the additional pattern, and virtual cell identification) based on higher layer signaling provided from the base station.

The physical layer processing unit 1265 of the processor 1260 of the terminal device 1250 may include a DMRS pattern configuration information receiving unit 1266, a DMRS receiving unit 1267, and a physical channel receiving unit 1268.

The DMRS pattern configuration information receiving unit 1266 may receive DMRS pattern configuration information provided via DCI from the base station, via the transceiver 1280.

For example, the DMRS pattern configuration information receiving unit 1266 may receive DCI including information indicating one of the DMRS pattern configuration information signaling set candidates determined by the DMRS pattern configuration information determining unit 1262 of the higher layer processing unit 1261.

The DMRS receiving unit 1267 may receive a DMRS via the transceiver 1280, based on DMRS configuration identified via the DMRS configuration information receiving unit 1266.

The physical channel receiving unit 1268 may receive a physical channel transmitted together with the DMRS, via the transceiver 1280.

The physical layer processing unit 1265 may transfer the received DMRS and physical channel to the higher layer processing unit 1261, and may attempt to demodulate the physical channel based on channel information estimated using the DMRS.

The descriptions provided in the embodiments of the present disclosure can be equally applied to the operations of the base station device 1200 and the terminal device 1250, and overlapping descriptions have been omitted. An example method of transmitting a reference signal may be performed by a base station (e.g., an eNodeB of an NR system) in a downlink or a UE (e.g., a UE of an NR system) in an uplink or a sidelink. For example, a method may comprise determining a first set of antenna ports for a demodulation reference signal (DM-RS) transmission; determining, based on the first set, a frequency index associated with four adjacent resource elements, wherein the four adjacent resource elements correspond to two adjacent symbols in a time axis and to two adjacent subcarriers in a frequency axis; generating, based on a first orthogonal cover code and a second orthogonal cover code, a DM-RS associated with the first set of antenna ports; and transmitting, via a mapping to the four adjacent resource elements, the DM-RS associated with the first set of antenna ports. The DM-RS may be a DM-RS for a physical downlink shared channel (PDSCH), a DM-RS for a physical uplink shared channel (PUSCH) or a DM-RS for a physical sidelink shared channel (PSSCH).

The first orthogonal cover code may be a length-2 orthogonal cover code and may be associated with the two adjacent subcarriers, and the second orthogonal cover code may be a length-2 orthogonal cover code and may be associated with the two adjacent symbols. The method may further comprise determining three code division multiplexing (CDM) groups each comprising four different antenna ports, and a first CDM group, of the three CDM groups, may comprise the first set of antenna ports.

The method may further comprise determining a second set of antenna ports for a DM-RS transmission; determining, based on the second set, a frequency index associated with additional four adjacent resource elements, wherein the additional four adjacent resource elements correspond to the two adjacent symbols in the time axis and to additional two adjacent subcarriers in the frequency axis; generating, based on the first orthogonal cover code and the second orthogonal cover code, a DM-RS associated with the second set of antenna ports; and transmitting, via a mapping to the additional four adjacent resource elements, the DM-RS associated with the second set of antenna ports.

The four adjacent resource elements may comprise a first resource element having a symbol index x and a subcarrier index y, a second resource element having a symbol index x and a subcarrier index (y+1), a third resource element having a symbol index (x+1) and a subcarrier index y, and a fourth resource element having a symbol index (x+1) and a subcarrier index (y+1) where x and y are positive integers. A sequence of four orthogonal cover code values for the first resource element, the second resource element, the third resource element, and the fourth resource element may be differently determined for each antenna port in the first set (e.g., as shown in FIG. 10 and Table 21).

The method may further comprise determining a third set of antenna ports for a DM-RS transmission; determining, based on the third set, a frequency index associated with second additional four adjacent resource elements, wherein the second additional four adjacent resource elements correspond to the two adjacent symbols in the time axis and to second additional two adjacent subcarriers in the frequency axis; generating, based on the first orthogonal cover code and the second orthogonal cover code, a DM-RS associated with the third set of antenna ports; and transmitting, via a mapping to the second additional four adjacent resource elements, the DM-RS associated with the third set of antenna ports.

The method may further comprise determining to transmit DM-RS via additional two adjacent symbols; determining, based on the first set, the frequency index associated with additional four adjacent resource elements, wherein the additional four adjacent resource elements correspond to the additional two adjacent symbols in the time axis and to the two adjacent subcarriers in the frequency axis; and transmitting, via a mapping to the additional four adjacent resource elements, a DM-RS associated with the first set of antenna ports. At least one symbol may exist between the two adjacent symbols and the additional two adjacent symbols, and the two adjacent symbols and the additional two adjacent symbols may be comprised in one slot.

If the DM-RS is a DM-RS for a PDSCH, the DM-RS associated with the first set of antenna ports comprises a DM-RS for a PDSCH, and the transmitting the DM-RS associated with the first set of antenna ports may comprise transmitting, from a base station and to a user equipment, the DM-RS associated with the first set of antenna ports. If the DM-RS is a DM-RS for a PUSCH, the DM-RS associated with the first set of antenna ports comprises a DM-RS for a PUSCH, and the transmitting the DM-RS associated with the first set of antenna ports may comprise transmitting, from a user equipment and to a base station, the DM-RS associated with the first set of antenna ports. If the DM-RS is a DM-RS for a PSSCH, the DM-RS associated with the first set of antenna ports comprises a DM-RS for a PSSCH, and the transmitting the DM-RS associated with the first set of antenna ports may comprise transmitting, from a user equipment and to another user equipment, the DM-RS associated with the first set of antenna ports.

An example method may comprise determining, by a base station, a type of demodulation reference signal (DM-RS) configuration; determining two adjacent orthogonal frequency division multiplexing (OFDM) symbols for mapping DM-RSs for at least three code division multiplexing (CDM) groups; determining a first set of antenna ports for a demodulation reference signal (DM-RS) transmission to a first user equipment (UE), wherein a first CDM group, among the at least three CDM groups, comprises the first set of antenna ports; determining, based on the first set, a frequency index associated with first four adjacent resource elements, wherein the first four adjacent resource elements correspond to the two adjacent OFDM symbols in a time axis and to first two adjacent subcarriers in a frequency axis; and mapping, based on a first orthogonal cover code and a second orthogonal cover code, a first DM-RS to the first four adjacent resource elements, wherein the first DM-RS is associated with the first set of antenna ports.

The method may further comprise determining a second set of antenna ports for a DM-RS transmission to a second UE, wherein a second CDM group, among the at least three CDM groups, comprises the second set of antenna ports; determining, based on the second set, a frequency index associated with second four adjacent resource elements, wherein the second four adjacent resource elements correspond to the two adjacent OFDM symbols in the time axis and to second two adjacent subcarriers in the frequency axis; and mapping, based on the first orthogonal cover code and the second orthogonal cover code, a second DM-RS to the second four adjacent resource elements, wherein the second DM-RS is associated with the second set of antenna ports.

The method may further comprise determining a second set of antenna ports for a DM-RS transmission to the first UE, wherein a second CDM group, among the at least three CDM groups, comprises the second set of antenna ports; determining, based on the second set, a frequency index associated with second four adjacent resource elements, wherein the second four adjacent resource elements correspond to the two adjacent OFDM symbols in the time axis and to second two adjacent subcarriers in the frequency axis; and mapping, based on the first orthogonal cover code and the second orthogonal cover code, a second DM-RS to the second four adjacent resource elements, wherein the second DM-RS is associated with the second set of antenna ports.

The first set of antenna ports may comprise one to four antenna ports not comprised in the second CDM group or a third CDM group of the at least three CDM groups, and the second set of antenna ports may comprise one to four antenna ports not comprised in the first CDM group or the third CDM group.

Antenna ports in the second CDM group may be configured to be selected for a DM-RS transmission after selecting at least one antenna port, from the first CDM group, for a DM-RS transmission, and antenna ports in the third CDM group may be configured to be selected for a DM-RS transmission after selecting at least one antenna port, from the second CDM group, for a DM-RS transmission.

An example method may comprise receiving, by a user equipment (UE) and from a base station, a type of demodulation reference signal (DM-RS) configuration, a first set of antenna ports for a DM-RS transmission from the UE, and information indicating a quantity of code division multiplexing (CDM) groups scheduled for a DM-RS transmission; determining two adjacent symbols for mapping a DM-RS; determining, based on the first set, a frequency index associated with first four adjacent resource elements, wherein the first four adjacent resource elements correspond to the two adjacent symbols in a time axis and to first two adjacent subcarriers in a frequency axis; generating, based on a first orthogonal cover code and a second orthogonal cover code, a DM-RS associated with the first set of antenna ports; and transmitting, via a mapping to the first four adjacent resource elements, the DM-RS associated with the first set of antenna ports.

The method may further comprise determining, based on the information indicating a quantity of CDM groups scheduled for a DM-RS transmission, whether to map a physical uplink shared channel (PUSCH) to second four adjacent resource elements, wherein the second four adjacent resource elements correspond to the two adjacent symbols in the time axis and to second two adjacent subcarriers in a frequency axis.

A first CDM group, among three CDM groups, may comprise the first set of antenna ports, antenna ports in a second CDM group, among the three CDM groups, may be configured to be selected for a DM-RS transmission after selecting at least one antenna port, from the first CDM group, for a DM-RS transmission, and antenna ports in a third CDM group, among the three CDM groups, may be configured to be selected for a DM-RS transmission after selecting at least one antenna port, from the second CDM group, for a DM-RS transmission.

The method may further comprise determining that the quantity of CDM groups scheduled for a DM-RS transmission corresponds to two or three. The determining whether to map the PUSCH to second four adjacent resource elements may comprise determining not to map the PUSCH to the second four adjacent resource elements.

In order to solve a problem in that a wide bandwidth is not used in a conventional frequency range or in a carrier such as 700 MHz or 2 GHz, a new numerology for an NR system supporting a plurality of subcarrier spacings (SCS) may be determined by assuming a wireless communication system operating in a frequency range or in a carrier such as 3 GHz or lower, 3 GHz-6 GHz, or 6 GHZ-52.6 GHz, but a range of the present disclosure is not limited thereto.

In the NR system, one radio frame may correspond to 10 ms on a temporal axis, and one subframe may correspond to 1 ms on a temporal axis. In addition, one slot may correspond to fourteen or seven symbols on a temporal axis. Accordingly, a number of available slots and symbols according to a subcarrier spacing (SCS) respectively in consideration within one radio frame corresponding to 10 ms is as Table 1 below. In Table 1, an SCS of 480 KHz may not be considered.

TABLE 32

| SCS | Number of slots within 10 ms (fourteen symbols in one slot) | Number of slots within 10 ms (seven symbols in one slot) | Number of symbols within 10 ms |
|---|---|---|---|
| 15 KHz | 10 | 20 | 140 |
| 30 Khz | 20 | 40 | 280 |
| 60 KHz | 40 | 80 | 560 |
| 120 KHz | 80 | N/A | 1120 |
| 240 KHz | 160 | N/A | 2240 |
| 480 KHz | 320 | N/A | 4480 |

In detail, hereinafter, various examples of the present disclosure for a DMRS layer, an antenna port, a sequence, and a multiplexing for the NR system will be described.

In an MU-MIMO, up to 12 layers being classified from each other may be supported for across all terminals. In other words, in the MU-MIMO, each layer used by each terminal may be one of DMRS antenna port numbers #1, #2, #3, #4, #5, #6, #7, #8, #9, #10, #11, and #12, which are different from each other.

In addition, a maximum number N of available DMRS layers for each terminal may be respectively defined for a case of an SU-MIMO and a case of an MU-MIMO.

In case of an SU-MIMO, up to N=8 layers classified from each other may be supported for one terminal.

In case of an MU-MIMO, up to N=2 (or N=3 or N=4) layers classified from each other may be supported for each terminal.

When a maximum number of available DMRS layers for each terminal is N, each layer may correspond to one of DMRS antenna port numbers #1, #2, #3, #4, #5, #6, #7, #8, #9, #10, #11, and #12, which is different from each other.

A DMRS for the NR system may be defined to be arranged up three DMRS types within one slot.

As the three DMRS types, a front-loaded DMRS, a first additional DMRS (Additional DMRS #1), and a second additional DMRS (Additional DMRS #2) may be defined.

The front-loaded DMRS may be basically arranged in one OFDM symbol that is positioned at a temporally front part within one slot or in two consecutive OFDM symbols within one slot. In addition, when a support for a channel temporally rapidly changing is required due to a fast movement speed, at least one of Additional DMRS #1 and Additional DMRS #2 may be additionally arranged within one slot.

DMRS Pattern A

A DMRS pattern A is an example where a DMRS configuration type 1 is applied. The DMRS configuration type 1 may be called an interleaved frequency division multiple access (IFDMA) method or a comb method. In other words, the DMRS configuration type 1 corresponds to a method in which one DMRS pattern is arranged in an alternate subcarrier in a frequency domain.

DMRS Pattern A-1

A DMRS pattern A-1 corresponds a case where one symbol is used, and may classify up to four DMRS antenna port.

FIG. 13 is a view showing an example of a DMRS pattern to which the present disclosure may be applied.

In the example of FIG. 13, in one symbol and twelve subcarriers (corresponding to one PRB in a frequency domain), a "Comb Pattern A" and a "Comb Pattern B" are represented. A DMRS pattern shown in FIG. 1 may expand, in a frequency axis, by being repeated to a plurality of PRBs by a bandwidth assigned for transmitting to a physical channel (for example, physical downlink shared channel (PDSCH), physical uplink shared channel (PUSCH), etc.) of each terminal. In addition, in a temporal axis, the DMRS pattern may be applied to each DMRS configuration (for example, front-loaded DMRS configuration, Additional DMRS #1 configuration, and Additional DMRS #2 configuration) within one slot.

FIG. 13 shows examples of, for one symbol within one PRB, respectively assigning six REs for a Comb Pattern A and a Comb Pattern B in case of a full overhead, and respectively assigning three REs in case of a ½ overhead that is when an overhead reduction is applied. However, it is not limited thereto, and an overhead reduction of another frequency may be used. For example, for each Comb Pattern, in one symbol within one PRB, two REs (in other words, applying a ⅓ overhead), four REs (in other words, applying a ⅔ overhead) may be assigned.

Relating to the example of FIG. 13, a DMRS antenna port configuration may be defined as Table 2 or Table 3 below. In Tables 2 and 3 below, a Comb pattern is the "Comb pattern A" or the "Comb pattern B" shown in FIG. 13. A cyclic shift (CS) is a cyclic delay value of a DMRS sequence. When a number of available values is X, a "CS value A" may have a value of 0, and a "CS value B" may represent to have a value of X/2. For example, when X=12, the "CS value A" may have a value of 0, and the "CS value B" may have a value of 6. When X=2π, the "CS value A" may have a value of 0, and the "CS value B" may have a value of π, but it is not limited thereto.

DMRS Pattern A-1-1

A DMRS pattern A-1-1 preferentially classifies DMRS antenna ports into Comb patterns, and within a range to which the same Comb Pattern is applied, the DMRS pattern A-1-1 corresponds to a method of classifying into CS values. Table 33 below shows an example thereof.

TABLE 33

|  | Comb pattern | CS(Cyclic Shift) |
|---|---|---|
| DMRS antenna port #1 | Comb pattern A | CS value A |
| DMRS antenna port #2 | Comb pattern B | CS value A |
| DMRS antenna port #3 | Comb pattern A | CS value B |
| DMRS antenna port #4 | Comb pattern B | CS value B |

DMRS Pattern A-1-2

A DMRS pattern A-1-2 preferentially classifies DMRS antenna ports into CS values, and within a range to which the same CS value is applied, the DMRS pattern A-1-2 corresponds to a method of classifying into Comb Patterns. Table 34 below shows an example thereof.

TABLE 34

|  | Comb pattern | CS(Cyclic Shift) |
|---|---|---|
| DMRS antenna port #1 | Comb pattern A | CS value A |
| DMRS antenna port #2 | Comb pattern A | CS value B |
| DMRS antenna port #3 | Comb pattern B | CS value A |
| DMRS antenna port #4 | Comb pattern B | CS value B |

DMRS Pattern A-2

A DMRS pattern A-2 corresponds to a case where two symbols are used, and the DMRS pattern A-2 may classify up to eight DMRS antenna ports.

FIG. 14 is a view showing an additional example of a DMRS pattern to which the present disclosure may be applied.

In the example of FIG. 14, in two symbols and twelve subcarriers (corresponding to one PRB in a frequency domain), a "Comb Pattern A" and "Comb Pattern B" are represented. A DMRS pattern shown in FIG. 14 may expand, in a frequency axis, by being repeated to a plurality of PRBs by a bandwidth assigned for transmitting to a physical channel (for example, PDSCH, PUSCH, etc.) In addition, in a temporal axis, the DMRS pattern may be applied to each DMRS configuration (for example, front-loaded DMRS configuration, Additional DMRS #1 configuration, and Additional DMRS #2 configuration) within one slot.

FIG. 14 shows examples of, for one symbol within one PRB, for the respectively Comb Pattern A and the Comb Pattern B, assigning six REs in case of a full overhead, and assigning three REs in case of a ½ overhead that is when an overhead reduction is applied. However, it is not limited thereto, and an overhead reduction of another frequency may be used. For example, for each Comb Pattern, in one symbol within one PRB, two REs (in other words, applying a ⅓ overhead), four REs (in other words, applying a ⅔ overhead) may be assigned.

In other words, for respectively two symbols within one PRB, for the Comb Pattern A and the Comb Pattern B, twelve REs may be assigned in case of a full overhead, six REs may be assigned in case of a ½ overhead that is when a overhead reduction is applied, four REs may be assigned when a ⅓ overhead is applied, and eight REs may be assigned when a ⅔ overhead is applied.

Relating to the example of FIG. 14, a DMRS antenna port configuration may be defined as Tables following. In Tables, a Comb pattern is the "Comb pattern A" or the "Comb pattern B" shown in FIG. 14. A cyclic shift (CS) is a cyclic delay value of a DMRS sequence. When a number of available values is X, a "CS value A" may have a value of 0, and a "CS value B" may represent to have a value of X/2. For example, when X=12, the "CS value A" may have a value of 0, and the "CS value B" may have a value of 6. When X=2π, the "CS value A" may have a value of 0, and the "CS value B" may be a value of π, but it is not limited thereto.

In addition, a time domain-orthogonal cover code (TD-OCC) may be applied to two REs that are adjacent in a temporal axis on the same subcarrier within each Comb pattern. In other words, a TD-OCC value of [+1, +1] or [+1, −1] may be applied to [RE with a temporal axial precedence on the same subcarrier, RE following in a temporal axis on the same subcarrier]. Accordingly, when generating a DMRS sequence, +1 or −1 is multiplied by a sequence value of a DMRS sequence mapped to a corresponding RE.

DMRS Pattern A-2-1

A DMRS pattern A-2-1 preferentially classifies DMRS antenna ports into Comb patterns, and within a range to which the same Comb Pattern is applied, the DMRS pattern A-2-1 classifies DMRS antenna ports into CS values. In addition, within a range to which the same Comb pattern and the same CS value are applied, the DMRS pattern A-2-1 corresponds to a method of classifying the DMRS antenna ports into TD-OCC values. Table 35 below shows an example thereof.

TABLE 35

|  | Comb pattern | CS(Cyclic Shift) | TD-OCC |
| --- | --- | --- | --- |
| DMRS antenna port #1 | Comb pattern A | CS value A | [+1, +1] |
| DMRS antenna port #2 | Comb pattern B | CS value A | [+1, +1] |

TABLE 35-continued

|  | Comb pattern | CS(Cyclic Shift) | TD-OCC |
| --- | --- | --- | --- |
| DMRS antenna port #3 | Comb pattern A | CS value B | [+1, +1] |
| DMRS antenna port #4 | Comb pattern B | CS value B | [+1, +1] |
| DMRS antenna port #5 | Comb pattern A | CS value A | [+1, −1] |
| DMRS antenna port #6 | Comb pattern B | CS value A | [+1, −1] |
| DMRS antenna port #7 | Comb pattern A | CS value B | [+1, −1] |
| DMRS antenna port #8 | Comb pattern B | CS value B | [+1, −1] |

DMRS Pattern A-2-2

A DMRS pattern A-2-2 preferentially classifies DMRS antenna ports into Comb patterns, and within a range to which the same Comb Pattern is applied, the DMRS pattern A-2-2 classifies the DMRS antenna ports into TD-OCC values. In addition, within a range to which the same Comb pattern and the same TD-OCC value are applied, the DMRS pattern A-2-2 corresponds to a method of classifying the DMRS antenna ports into CS values. Table 36 below shows an example thereof.

TABLE 36

|  | Comb pattern | CS(Cyclic Shift) | TD-OCC |
| --- | --- | --- | --- |
| DMRS antenna port #1 | Comb pattern A | CS value A | [+1, +1] |
| DMRS antenna port #2 | Comb pattern B | CS value A | [+1, +1] |
| DMRS antenna port #3 | Comb pattern A | CS value A | [+1, −1] |
| DMRS antenna port #4 | Comb pattern B | CS value A | [+1, −1] |
| DMRS antenna port #5 | Comb pattern A | CS value B | [+1, +1] |
| DMRS antenna port #6 | Comb pattern B | CS value B | [+1, +1] |
| DMRS antenna port #7 | Comb pattern A | CS value B | [+1, −1] |
| DMRS antenna port #8 | Comb pattern B | CS value B | [+1, −1] |

DMRS Pattern A-2-3

A DMRS pattern A-2-3 preferentially classifies DMRS antenna ports into CS values, and within a range to which the same CS value is applied, the DMRS pattern A-2-3 classifies the DMRS antenna ports into Comb patterns. In addition, within a range to which the same CS value and the same Comb pattern are applied, the DMRS pattern A-2-3 corresponds to a method of classifying the DMRS antenna ports into TD-OCC values. Table 37 below shows an example thereof.

TABLE 37

|  | Comb pattern | CS(Cyclic Shift) | TD-OCC |
| --- | --- | --- | --- |
| DMRS antenna port #1 | Comb pattern A | CS value A | [+1, +1] |
| DMRS antenna port #2 | Comb pattern A | CS value B | [+1, +1] |
| DMRS antenna port #3 | Comb pattern B | CS value A | [+1, +1] |
| DMRS antenna port #4 | Comb pattern B | CS value B | [+1, +1] |
| DMRS antenna port #5 | Comb pattern A | CS value A | [+1, −1] |
| DMRS antenna port #6 | Comb pattern A | CS value B | [+1, −1] |
| DMRS antenna port #7 | Comb pattern B | CS value A | [+1, −1] |
| DMRS antenna port #8 | Comb pattern B | CS value B | [+1, −1] |

DMRS Pattern A-2-4

A DMRS pattern A-2-4 preferentially classifies DMRS antenna ports into CS values, and within a range to which the same CS value is applied, the DMRS pattern A-2-4 classifies the DMRS antenna ports into TD-OCC values. In addition, within a range to which the same CS value and the same TD-OCC value are applied, the DMRS pattern A-2-4 corresponds to a method of classifying the DMRS antenna ports into Comb patterns. Table 38 below shows an example thereof.

TABLE 38

|  | Comb pattern | CS(Cyclic Shift) | TD-OCC |
| --- | --- | --- | --- |
| DMRS antenna port #1 | Comb pattern A | CS value A | [+1, +1] |
| DMRS antenna port #2 | Comb pattern A | CS value B | [+1, +1] |
| DMRS antenna port #3 | Comb pattern A | CS value A | [+1, −1] |
| DMRS antenna port #4 | Comb pattern A | CS value B | [+1, −1] |
| DMRS antenna port #5 | Comb pattern B | CS value A | [+1, +1] |
| DMRS antenna port #6 | Comb pattern B | CS value B | [+1, +1] |
| DMRS antenna port #7 | Comb pattern B | CS value A | [+1, −1] |
| DMRS antenna port #8 | Comb pattern B | CS value B | [+1, −1] |

DMRS Pattern A-2-5

A DMRS pattern A-2-5 preferentially classifies DMRS antenna ports into TD-OCC values, and within a range to which the same TD-OCC value is applied, the DMRS pattern A-2-5 classifies the DMRS antenna ports into CS values. In addition, within a range to which the same TD-OCC value and the same CS value are applied, the DMRS pattern A-2-5 corresponds to a method of classifying the DMRS antenna ports into Comb patterns. Table 39 below shows an example thereof.

TABLE 39

|  | Comb pattern | CS(Cyclic Shift) | TD-OCC |
| --- | --- | --- | --- |
| DMRS antenna port #1 | Comb pattern A | CS value A | [+1, +1] |
| DMRS antenna port #2 | Comb pattern A | CS value A | [+1, −1] |
| DMRS antenna port #3 | Comb pattern A | CS value B | [+1, +1] |
| DMRS antenna port #4 | Comb pattern A | CS value B | [+1, −1] |
| DMRS antenna port #5 | Comb pattern B | CS value A | [+1, +1] |
| DMRS antenna port #6 | Comb pattern B | CS value A | [+1, −1] |
| DMRS antenna port #7 | Comb pattern B | CS value B | [+1, +1] |
| DMRS antenna port #8 | Comb pattern B | CS value B | [+1, −1] |

DMRS Pattern A-2-6

A DMRS pattern A-2-6 preferentially classifies DMRS antenna ports into TD-OCC values, and within a range to which the same TD-OCC value is applied, the DMRS pattern A-2-6 classifies the DMRS antenna ports into Comb patterns. In addition, within a range to which the same TD-OCC value and the same Comb pattern are applied, the DMRS pattern A-2-6 corresponds to a method of classifying the DMRS antenna ports into CS values. Table 40 below shows an example thereof.

TABLE 40

|  | Comb pattern | CS(Cyclic Shift) | TD-OCC |
| --- | --- | --- | --- |
| DMRS antenna port #1 | Comb pattern A | CS value A | [+1, +1] |
| DMRS antenna port #2 | Comb pattern A | CS value A | [+1, −1] |
| DMRS antenna port #3 | Comb pattern B | CS value A | [+1, +1] |
| DMRS antenna port #4 | Comb pattern B | CS value A | [+1, −1] |
| DMRS antenna port #5 | Comb pattern A | CS value B | [+1, +1] |
| DMRS antenna port #6 | Comb pattern A | CS value B | [+1, −1] |
| DMRS antenna port #7 | Comb pattern B | CS value B | [+1, +1] |
| DMRS antenna port #8 | Comb pattern B | CS value B | [+1, −1] |

DMRS Pattern B

A DMRS pattern B is an example where a DMRS configuration type 2 is applied. The DMRS configuration type 2 may be called a code division multiplexing (CDM) method. In other words, according to the DMRS configuration type 2, in CDM groups different from each other, DMRS antenna ports may be classified by being arranged in temporal-frequency resources different from each other. In addition, within the same CDM group, the DMRS antenna ports may be classified by other code resources different from each other (for example, OCC).

DMRS Pattern B-1

A DMRS pattern B-1 corresponds to a case where one symbol is used, and the DMRS pattern B-1 may classify up to six DMRS antenna ports.

FIG. 15 is a view showing an additional example of a DMRS pattern to which the present disclosure may be applied.

In the example of FIG. 15, in one symbol and twelve subcarriers (corresponding to one PRB in a frequency domain), a "CDM group A", a "CDM group B", and a "CDM group C" are represented. A DMRS pattern shown in FIG. 15 may expand, in a frequency axis, by being repeated to a plurality of PRBs as much as a bandwidth assigned for transmitting to a physical channel (for example PDSCH, PUSCH, etc.). In addition, in a temporal axis, the DMRS pattern may be applied to each DMRS configuration (for example, front-loaded DMRS configuration, Additional DMRS #1 configuration, and Additional DMRS #2 configuration) within one slot.

FIG. 15 shows examples of, for one symbol within one PRB, assigning four REs to each CDM group in case of a full overhead, and assigning two REs in case of a ½ overhead that occurs when a overhead reduction is applied.

Relating to the examples of FIG. 15, a DMRS antenna port configuration may be defined as Table 41 or Table 42 below. In Tables, a CDM group is the "CDM group A", the "CDM group B", or the "CDM group C" shown in FIG. 15.

In addition, a frequency domain-orthogonal cover code (FD-OCC) may be applied to two REs that are adjacent in a frequency axis on the same symbol within each CDM group. In other words, a FD-OCC value of [+1, +1] or [+1, −1] may be applied to [RE with a frequency axial precedence on the same symbol, RE following in a frequency axis on the same symbol]. Accordingly, when generating a DMRS sequence, +1 or −1 is multiplied by a sequence value of a DMRS sequence mapped to a corresponding RE.

DMRS Pattern B-1-1

A DMRS pattern B-1-1 preferentially classifies DMRS antenna ports into CDM groups, and within a range to which the same CDM group is applied, the DMRS pattern B-1-1 corresponds to a method of classifying the DMRS antenna ports into FD-OCC values. Table 41 below shows an example thereof.

TABLE 41

|  | CDM group | FD-OCC |
| --- | --- | --- |
| DMRS antenna port #1 | CDM group A | [+1, +1] |
| DMRS antenna port #2 | CDM group B | [+1, +1] |
| DMRS antenna port #3 | CDM group C | [+1, +1] |
| DMRS antenna port #4 | CDM group A | [+1, −1] |
| DMRS antenna port #5 | CDM group B | [+1, −1] |
| DMRS antenna port #6 | CDM group C | [+1, −1] |

DMRS Pattern B-1-2

A DMRS pattern B-1-2 preferentially classifies DMRS antenna ports into FD-OCC values, and within a range to which the same FD-OCC value is applied, the DMRS pattern B-1-2 corresponds to a method of classifying the DMRS antenna ports into CDM groups. Table 11 below shows an example thereof.

TABLE 42

|  | CDM group | FD-OCC |
| --- | --- | --- |
| DMRS antenna port #1 | CDM group A | [+1, +1] |
| DMRS antenna port #2 | CDM group A | [+1, -1] |
| DMRS antenna port #3 | CDM group B | [+1, +1] |
| DMRS antenna port #4 | CDM group B | [+1, -1] |
| DMRS antenna port #5 | CDM group C | [+1, +1] |
| DMRS antenna port #6 | CDM group C | [+1, -1] |

DMRS Pattern B-2

A DMRS pattern B-2 corresponds to a case where two symbols are used, and the DMRS pattern B-2 may classify up to twelve DMRS antenna ports.

FIG. 16 is a view showing an additional example of a DMRS pattern to which the present disclosure may be applied.

In the example of FIG. 16, in two symbols and twelve subcarriers (corresponding to one PRB in a frequency domain), a "CDM group A", a "CDM group B", and a "CDM group C" are represented. A DMRS pattern shown in FIG. 16 may expand, to a frequency axis, by being repeated to a plurality of PRBs by a bandwidth assigned for transmitting a physical channel of each terminal (for example, PDSCH, PUSCH, etc.). In addition, in a temporal axis, the DMRS pattern may be applied to each DMRS configuration (for example, front-loaded DMRS configuration, Additional DMRS #1 configuration, and Additional DMRS #2 configuration) within one slot.

FIG. 16 shows examples of, for one symbol within one PRB, for each CDM group, assigning four REs in case of a full overhead, and assigning two REs in case of a ½ overhead that occurs when an overhead reduction is applied.

In other words, for two symbols within one PRB, for each CDM group, eight REs may be assigned in case of a full overhead, and four REs may be assigned in case of a ½ overhead that occurs when an overhead reduction is applied.

Relating to the examples of FIG. 16, a DMRS antenna port configuration may be defined as Tables 43 to 48 below. In Tables, a CDM group is the "CDM group A", the "CDM group B", and the "CDM group C" shown in FIG. 16.

In addition, a frequency domain-orthogonal cover code (FD-OCC) may be applied to two REs that are adjacent in a frequency axis on the same symbol within each CDM group. In other words, a FD-OCC value of [+1, +1] or [+1, -1] may be respectively applied to [one of the two contiguous REs having a lower frequency index in the same symbol, the other one of the two contiguous REs having a higher frequency index in the same symbol]. Accordingly, when generating a DMRS sequence, +1 or -1 is multiplied by a sequence value of a DMRS sequence that is mapped to a corresponding RE.

In addition, a time domain-orthogonal cover code (TD-OCC) may be applied to two contiguous REs along a time axis on the same subcarrier within each CDM group. In other words, a TD-OCC value of [+1, +1] or [+1, -1] may be respectively applied to [one of the two contiguous REs having a lower symbol index on the same subcarrier, the other one of the two REs having a higher symbol index on the same subcarrier]. Accordingly, when generating a DMRS sequence, +1 or -1 is multiplied by a sequence value of a DMRS sequence that is mapped to a corresponding RE.

DMRS Pattern B-2-1

A DMRS pattern B-2-1 preferentially classifies DMRS antenna ports into CDM groups, and within a range to which the same CDM group is applied, the DMRS pattern B-2-1 classifies the DMRS antenna ports into FD-OCC values. In addition, within a range to which the same CDM group and the same FD-OCC value are applied, the DMRS pattern B-2-1 corresponds to a method of classifying the DMRS antenna ports into TD-OCC values. Table 43 below shows an example thereof.

TABLE 43

|  | CDM group | FD-OCC | TD-OCC |
| --- | --- | --- | --- |
| DMRS antenna port #1 | CDM group A | [+1, +1] | [+1, +1] |
| DMRS antenna port #2 | CDM group B | [+1, +1] | [+1, +1] |
| DMRS antenna port #3 | CDM group C | [+1, +1] | [+1, +1] |
| DMRS antenna port #4 | CDM group A | [+1, -1] | [+1, +1] |
| DMRS antenna port #5 | CDM group B | [+1, -1] | [+1, +1] |
| DMRS antenna port #6 | CDM group C | [+1, -1] | [+1, +1] |
| DMRS antenna port #7 | CDM group A | [+1, +1] | [+1, -1] |
| DMRS antenna port #8 | CDM group B | [+1, +1] | [+1, -1] |
| DMRS antenna port #9 | CDM group C | [+1, +1] | [+1, -1] |
| DMRS antenna port #10 | CDM group A | [+1, -1] | [+1, -1] |
| DMRS antenna port #11 | CDM group B | [+1, -1] | [+1, -1] |
| DMRS antenna port #12 | CDM group C | [+1, -1] | [+1, -1] |

DMRS Pattern B-2-2

A DMRS pattern B-2-2 preferentially classifies DMRS antenna ports into CDM groups, and within a range to which the same CDM group is applied, the DMRS pattern B-2-2 classifies the DMRS antenna ports into TD-OCC values. In addition, within a range to which the same CDM group and the same TD-OCC value are applied, the DMRS pattern B-2-2 corresponds to a method of classifying the DMRS antenna ports into FD-OCC values. Table 44 below shows an example thereof.

TABLE 44

|  | CDM group | FD-OCC | TD-OCC |
| --- | --- | --- | --- |
| DMRS antenna port #1 | CDM group A | [+1, +1] | [+1, +1] |
| DMRS antenna port #2 | CDM group B | [+1, +1] | [+1, +1] |
| DMRS antenna port #3 | CDM group C | [+1, +1] | [+1, +1] |
| DMRS antenna port #4 | CDM group A | [+1, +1] | [+1, -1] |
| DMRS antenna port #5 | CDM group B | [+1, +1] | [+1, -1] |
| DMRS antenna port #6 | CDM group C | [+1, +1] | [+1, -1] |
| DMRS antenna port #7 | CDM group A | [+1, -1] | [+1, +1] |
| DMRS antenna port #8 | CDM group B | [+1, -1] | [+1, +1] |
| DMRS antenna port #9 | CDM group C | [+1, -1] | [+1, +1] |
| DMRS antenna port #10 | CDM group A | [+1, -1] | [+1, -1] |
| DMRS antenna port #11 | CDM group B | [+1, -1] | [+1, -1] |
| DMRS antenna port #12 | CDM group C | [+1, -1] | [+1, -1] |

DMRS Pattern B-2-3

A DMRS pattern B-2-3 may classify DMRS antenna ports into FD-OCC values, and within a range to which the same FD-OCC value is applied, the DMRS pattern B-2-3 may classify the DMRS antenna ports into CDM groups. In addition, within a range to which the same FD-OCC value and the same CDM group are applied, the DMRS pattern B-2-3 may correspond to a method of classifying the DMRS antenna ports into TD-OCC values. Table 45 below shows an example thereof.

TABLE 45

|  | CDM group | FD-OCC | TD-OCC |
| --- | --- | --- | --- |
| DMRS antenna port #1 | CDM group A | [+1, +1] | [+1, +1] |
| DMRS antenna port #2 | CDM group A | [+1, -1] | [+1, +1] |
| DMRS antenna port #3 | CDM group B | [+1, +1] | [+1, +1] |
| DMRS antenna port #4 | CDM group B | [+1, -1] | [+1, +1] |
| DMRS antenna port #5 | CDM group C | [+1, +1] | [+1, +1] |
| DMRS antenna port #6 | CDM group C | [+1, -1] | [+1, +1] |
| DMRS antenna port #7 | CDM group A | [+1, +1] | [+1, -1] |

TABLE 45-continued

| | CDM group | FD-OCC | TD-OCC |
|---|---|---|---|
| DMRS antenna port #8 | CDM group A | [+1, −1] | [+1, −1] |
| DMRS antenna port #9 | CDM group B | [+1, +1] | [+1, −1] |
| DMRS antenna port #10 | CDM group B | [+1, −1] | [+1, −1] |
| DMRS antenna port #11 | CDM group C | [+1, +1] | [+1, −1] |
| DMRS antenna port #12 | CDM group C | [+1, −1] | [+1, −1] |

DMRS Pattern B-2-4

A DMRS pattern B-2-4 preferentially classifies DMRS antenna ports into FD-OCC values, and within a range to which the same FD-OCC value is applied, the DMRS pattern B-2-4 classifies the DMRS antenna ports into TD-OCC values. In addition, within a range to which the same FD-OCC value and the same TD-OCC value are applied, the DMRS pattern B-2-4 corresponds to a method of classifying the DMRS antenna ports into CDM groups. Table 46 below shows an example thereof.

TABLE 46

| | CDM group | FD-OCC | TD-OCC |
|---|---|---|---|
| DMRS antenna port #1 | CDM group A | [+1, +1] | [+1, +1] |
| DMRS antenna port #2 | CDM group A | [+1, −1] | [+1, +1] |
| DMRS antenna port #3 | CDM group A | [+1, +1] | [+1, −1] |
| DMRS antenna port #4 | CDM group A | [+1, −1] | [+1, −1] |
| DMRS antenna port #5 | CDM group B | [+1, +1] | [+1, +1] |
| DMRS antenna port #6 | CDM group B | [+1, −1] | [+1, +1] |
| DMRS antenna port #7 | CDM group B | [+1, +1] | [+1, −1] |
| DMRS antenna port #8 | CDM group B | [+1, −1] | [+1, −1] |
| DMRS antenna port #9 | CDM group C | [+1, +1] | [+1, +1] |
| DMRS antenna port #10 | CDM group C | [+1, −1] | [+1, +1] |
| DMRS antenna port #11 | CDM group C | [+1, +1] | [+1, −1] |
| DMRS antenna port #12 | CDM group C | [+1, −1] | [+1, −1] |

DMRS Pattern B-2-5

A DMRS pattern B-2-5 preferentially classifies DMRS antenna ports into TD-OCC values, and within a range to which the same TD-OCC value is applied, the DMRS pattern B-2-5 classifies the DMRS antenna ports into CDM groups. In addition, within a range to which the same TD-OCC value and the same CDM group are applied, the DMRS pattern B-2-5 corresponds to a method of classifying the DMRS antenna ports into FD-OCC values. Table 47 below shows an example thereof.

TABLE 47

| | CDM group | FD-OCC | TD-OCC |
|---|---|---|---|
| DMRS antenna port #1 | CDM group A | [+1, +1] | [+1, +1] |
| DMRS antenna port #2 | CDM group A | [+1, +1] | [+1, −1] |
| DMRS antenna port #3 | CDM group B | [+1, +1] | [+1, +1] |
| DMRS antenna port #4 | CDM group B | [+1, +1] | [+1, −1] |
| DMRS antenna port #5 | CDM group C | [+1, +1] | [+1, +1] |
| DMRS antenna port #6 | CDM group C | [+1, +1] | [+1, −1] |
| DMRS antenna port #7 | CDM group A | [+1, −1] | [+1, +1] |
| DMRS antenna port #8 | CDM group A | [+1, −1] | [+1, −1] |
| DMRS antenna port #9 | CDM group B | [+1, −1] | [+1, +1] |
| DMRS antenna port #10 | CDM group B | [+1, −1] | [+1, −1] |
| DMRS antenna port #11 | CDM group C | [+1, −1] | [+1, +1] |
| DMRS antenna port #12 | CDM group C | [+1, −1] | [+1, −1] |

DMRS Pattern B-2-6

A DMRS pattern B-2-6 preferentially classifies DMRS antenna ports into TD-OCC values, and within a range to which the same TD-OCC value is applied, the DMRS pattern B-2-6 classifies the DMRS antenna ports into FD-OCC values. In addition, within a range to which the same TD-OCC value and the same FD-OCC value are applied, the DMRS pattern B-2-6 corresponds to a method of classifying the DMRS antenna ports into CDM groups. Table 48 below shows an example thereof.

TABLE 48

| | CDM group | FD-OCC | TD-OCC |
|---|---|---|---|
| DMRS antenna port #1 | CDM group A | [+1, +1] | [+1, +1] |
| DMRS antenna port #2 | CDM group A | [+1, +1] | [+1, −1] |
| DMRS antenna port #3 | CDM group A | [+1, −1] | [+1, +1] |
| DMRS antenna port #4 | CDM group A | [+1, −1] | [+1, −1] |
| DMRS antenna port #5 | CDM group B | [+1, +1] | [+1, +1] |
| DMRS antenna port #6 | CDM group B | [+1, +1] | [+1, −1] |
| DMRS antenna port #7 | CDM group B | [+1, −1] | [+1, +1] |
| DMRS antenna port #8 | CDM group B | [+1, −1] | [+1, −1] |
| DMRS antenna port #9 | CDM group C | [+1, +1] | [+1, +1] |
| DMRS antenna port #10 | CDM group C | [+1, +1] | [+1, −1] |
| DMRS antenna port #11 | CDM group C | [+1, −1] | [+1, +1] |
| DMRS antenna port #12 | CDM group C | [+1, −1] | [+1, −1] |

FIG. 17 is a view showing an application example of a TD-OCC and a FD-OCC to which the present disclosure may be applied.

FIG. 17 shows detailed examples where a "TD-OCC", a "FD-OCC" a "FD-OCC and a TD-OCC" are mapped to DMRS REs.

When a TD-OCC value is [+1, +1], for two REs corresponding to two consecutive symbols on the same subcarrier, a DMRS sequence value mapped to an RE of a low symbol index may be multiplied by +1, and a DMRS sequence value mapped to an RE of a next symbol index may be multiplied by +1.

When a TD-OCC value is [+1, −1], for two REs corresponding to two consecutive symbols on the same subcarrier, a DMRS sequence value mapped to an RE of a low symbol index may be multiplied by +1, and a DMRS sequence value mapped to an RE of a next symbol index may be multiplied by −1.

When a FD-OCC value is [+1, +1], for two REs corresponding to two consecutive subcarriers on the same symbol, a DMRS sequence value mapped to an RE of a low subcarrier index may be multiplied by +1, and a DMRS sequence value mapped to an RE of a next subcarrier index may be multiplied by +1.

When a FD-OCC value is [+1, −1], for two REs corresponding to two consecutive subcarriers on the same symbol, a DMRS sequence value mapped to an RE of a low subcarrier index may be multiplied by +1, and a DMRS sequence value mapped to an RE of a next subcarrier index may be multiplied by −1.

In Examples where both of TD-ODD and FD-OCC are applied, according to the above method, for REs belonging to the same CDM group, an OCC value may be multiplied in a temporal axis and a frequency axis.

Hereinafter, a method of indicating a DMRS layer and an antenna port for an NR system according to the present disclosure, and an apparatus thereof will be described.

According to the present disclosure, in a DMRS used for demodulating a data channel in an NR system, when configuring a layer and an antenna port for transmitting a DMRS and indicating the same, the following aspects may be considered.

Various types of a DMRS configuration: a DMRS configuration type 1 may correspond to an IFDMA (or Comb) method, and a DMRS configuration type 2 may correspond to a CDM group method.

A number of DMRS symbols: one symbol or two symbol may be used for transmitting a DMRS in each DMRS configuration type.

A number of available layers being classified from each other for each terminal according to an MIMO method: up to eight layers may be classified for one terminal in a SU-MIMO, and up to two (or three or four) layers may be classified for each terminal in an MU-MIMO.

Up to twelve layers may be classified for across all terminals in an MU-MIMO.

A signaling method of configuring a layer and an antenna port for transmitting a DMRS, and indicating the same, in order to classify into a DMRS configuration type 1 and a DMRS configuration type 2, a high class signaling method (for example, radio resource control (RRC) signaling) may be used.

For each DMRS configuration type, a number of layers, an antenna port number, and a number of symbols which are used for receiving a DMRS or transmitting a DMRS for each terminal may be indicated by a specific signaling field defined within a specific downlink control information (DCI) format.

When transmitting a downlink (DL) DMRS, a base station may determine a DMRS configuration type of a DMRS to be transmitted, and may transmit to a terminal the determined DMRS configuration type by using a RRC signaling method. The base station may determine a number of layers, an antenna port number, and a number of symbols of the DMRS to be transmitted to a terminal based on the DMRS configuration type, and may transmit the same to the terminal by using DCI. The base station may transmit the DMRS to the terminal by mapping on a physical resource based on the DMRS configuration type, and information of the number of layers, the antenna port number, and the number of symbols of the DMRS.

When receiving a downlink (DL) DMRS, the terminal may receive and check the DMRS configuration type and information of the DMRS which will be transmitted from the base station to the terminal by using a RRC signaling method. The terminal may receive and check information of the number of layers, the antenna port number, and the number of symbols layers of the DMRS which are determined based on the DMRS configuration type of the DMRS which will be transmitted from the base station to the terminal by using DCI transmitted from the base station to the terminal. The terminal may generate a DMRS based on information of the DMRS configuration type, the number of layers, the antenna port number, and the number of symbols, and estimate a downlink channel by comparing the DMRS received from the base station and the generated DMRS.

When receiving an uplink (UL) DMRS, the base station may determine a DMRS configuration type of a DMRS to be transmitted from the terminal to the base station, and transmit the determined DMRS configuration type to the terminal by using RRC signaling. The base station may determine a number of layers, an antenna port number, and a number of symbols of the DMRS to be transmitted from the terminal to the base station based on the DMRS configuration type, and transmit the same to the terminal by using DCI. The base station may generate a DMRS based on the DMRS configuration type and the information of the number of layers, the antenna port number, and the number of symbols of the DMRS, and estimate an uplink channel by comparing the DMRS received from the terminal and the generated DMRS.

When transmitting an uplink (UL) DMRS, the terminal may receive and check from the base station information of a DMRS configuration type of a DMRS to be transmitted from the terminal to the base station by using RRC signaling. The terminal may receive and check information of a number of layers, an antenna port number, and a number of symbols of the DMRS determined based on the DMRS configuration type of the DMRS to be transmitted from the terminal to the base station by using DCI that is transmitted from the base station to the terminal. The terminal may transmit the DMRS to the base station by mapping on a physical resource based on the DMRS configuration type and the information of the number of layers, the antenna port number, and the number of symbols of the DMRS.

Embodiment 5

The present embodiment 5 relates to a method of configuring and indicating information of a number of layers, an antenna port number, and a number of symbols of a DMRS in case of a DMRS configuration type 1 (in other words, a DMRS configuration type of an IFDMA (or Comb) method).

Hereinafter, in detailed examples, examples of a combination of a number of layers, an antenna port number, and a number of symbols of a DMRS may be represented in a single table form, and a value indicating a specific combination among combinations configured as the above table form may be transmitted from the base station to the terminal by using DCI. In other words, in a DCI format, as examples below, a signaling field indicating a number of layers, an antenna port number, and a number of symbols of a DMRS may be defined. When a corresponding signaling field has a specific value, a number of layers, an antenna port number, and a number of symbols of a DMRS which are mapped to the specific value may be indicated.

In addition, in detailed examples below, it is assumed that up to two codewords are used in an NR system. In detail, it is assumed that, for each terminal, when one to four layers are used, one codeword (for example, codeword 0) is used, and when five to eight layers are used, two codewords (for example, codeword 0 and codeword 1) are used. In addition, it is assumed that one codeword may be mapped up to four layers, and one layer is mapped to one antenna port.

In addition, in detailed examples below, an order of bit values represented in Table is not limited thereto, the order may be out of order, and content of a message may be identical. In other words, in the present disclosure, a mapping relation between the bit value and the message is not restricted. In addition, detailed content of the message may be referenced with FIGS. 13 to 17, and the Tables 33 to 48.

Embodiment 5-1

The present embodiment 5-1 corresponds to a case where up to N=2 layers being classified from each other is supported for each terminal in an MU-MIMO.

Hereinafter, examples of a codeword and a DMRS antenna port number according to a number of layers used for each terminal will be described.

In case of one layer, codeword 0 is enabled, and codeword 1 is disabled. The enabled codeword 0 may be mapped to any one of DMRS antenna ports #1, #2, #3, #4, #5, #6, #7, and #8. Herein, when the codeword 0 is mapped to any one of the DMRS antenna ports #2, #3, #4, #5, #6, #7, and #8, it may correspond to a case where a corresponding terminal is in an MU-MIMO.

In case of two layers, codeword 0 is enabled, and codeword 1 is disabled. The enabled codeword 0 may be mapped to any one of DMRS antenna ports #1 and #2, #3 and #4, #5 and #6, and #7 and #8. Herein, when the codeword 0 is mapped to any one of the DMRS antenna ports #3 and #4, #5 and #6, and #7 and #8, it may correspond a case where a corresponding terminal is in an MU-MIMO.

In case of three layers, codeword 0 is enabled, and codeword 1 is disabled. The enabled codeword 0 may be mapped to DMRS antenna ports #1 to #3 (DMRS antenna ports #1~#3).

In case of four layers, codeword 0 is enabled, and codeword 1 is disabled. The enabled codeword 0 may be mapped to DMRS antenna ports #1 to #4 (DMRS antenna ports #1~#4).

In case of five layers, codeword 0 and codeword 1 are both enabled. The enabled codeword 0 may be mapped to DMRS antenna ports #1 and #2, and the enabled codeword 1 may be mapped to DMRS antenna ports #3 to #5 (DMRS antenna ports #3~#5).

In case of six layers, codeword 0 and codeword 1 are both enabled. The enabled codeword 0 may be mapped to DMRS antenna ports #1 to #3 (DMRS antenna ports #1~#3), and the enabled codeword 1 may be mapped to DMRS antenna ports #4 to #6 (DMRS antenna ports #4~#6).

In case of seven layers, codeword 0 and codeword 1 are both enabled. The enabled codeword 0 may be mapped to DMRS antenna ports #1 to #3 (DMRS antenna ports #1~#3), and the enabled codeword 1 may be mapped to DMRS antenna ports #4 to #7 (DMRS antenna ports #4~#7).

In case of eight layers, codeword 0 and codeword 1 are both enabled. The enabled codeword 0 may be mapped to DMRS antenna ports #1 to #4 (DMRS antenna ports #1~#4), and the enabled codeword 1 may be mapped to DMRS antenna ports #5 to #8 (DMRS antenna ports #5~#8).

Table 49 below shows an example of indicating a number of symbols, a number of layers, and an antenna port number for one codeword when one codeword is enabled and the other codeword is disabled (in other words, codeword 0 is enabled, and codeword 1 is disabled). In other words, a specific bit value in the table corresponds to a specific message, and the specific message indicates a combination of a number of symbols, a number of layers, and an antenna port number.

TABLE 49

| Bit value | Message |
| --- | --- |
| 0 | 1 symbol, 1 layer, DMRS antenna ports #1 |
| 1 | 1 symbol, 1 layer, DMRS antenna ports #2 |
| 2 | 1 symbol, 1 layer, DMRS antenna ports #3 |
| 3 | 1 symbol, 1 layer, DMRS antenna ports #4 |
| 4 | 2 symbols, 1 layer, DMRS antenna ports #1 |
| 5 | 2 symbols, 1 layer, DMRS antenna ports #2 |
| 6 | 2 symbols, 1 layer, DMRS antenna ports #3 |
| 7 | 2 symbols, 1 layer, DMRS antenna ports #4 |
| 8 | 2 symbols, 1 layer, DMRS antenna ports #5 |
| 9 | 2 symbols, 1 layer, DMRS antenna ports #6 |
| 10 | 2 symbols, 1 layer, DMRS antenna ports #7 |
| 11 | 2 symbols, 1 layer, DMRS antenna ports #8 |
| 12 | 1 symbol, 2 layers, DMRS antenna ports #1~#2 |
| 13 | 1 symbol, 2 layers, DMRS antenna ports #3~#4 |
| 14 | 2 symbols, 2 layers, DMRS antenna ports #1~#2 |
| 15 | 2 symbols, 2 layers, DMRS antenna ports #3~#4 |
| 16 | 2 symbols, 2 layers, DMRS antenna ports #5~#6 |
| 17 | 2 symbols, 2 layers, DMRS antenna ports #7~#8 |
| 18 | 1 symbol, 3 layers, DMRS antenna ports #1~#3 |
| 19 | 2 symbols, 3 layers, DMRS antenna ports #1~#3 |
| 20 | 1 symbol, 4 layers, DMRS antenna ports #1~#4 |
| 21 | 2 symbols, 4 layers, DMRS antenna ports #1~#4 |
| 22 | Reserved |
| ... | ... |
| 31 | Reserved |

Table 50 below shows an example of indicating a number of symbols, a number of layers, and an antenna port number for two codewords when both of two codewords are enabled (for example, when codeword 0 and codeword 1 are both enabled). In other words, a specific bit value of the table corresponds to a specific message, and the specific message indicates a combination of a number of symbols, a number of layers, and antenna port number.

TABLE 50

| Bit value | Message |
| --- | --- |
| 0 | 2 symbols, 5 layers, DMRS antenna ports #1~#5 |
| 1 | 2 symbols, 6 layers, DMRS antenna ports #1~#6 |
| 2 | 2 symbols, 7 layers, DMRS antenna ports #1~#7 |
| 3 | 2 symbols, 8 layers, DMRS antenna ports #1~#8 |
| 4 | Reserved |
| ... | ... |
| 1 | Reserved |

When one codeword of the Table 18 is enabled, in order to indicate a number of symbols, a number of layers, and a DMRS antenna port number, a signaling field having a 5-bit size may be defined. The above signaling field is sufficient for indicating a number of symbols, a number of layers, and a DMRS antenna port number when two codewords of the Table 50 are enabled. In addition, in order to configure in one signaling field by combining the examples of the Table 18 and Table 19, a number of cases to be indicated does not exceed 32, thus a signaling field having a 5-bit size may be identically used.

Table 51 below shows where a case when one codeword of the Table 49 is enabled and a case when two codewords of the Table 50 are enabled are combined and represented in one table. The examples of the Table 18 and the Table 50 may be used for a case where information of whether one codeword is enabled or two codewords are used may be obtained in advance. Table 51 below may be used for all cases where information of a number of enabled codewords may be or may not be obtained (in other words, regardless of whether or not information of a number of enabled codewords is obtained).

TABLE 51

| Bit value | Message |
| --- | --- |
| 0 | 1 symbol, 1 layer, DMRS antenna ports #1, codeword 0 |
| 1 | 1 symbol, 1 layer, DMRS antenna ports #2, codeword 0 |
| 2 | 1 symbol, 1 layer, DMRS antenna ports #3, codeword 0 |
| 3 | 1 symbol, 1 layer, DMRS antenna ports #4, codeword 0 |
| 4 | 2 symbols, 1 layer, DMRS antenna ports #1, codeword 0 |
| 5 | 2 symbols, 1 layer, DMRS antenna ports #2, codeword 0 |
| 6 | 2 symbols, 1 layer, DMRS antenna ports #3, codeword 0 |
| 7 | 2 symbols, 1 layer, DMRS antenna ports #4, codeword 0 |
| 8 | 2 symbols, 1 layer, DMRS antenna ports #5, codeword 0 |
| 9 | 2 symbols, 1 layer, DMRS antenna ports #6, codeword 0 |
| 10 | 2 symbols, 1 layer, DMRS antenna ports #7, codeword 0 |
| 11 | 2 symbols, 1 layer, DMRS antenna ports #8, codeword 0 |
| 12 | 1 symbol, 2 layers, DMRS antenna ports #1~#2, codeword 0 |
| 13 | 1 symbol, 2 layers, DMRS antenna ports #3~#4, codeword 0 |
| 14 | 2 symbols, 2 layers, DMRS antenna ports #1~#2, codeword 0 |
| 15 | 2 symbols, 2 layers, DMRS antenna ports #3~#4, codeword 0 |
| 16 | 2 symbols, 2 layers, DMRS antenna ports #5~#6, codeword 0 |
| 17 | 2 symbols, 2 layers, DMRS antenna ports #7~#8, codeword 0 |
| 18 | 1 symbol, 3 layers, DMRS antenna ports #1~#3, codeword 0 |
| 19 | 2 symbols, 3 layers, DMRS antenna ports #1~#3, codeword 0 |
| 20 | 1 symbol, 4 layers, DMRS antenna ports #1~#4, codeword 0 |
| 21 | 2 symbols, 4 layers, DMRS antenna ports #1~#4, codeword 0 |
| 22 | 2 symbols, 5 layers, DMRS antenna ports #1~#5, codeword 0 & codeword 1 |
| 23 | 2 symbols, 6 layers, DMRS antenna ports #1~#6, codeword 0 & codeword 1 |
| 24 | 2 symbols, 7 layers, DMRS antenna ports #1~#7, codeword 0 & codeword 1 |

TABLE 51-continued

| Bit value | Message |
|---|---|
| 25 | 2 symbols, 8 layers, DMRS antenna ports #1~#8, codeword 0 & codeword 1 |
| 26 | Reserved |
| ... | ... |
| 31 | Reserved |

Embodiment 5-2

The present embodiment 5-2 relates to a case where, in an MU-MIMO, up to N=3 layers being classified from each other are supported for each terminal.

Hereinafter, examples of a codeword and a DMRS antenna port number according to a number of layers used of a terminal will be described.

In case of one layer, codeword 0 is enabled, and codeword 1 is disabled. The enabled codeword 0 may be mapped to any one of DMRS antenna ports #1, #2, #3, #4, #5, #6, #7, and #8. Herein, when the codeword 0 is mapped to any one of the DMRS antenna ports #2, #3, #4, #5, #6, #7, and #8, it may correspond to a case where a corresponding terminal is in an MU-MIMO.

In case of two layers, codeword 0 is enabled, and codeword 1 is disabled. The enabled codeword 0 may be mapped to any one of DMRS antenna ports #1 and #2, #3 and #4, #5 and #6, and #7 and #8. Herein, when the codeword 0 is mapped to any one of the DMRS antenna ports #3 and #4, #5 and #6, and #7 and #8, it may correspond to a case where a corresponding terminal is in an MU-MIMO.

In case of three layers, codeword 0 is enabled, and codeword 1 is disabled. The enabled codeword 0 may be mapped to any one of DMRS antenna ports #1 to #3, and #5 to #7 (DMRS antenna ports #1~#3, and #5~#7). Herein, when the codeword 0 is mapped to the DMRS antenna ports #5 to #7, it may correspond to a case where a corresponding terminal is in an MU-MIMO.

Alternatively, in case of three layers, codeword 0 is enabled, and codeword 1 is disabled. The enabled codeword 0 may be mapped to any one of DMRS antenna ports #1 to #3, and #4 to #6 (DMRS antenna ports #1~#3, and #4~#6). Herein, when the codeword 0 is mapped to the DMRS antenna ports #4 to #6, it may correspond to a case where a corresponding terminal is in an MU-MIMO.

In case of four layers, codeword 0 is enabled, and codeword 1 is disabled. The enabled codeword 0 may be mapped to antenna ports #1 to #4 (DMRS antenna ports #1~#4).

In case of five layers, codeword 0 and codeword 1 are both enabled. The enabled codeword 0 may be mapped to DMRS antenna ports #1 and #2, and the enabled codeword 1 may be mapped to DMRS antenna ports #3 to #5 (DMRS antenna ports #3~#5).

In case of six layers, codeword 0 and codeword 1 are both enabled. The enabled codeword 0 may be mapped to DMRS antenna ports #1 to #3 (DMRS antenna ports #1~#3), and the enabled codeword 1 may be mapped to DMRS antenna ports #4 to #6 (DMRS antenna ports #4~#6).

In case of seven layers, codeword 0 and codeword 1 are both enabled. The enabled codeword 0 may be mapped to DMRS antenna ports #1 to #3 (DMRS antenna ports #1~#3), and the enabled codeword 1 may be mapped to DMRS antenna ports #4 to #7 (DMRS antenna ports #4~#7).

In case of eight layers, codeword 0 and codeword 1 are both enabled. The enabled codeword 0 may be mapped to DMRS antenna ports #1 to #4 (DMRS antenna ports #1~#4), and the enabled codeword 1 may be mapped to DMRS antenna ports #5 to #8 (DMRS antenna ports #5~#8).

Table 21 below shows an example of indicating an antenna port number, a number of layers, and a number of symbols for one codeword when one codeword is enabled and the other codeword is disabled (in other words, when codeword 0 is enabled, and codeword 1 is disabled). In other words, in the table, a specific bit value corresponds to a specific message, and the specific message indicates a combination of a number of symbols, a number of layers, and an antenna port number.

In addition, in the example of Table 52, in case of two symbols and three layers (in other words, 2 symbol, and 3 layers), an antenna port number may be fixedly used when the antenna port number corresponds to one of DMRS antenna ports #5~#7, and DMRS antenna ports #4~#6.

TABLE 52

| Bit value | Message |
|---|---|
| 0 | 1 symbol, 1 layer, DMRS antenna ports #1 |
| 1 | 1 symbol, 1 layer, DMRS antenna ports #2 |
| 2 | 1 symbol, 1 layer, DMRS antenna ports #3 |
| 3 | 1 symbol, 1 layer, DMRS antenna ports #4 |
| 4 | 2 symbols, 1 layer, DMRS antenna ports #1 |
| 5 | 2 symbols, 1 layer, DMRS antenna ports #2 |
| 6 | 2 symbols, 1 layer, DMRS antenna ports #3 |
| 7 | 2 symbols, 1 layer, DMRS antenna ports #4 |
| 8 | 2 symbols, 1 layer, DMRS antenna ports #5 |
| 9 | 2 symbols, 1 layer, DMRS antenna ports #6 |
| 10 | 2 symbols, 1 layer, DMRS antenna ports #7 |
| 11 | 2 symbols, 1 layer, DMRS antenna ports #8 |
| 12 | 1 symbol, 2 layers, DMRS antenna ports #1~#2 |
| 13 | 1 symbol, 2 layers, DMRS antenna ports #3~#4 |
| 14 | 2 symbols, 2 layers, DMRS antenna ports #1~#2 |
| 15 | 2 symbols, 2 layers, DMRS antenna ports #3~#4 |
| 16 | 2 symbols, 2 layers, DMRS antenna ports #5~#6 |
| 17 | 2 symbols, 2 layers, DMRS antenna ports #7~#8 |
| 18 | 1 symbol, 3 layers, DMRS antenna ports #1~#3 |
| 19 | 2 symbols, 3 layers, DMRS antenna ports #1~#3 |
| 20 | 2 symbols, 3 layers, DMRS antenna ports #5~#7 (or #4~#6) |
| 21 | 1 symbol, 4 layers, DMRS antenna ports #1~#4 |
| 22 | 2 symbols, 4 layers, DMRS antenna ports #1~#4 |
| 23 | Reserved |
| ... | ... |
| 31 | Reserved |

Table 53 below shows an example of indicating a number of symbols, an antenna port number, and a number of layers for two codewords when two codewords are both enabled (for example, when codeword 0 and codeword 1 are both enabled). In other words, in the table, a specific bit value corresponds to a specific message, and the specific message indicates a combination of a number of symbols, a number of layers, and an antenna port number.

TABLE 53

| Bit value | Message |
|---|---|
| 0 | 2 symbols, 5 layers, DMRS antenna ports #1~#5 |
| 1 | 2 symbols, 6 layers, DMRS antenna ports #1~#6 |
| 2 | 2 symbols, 7 layers, DMRS antenna ports #1~#7 |
| 3 | 2 symbols, 8 layers, DMRS antenna ports #1~#8 |
| 4 | Reserved |
| ... | ... |
| 31 | Reserved |

In order to indicate a number of symbols, a number of layers, and a DMRS antenna port number when one codeword of the Table 21 is enabled, a signaling field having a 5-bit size may be defined. The above signaling field is sufficiently large to indicate a number of symbols, a number of layers, and a DMRS antenna port number when two codewords of Table 22 are enabled. In addition, a number of cases to be indicated for configuring one signaling field by combining the examples of the Table 52 and the Table 53 does not exceed 32 cases, thus a signaling field having a 5-bit size may be identically used.

Table 54 below shows where a case when one codeword of the Table 21 is enabled and a case when two codewords of the Table 53 are enabled are combined and represented in one table. The examples of the Table 52 and the Table 53 may be used for a case where information of whether one codeword is enabled or two codewords are enabled may be obtained in advance. Table 54 below may be used for all cases where information of a number of enabled codewords may be and may not be obtained (in other words, regardless of whether or not information of a number of enabled codewords may be obtained).

In addition, in the example of Table 54, in case of two symbols and three layers (in other words, 2 symbol, and 3 layers), an antenna port number may be fixedly used when the antenna port number corresponds to one of DMRS antenna ports #5~#7, and DMRS antenna ports #4~#6.

TABLE 54

| Bit value | Message |
|---|---|
| 0 | 1 symbol, 1 layer, DMRS antenna ports #1, codeword 0 |
| 1 | 1 symbol, 1 layer, DMRS antenna ports #2, codeword 0 |
| 2 | 1 symbol, 1 layer, DMRS antenna ports #3, codeword 0 |
| 3 | 1 symbol, 1 layer, DMRS antenna ports #4, codeword 0 |
| 4 | 2 symbols, 1 layer, DMRS antenna ports #1, codeword 0 |
| 5 | 2 symbols, 1 layer, DMRS antenna ports #2, codeword 0 |
| 6 | 2 symbols, 1 layer, DMRS antenna ports #3, codeword 0 |
| 7 | 2 symbols, 1 layer, DMRS antenna ports #4, codeword 0 |
| 8 | 2 symbols, 1 layer, DMRS antenna ports #5, codeword 0 |
| 9 | 2 symbols, 1 layer, DMRS antenna ports #6, codeword 0 |
| 10 | 2 symbols, 1 layer, DMRS antenna ports #7, codeword 0 |
| 11 | 2 symbols, 1 layer, DMRS antenna ports #8, codeword 0 |
| 12 | 1 symbol, 2 layers, DMRS antenna ports #1~#2, codeword 0 |
| 13 | 1 symbol, 2 layers, DMRS antenna ports #3~#4, codeword 0 |
| 14 | 2 symbols, 2 layers, DMRS antenna ports #1~#2, codeword 0 |
| 15 | 2 symbols, 2 layers, DMRS antenna ports #3~#4, codeword 0 |
| 16 | 2 symbols, 2 layers, DMRS antenna ports #5~#6, codeword 0 |
| 17 | 2 symbols, 2 layers, DMRS antenna ports #7~#8, codeword 0 |
| 18 | 1 symbol, 3 layers, DMRS antenna ports #1~#3, codeword 0 |
| 19 | 2 symbols, 3 layers, DMRS antenna ports #1~#3, codeword 0 |
| 20 | 2 symbols, 3 layers, DMRS antenna ports #5~#7 (or #4~#6), codeword 0 |
| 21 | 1 symbol, 4 layers, DMRS antenna ports #1~#4, codeword 0 |
| 22 | 2 symbols, 4 layers, DMRS antenna ports #1~#4, codeword 0 |
| 23 | 2 symbols, 5 layers, DMRS antenna ports #1~#5, codeword 0 & codeword 1 |
| 24 | 2 symbols, 6 layers, DMRS antenna ports #1~#6, codeword 0 & codeword 1 |
| 25 | 2 symbols, 7 layers, DMRS antenna ports #1~#7, codeword 0 & codeword 1 |
| 26 | 2 symbols, 8 layers, DMRS antenna ports #1~#8, codeword 0 & codeword 1 |
| 27 | Reserved |
| ... | ... |
| 31 | Reserved |

Embodiment 5-3

The present embodiment 5-3 relates to a case where, in an MU-MIMO, up to N=4 layers being classified from each other are supported for each terminal.

Hereinafter, examples of a codeword and a DMRS antenna port number according to a number of layers used for each terminal will be described.

In case of one layer, codeword 0 is enabled, and codeword 1 is disabled. The enabled codeword 0 may be mapped to any one DMRS antenna ports #1, #2, #3, #4, #5, #6, #7, and #8. Herein, when the codeword 0 is mapped to any one of the DMRS antenna ports #2, #3, #4, #5, #6, #7, and #8, it may corresponds to a case where a corresponding terminal is in an MU-MIMO.

In case of two layers, codeword 0 is enabled, and codeword 1 is disabled. The enabled codeword 0 may be mapped to any one of DMRS antenna ports #1 and #2, #3 and #4, #5 and #6, and #7 and #8. Herein, when the codeword 0 is mapped to any one of the DMRS antenna ports #3 and #4, #5 and #6, and #7 and #8, it may corresponds to a case where a corresponding terminal is in an MU-MIMO.

In case of three layers, codeword 0 is enabled, and codeword 1 is disabled. The enabled codeword 0 may be mapped to any one of DMRS antenna ports #1 to #3, and #5 to #7 (DMRS antenna ports #1~#3, or #5~#7). Herein, when the codeword 0 is mapped to the DMRS antenna port #5 to #7, it may correspond to a case where a corresponding terminal is in an MU-MIMO.

Alternatively, in case of three layers, codeword 0 is enabled, and codeword 1 is disabled. The enabled codeword 0 may be mapped to any one of DMRS antenna ports #1 to #3, and #4 to #6 (DMRS antenna ports #1~#3, or #4~#6). Herein, when the codeword 0 is mapped to the DMRS antenna ports #4 to #6, it may correspond to a case where a corresponding terminal is in an MU-MIMO.

In case of four layers, codeword 0 is enabled, and codeword 1 is disabled. The enabled codeword 0 may be mapped to any one of DMRS antenna ports #1 to #4, and #5 to #8 (DMRS antenna ports #1~#4, or #5~#8). Herein, when the codeword 0 is mapped to the DMRS antenna ports #5 to #8, it may correspond to a case where a corresponding terminal is in an MU-MIMO.

In case of five layers, codeword 0 and codeword 1 are both enabled. The enabled codeword 0 may be mapped to DMRS antenna ports #1 and #2, and the enabled codeword 1 may be mapped to DMRS antenna ports #3 to #5 (DMRS antenna ports #3~#5).

In case of six layers, codeword 0 and codeword 1 are both enabled. The enabled codeword 0 may be mapped to DMRS antenna ports #1 to #3 (DMRS antenna ports #1~#3), and the enabled codeword 1 may be mapped to DMRS antenna ports #4 to #6 (DMRS antenna ports #4~#6).

In case of seven layers, codeword 0 and codeword 1 are both enabled. The enabled codeword 0 may be mapped to DMRS antenna ports #1 to #3 (DMRS antenna ports #1~#3), and the enabled codeword 1 may be mapped to DMRS antenna ports #4 to #7 (DMRS antenna ports #4~#7).

In case of eight layers, codeword 0 and codeword 1 are both enabled. The enabled codeword 0 may be mapped to DMRS antenna ports #1 to #4 (DMRS antenna ports #1~#4), and the enabled codeword 1 may be mapped to DMRS antenna ports #5 to #8 (DMRS antenna ports #5~#8).

Table 55 below shows an example of indicating a number of symbols, a number of layers, and an antenna port number for one codeword when one codeword is enabled and the other codeword is disabled (in other words, when codeword 0 is enabled and codeword 1 is disabled). In other words, in the table, a specific bit value corresponds to a specific message, and the specific message indicates a combination of a number of symbols, a number of layers, and an antenna port number.

In addition, in the example of Table 55, in case of two symbols and three layers (in other words, 2 symbols, and 3 layers), an antenna port number may be fixedly used when the antenna port number corresponds to one of DMRS antenna ports #5~#7, and DMRS antenna ports #4~#6.

TABLE 55

| Bit value | Message |
|---|---|
| 0 | 1 symbol, 1 layer, DMRS antenna ports #1 |
| 1 | 1 symbol, 1 layer, DMRS antenna ports #2 |
| 2 | 1 symbol, 1 layer, DMRS antenna ports #3 |
| 3 | 1 symbol, 1 layer, DMRS antenna ports #4 |
| 4 | 2 symbols, 1 layer, DMRS antenna ports #1 |
| 5 | 2 symbols, 1 layer, DMRS antenna ports #2 |
| 6 | 2 symbols, 1 layer, DMRS antenna ports #3 |
| 7 | 2 symbols, 1 layer, DMRS antenna ports #4 |
| 8 | 2 symbols, 1 layer, DMRS antenna ports #5 |
| 9 | 2 symbols, 1 layer, DMRS antenna ports #6 |
| 10 | 2 symbols, 1 layer, DMRS antenna ports #7 |
| 11 | 2 symbols, 1 layer, DMRS antenna ports #8 |
| 12 | 1 symbol, 2 layers, DMRS antenna ports #1~#2 |
| 13 | 1 symbol, 2 layers, DMRS antenna ports #3~#4 |
| 14 | 2 symbols, 2 layers, DMRS antenna ports #1~#2 |
| 15 | 2 symbols, 2 layers, DMRS antenna ports #3~#4 |
| 16 | 2 symbols, 2 layers, DMRS antenna ports #5~#6 |
| 17 | 2 symbols, 2 layers, DMRS antenna ports #7~#8 |
| 18 | 1 symbol, 3 layers, DMRS antenna ports #1~#3 |
| 19 | 2 symbols, 3 layers, DMRS antenna ports #1~#3 |
| 20 | 2 symbols, 3 layers, DMRS antenna ports #5~#7 (or #4~#6) |
| 21 | 1 symbol, 4 layers, DMRS antenna ports #1~#4 |
| 22 | 2 symbols, 4 layers, DMRS antenna ports #1~#4 |
| 23 | 2 symbols, 4 layers, DMRS antenna ports #5~#8 |
| 24 | Reserved |
| ... | ... |
| 31 | Reserved |

Table 56 below shows an example of indicating a number of symbols, a number of layers, and an antenna port number for two codewords when two codewords are both enabled (for example, when codeword 0 and codeword 1 are both enabled). In other words, in the table, a specific bit value corresponds to a specific message, and the specific message indicates a combination of a number of symbols, a number of layers, and an antenna port number.

TABLE 56

| Bit value | Message |
|---|---|
| 0 | 2 symbols, 5 layers, DMRS antenna ports #1~#5 |
| 1 | 2 symbols, 6 layers, DMRS antenna ports #1~#6 |
| 2 | 2 symbols, 7 layers, DMRS antenna ports #1~#7 |
| 3 | 2 symbols, 8 layers, DMRS antenna ports #1~#8 |
| 4 | Reserved |
| ... | ... |
| 31 | Reserved |

In order to indicate a number of symbols, a number of layers, and a DMRS antenna port number when one codeword of the Table 24 is enabled, a signaling field having a 5-bit size may be defined. The above signaling field is sufficiently large to indicate a number of symbols, a number of layers, and a DMRS antenna port number when two codewords of the Table 25 are enabled. In addition, a number of cases to be indicated for configuring one signaling field by combining the examples of the Table 55 and the Table 56 does not exceeds 32 cases, thus a signaling field having a 5-bit size may be identically used.

Table 57 below shows where a case when one codeword of the Table 55 is enabled and a case when two codewords of the Table 56 are enabled are combined and represented in one table. The examples of the Table 55 and the Table 56 may be used for a case where information of whether one codeword is enabled or two codeword are enabled may be obtained in advance. Table 57 below may be used for all cases where information of a number of enabled codewords may be and may not be obtained (in other words, regardless of whether or not information of a number of enabled codeword may be obtained).

In addition, in the example of Table 57, in case of two symbols and three layers (in other words, 2 symbol, and 3 layers), an antenna port number may be fixedly used when the antenna port number corresponds to one of DMRS antenna ports #5~#7, and DMRS antenna ports #4~#6.

TABLE 57

| Bit value | Message |
|---|---|
| 0 | 1 symbol, 1 layer, DMRS antenna ports #1, codeword 0 |
| 1 | 1 symbol, 1 layer, DMRS antenna ports #2, codeword 0 |
| 2 | 1 symbol, 1 layer, DMRS antenna ports #3, codeword 0 |
| 3 | 1 symbol, 1 layer, DMRS antenna ports #4, codeword 0 |
| 4 | 2 symbols, 1 layer, DMRS antenna ports #1, codeword 0 |
| 5 | 2 symbols, 1 layer, DMRS antenna ports #2, codeword 0 |
| 6 | 2 symbols, 1 layer, DMRS antenna ports #3, codeword 0 |
| 7 | 2 symbols, 1 layer, DMRS antenna ports #4, codeword 0 |
| 8 | 2 symbols, 1 layer, DMRS antenna ports #5, codeword 0 |
| 9 | 2 symbols, 1 layer, DMRS antenna ports #6, codeword 0 |
| 10 | 2 symbols, 1 layer, DMRS antenna ports #7, codeword 0 |
| 11 | 2 symbols, 1 layer, DMRS antenna ports #8, codeword 0 |
| 12 | 1 symbol, 2 layers, DMRS antenna ports #1~#2, codeword 0 |
| 13 | 1 symbol, 2 layers, DMRS antenna ports #3~#4, codeword 0 |
| 14 | 2 symbols, 2 layers, DMRS antenna ports #1~#2, codeword 0 |
| 15 | 2 symbols, 2 layers, DMRS antenna ports #3~#4, codeword 0 |
| 16 | 2 symbols, 2 layers, DMRS antenna ports #5~#6, codeword 0 |
| 17 | 2 symbols, 2 layers, DMRS antenna ports #7~#8, codeword 0 |
| 18 | 1 symbol, 3 layers, DMRS antenna ports #1~#3, codeword 0 |
| 19 | 2 symbols, 3 layers, DMRS antenna ports #1~#3, codeword 0 |
| 20 | 2 symbols, 3 layers, DMRS antenna ports #5~#7 (or #4~#6), codeword 0 |
| 21 | 1 symbol, 4 layers, DMRS antenna ports #1~#4, codeword 0 |
| 22 | 2 symbols, 4 layers, DMRS antenna ports #1~#4, codeword 0 |
| 23 | 2 symbols, 4 layers, DMRS antenna ports #5~#8, codeword 0 |
| 24 | 2 symbols, 5 layers, DMRS antenna ports #1~#5, codeword 0 & codeword 1 |
| 25 | 2 symbols, 6 layers, DMRS antenna ports #1~#6, codeword 0 & codeword 1 |
| 26 | 2 symbols, 7 layers, DMRS antenna ports #1~#7, codeword 0 & codeword 1 |
| 27 | 2 symbols, 8 layers, DMRS antenna ports #1~#8, codeword 0 & codeword 1 |
| 28 | Reserved |
| ... | ... |
| 31 | Reserved |

Embodiment 6

The present embodiment 6 relates to a method of configuring and indicating information of a number of layers, an antenna port number and a number of symbols of a DMRS in case of a DMRS configuration type 2 (in other words, in case of a DMRS configuration type of a CDM group method).

Hereinafter, in detailed examples, examples of a combination of a number of layers, an antenna port number, and a number of symbols of a DMRS may be represented in one table form, and a value indicating a specific combination among combinations configured as the above table form may be transmitted from the base station to the terminal by using DCI. In other words, in a DCI format, as an example below, a signaling field indicating a number of layers, an antenna port number, and a number of symbols of a DMRS may be defined. When a correspond signaling field has a specific value, a number of layers, an antenna port number, and a number of symbols of a DMRS which is mapped to the specific value may be indicated.

In addition, in detailed examples below, it is assumed that up to two codewords are used in an NR system. In detail, it is assumed that, for each terminal, one codeword (for example, codeword 0) is used when one to four layers are used, and two codewords (for example, codeword 0 and codeword 1) are used when five to eight layers are used. In addition, it is assumed that one codeword may be mapped to up to four layers, and one layer is mapped to one antenna port.

In addition, in detailed examples below, an order of bit values represented in the table is not limited thereto, the order may be out of order, and a message may be identical. In other words, in the present disclosure, a mapping relation between a bit value and a message is not restricted. In addition, a detailed content of a message may be referenced with FIGS. 13 to 17, and Tables 33 to 48.

Embodiment 6-1

The present embodiment 6-1 relates to a case where, in an MU-MIMO, up to N=2 layers being classified from each other are supported for each terminal.

Hereinafter, a codeword and a DMRS antenna port number according to a number of layers used for each terminal will be described.

In case of one layer, codeword 0 is enabled, and codeword 1 is disabled. The enabled codeword 0 may be mapped to any one of DMRS antenna ports #1, #2, #3, #4, #5, #6, #7, and #8. Herein, when the codeword 0 is mapped to the DMRS antenna ports #2, #3, #4, #5, #6, #7, and #8, it may correspond to a case where a corresponding terminal is in an MU-MIMO.

In case of two layers, codeword 0 is enabled, and codeword 1 is disabled. The enabled codeword 0 may be mapped to any one of DMRS antenna ports #1 and #2, #3 and #4, #5 and #6, and #7 and #8. Herein, when the codeword 0 is mapped to any one of the DMRS antenna ports #3 and #4, #5 and #6, and #7 and #8, it may correspond to a case where a corresponding terminal is in an MU-MIMO.

In case of three layers, codeword 0 is enabled, and codeword 1 is disabled. The enabled codeword 0 may be mapped to DMRS antenna ports #1 to #3 (DMRS antenna ports #1~#3).

In case of four layers, codeword 0 is enabled, and codeword 1 is disabled. The enabled codeword 0 may be mapped to DMRS antenna ports #1 to #4 (DMRS antenna ports #1~#4).

In case of five layers, codeword 0 and codeword 1 are all enabled. The enabled codeword 0 may be mapped to DMRS antenna ports #1 and #2, and the enabled codeword 1 may be mapped to DMRS antenna ports #3 to #5 (DMRS antenna ports #3~#5).

In case of six layers, codeword 0 and codeword 1 are both enabled. The enabled codeword 0 may be mapped to DMRS antenna ports #1 to #3 (DMRS antenna ports #1~#3), and the enabled codeword 1 may be mapped to DMRS antenna ports #4 to #6 (DMRS antenna ports #4~#6).

In case of seven layers, codeword 0 and codeword 1 are both enabled. The enabled codeword 0 may be mapped to DMRS antenna ports #1 to #3 (DMRS antenna ports #1~#3), and the enabled codeword 1 may be mapped to DMRS antenna ports #4 to #7 (DMRS antenna ports #4~#7).

In case of eight layers, codeword 0 and codeword 1 are both enabled. The enabled codeword 0 may be mapped to DMRS antenna ports #1 to #4 (DMRS antenna ports #1~#4),
and the enabled codeword 1 may be mapped to DMRS antenna ports #5 to #8 (DMRS antenna ports #5~#8).

Table 58 below shows an example of indicating a number of symbols, a number of layers, and a antenna port number for one codeword when one codeword is enabled and the other codeword is disabled (in other words, when codeword 0 is enabled, and codeword 1 is disabled). In other words, in the table, a specific bit value corresponds to a specific message, and the specific message indicates a combination of a number of symbols, a number of layers, and an antenna port number.

TABLE 58

| Bit value | Message |
| --- | --- |
| 0 | 1 symbol, 1 layer, DMRS antenna ports #1 |
| 1 | 1 symbol, 1 layer, DMRS antenna ports #2 |
| 2 | 1 symbol, 1 layer, DMRS antenna ports #3 |
| 3 | 1 symbol, 1 layer, DMRS antenna ports #4 |
| 4 | 1 symbol, 1 layer, DMRS antenna ports #5 |
| 5 | 1 symbol, 1 layer, DMRS antenna ports #6 |
| 6 | 2 symbols, 1 layer, DMRS antenna ports #1 |
| 7 | 2 symbols, 1 layer, DMRS antenna ports #2 |
| 8 | 2 symbols, 1 layer, DMRS antenna ports #3 |
| 9 | 2 symbols, 1 layer, DMRS antenna ports #4 |
| 10 | 2 symbols, 1 layer, DMRS antenna ports #5 |
| 11 | 2 symbols, 1 layer, DMRS antenna ports #6 |
| 12 | 2 symbols, 1 layer, DMRS antenna ports #7 |
| 13 | 2 symbols, 1 layer, DMRS antenna ports #8 |
| 14 | 2 symbols, 1 layer, DMRS antenna ports #9 |
| 15 | 2 symbols, 1 layer, DMRS antenna ports #10 |
| 16 | 2 symbols, 1 layer, DMRS antenna ports #11 |
| 17 | 2 symbols, 1 layer, DMRS antenna ports #12 |
| 18 | 1 symbol, 2 layers, DMRS antenna ports #1~#2 |
| 19 | 1 symbol, 2 layers, DMRS antenna ports #3~#4 |
| 20 | 1 symbol, 2 layers, DMRS antenna ports #5~#6 |
| 21 | 2 symbols, 2 layers, DMRS antenna ports #1~#2 |
| 22 | 2 symbols, 2 layers, DMRS antenna ports #3~#4 |
| 23 | 2 symbols, 2 layers, DMRS antenna ports #5~#6 |
| 24 | 2 symbols, 2 layers, DMRS antenna ports #7~#8 |
| 25 | 2 symbols, 2 layers, DMRS antenna ports #9~#10 |
| 26 | 2 symbols, 2 layers, DMRS antenna ports #11~#12 |
| 27 | 1 symbol, 3 layers, DMRS antenna ports #1~#3 |
| 28 | 2 symbols, 3 layers, DMRS antenna ports #1~#3 |
| 29 | 1 symbol, 4 layers, DMRS antenna ports #1~#4 |
| 30 | 2 symbols, 4 layers, DMRS antenna ports #1~#4 |
| 31 | Reserved |

Table 59 below shows an example of indicating a number of symbols, a number of layers, and an antenna port number for two codewords when two codewords are enabled (for example, when codeword 0 and codeword 1 both all enabled). In other words, in the table, a specific bit value corresponds to a specific message, and the specific message indicates a combination of a number of symbols, a number of layers, and an antenna port number.

TABLE 59

| Bit value | Message |
| --- | --- |
| 0 | 1 symbols, 5 layers, DMRS antenna ports #1~#5 |
| 1 | 2 symbols, 5 layers, DMRS antenna ports #1~#5 |
| 2 | 1 symbols, 6 layers, DMRS antenna ports #1~#6 |
| 3 | 2 symbols, 6 layers, DMRS antenna ports #1~#6 |
| 4 | 2 symbols, 7 layers, DMRS antenna ports #1~#7 |
| 5 | 2 symbols, 8 layers, DMRS antenna ports #1~#8 |
| 6 | Reserved |
| . . . | . . . |
| 31 | Reserved |

In order to indicate a number of symbols, a number of layers, and a DMRS antenna port number when one codeword of the Table 58 is enabled, a signaling field having a 5-bit size may be defined. The above signaling field is sufficiently large to indicate a number of symbols, a number of layers, and a DMRS antenna port number when two codewords of the Table 59 are enabled. Meanwhile, a case to be indicated for configuring one signaling field by combining the examples of the Tables 58 and 59 exceeds 32 cases, thus a signaling field having a 5-bit size may not be identically used. Accordingly, in the above cases, the signaling field may not be configured by simply combining massages of Tables 58 and 59, and a signaling field having a 5-bit size may be used by configuring the entire cases being equal to or less than 32 cases by excluding a part of the message of Tables 58 and 59. Alternatively, in order to include all messages of Tables 58 and 59 (in other words, in order to includes 37 messages), a signaling field having a 6-bit size may be newly defined.

Embodiment 6-2

The present embodiment 6-2 relates to a case where, in an MU-MIMO, up to N=3 layers being classified from each other are supported for each terminal.

Hereinafter, examples of a codeword and a DMRS antenna port number according to a number of layers used for each terminal will be described.

In case of one layer, codeword 0 is enabled, and codeword 1 is disabled. The enabled codeword 0 may be mapped to any one of DMRS antenna ports #1, #2, #3, #4, #5, #6, #7, and #8. Herein, when the codeword 0 is mapped to nay one of the DMRS antenna ports #2, #3, #4, #5, #6, #7, and #8, it may correspond to a case where a corresponding terminal is in an MU-MIMO.

In case of two layers, codeword 0 is enabled, and codeword 1 is disabled. The enabled codeword 0 may be mapped to any one of DMRS antenna ports #1 and #2, #3 and #4, #5 and #6, and #7 and #8. Herein, when the codeword 0 is mapped to any one of the DMRS antenna ports #3 and #4, #5 and #6, and #7 and #8, it may correspond to a case where a corresponding terminal is in an MU-MIMO.

In case of three layers, codeword 0 is enabled, and codeword 1 is disabled. The enabled codeword 0 may be mapped to any one of DMRS antenna ports #1 to #3, #4 to #6, #7 to #9, and #10 to #12 (DMRS antenna ports #1~#3, #4~#6, #7~#9, or #10~#12). Herein, when the codeword 0 is mapped to any one of the DMRS antenna ports #4 to #6, #7 to #9, and #10 to #12 (DMRS antenna ports #4~#6, #7~#9, or #10~#12), it may correspond to a case where a corresponding terminal is in an MU-MIMO.

In case of four layers, codeword 0 is enabled, and codeword 1 is disabled. The enabled codeword 0 may be mapped to DMRS antenna ports #1 to #4 (DMRS antenna ports #1~#4).

In case of five layers, codeword 0 and codeword 1 are both enabled. The enabled codeword 0 may be mapped to DMRS antenna ports #1 and #2, and the enabled codeword 1 may be mapped to DMRS antenna ports #3 to #5 (DMRS antenna ports #3~#5).

In case of six layers, codeword 0 and codeword 1 are both enabled. The enabled codeword 0 may be mapped to DMRS antenna ports #1 to #3 (DMRS antenna ports #1~#3), and the enabled codeword 1 may be mapped to DMRS antenna ports #4 to #6 (DMRS antenna ports #4~#6).

In case of seven layers, codeword 0 and codeword 1 are both enabled. The enabled codeword 0 may be mapped to DMRS antenna ports #1 to #3 (DMRS antenna ports #1~#3), and the enabled codeword 1 may be mapped to DMRS antenna ports #4 to #7 (DMRS antenna ports #4~#7).

In case of eight layers, codeword 0 and codeword 1 are both enabled. The enabled codeword 0 may be mapped to DMRS antenna ports #1 to #4 (DMRS antenna ports #1~#4), and the enabled codeword 1 may be mapped to DMRS antenna ports #5 to #8 (DMRS antenna ports #5~#8).

Table 60 below shows an example of indicating a number of symbols, a number of layers, and an antenna port number for one codeword when one codeword is enabled and the other codeword is disabled (in other words, when codeword 0 is enabled, and codeword 1 is disabled). In other words, in the table, a specific bit value corresponds to a specific message, and the specific message indicates a combination of a number of symbols, a number of layers, and an antenna port number.

TABLE 60

| Bit value | Message |
| --- | --- |
| 0 | 1 symbol, 1 layer, DMRS antenna ports #1 |
| 1 | 1 symbol, 1 layer, DMRS antenna ports #2 |
| 2 | 1 symbol, 1 layer, DMRS antenna ports #3 |
| 3 | 1 symbol, 1 layer, DMRS antenna ports #4 |
| 4 | 1 symbol, 1 layer, DMRS antenna ports #5 |
| 5 | 1 symbol, 1 layer, DMRS antenna ports #6 |
| 6 | 2 symbols, 1 layer, DMRS antenna ports #1 |
| 7 | 2 symbols, 1 layer, DMRS antenna ports #2 |
| 8 | 2 symbols, 1 layer, DMRS antenna ports #3 |
| 9 | 2 symbols, 1 layer, DMRS antenna ports #4 |
| 10 | 2 symbols, 1 layer, DMRS antenna ports #5 |
| 11 | 2 symbols, 1 layer, DMRS antenna ports #6 |
| 12 | 2 symbols, 1 layer, DMRS antenna ports #7 |
| 13 | 2 symbols, 1 layer, DMRS antenna ports #8 |
| 14 | 2 symbols, 1 layer, DMRS antenna ports #9 |
| 15 | 2 symbols, 1 layer, DMRS antenna ports #10 |
| 16 | 2 symbols, 1 layer, DMRS antenna ports #11 |
| 17 | 2 symbols, 1 layer, DMRS antenna ports #12 |
| 18 | 1 symbol, 2 layers, DMRS antenna ports #1~#2 |
| 19 | 1 symbol, 2 layers, DMRS antenna ports #3~#4 |
| 20 | 1 symbol, 2 layers, DMRS antenna ports #5~#6 |
| 21 | 2 symbols, 2 layers, DMRS antenna ports #1~#2 |
| 22 | 2 symbols, 2 layers, DMRS antenna ports #3~#4 |
| 23 | 2 symbols, 2 layers, DMRS antenna ports #5~#6 |
| 24 | 2 symbols, 2 layers, DMRS antenna ports #7~#8 |
| 25 | 2 symbols, 2 layers, DMRS antenna ports #9~#10 |
| 26 | 2 symbols, 2 layers, DMRS antenna ports #11~#12 |
| 27 | 1 symbol, 3 layers, DMRS antenna ports #1~#3 |
| 28 | 1 symbol, 3 layers, DMRS antenna ports #4~#6 |
| 29 | 2 symbols, 3 layers, DMRS antenna ports #1~#3 |
| 30 | 2 symbols, 3 layers, DMRS antenna ports #4~#6 |
| 31 | 2 symbols, 3 layers, DMRS antenna ports #7~#9 |
| 32 | 2 symbols, 3 layers, DMRS antenna ports #10~#12 |
| 33 | 1 symbol, 4 layers, DMRS antenna ports #1~#4 |
| 34 | 2 symbols, 4 layers, DMRS antenna ports #1~#4 |
| 35 | Reserved |
| ... | ... |
| 63 | Reserved |

Table 61 below shows an example of indicating a number of symbols, a number of layers, and an antenna port number for two codewords when two codewords are both enabled (for example, when codeword 0 and codeword 1 are both enabled). In other words, in the table, a specific bit value corresponds to a specific message, and the specific message indicates a combination of a number of symbols, a number of layers, and an antenna port number.

TABLE 61

| Bit value | Message |
|---|---|
| 0 | 1 symbols, 5 layers, DMRS antenna ports #1~#5 |
| 1 | 2 symbols, 5 layers, DMRS antenna ports #1~#5 |
| 2 | 1 symbols, 6 layers, DMRS antenna ports #1~#6 |
| 3 | 2 symbols, 6 layers, DMRS antenna ports #1~#6 |
| 4 | 2 symbols, 7 layers, DMRS antenna ports #1~#7 |
| 5 | 2 symbols, 8 layers, DMRS antenna ports #1~#8 |
| 6 | Reserved |
| . . . | . . . |
| 63 | Reserved |

In order to indicate a number of symbols, a number of layers, and a DMRS antenna port number when one codeword of the Table 60 is enabled, a signaling field having a 6-bit size may be defined. The above signaling field is sufficiently large to indicate a number of symbols, a number of layers, and a DMRS antenna port number when two codewords of the Table 30 are enabled. In addition, a case to be indicated for configuring one signaling field by combining the examples of the Tables 60 and 61 does not exceed 64 cases, thus a signaling field having a 6-bit size may be identically used.

Table 62 below shows where a case where one codeword of the Table 60 is enabled and a case where two codewords of the Table 61 are combined and represented in one table. The examples of the Tables 60 and 61 may be used for a case where information of whether one codeword is enabled or two codewords are enabled may be obtained in advance. Table 62 below may be used for all cases where information of a number of enabled codewords may be and may not be obtained (in other words, regardless of whether or not information of a number of enabled codewords may be obtained).

TABLE 62

| Bit value | Message |
|---|---|
| 0 | 1 symbol, 1 layer, DMRS antenna ports #1, codeword 0 |
| 1 | 1 symbol, 1 layer, DMRS antenna ports #2, codeword 0 |
| 2 | 1 symbol, 1 layer, DMRS antenna ports #3, codeword 0 |
| 3 | 1 symbol, 1 layer, DMRS antenna ports #4, codeword 0 |
| 4 | 1 symbol, 1 layer, DMRS antenna ports #5, codeword 0 |
| 5 | 1 symbol, 1 layer, DMRS antenna ports #6, codeword 0 |
| 6 | 2 symbols, 1 layer, DMRS antenna ports #1, codeword 0 |
| 7 | 2 symbols, 1 layer, DMRS antenna ports #2, codeword 0 |
| 8 | 2 symbols, 1 layer, DMRS antenna ports #3, codeword 0 |
| 9 | 2 symbols, 1 layer, DMRS antenna ports #4, codeword 0 |
| 10 | 2 symbols, 1 layer, DMRS antenna ports #5, codeword 0 |
| 11 | 2 symbols, 1 layer, DMRS antenna ports #6, codeword 0 |
| 12 | 2 symbols, 1 layer, DMRS antenna ports #7, codeword 0 |
| 13 | 2 symbols, 1 layer, DMRS antenna ports #8, codeword 0 |
| 14 | 2 symbols, 1 layer, DMRS antenna ports #9, codeword 0 |
| 15 | 2 symbols, 1 layer, DMRS antenna ports #10, codeword 0 |
| 16 | 2 symbols, 1 layer, DMRS antenna ports #11, codeword 0 |
| 17 | 2 symbols, 1 layer, DMRS antenna ports #12, codeword 0 |
| 18 | 1 symbol, 2 layers, DMRS antenna ports #1~#2, codeword 0 |
| 19 | 1 symbol, 2 layers, DMRS antenna ports #3~#4, codeword 0 |
| 20 | 1 symbol, 2 layers, DMRS antenna ports #5~#6, codeword 0 |
| 21 | 2 symbols, 2 layers, DMRS antenna ports #1~#2, codeword 0 |
| 22 | 2 symbols, 2 layers, DMRS antenna ports #3~#4, codeword 0 |
| 23 | 2 symbols, 2 layers, DMRS antenna ports #5~#6, codeword 0 |
| 24 | 2 symbols, 2 layers, DMRS antenna ports #7~#8, codeword 0 |
| 25 | 2 symbols, 2 layers, DMRS antenna ports #9~#10, codeword 0 |
| 26 | 2 symbols, 2 layers, DMRS antenna ports #11~#12, codeword 0 |
| 27 | 1 symbol, 3 layers, DMRS antenna ports #1~#3, codeword 0 |
| 28 | 1 symbol, 3 layers, DMRS antenna ports #4~#6, codeword 0 |
| 29 | 2 symbols, 3 layers, DMRS antenna ports #1~#3, codeword 0 |
| 30 | 2 symbols, 3 layers, DMRS antenna ports #4~#6, codeword 0 |
| 31 | 2 symbols, 3 layers, DMRS antenna ports #7~#9, codeword 0 |

TABLE 62-continued

| Bit value | Message |
|---|---|
| 32 | 2 symbols, 3 layers, DMRS antenna ports #10~#12, codeword 0 |
| 33 | 1 symbol, 4 layers, DMRS antenna ports #1~#4, codeword 0 |
| 34 | 2 symbols, 4 layers, DMRS antenna ports #1~#4, codeword 0 |
| 35 | 1 symbols, 5 layers, DMRS antenna ports #1~#5, codeword 0 & codeword 1 |
| 36 | 2 symbols, 5 layers, DMRS antenna ports #1~#5, codeword 0 & codeword 1 |
| 37 | 1 symbols, 6 layers, DMRS antenna ports #1~#6, codeword 0 & codeword 1 |
| 38 | 2 symbols, 6 layers, DMRS antenna ports #1~#6, codeword 0 & codeword 1 |
| 39 | 2 symbols, 7 layers, DMRS antenna ports #1~#7, codeword 0 & codeword 1 |
| 40 | 2 symbols, 8 layers, DMRS antenna ports #1~#8, codeword 0 & codeword 1 |
| 41 | Reserved |
| . . . | . . . |
| 63 | Reserved |

Embodiment 6-3

The present embodiment 6-3 relates to a case where, in an MU-MIMO, up to N=4 layers being classified from each other are supported to each terminal.

Hereinafter, examples of a codeword and a DMRS antenna port number according to a number of layers used for each terminal will be described.

In case of one layer, codeword 0 is enabled, and codeword 1 is disabled. The enabled codeword 0 may be mapped to any one of DMRS antenna ports #1, #2, #3, #4, #5, #6, #7, and #8. Herein, when the codeword 0 is mapped to any one of the DMRS antenna ports #2, #3, #4, #5, #6, #7, and #8, it may correspond to a case where a corresponding terminal is in an MU-MIMO.

In case of two layers, codeword 0 is enabled, and codeword 1 is disabled. The enabled codeword 0 may be mapped to any one of DMRS antenna ports #1 and #2, #3 and #4, #5 and #6, and #7 and #8. Herein, when the codeword 0 is mapped to any one of the DMRS antenna ports #3 and #4, #5 and #6, and #7 and #8, it may correspond to a case where a corresponding terminal is in an MU-MIMO.

In case of three layers, codeword 0 is enabled, and codeword 1 is disabled. The enabled codeword 0 may be mapped to any one of DMRS antenna ports #1 to #3, #4 to #6, #7 to #9, and #10 to #12 (DMRS antenna ports #1~#3, #4~#6, #7~#9, or #10~#12). Herein, when the codeword 0 is mapped to any one of the DMRS antenna ports #4 to #6, #7 to #9, and #10 to #12 (DMRS antenna ports #4~#6, #7~#9, or #10~#12), it may correspond to a case where a corresponding terminal is in an MU-MIMO.

In case of four layers, codeword 0 is enabled, and codeword 1 is disabled. The enabled codeword 0 may be mapped to any one of DMRS antenna ports #1 to #4, #5 to #8, and #9 to #12 (DMRS antenna ports #1~#4, #5~#8, or #9~#12). Herein, when the codeword 0 is mapped to any one of the DMRS antenna ports #5 to #8, and #9 to #12 (DMRS antenna ports #5~#8, or #9~#12), it may correspond to a case where a corresponding terminal is in an MU-MIMO.

In case of five layers, codeword 0 and codeword 1 are both enabled. The enabled codeword 0 may be mapped to DMRS antenna ports #1 and #2, and the enabled codeword 1 may be mapped to DMRS antenna ports #3 to #5 (DMRS antenna ports #3~#5). In case of six layers, codeword 0 and codeword 1 are both enabled. The enabled codeword 0 may be mapped to DMRS antenna ports #1 to #3 (DMRS antenna ports #1~#3), and the enabled codeword 1 may be mapped to DMRS antenna ports #4 to #6 (DMRS antenna ports #4~#6).

In case of seven layers, codeword 0 and codeword 1 are both enabled. The enabled codeword 0 may be mapped to DMRS antenna ports #1 to #3 (DMRS antenna ports #1~#3), and the enabled codeword 1 may be mapped to DMRS antenna ports #4 to #7 (DMRS antenna ports #4~#7).

In case of eight layers, codeword 0 and codeword 1 are both enabled. The enabled codeword 0 may be mapped to DMRS antenna ports #1 to #4 (DMRS antenna ports #1~#4), and the enabled codeword 1 may be mapped to DMRS antenna ports #5 to #8 (DMRS antenna ports #5~#8).

Table 63 below shows an example of indicating a number of symbols, a number of layers, and an antenna port number for one codeword when one codeword is enabled and the other codeword is disabled (in other words, when codeword 0 is enabled, and codeword 1 is disabled). In other words, in the table, a specific bit value corresponds to a specific message, and the specific message indicates a combination of a number of symbols, a number of layers, and an antenna port number.

TABLE 63

| Bit value | Message |
|---|---|
| 0 | 1 symbol, 1 layer, DMRS antenna ports #1 |
| 1 | 1 symbol, 1 layer, DMRS antenna ports #2 |
| 2 | 1 symbol, 1 layer, DMRS antenna ports #3 |
| 3 | 1 symbol, 1 layer, DMRS antenna ports #4 |
| 4 | 1 symbol, 1 layer, DMRS antenna ports #5 |
| 5 | 1 symbol, 1 layer, DMRS antenna ports #6 |
| 6 | 2 symbols, 1 layer, DMRS antenna ports #1 |
| 7 | 2 symbols, 1 layer, DMRS antenna ports #2 |
| 8 | 2 symbols, 1 layer, DMRS antenna ports #3 |
| 9 | 2 symbols, 1 layer, DMRS antenna ports #4 |
| 10 | 2 symbols, 1 layer, DMRS antenna ports #5 |
| 11 | 2 symbols, 1 layer, DMRS antenna ports #6 |
| 12 | 2 symbols, 1 layer, DMRS antenna ports #7 |
| 13 | 2 symbols, 1 layer, DMRS antenna ports #8 |
| 14 | 2 symbols, 1 layer, DMRS antenna ports #9 |
| 15 | 2 symbols, 1 layer, DMRS antenna ports #10 |
| 16 | 2 symbols, 1 layer, DMRS antenna ports #11 |
| 17 | 2 symbols, 1 layer, DMRS antenna ports #12 |
| 18 | 1 symbol, 2 layers, DMRS antenna ports #1~#2 |
| 19 | 1 symbol, 2 layers, DMRS antenna ports #3~#4 |
| 20 | 1 symbol, 2 layers, DMRS antenna ports #5~#6 |
| 21 | 2 symbols, 2 layers, DMRS antenna ports #1~#2 |
| 22 | 2 symbols, 2 layers, DMRS antenna ports #3~#4 |
| 23 | 2 symbols, 2 layers, DMRS antenna ports #5~#6 |
| 24 | 2 symbols, 2 layers, DMRS antenna ports #7~#8 |
| 25 | 2 symbols, 2 layers, DMRS antenna ports #9~#10 |
| 26 | 2 symbols, 2 layers, DMRS antenna ports #11~#12 |
| 27 | 1 symbol, 3 layers, DMRS antenna ports #1~#3 |
| 28 | 1 symbol, 3 layers, DMRS antenna ports #4~#6 |
| 29 | 2 symbols, 3 layers, DMRS antenna ports #1~#3 |
| 30 | 2 symbols, 3 layers, DMRS antenna ports #4~#6 |
| 31 | 2 symbols, 3 layers, DMRS antenna ports #7~#9 |
| 32 | 2 symbols, 3 layers, DMRS antenna ports #10~#12 |
| 33 | 1 symbol, 4 layers, DMRS antenna ports #1~#4 |
| 34 | 2 symbols, 4 layers, DMRS antenna ports #1~#4 |
| 35 | 2 symbols, 4 layers, DMRS antenna ports #5~#8 |
| 36 | 2 symbols, 4 layers, DMRS antenna ports #9~#12 |
| 37 | Reserved |
| . . . | . . . |
| 63 | Reserved |

Table 64 below shows an example of indicating a number of symbols, a number of layers, and an antenna port number when two codewords are both enabled (for example, codeword 0 and codeword 1 are both enabled). In other words, in the table, a specific bit value corresponds to a specific message, and the specific message indicates a combination of a number of symbols, a number of layers, and an antenna port number.

TABLE 64

| Bit value | Message |
|---|---|
| 0 | 1 symbols, 5 layers, DMRS antenna ports #1~#5 |
| 1 | 2 symbols, 5 layers, DMRS antenna ports #1~#5 |
| 2 | 1 symbols, 6 layers, DMRS antenna ports #1~#6 |
| 3 | 2 symbols, 6 layers, DMRS antenna ports #1~#6 |
| 4 | 2 symbols, 7 layers, DMRS antenna ports #1~#7 |
| 5 | 2 symbols, 8 layers, DMRS antenna ports #1~#8 |
| 6 | Reserved |
| . . . | . . . |
| 63 | Reserved |

In order to indicate a number of symbols, a number of layers, and a DMRS antenna port number when one codeword of the Table 63 is enabled, a signaling field having a 6-bit size may be defined. The above signaling field is sufficiently large to indicate a number of symbols, a number of layers, and a DMRS antenna port number when two codewords of the Table 64 are enabled. In addition, a number of cases to be indicated for configuring one signaling field by combining the examples of Tables 63 and 64 which does not exceed 64 cases, thus a signaling field having a 6-bit size may be identically used.

Table 65 below shows where a case where one codeword of the Table 63 is enabled and a case where two codewords of the Table 64 are enabled are combined and represented in one table. The examples of the Tables 63 and 64 may be used for a case where information of whether one codeword is enabled or two codeword are enabled may be obtained in advance. Table 65 below may be used for all cases where information of a number of enabled codewords may be, and may not be obtained (in other words, regardless of whether or not information of a number of enabled codewords may be obtained.

TABLE 65

| Bit value | Message |
|---|---|
| 0 | 1 symbol, 1 layer, DMRS antenna ports #1, codeword 0 |
| 1 | 1 symbol, 1 layer, DMRS antenna ports #2, codeword 0 |
| 2 | 1 symbol, 1 layer, DMRS antenna ports #3, codeword 0 |
| 3 | 1 symbol, 1 layer, DMRS antenna ports #4, codeword 0 |
| 4 | 1 symbol, 1 layer, DMRS antenna ports #5, codeword 0 |
| 5 | 1 symbol, 1 layer, DMRS antenna ports #6, codeword 0 |
| 6 | 2 symbols, 1 layer, DMRS antenna ports #1, codeword 0 |
| 7 | 2 symbols, 1 layer, DMRS antenna ports #2, codeword 0 |
| 8 | 2 symbols, 1 layer, DMRS antenna ports #3, codeword 0 |
| 9 | 2 symbols, 1 layer, DMRS antenna ports #4, codeword 0 |
| 10 | 2 symbols, 1 layer, DMRS antenna ports #5, codeword 0 |
| 11 | 2 symbols, 1 layer, DMRS antenna ports #6, codeword 0 |
| 12 | 2 symbols, 1 layer, DMRS antenna ports #7, codeword 0 |
| 13 | 2 symbols, 1 layer, DMRS antenna ports #8, codeword 0 |
| 14 | 2 symbols, 1 layer, DMRS antenna ports #9, codeword 0 |
| 15 | 2 symbols, 1 layer, DMRS antenna ports #10, codeword 0 |
| 16 | 2 symbols, 1 layer, DMRS antenna ports #11, codeword 0 |
| 17 | 2 symbols, 1 layer, DMRS antenna ports #12, codeword 0 |
| 18 | 1 symbol, 2 layers, DMRS antenna ports #1~#2, codeword 0 |
| 19 | 1 symbol, 2 layers, DMRS antenna ports #3~#4, codeword 0 |
| 20 | 1 symbol, 2 layers, DMRS antenna ports #5~#6, codeword 0 |
| 21 | 2 symbols, 2 layers, DMRS antenna ports #1~#2, codeword 0 |
| 22 | 2 symbols, 2 layers, DMRS antenna ports #3~#4, codeword 0 |
| 23 | 2 symbols, 2 layers, DMRS antenna ports #5~#6, codeword 0 |
| 24 | 2 symbols, 2 layers, DMRS antenna ports #7~#8, codeword 0 |
| 25 | 2 symbols, 2 layers, DMRS antenna ports #9~#10, codeword 0 |
| 26 | 2 symbols, 2 layers, DMRS antenna ports #11~#12, codeword 0 |

TABLE 65-continued

| Bit value | Message |
|---|---|
| 27 | 1 symbol, 3 layers, DMRS antenna ports #1~#3, codeword 0 |
| 28 | 1 symbol, 3 layers, DMRS antenna ports #4~#6, codeword 0 |
| 29 | 2 symbols, 3 layers, DMRS antenna ports #1~#3, codeword 0 |
| 30 | 2 symbols, 3 layers, DMRS antenna ports #4~#6, codeword 0 |
| 31 | 2 symbols, 3 layers, DMRS antenna ports #7~#9, codeword 0 |
| 32 | 2 symbols, 3 layers, DMRS antenna ports #10~#12, codeword 0 |
| 33 | 1 symbol, 4 layers, DMRS antenna ports #1~#4, codeword 0 |
| 34 | 2 symbols, 4 layers, DMRS antenna ports #1~#4, codeword 0 |
| 35 | 2 symbols, 4 layers, DMRS antenna ports #5~#8, codeword 0 |
| 36 | 2 symbols, 4 layers, DMRS antenna ports #9~#12, codeword 0 |
| 37 | 1 symbols, 5 layers, DMRS antenna ports #1~#5, codeword 0 & codeword 1 |
| 38 | 2 symbols, 5 layers, DMRS antenna ports #1~#5, codeword 0 & codeword 1 |
| 39 | 1 symbols, 6 layers, DMRS antenna ports #1~#6, codeword 0 & codeword 1 |
| 40 | 2 symbols, 6 layers, DMRS antenna ports #1~#6, codeword 0 & codeword 1 |
| 41 | 2 symbols, 7 layers, DMRS antenna ports #1~#7, codeword 0 & codeword 1 |
| 42 | 2 symbols, 8 layers, DMRS antenna ports #1~#8, codeword 0 & codeword 1 |
| 43 | Reserved |
| ... | ... |
| 63 | Reserved |

Embodiment 7

The present embodiment 7 relates to method of using a combination of detailed examples of the above embodiment 5 and the embodiment 6.

The embodiment 5-1, the embodiment 5-2, and the embodiment 5-3 are embodiment in consideration with a DMRS configuration type 1 based on an IFDMA method. Meanwhile, the embodiment 6-1, the embodiment 6-2, and the embodiment 6-3 are embodiments in consideration with a DMRS configuration type 2 based on a CDM group method.

Accordingly, when it is indicated that a DMRS configuration type 1 is used by using high layer signaling such as RRC, a signaling field related to configure a DMRS and which is included in DCI may be fixedly used according to one of the embodiment 5-1, embodiment 5-2, and embodiment 5-3. Meanwhile, when it is indicated that a DMRS configuration type 2 is used by using high layer signaling such as RRC, a signaling field related to configure a DMRS and which is included in DCI may be fixedly used according to one of the embodiment 6-1, the embodiment 6-2, and embodiment 6-3.

Herein, a combination configured with one of the embodiment 5-1, the embodiment 5-2, and embodiment 5-3, and one of the embodiment 6-1, the embodiment 6-2, and the embodiment 6-3 may be fixedly used.

For example, it is assumed that, in an MU-MIMO, for each terminal, up to N=2 layers are identically classified for a DMRS configuration type 1 and a DMRS configuration type 2. Herein, in case of the DMRS configuration type 1, a signaling field related to configure a DMRS and which is included in DCI (for example, a signaling field having a 5-bit size according to Tables 49 and 50) may be configured. In case of the DMRS configuration type 2, a signaling field related to configure a DMRS and which is included in DCI (for example, a signaling field having a 5-bit size according to Tables 58 and 59) may be configured.

As an additional example, in a DMRS configuration type 1 and a DMRS configuration type 2, it is assumed that, in an MU-MIMO, a maximum number of available layers that may be classified and transmitted at the same time for each terminal is different from each other. For example, it may be assumed that, in a DMRS configuration type 1, in an MU-MIMO, up to N=2 layers are classified for each terminal, and in a DMRS configuration type 2, in an MU-MIMO, up to N=3 layers are classified for each terminal.

The above assumption considers that, in case of a DMRS configuration type 1, a number of available layers that may be classified and transmitted at the same time for across all terminals in an MU-MIMO is up to four layers in case of one symbol, and up to eight layers in case of two symbols. The above four and eight layers are in consideration with a maximum number of available layers that may be transmitted at the same time for each terminal which is a multiple of N=2. In addition, in case of a DMRS configuration type 2, in an MU-MIMO, a number of available layers that may be classified and transmitted at the same time for across all terminals is up to six layers in case of one symbol, and up to twelve layers in case of two symbols. The above six and twelve layers are in consideration with a maximum number of available layers that may be transmitted at the same time for each terminal which is a multiple of N=3.

For example, when it is assumed that, in a DMRS configuration type 1, in an MU-MIMO, up to N=2 layers are classified for each terminal, and in a DMRS configuration type 2, in an MU-MIMO, up to N=3 layers are classified for each terminal, a signaling field related to configure a DMRS and which is fixedly used according to a DMRS configuration type may be configured as examples below.

Embodiment 7-1

In case of a DMRS configuration type 2, a signaling field related to configure a DMRS and which is included in DCI may be configured according to the embodiment 6-2. In other words, in the embodiment 6-2, a signaling field having a 6-bit size may be configured according to Tables 60 and 61.

In case of a DMRS configuration type 1, a signaling field related to configure a DMRS and which is included in DCI may be configured according to the embodiment 5-1. Herein, Tables 49 and 50 of the embodiment 5-1 correspond to a signaling field having a 5-bit size. However, in case of a DMRS configuration type 2, a size of a signaling field according to the embodiment 6-2 may be configured to have a size identical to 6 bits. For this, for respective Tables 49 and 50, a reserved bit corresponding to bit values from 32 to 63 may be added so that a size of a signaling field may be configured to be a 6-bit size.

Accordingly, a size of a signaling field related to configure a DMRS and which is included in DCI is maintained to be identical for DMRS configuration types different from each other, thus it may prevent for a DCI size that is transmitted to a terminal from being changed according to a configuration type.

Embodiment 7-2

In case of a DMRS configuration type 1, a signaling field related to configure a DMRS and which is included in DCI may be configured according to the embodiment 5-1. In other words, in the embodiment 5-1, a signaling field having 5-bit size according to Tables 49 and 50 may be configured.

In case of a DMRS configuration type 2, a signaling field related to configure a DMRS and which is included in DCI may be configured according to the embodiment 6-2.

Herein, in the embodiment 6-2, Tables 60 and 61 correspond to a signaling field having a 6-bit size. However, the signaling field may be configured to have a size identical to a 5-bit size of the signaling field according to the embodiment 5-1 of the DMRS configuration type 1. For this, for Table 61, by excluding bit values from 32 to 63 which correspond to reserved messages, a signaling field having a 5-bit size may be configured.

Then, for Table 60, by excluding a part among 35 messages excluding a reserved message, a signaling field having a 5-bit size may be configured.

Tables 66 to 68 below shows examples of configuring a signaling field related to configure a DMRS and which is included in DCI to have a 5-bit size by excluding partial messages in the example of Table 60. For example, among 35 messages excluding a reserved bit of Table 60, three messages having a low possibility when actually configuring a DMRS are excluded, and a signaling field indicating one of the remaining 32 messages may be configured. Tables 66 to 68 below are not restrictive examples, an example in which other message is excluded in Tables 66 to 68 rather than the above three messages is included in a range of the present disclosure.

In the examples of Tables 66 to 68, example messages excluded in the example of Table 60 are represented as "[[excluded]]". In addition, a bit value corresponding to the excluded message is not assigned.

TABLE 66

| Bit value | Message |
|---|---|
| 0 | 1 symbol, 1 layer, DMRS antenna ports #1 |
| 1 | 1 symbol, 1 layer, DMRS antenna ports #2 |
| 2 | 1 symbol, 1 layer, DMRS antenna ports #3 |
| 3 | 1 symbol, 1 layer, DMRS antenna ports #4 |
| 4 | 1 symbol, 1 layer, DMRS antenna ports #5 |
| 5 | 1 symbol, 1 layer, DMRS antenna ports #6 |
| 6 | 2 symbols, 1 layer, DMRS antenna ports #1 |
| 7 | 2 symbols, 1 layer, DMRS antenna ports #2 |
| 8 | 2 symbols, 1 layer, DMRS antenna ports #3 |
| 9 | 2 symbols, 1 layer, DMRS antenna ports #4 |
| 10 | 2 symbols, 1 layer, DMRS antenna ports #5 |
| 11 | 2 symbols, 1 layer, DMRS antenna ports #6 |
| 12 | 2 symbols, 1 layer, DMRS antenna ports #7 |
| 13 | 2 symbols, 1 layer, DMRS antenna ports #8 |
| 14 | 2 symbols, 1 layer, DMRS antenna ports #9 |
| 15 | 2 symbols, 1 layer, DMRS antenna ports #10 |
| 16 | 2 symbols, 1 layer, DMRS antenna ports #11 |
| 17 | 2 symbols, 1 layer, DMRS antenna ports #12 |
| 18 | 1 symbol, 2 layers, DMRS antenna ports #1~#2 |
| 19 | 1 symbol, 2 layers, DMRS antenna ports #3~#4 |
| 20 | 1 symbol, 2 layers, DMRS antenna ports #5~#6 |
| 21 | 2 symbols, 2 layers, DMRS antenna ports #1~#2 |
| 22 | 2 symbols, 2 layers, DMRS antenna ports #3~#4 |
| 23 | 2 symbols, 2 layers, DMRS antenna ports #5~#6 |
| 24 | 2 symbols, 2 layers, DMRS antenna ports #7~#8 |
|  | [[excluded]] 2 symbols, 2 layers, DMRS antenna ports #9~#10 |
|  | [[excluded]] 2 symbols, 2 layers, DMRS antenna ports #11~#12 |
| 25 | 1 symbol, 3 layers, DMRS antenna ports #1~#3 |
| 26 | 1 symbol, 3 layers, DMRS antenna ports #4~#6 |
| 27 | 2 symbols, 3 layers, DMRS antenna ports #1~#3 |
| 28 | 2 symbols, 3 layers, DMRS antenna ports #4~#6 |
| 29 | 2 symbols, 3 layers, DMRS antenna ports #7~#9 |
|  | [[excluded]] 2 symbols, 3 layers, DMRS antenna ports #10~#12 |
| 30 | 1 symbol, 4 layers, DMRS antenna ports #1~#4 |
| 31 | 2 symbols, 4 layers, DMRS antenna ports #1~#4 |

TABLE 67

| Bit value | Message |
|---|---|
| 0 | 1 symbol, 1 layer, DMRS antenna ports #1 |
| 1 | 1 symbol, 1 layer, DMRS antenna ports #2 |
| 2 | 1 symbol, 1 layer, DMRS antenna ports #3 |
| 3 | 1 symbol, 1 layer, DMRS antenna ports #4 |
| 4 | 1 symbol, 1 layer, DMRS antenna ports #5 |
| 5 | 1 symbol, 1 layer, DMRS antenna ports #6 |
| 6 | 2 symbols, 1 layer, DMRS antenna ports #1 |
| 7 | 2 symbols, 1 layer, DMRS antenna ports #2 |
| 8 | 2 symbols, 1 layer, DMRS antenna ports #3 |
| 9 | 2 symbols, 1 layer, DMRS antenna ports #4 |
| 10 | 2 symbols, 1 layer, DMRS antenna ports #5 |
| 11 | 2 symbols, 1 layer, DMRS antenna ports #6 |
| 12 | 2 symbols, 1 layer, DMRS antenna ports #7 |
| 13 | 2 symbols, 1 layer, DMRS antenna ports #8 |
| 14 | 2 symbols, 1 layer, DMRS antenna ports #9 |
| 15 | 2 symbols, 1 layer, DMRS antenna ports #10 |
| 16 | 2 symbols, 1 layer, DMRS antenna ports #11 |
| 17 | 2 symbols, 1 layer, DMRS antenna ports #12 |
| 18 | 1 symbol, 2 layers, DMRS antenna ports #1~#2 |
| 19 | 1 symbol, 2 layers, DMRS antenna ports #3~#4 |
| 20 | 1 symbol, 2 layers, DMRS antenna ports #5~#6 |
| 21 | 2 symbols, 2 layers, DMRS antenna ports #1~#2 |
| 22 | 2 symbols, 2 layers, DMRS antenna ports #3~#4 |
| 23 | 2 symbols, 2 layers, DMRS antenna ports #5~#6 |
| 24 | 2 symbols, 2 layers, DMRS antenna ports #7~#8 |
| 25 | 2 symbols, 2 layers, DMRS antenna ports #9~#10 |
|  | [[excluded]] 2 symbols, 2 layers, DMRS antenna ports #11~#12 |
| 26 | 1 symbol, 3 layers, DMRS antenna ports #1~#3 |
| 27 | 1 symbol, 3 layers, DMRS antenna ports #4~#6 |
| 28 | 2 symbols, 3 layers, DMRS antenna ports #1~#3 |
| 29 | 2 symbols, 3 layers, DMRS antenna ports #4~#6 |
|  | [[excluded]] 2 symbols, 3 layers, DMRS antenna ports #7~#9 |
|  | [[excluded]] 2 symbols, 3 layers, DMRS antenna ports #10~#12 |
| 30 | 1 symbol, 4 layers, DMRS antenna ports #1~#4 |
| 31 | 2 symbols, 4 layers, DMRS antenna ports #1~#4 |

TABLE 68

| Bit value | Message |
|---|---|
| 0 | 1 symbol, 1 layer, DMRS antenna ports #1 |
| 1 | 1 symbol, 1 layer, DMRS antenna ports #2 |
| 2 | 1 symbol, 1 layer, DMRS antenna ports #3 |
| 3 | 1 symbol, 1 layer, DMRS antenna ports #4 |
| 4 | 1 symbol, 1 layer, DMRS antenna ports #5 |
| 5 | 1 symbol, 1 layer, DMRS antenna ports #6 |
| 6 | 2 symbols, 1 layer, DMRS antenna ports #1 |
| 7 | 2 symbols, 1 layer, DMRS antenna ports #2 |
| 8 | 2 symbols, 1 layer, DMRS antenna ports #3 |
| 9 | 2 symbols, 1 layer, DMRS antenna ports #4 |
| 10 | 2 symbols, 1 layer, DMRS antenna ports #5 |
| 11 | 2 symbols, 1 layer, DMRS antenna ports #6 |
| 12 | 2 symbols, 1 layer, DMRS antenna ports #7 |
| 13 | 2 symbols, 1 layer, DMRS antenna ports #8 |
| 14 | 2 symbols, 1 layer, DMRS antenna ports #9 |
| 15 | 2 symbols, 1 layer, DMRS antenna ports #10 |
| 16 | 2 symbols, 1 layer, DMRS antenna ports #11 |
| 17 | 2 symbols, 1 layer, DMRS antenna ports #12 |
| 18 | 1 symbol, 2 layers, DMRS antenna ports #1~#2 |
| 19 | 1 symbol, 2 layers, DMRS antenna ports #3~#4 |
| 20 | 1 symbol, 2 layers, DMRS antenna ports #5~#6 |
| 21 | 2 symbols, 2 layers, DMRS antenna ports #1~#2 |
| 22 | 2 symbols, 2 layers, DMRS antenna ports #3~#4 |
| 23 | 2 symbols, 2 layers, DMRS antenna ports #5~#6 |
| 24 | 2 symbols, 2 layers, DMRS antenna ports #7~#8 |
| 25 | 2 symbols, 2 layers, DMRS antenna ports #9~#10 |
| 26 | 2 symbols, 2 layers, DMRS antenna ports #11~#12 |
| 27 | 1 symbol, 3 layers, DMRS antenna ports #1~#3 |
|  | [[excluded]] 1 symbol, 3 layers, DMRS antenna ports #4~#6 |
| 28 | 2 symbols, 3 layers, DMRS antenna ports #1~#3 |
| 29 | 2 symbols, 3 layers, DMRS antenna ports #4~#6 |
|  | [[excluded]] 2 symbols, 3 layers, DMRS antenna ports #7~#9 |
|  | [[excluded]] 2 symbols, 3 layers, DMRS antenna ports #10~#12 |

TABLE 68-continued

| Bit value | Message |
|---|---|
| 30 | 1 symbol, 4 layers, DMRS antenna ports #1~#4 |
| 31 | 2 symbols, 4 layers, DMRS antenna ports #1~#4 |

FIG. 18 is a view showing a flowchart for illustrating a method of transmitting and receiving a downlink DMRS according to the present disclosure.

In step S1810, the base station may indicate a downlink (DL) DMRS configuration type to the terminal by using high layer signaling. The DL DMRS configuration type may one of a DMRS configuration type 1 based on an IFDMA (or Comb) method and DMRS configuration type 2 based on a CDM group method.

In step S1820, the base station may indicate configuration information of the DL DMRS to the terminal by using DCI. The configuration information of the DL DMRS may include information of a number of symbols, a number of layers, and an antenna port number of the DL DMRS. In addition, the above configuration information of the DL DMRS may be configured in a form of a signaling field having a 5-bit or 6-bit size and which is included in DCI described in the above various examples of the present disclosure. Accordingly, by indicating a specific bit value to the terminal, the terminal may identify a number of symbols, a number of layers, and an antenna port number of a DMRS corresponding to a corresponding bit value.

In step S1830, the base station may generate a DL DMRS based on the DL DMRS configuration type, and information of the number of symbols, the number of layers, and the antenna port number which are provided to the terminal.

In step S1840, the base station may transmit the generated DMRS by mapping on a physical resource.

In step S1850, the terminal may compare a DL DMRS received from the base station with a DMRS generated by the terminal based on the DL DMRS configuration type and the DL DMRS configuration information received from the base station in steps S610 and S1820, and estimate a DL channel. In other words, by comparing a DMRS that is estimated to have been originally transmitted from the base station with a DMRS distorted by passing a DL channel, the DL channel may be estimated.

FIG. 19 is a view showing a flowchart for illustrating a method of transmitting and receiving an uplink DMRS according to the present disclosure.

In step S1910, the base station may indicate an uplink (UL) DMRS configuration type to the terminal by using high layer signaling. The UL DMRS configuration type may be one of a DMRS configuration type 1 based on an IFDMA (or Comb) method and a DMRS configuration type 2 based on a CDM group method.

In step S1920, the base station may indicate to the terminal configuration information of the DMRS. The configuration information of the UL DMRS may include information of a number of symbols, a number of layers, and an antenna port number of the UL DMRS. In addition, the above configuration information of the UL DMRS may be configured in a form of a signaling field having a 5 bit or a 6-bit size which is included in DCI described in above various examples of the present disclosure. Accordingly, by indicating a specific bit value to the terminal, the terminal may identify a number of symbols, a number of layers, and an antenna port number of a DMRS corresponding to a corresponding bit value.

In step S1930, the terminal may generate a UL DMRS based on the UL DMRS configuration type, and the information of the number of symbols, the number of layers, and the antenna port number which are received from the base station.

In step S1940, the terminal may transmit the generated DMRS by mapping on a physical resource.

In step S1950, the base station may compare a UL DMRS received from the terminal with a DMRS generated by the base station based on the UL DMRS configuration type and the UL DMRS configuration information which are provided to the terminal in steps S1910 and S1920, and estimate a UL channel. In other words, by comparing a DMRS that is estimated to have been originally transmitted from the terminal with a DMRS distorted by passing a UL channel, the UL channel may be estimated.

FIG. 20 is a view showing a configuration of a wireless device according to the present disclosure.

A DMRS configuration information transmitting unit 2016 may configure a signaling field having a 5-bit or a 6-bit size and which indicates a number of symbols, a number of layers, and an antenna port number of a DL/UL DMRS, and transmit the generated signaling field to a terminal device 2050 by including the same in a downlink control information (DCI) format through a transceiver 2030.

A DMRS transmitting receiving unit 2017 may transmit to the terminal device 2050 the DL DMRS by mapping on a physical resource through the transceiver 2030 based on a DMRS configuration type of the DL DMRS and DMRS configuration information. In addition, a DMRS transmitting receiving unit 2017 may receive, through the transceiver 2030, on a physical resource a UL DMRS transmitted from the terminal device 2050 and which is determined based on the DMRS configuration type and the DMRS configuration information of the UL DMRS.

A channel estimating unit 2018 may estimate a UL channel by comparing a UL DMRS received from the terminal device 2050 with a DMRS generated by a base station device 2000.

A DMRS configuration identifying unit 2062 may identify a number of symbols, a number of layers, and an antenna port number of a DMRS received from the base station device 2000 by using DCI based on information of the DMRS configuration type for the downlink or uplink (DL/UL) DMRS received from the base station device 2000 by using high layer signaling.

A physical layer processing unit 2065 of a processor 2060 of the terminal device 2050 may include a DL/UL DMRS configuration information receiving unit 2066, a DMRS transmitting receiving unit 2067, and a channel estimating unit 2068.

The DMRS configuration information receiving unit 2066 may receive DCI from the base station device 2000 through a physical downlink control channel (PDCCH), etc. In addition, a number of symbols, a number of layers, and an antenna port number of a DL/UL DMRS may be checked, the number of symbols, the number of layers, and the antenna port number of a DL/UL DMRS are indicated by a bit value of a signaling field having a 5-bit or 6-bit size and which is included in the received DCI.

The DMRS transmitting receiving unit 2067 may transmit to the base station device 2000 a UL DMRS by mapping on a physical resource through the transceiver 2030 based on the DMRS configuration type and the DMRS configuration information of the UL DMRS. In addition, the DMRS transmitting receiving unit 2067 may receive, through the transceiver 2030, a DL DMRS transmitted from the base station device 2000 on a physical resource that is determined based on the DMRS configuration type and the DMRS configuration information of the DL DMRS.

The channel estimating unit 2068 may estimate a DL channel by comparing a DL DMRS received from the base station device 2000 with a DMRS generated by the terminal device 2050.

The present invention relates to a method of indicating a demodulation reference signal (DMRS) layers, antenna ports, and information of rate-matching for a new wireless communication system, and an apparatus thereof.

In the international telecommunication union (ITU), development for an international mobile telecommunication (IMT) framework and standard has been conducted. Recently, discussions are underway for 5G communication through a program called "IMT for 2020 and beyond".

In order to satisfy the requirement of the "IMT for 2020 and beyond", a new radio (NR) system of a third generation partnership project discloses a method of supporting various subcarrier spacing (SCS) in consideration with various scenarios, service requirements, and potential system compatibility. In addition, in order to overcome bad environment conditions such as high path-loss, phase-noise, frequency offset, etc. occurring at a high carrier frequency, the NR system considers a transmission of a physical signal/channel by using a plurality of beams. However, according to various SCS supported in the NR system, a method of configuring a reference signal in consideration with a transmission using a plurality of beams, and transmitting and receiving the same is not determined in detail yet.

Accordingly, an object of the present invention is to provide a method of indicating a DMRS layer, an antenna port, and rate-matching, and an apparatus thereof, wherein the method and apparatus efficiently configures and indicates a layer and an antenna port in association therewith which are associated with operations of a single-user multiple input multiple output (SU-MIMO) and a multi-user MIMO (MU-MIMO).

Another object of the present invention is to provide a method of indicating a DMRS layer, an antenna port, and rate-matching, and an apparatus thereof, wherein the method and apparatus is capable of preventing wrong decoding between a DMRS and data.

Still another object of the present invention is to provide a method of indicating a DMRS layer, an antenna port, and rate-matching, and an apparatus thereof, wherein the method and apparatus is capable of reducing signaling overhead.

According to an aspect of the present invention, a method of transmitting a DMRS, wherein the method transmits a demodulation reference signal (DMRS) from a wireless communication system to a terminal, the method includes: determining a DMRS configuration type of a DMRS to be transmitted to the terminal among a plurality of DMRS configuration types; transmitting to the terminal information of the determined DMRS configuration type by using high layer signaling; determining a number layers, an antenna port number, a number of symbols, and a code division multiplexing (CDM) group according to an MU-MIMO of the DMRS to be transmitted to the terminal within the determined DMRS configuration type, and transmitting the determined information to the terminal; and configuring the DMRS according to the determined information and transmitting the configured DMRS to the terminal.

According to the present invention, for a DMRS used for demodulating a data channel, a layer and an antenna port in association therewith can be efficiently configured and indicated in consideration with operations of a SU-MIMO and an MU-MIMO.

In addition, according to the present invention, a symbol transmitted through a DMRS and whether or not data is multiplexed by using a FDM method may be obtained by rate-matching information, thus wrong decoding between a DMRS and data can be prevented.

In addition, according to the present invention, when indicating a co-scheduled code division multiplexing (CDM) group for rate-matching, rather than indicating all co-scheduled CDM groups, information defined according to a specific rule is indicated, thus signaling overhead can be reduced.

Hereinafter, in the present description, some exemplary embodiments of the present invention will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, the present description is based with respect to a wireless communication network, operations performed in the wireless communication network may be performed during controlling the network, and transmitting data by a system managing the corresponding wireless communication network (for example base station), or may be performed in a terminal included in the corresponding wireless communication network.

FIG. 21 is a view showing a wireless communication system to which the present invention is applied.

A network configuration shown in FIG. 21 may be a network configuration of a new radio (NR) system. Hereinafter, the wireless communication system to which the present invention is applied is referred to an NR system. The NR system may include a network configuration satisfying the standard of "International Mobile Telecommunication (IMT)-2020 and beyond" defined in an international telecommunication union–radio communication (ITU-R) sector.

Referring to FIG. 21, in an NR system 10, a base station (BS) 11 and a user equipment (UE: Terminal) 12 may transmit and receive data in a wireless manner.

In the NR system 10, the base station 11 may provide communication service to the terminal present within a coverage through a specific frequency domain. It may be represented as a term of a site serviced under the coverage of the base station. The site may include a plurality of areas 15*a*, 15*b*, and 15*c* which is called a sector. Each sector included in the site may be identified based on an identifier different from each other. Each of the sectors 15*a*, 15*b*, and 15*c* may be understood as a partial area covered by the base station 11.

The base station 11 refers to a station that generally communicates with the terminal 12, and may be called such as eNodeB (evolved-NodeB, eNB), gNodeB (gNB), base transceiver system (BTS), access point, femto base station (Femto eNodeB, Femto gNodeB), home base station (HeNodeB: Home eNodeB, Home gNodeB), relay, remote radio head (RRH), etc.

In addition, the base station 11 may be referred to by various terms according to a coverage size provided by the corresponding base station such as mega cell, macro cell, micro cell, pico cell, femto cell, etc. The cell may be used as a frequency domain provided by the base station, a coverage of the base station, or a term of indicating the base station The terminal 12 may be fixed or may move, and may be called a mobile station (MS), mobile terminal (MT), user terminal (UT), subscriber station (SS), wireless device, personal digital assistant (PDA), wireless modem, handheld device, etc.

Hereinafter, a downlink means communicating or a communicating path from the base station 11 to the terminal 12, and an uplink means communicating or a communicating path from terminal 12 to the base station 11. In the downlink, a transmitter may be a part of the base station 11, and a receiver may be a part of the terminal 12. In the uplink, a transmitter may be a part of the terminal 12 and a receiver may be a part of the base station 11.

Meanwhile, there is no limit for a multiple access method applied to the wireless communication system 10. For example, various multiple access methods such as code division multiplexing (CDM), code division multiple access (CDMA), time division multiple access (TDMA), interleaved FDMA (IFDMA), frequency division multiple access (FDMA), orthogonal frequency division multiple access (OFDMA), single carrier-FDMA (SC-FDMA), OFDM-FDMA, OFDM-TDMA, OFDM-CDMA, etc. may be used. In addition, in an uplink transmission and downlink transmission, a time division duplex (TDD) method of transmitting by using times different from each other or a frequency division duplex (FDD) method of transmitting by using frequencies different from each other may be used.

Hereinafter, a numerology in consideration with the NR system will be described. A numerology may mean a general element or a numerical value of a factor which generates a resource grid on a time-frequency domain for designing a system. For example, as an example of numerology of a 3GPP LTE/LTE-A system, subcarrier spacing (SCS) corresponds to 15 kHz (or to 7.5 kHz in case of a multicast-broadcast single-frequency network (MBSFN)). However, the term of the numerology may not mean be a restrictive meaning for SCS, and may mean including a cyclic prefix (CP) length, a transmit time interval (TTI) length, a number of orthogonal frequency division multiplexing (OFDM) symbols within a predetermined time section, a duration of one OFDM symbol, etc. which are determined based on an associative relation with SCS or based on SCS. In other words, a numerology different from each other may be classified by values differing in at least one of SCS, a CP length, a TTI length, a number of OFDM symbols within a predetermined time section, and a duration of one OFDM symbol.

In order to satisfy requirements presented in "IMT for 2020 and beyond", the NR system considers a plurality of numerologies for various scenarios, various service requirements, compatibility with potential new systems, etc. In detail, in a numerology of the present wireless communication system, it is difficult to support higher frequency domain, faster moving speed, lower delay, etc. than requested by "IMT for 2020 and beyond, thus defining a new numerology is required.

For example, the NR system may support an application such as enhanced mobile broadband (eMBB), massive machine type communications (mMTC)/ultra machine type communications (uMTC), ultra-reliable and low latency communications (URLLC), etc. Particularly, in URLLC or eMBB service, requirement for a user plane latency is 0.5 ms for an uplink and 4 ms for an uplink/downlink, and this means that a reduction of a significant latency is required than the latency requirement of a 3GPP long term evolution (LTE) and LTE-advanced (LTE-A) system which is 10 ms.

In order to satisfy various scenarios and various requirements described above in one NR system, supporting of various numerologies is required. Particularly, in a conventional LTE/LTE-A system, different from supporting one SCS, supporting of a plurality of SCS is required.

In order to solve a problem in that a wide bandwidth is not used in a conventional frequency range or carrier such as 700 MHz or 2 GHz, a new numerology for an NR system supporting a plurality of SCSs may be determined by assuming a wireless communication system operating in a frequency range or carrier such as 3 GHz or lower, 3 GHz-6 GHz, or 6 GHZ-52.6 GHz, but a range of the present disclosure is not limited thereto.

In the NR system, one radio frame may correspond to 10 ms on a temporal axis, and one subframe may correspond to 1 ms on a temporal axis. In addition, one slot may correspond to fourteen or seven symbols on a temporal axis. Accordingly, a number of available slots and symbols according to a subcarrier spacing (SCS) respectively in consideration within one radio frame corresponding to 10 ms is as Table 1 below. In Table 69, an SCS of 480 KHz may not be considered.

TABLE 69

| SCS | Number of slots within 10 ms (fourteen symbols in one slot) | Number of slots within 10 ms (seven symbols in one slot) | Number of symbols within 10 ms |
| --- | --- | --- | --- |
| 15 KHz | 10 | 20 | 140 |
| 30 KHz | 20 | 40 | 280 |
| 60 KHz | 40 | 80 | 560 |
| 120 KHz | 80 | N/A | 1120 |
| 240 KHz | 160 | N/A | 2240 |
| 480 KHz | 320 | N/A | 4480 |

One physical resource block (PRB) may be defined as a resource area corresponding to one slot on a temporal axis, and twelve subcarriers on a frequency axis.

In the above NR system, a demodulation reference signal (DMRS) for demodulating a specific physical channel is required. For example, a DMRS for demodulating a physical data channel, a DMRS for demodulating a physical control channel, etc. may be defined in the NR system.

In detail, in the NR system, up to eight layers may be supported for transmitting a single-user multiple input multiple output (SU-MIMO), and up to twelve orthogonal layers may be supported for transmitting a multi-user MIMO (MU-MIMO). The above layers may be mapped to an antenna port (in other words, logical antenna), and transmitted through a physical channel. Herein, in order to correctly demodulate a signal transmitted through each layer of a physical channel or an antenna port, a reference signal (RS) of a corresponding layer or antenna is required, and the RE may be defined as a DMRS.

In the NR system, a number of DMRS orthogonal antenna ports (hereinafter, DMRS antenna port) may be up to twelve. For example, a DMRS antenna port number (antenna port number) may be defined as from #0 to #11.

In an MU-MIMO, up to twelve layers being classified from each other may be supported across all terminals. For example, in an MU-MIMO, each layer used by each terminal may be one of DMRS antenna port numbers #0, #1, #2, #3, #4, #5, #6, #7, #8, #9, #10, and #11. However, an actual DMRS antenna port number may vary according to an RS antenna port number corresponding to a first antenna port of a DMRS. When an RS antenna port number corresponding to the first RS antenna port of the DMRS is #A, the twelve DMRS antenna port numbers may be assigned as #A, #A+1, #A+2, #A+3, #A+4, #A+5, #A+6, #A+7, #A+8, #A+9, #A+10, and #A+11.

Meanwhile, a DMRS pattern may mean which DMRS configuration is used for an uplink and downlink, and may be classified into four types according to a number of symbols used for the DMRS.

1. When a first DMRS configuration type based on an IFDMA is applied, and one symbol is used for a DMRS.
2. When a first DMRS configuration type based on an IFDMA is applied, and two symbols are used for a DMRS.
3. When a second DMRS configuration type based on a CDM is applied, and one symbol is used for a DMRS.
4. When a second DMRS configuration type based on a CDM is applied, and two symbols are used for a DMRS.

In addition, a maximum number of available DMRS layers for each terminal may be defined as below for a case of a SU-MIMO and for a case of an MU-MIMO.

In case of a SU-MIMO, when a first DMRS configuration type is applied and one symbol is used for a DMRS, up to four layers being classified from each other may be supported to a terminal. When a first DMRS configuration type is applied and two symbols are used for a DMRS, up to eight layers being classified from each other may be supported to a terminal. In addition, when a DMRS configuration type 2 is applied and one symbol is used for a DMRS, up to six layers being classified from each other may be supported to a terminal. When a DMRS configuration type 2 is applied and two symbols are used for a DMRS, up to eight layers being classified from each other may be supported to a terminal.

In case of an MU-MIMO, when a first DMRS configuration type is applied and one symbol is used for a DMRS, up to two layers being classified from each other may be supported to each terminal. When a first DMRS configuration type is applied and two symbols are used for a DMRS, up to four layers being classified from each other may be supported to each terminal. When a DMRS configuration type 2 is applied and one symbol is used for a DMRS, up to four layers being classified from each other may be supported to each terminal. When a DMRS configuration type 2 is applied and two symbols are used for a DMRS, up to four layers being classified from each other may be also supported to each terminal.

When a maximum number of available layers for each terminal is N, each layer may correspond to any one of DMRS antenna port numbers #0, #1, #2, #3, #4, #5, #6, #7, #8, #9, #10, and #11.

Hereinafter, a DMRS pattern for the NR system will be described in detail with accompanied drawings.

FIG. 22 is a view showing a DMRS pattern when a first DMRS configuration type is applied and one symbol is used for a DMRS.

In FIG. 22, a "Comb pattern A" and a "Comb pattern B" in one symbol and twelve subcarriers (corresponding to one PRB in a frequency domain) are represented. A DMRS pattern shown in FIG. 22 may extend, in a frequency axis, by being repeated to a plurality of PRBs by a bandwidth assigned for transmitting to a physical channel (for example, physical downlink shared channel (PDSCH), physical uplink shared channel (PUSCH), etc.) of each terminal. In addition, in a temporal axis, the DMRS pattern may be applied to each DMRS configuration (front-loaded DMRS configuration or additional DMRS configuration) within one slot. The "Comb pattern A" may be defined as a DMRS pattern applied to an even numbered subcarrier, and the "Comb pattern B" may be defined as a DMRS pattern applied to an odd numbered subcarrier.

As shown in FIG. 22, for one symbol within one PRB, six resource elements (RE) may be assigned to each Comb pattern. Herein, a DMRS antenna port configuration may be as Table 70 below.

TABLE 70

|  | Comb pattern | CS(Cyclic Shift) |
| --- | --- | --- |
| DMRS antenna port #0 | Comb pattern A | CS value A |
| DMRS antenna port #1 | Comb pattern A | CS value B |
| DMRS antenna port #2 | Comb pattern B | CS value A |
| DMRS antenna port #3 | Comb pattern B | CS value B |

In Table 70, a Comb pattern is the "Comb pattern A" or the "Comb pattern B" shown in FIG. 22, a cyclic shift (CS) is a cyclic delay value of a DMRS sequence. When a range of available values is from 0 to X, the "CS value A" may have a value of 0, and the "CS value B" may have a value of X/2. For example, when X=12, the "CS value A" may have a value of 0, and the "CS value B" may have a value of 6. When X=2π, the "CS value A" may have a value of 0, and the "CS value B" may have a value of π, but it is not limited thereto.

Referring to Table 70, DMRS antenna port numbers may be preferentially classified into CS values, and then classified into Comb patterns. A Comb pattern A may be applied to DMRS antenna port numbers #0 and #1, and a Comb pattern B may be applied to DMRS antenna ports #2 and #3.

FIG. 23 is a view showing a DMRS pattern when a first DMRS configuration type is applied and two symbols are used for a DMRS.

In FIG. 23, a "Comb pattern A" and a "Comb pattern B" in two symbols and twelve subcarriers (corresponding to one PRB in a frequency domain) are represented. A DMRS pattern shown in FIG. 23 may expand, in a frequency axis, by being repeated up to a plurality of PRBs by a bandwidth assigned for transmitting a physical channel (for example, PDSCH, PUSCH, etc.) for each terminal. In addition, in a temporal axis, the DMRS pattern may be applied to each DMRS configuration (front-loaded DMRS configuration or additional DMRS configuration) within one slot.

As shown in FIG. 23, for one symbol within one PRB, six REs may be assigned for each Comb pattern. Herein, a DMRS antenna port configuration may be as Table 71 below.

TABLE 71

|  | Comb pattern | CS(Cyclic Shift) | TD-OCC |
| --- | --- | --- | --- |
| DMRS antenna port #0 | Comb pattern A | CS value A | [+1, +1] |
| DMRS antenna port #1 | Comb pattern A | CS value B | [+1, +1] |
| DMRS antenna port #2 | Comb pattern B | CS value A | [+1, +1] |
| DMRS antenna port #3 | Comb pattern B | CS value B | [+1, +1] |
| DMRS antenna port #4 | Comb pattern A | CS value A | [+1, −1] |
| DMRS antenna port #5 | Comb pattern A | CS value B | [+1, −1] |
| DMRS antenna port #6 | Comb pattern B | CS value A | [+1, −1] |
| DMRS antenna port #7 | Comb pattern B | CS value B | [+1, −1] |

In Table 71, a Comb pattern is the "Comb pattern A" or the "Comb pattern B" shown in FIG. 23. A CS is a cyclic delay value of a DMRS sequence. When a range of available values is from 0 to X, the "CS value A" may have a value of 0, and the "CS value B" may have a value of X/2. For example, when X=12, the "CS value A" may have a value of 0, and the "CS value B" may have a value of 6. When X=2π, the "CS value A" may have a value of 0, and the "CS value B" may have a value of π, but it is not limited thereto.

In addition, a time domain-orthogonal cover code (TD-OCC) may be applied to two REs that are adjacent in a temporal axis on the same subcarrier within each Comb pattern. A value thereof is [+1, +1] or [+1, −1] for [RE with a temporal axial precedence on the same subcarrier, RE following in a temporal axis on the same subcarrier]. When generating a DMRS sequence, '+1' or '−1' may be multiplied by a sequence value of a DMRS sequence mapped to a corresponding RE.

Referring to Table 71, DMRS antenna port numbers may be preferentially classified into CS value, then classified into Comb patterns, and lastly, classified into TD-OCCs. A Comb pattern A may be applied to DMRS antenna port numbers #0, #1, #4, and #5, and a Comb pattern B may be applied to DMRS antenna port numbers #2, #3, #6, and #7.

FIG. 24 is a view showing a DMRS pattern when a second DMRS configuration type is applied and one symbol is used for a DMRS.

In FIG. 24, a "CDM group A", a "CDM group B", and a "CDM group C" in one symbol and twelve subcarriers (corresponding to one PRB in a frequency domain) are represented. A DMRS pattern shown in FIG. 24 may expand, in a frequency axis, by being repeated to a plurality of PRBS by a bandwidth assigned for transmitting a physical channel (for example, PDSCH, PUSCH, etc.) of each terminal. In addition, in a temporal axis, the DMRS pattern may be applied to each DMRS configuration (front-loaded DMRS configuration or additional DMRS configuration) within one slot.

As shown in FIG. 24, for one symbol within one PRB, four REs may be assigned for each CDM group. Herein, a DMRS antenna port configuration may be as Table 72 below.

TABLE 72

|  | CDM group | FD-OCC |
| --- | --- | --- |
| DMRS antenna port #0 | CDM group A | [+1, +1] |
| DMRS antenna port #1 | CDM group A | [+1, −1] |
| DMRS antenna port #2 | CDM group B | [+1, +1] |
| DMRS antenna port #3 | CDM group B | [+1, −1] |
| DMRS antenna port #4 | CDM group C | [+1, +1] |
| DMRS antenna port #5 | CDM group C | [+1, −1] |

In Table 72, a CDM group is the "CDM group A", the "CDM group B", or the "CDM group C" shown in FIG. 23. A frequency domain-orthogonal cover code (FD-OCC) may be applied to two REs that are adjacent in a frequency axis on the same symbol within each CDM group. A value thereof is [+1, +1] or [+1, −1] for [RE with a frequency axial precedence on the same symbol, RE following in a frequency axis on the same symbol]. When generating a DMRS sequence, '+1' or '−1' may be multiplied by a sequence value of a DMRS sequence mapped to a corresponding RE.

Referring to Table 72, DMRS antenna port numbers may be preferentially classified into FD-OCCs, and then classified into CDM groups. A CDM group A may be applied to DMRS antenna port numbers #0 and #1, a CDM group B may be applied to DMRS antenna port numbers #2 and #3, and a CMD group C may be applied to DMRS antenna port numbers #4 and #5.

FIG. 25 is a view showing a DMRS pattern when a second DMRS configuration type is applied and two symbols are used for a DMRS.

In FIG. 25, a "CDM group A", a "CDM group B", and a "CDM group C" in two symbols and twelve subcarriers (corresponding to one PRB in a frequency domain) are represented. A DMRS pattern shown in FIG. 25 may expand, in a frequency axis, by being repeated to a plurality of PRBs by a bandwidth assigned for transmitting to a physical channel (for example, PDSCH, PUSCH, etc.) of each terminal. In addition, in a temporal axis, the DMRS pattern may be applied to each DMRS configuration (front-loaded DMRS configuration or additional DMRS configuration) within one slot. As shown in FIG. 25, for one symbol within one PRB, four REs may be assigned for each CDM group. Herein, a DMRS antenna port configuration may be as Table 73 below.

TABLE 73

|  | CDM group | FD-OCC | TD-OCC |
| --- | --- | --- | --- |
| DMRS antenna port #0 | CDM group A | [+1, +1] | [+1, +1] |
| DMRS antenna port #1 | CDM group A | [+1, −1] | [+1, +1] |
| DMRS antenna port #2 | CDM group B | [+1, +1] | [+1, +1] |
| DMRS antenna port #3 | CDM group B | [+1, −1] | [+1, +1] |
| DMRS antenna port #4 | CDM group C | [+1, +1] | [+1, +1] |
| DMRS antenna port #5 | CDM group C | [+1, −1] | [+1, +1] |
| DMRS antenna port #6 | CDM group A | [+1, +1] | [+1, −1] |
| DMRS antenna port #7 | CDM group A | [+1, −1] | [+1, −1] |
| DMRS antenna port #8 | CDM group B | [+1, +1] | [+1, −1] |
| DMRS antenna port #9 | CDM group B | [+1, −1] | [+1, −1] |
| DMRS antenna port #10 | CDM group C | [+1, +1] | [+1, −1] |
| DMRS antenna port #11 | CDM group C | [+1, −1] | [+1, −1] |

In Table 73, a CDM group is the "CDM group A", the "CDM group B", or the "CDM group C" shown in FIG. 24. A FD-OCC may be applied to two REs that are adjacent in a frequency axis on the same symbol within each CDM group. A value thereof is [+1, +1] or [+1, −1] for [RE with a frequency axial precedence on the same symbol, RE following in a frequency axis on the same symbol]. When generating a DMRS sequence, '+1' or '−1' may be multiplied by a sequence value of a DMRS sequence mapped to a corresponding RE. In addition, a TD-OCC may be applied to two REs that are adjacent in a temporal axis on the same subcarrier. A value thereof is [+1, +1] or [+1, −1] for [RE with a temporal axial precedence on the same subcarrier, RE following in a temporal axis on the same subcarrier]. When generating a DMRS sequence, '+1' or '−1' may be multiplied by a sequence value of a DMRS sequence mapped to a corresponding RE.

Referring to Table 73, DMRS antenna port numbers may be preferentially classified into FD-OCCs, then classified into CDM groups, and lastly classified into TD-OCC values. A CDM group A may be applied to DMRS antenna ports #0, #1, #6, and #7, a CDM group B may be applied to DMRS antenna ports #2, #3, #8, and #9, and a CDM group C may be applied to DMRS antenna ports #4, #5, #10, and #11.

FIG. 26 is a view showing a mapping example of an OCC applied to the present invention.

In FIG. 26, detailed examples in which a "TD-OCC" of FIG. 22 and Table 23, a "FD-OCC" of FIG. 23 and Table 4, and "FD-OCC and TD-OCC" of FIG. 24 and Table 73 are mapped to DMRS REs are represented.

Referring to FIG. 26, when a TD-OCC has a value of [+1, +1] for two REs corresponding to two consecutive symbols on the same subcarrier, a DMRS sequence value mapped to an RE with a low symbol index may be multiplied by +1, and a DMRS sequence value mapped to an RE of a next symbol index may be multiplied by +1.

When a TD-OCC has a value of [+1, −1] for two REs corresponding to two consecutive subcarriers on the same symbol, a DMRS sequence value mapped to an RE with a low subcarrier index may be multiplied by +1, and a DMRS sequence value mapped to an RE of a next subcarrier index may be multiplied by −1.

When a FD-OCC has a value of [+1, +1] for two REs corresponding to two consecutive subcarriers on the same symbol, a DMRS sequence value mapped to an RE with a low subcarrier index may be multiplied by +1, and a DMRS sequence value mapped to an RE of a next subcarrier index may be multiplied by +1.

When a FD-OCC has a value of [+1, −1] for two REs corresponding to consecutive two subcarriers on the same symbol, a DMRS sequence value mapped to an RE with a low subcarrier index may be multiplied by +1, and a DMRS sequence value mapped to an RE of a next subcarrier index may be multiplied by −1.

When a TD-ODD and a FD-OCC are all applied, for RES belonging to the same CDM group, an OCC value may be multiplied in a temporal axis and a frequency axis according to the above described method.

Hereinafter, for a DMRS used for demodulating a data channel in the NR system, a method of configuring a layer and an antenna port for transmitting a DMRS, and a signaling method for indicating the same will be described in consideration of the following factors.

In the NR system, a DMRS may be configured in a first DMRS configuration type based on an IFDMA or may be configured in a second DMRS configuration type based on a CDM.

In addition, each DMRS configuration may be configured with one symbol or two symbols. Accordingly, the DMRS configuration may be classified into: (1) a first DMRS configuration type using one symbol; (2) a first DMRS configuration type using two symbols; (3) a second DMRS configuration type using one symbol; and (4) a second DMRS configuration type using two symbols.

In case of a SU-MIMO, for (1) a first DMRS configuration type using one symbol, (2) a first DMRS configuration type using two symbols. (3) a second DMRS configuration type using one symbol, and (4) a second DMRS configuration type using two symbols, up to four, eight, six, and eight layers (and the quantity of antenna ports corresponding to the quantity of layers) may be respectively classified.

In case of an MU-MIMO, for (1) a first DMRS configuration type using one symbol, (2) a first DMRS configuration type using two symbols. (3) a second DMRS configuration type using one symbol, and (4) a second DMRS configuration type using two symbols, up to two, four, four, and four layers (and the quantity of antenna ports corresponding to the quantity of layers) may be respectively classified. In addition, in an MU-MIMO, up to twelve layers (and the quantity of antenna ports corresponding to the quantity of layers) may be classified for all terminals communicating with a base station.

In addition, in the NR system, for rate-matching purposes, when indicating a CDM group used by a specific terminal, a CDM group used by another terminal (hereinafter, a co-scheduled CDM group) may be indicated as well. However, when indicating the co-scheduled CDM group, in order to reduce signaling overhead, information defined according to a specific rule may be indicated rather than indicating all co-scheduled CDM groups.

Hereinafter, indicating a co-scheduled CDM group for rate-matching will be described in detail.

An RE pattern for each DMRS configuration shown in FIGS. 22 to 25 may be organized as below.

When one symbol is used in a first DMRS configuration pattern based on an IFDMA, a Comb pattern A may be applied to DMRS antenna ports #0 and #1, and a Comb pattern B may be applied to DMRS antenna ports #2 and #3.

When two symbols are used in a first DMRS configuration pattern based on an IFDMA, a Comb pattern A may be applied to DMRS antenna ports #0, #1, #4, and #5, and a Comb pattern B may be applied to DMRS antenna ports #2, #3, #6, and #7.

A Comb pattern group may be configured with antenna ports using the same RE pattern. Antenna ports within a Comb pattern group may share the same RE resources and may be classified into CS values or FD-OCCs or both. The Comb pattern group may be defined as a CDM group as similar to a second DMRS configuration type.

When one symbol is used in a second DMRS configuration pattern based on a CDM, a CDM group A may be applied to DMRS antenna ports #0 and #1, a CDM group B may be applied to DMRS antenna ports #2 and #3, and a CDM group B may be applied to DMRS antenna ports #4 and #5.

When two symbols are used in a second DMRS configuration pattern based on a CDM, a CDM group A may be applied to DMRS antenna ports #0, #1, #6, and #7, a CDM group B may be applied to DMRS antenna ports #2, #3, #8, and #9, and a CDM group C may be applied to DMRS antenna ports #4, #5, #10, and #11.

A CDM group may be configured with antenna ports using the same RE pattern. Antenna ports within a CDM group may share the same RE resources and may be classified into FD-OCCs or TD-OCCs or both.

A DMRS and data (NR-PDSCH or NR-PUSCH) may be multiplexed in a FDM within the same symbol. However, in an MU-MIMO environment, when a specific terminal transmits a DMRS by using a RE pattern corresponding to a first CDM group, the specific terminal may not obtain information whether or not a RE pattern corresponding to remaining CDM groups, except for the first CDM group, is used by other terminals. Accordingly, in the above case, when performing rate-matching for a data transmission, it is not possible to obtain information of whether to include or to exclude an RE pattern corresponding to the remaining CDM groups. When it is assumed that the RE pattern corresponding to the remaining CDM groups is always excluded from a data transmission, the RE pattern belonging to the remaining CDM group is excluded in a data transmission even though other terminals do not transmit a DMRS, thus wireless resource waste may occur and accordingly, performance degradation also may occur. When it is assumed that the RE pattern corresponding to the remaining CDM group is included in a data transmission, the RE pattern corresponding to the remaining CDM group is included in a data transmission when other terminals transmit a DMRS, and it becomes difficult to correctly demodulate data. In addition, this also may cause performance degradation. Accordingly, in order to solve the above problems, the base station may indicate a co-scheduled CDM group used by another terminal for rate-matching when the base station indicates a CDM group for a DMRS to a specific terminal. All cases of indicating the co-scheduled CDM group are represented as Table 74 below.

TABLE 74

| Case | DMRS configuration | CDM group used by specific terminal | Co-scheduled CDM group used by other terminal |
|---|---|---|---|
| Case 1 | Configuration type 1 | Comb pattern A | None |
| Case 2 | | Comb pattern A | Comb pattern B |
| Case 3 | | Comb pattern B | None |
| Case 4 | | Comb pattern B | Comb pattern A |
| Case 5 | | Comb pattern A, B | No need for indication |
| Case 6 | Configuration type 2 | CDM group A | None |
| Case 7 | | CDM group A | CDM group B |
| Case 8 | | CDM group A | CDM group C |
| Case 9 | | CDM group A | CDM group B, C |
| Case 10 | | CDM group B | None |
| Case 11 | | CDM group B | CDM group A |
| Case 12 | | CDM group B | CDM group C |
| Case 13 | | CDM group B | CDM group A, C |
| Case 14 | | CDM group C | None |
| Case 15 | | CDM group C | CDM group A |
| Case 16 | | CDM group C | CDM group B |
| Case 17 | | CDM group C | CDM group A, B |
| Case 18 | | CDM group A, B | None |
| Case 19 | | CDM group A, B | CDM group C |
| Case 20 | | CDM group A, C | None |
| Case 21 | | CDM group A, C | CDM group B |
| Case 22 | | CDM group B, C | None |
| Case 23 | | CDM group B, C | CDM group A |
| Case 24 | | CDM group A, B, C | No need for indication |

As Table 74, when all cases of indicating a co-scheduled CDM group for rate-matching are considered, signaling overhead becomes worse since there are lots of cases. Accordingly, in order to reduce signaling overhead, rather than indicating all cases of the co-scheduled CDM group, it is possible to specify certain cases according to a specific rule and to indicate the specified cases.

Examples of the specific rule are as below.

1. In case of a DMRS configuration using one symbol in a first DMRS configuration type, when a total number of antenna ports in consideration with an MU-MIMO is N, and N is '1' or '2', a Comb pattern A is used. When N is '3' or '4', a Comb pattern A and a Comb pattern B are used.

2. In case of a DMRS configuration using two symbols in a first DMRS configuration type, when a total number of antenna ports in consideration with an MU-MIMO is N and N is any one of '1' to '4', a Comb pattern A is used. When N is any one of '5' to '8', a Comb pattern A and a Comb pattern B are used.

3. In case of a DMRS configuration using one symbol in a second DMRS configuration type, when a total number of antenna ports in consideration with an MU-MIMO is N and N is '1' or '2', a CDM group A is used. When N is '3' or '4', a CDM group A and a CDM group B are used. When N is '5' or '6', a CDM group A, a CDM group B, and a CDM group C are used.

4. In case of a DMRS configuration using two symbols in a second DMRS configuration type 2, when a total number of antenna ports in consideration with an MU-MIMO is N and N is any one of '1' to '4', a CDM group A is used. When N is any one of '5' to '8', a CDM group A and a CDM group B are used. When N is any one of '9' to '12', a CDM group A, a CDM group B, and a CDM group C are used.

In other words, in case of a first DMRS configuration type, for a total number N of antenna ports used for a plurality of terminals in an MU-MIMO, N antenna ports may be assigned to a Comb pattern A, and then assigned to a Comb pattern B.

In addition, in case of a second DMRS configuration type, for a total number N of antenna ports used for a plurality of terminals in an MU-MIMO, N antenna ports may be assigned to a CDM group A, then assigned to a CDM group B, and lastly assigned to a CDM group C.

All cases of indicating a co-scheduled CDM group according to the specific rule are represented as Table 75 below.

TABLE 75

| Case | DMRS configuration | CDM group used by specific terminal | Co-scheduled CDM group used by another terminal |
|---|---|---|---|
| Case 1 | Configuration type 1 | Comb pattern A | None |
| Case 2 | | Comb pattern A | Comb pattern B |
| Case 3 | | Comb pattern B | Comb pattern A |
| Case 4 | | Comb pattern A, B | No need for indication |
| Case 5 | Configuration type 2 | CDM group A | None |
| Case 6 | | CDM group A | CDM group B |
| Case 7 | | CDM group A | CDM group B, C |
| Case 8 | | CDM group B | CDM group A |
| Case 9 | | CDM group B | CDM group A, C |
| Case 10 | | CDM group C | CDM group A, B |
| Case 11 | | CDM group A, B | None |
| Case 12 | | CDM group A, B | CDM group C |
| Case 13 | | CDM group A, B, C | No need for indication |

Referring to Table 75, when a Comb pattern A is used for a specific terminal, a co-scheduled CDM group used by another terminal may not be present (Case 1), or a Comb pattern B may be co-scheduled (Case 2).

Referring to Table 75, when a Comb pattern B is used for a specific terminal, in an MU-MIMO, total antenna ports used for a plurality of terminals may be assigned to a Comb pattern A, and then assigned to a Comb pattern B, thus a co-scheduled CDM group becomes always a Comb pattern A (Case 3).

Referring to Table 75, when a Comb pattern A and a Comb pattern B are all used for a specific terminal, there is no need for additionally indicating a co-scheduled CDM group (Case 4).

Referring to Table 75, when a CDM group A is used for a specific terminal, a co-scheduled CDM group used by another terminal may not be present (Case 5), a CDM group B may be co-scheduled (Case 6), or a CDM group B and a CDM group C may be co-scheduled (Case 7).

Referring to Table 75, when a CDM group B is used for a specific terminal, in an MU-MIMO, total antenna ports used for a plurality of terminals are assigned to a CDM group A, and then assigned to a CDM group B, thus a co-scheduled CDM group used by another terminal may be a CDM group A (Case 8), or may be a CDM group A and a CDM group C (Case 9).

Referring to Table 75, when a CDM group C is used for a specific terminal, in an MU-MIMO, total antenna ports used for a plurality of terminals are assigned to a CDM group A and a CDM group B, and then assigned to a CDM group C, thus a co-scheduled CDM group used by another terminal always becomes a CDM group A and a CDM group B (Case 10).

Referring to Table 75, when a CDM group A and a CDM group B are used for a specific terminal, a co-scheduled CDM group used by other terminal may not be present (Case 11), or a CDM group C may be co-scheduled (Case 12).

Referring to Table 75, when a CDM group A, a CDM group B, and a CDM group C are all used for a specific terminal, there is no need for indicating a CDM group used with another terminal (Case 13).

Meanwhile, a co-scheduled CDM group used by another terminal may be represented in a number of co-scheduled CDM groups which is additionally considered. Accordingly, Table 75 is represented in another method as Table 76 below.

TABLE 76

| Case | DMRS configuration | CDM group used by specific terminal | Additionally considered number of co-scheduled CDM groups |
|---|---|---|---|
| Case 1 | Configuration type 1 | Comb pattern A | 0 |
| Case 2 | | Comb pattern A | 1 (Comb pattern B) |
| Case 3 | | Comb pattern B | 1 (Comb pattern A) |
| Case 4 | | Comb pattern A, B | 0 |
| Case 5 | Configuration type 2 | CDM group A | 0 |
| Case 6 | | CDM group A | 1 (CDM group B) |
| Case 7 | | CDM group A | 2 (CDM group B, C) |
| Case 8 | | CDM group B | 1 (CDM group A) |
| Case 9 | | CDM group B | 2 (CDM group A, C) |
| Case 10 | | CDM group C | 2 (CDM group A, B) |
| Case 11 | | CDM group A, B | 0 |
| Case 12 | | CDM group A, B | 1 (CDM group C) |
| Case 13 | | CDM group A, B, C | 0 |

Referring to Table 76, as a case of a first DMRS configuration type, when a Comb pattern A is used for a specific terminal, a number of additionally considered co-scheduled CDM groups may be 0 (Case 1), or may be 1 (Case 2, herein, a Comb pattern B is co-scheduled).

Referring to Table 76, as a case of a first DMRS configuration type, when a Comb pattern B is used for a specific terminal, in an MU-MIMO, total antenna ports used for a plurality of terminals are assigned to a Comb pattern A, and then assigned to a Comb pattern B, thus a number of additionally considered co-scheduled CDM groups always becomes 1 (Case 3, herein, a Comb pattern A is co-scheduled).

Referring to Table 76, as a case of a first DMRS configuration type, when a Comb pattern A and a Comb pattern B are used for a specific terminal, an additionally considered co-scheduled CDM group is not present, thus a number of thereof always becomes 0 (Case 4).

Referring to Table 76, as a case of a second DMRS configuration type, when a CDM group A is used for a specific terminal, a number of additionally considered co-scheduled CDM groups may be 0 (Case 5), may be 1 (Case 6, herein, a CDM group B is co-scheduled), or may be 2 (Case 7, herein, a CDM group B and a CDM group C are co-scheduled).

Referring to Table 76, as a case of a second DMRS configuration type, when a CDM group B is used for a specific terminal, in an MU-MIMO, total antenna ports used for a plurality of terminals are assigned to a CDM group A, and then assigned to a CDM group B, thus a number of additionally considered co-scheduled CDM groups may be 1 (Case 8, herein, a CDM group A is co-scheduled), or may be 2 (Case 9, herein, a CDM group A and a CDM group C are co-scheduled).

Referring to Table 76, as a case of a second DMRS configuration type, when a CDM group C is used for a specific terminal, in an MU-MIMO, total antenna ports used for a plurality of terminals are assigned to a CDM group A and a CDM group B, and then assigned to a CDM group C, thus a number of additionally considered co-scheduled CDM groups always becomes 2 (Case 10, herein, a CDM group A and a CDM group B are co-scheduled).

Referring to Table 76, as a case of a second DMRS configuration type, when a CDM group A and a CDM group B are used for a specific terminal, a number of additionally considered co-scheduled CDM groups may be 0 (Case 11), or may be 1 (Case 12, herein, a CDM group C is co-scheduled).

Referring to Table 76, as a case of a second DMRS configuration type, when a CDM group A, a CDM group B, and a CDM group C are used for a specific terminal, an additionally considered co-scheduled CDM group is not present, thus a number of additionally considered co-scheduled CDM groups always becomes 0 (Case 13).

Hereinafter, an antenna port number configured according to a number of codewords and a number of layers will be described. Herein, it is assumed that up to two codewords are used. For each terminal, when one to four layers are used, one codeword (codeword 0) may be used, and when five to eight layers are used, two codewords (codeword 0, codeword 1) may be used.

When one layer is used in a first DMRS configuration type based on an IFDMA, codeword 0 may be used as any one of DMRS antenna ports #0 to #7 (#1, #2, #3, #4, #5, #6, or #7) (enabled). Herein, codeword 1 is not used (disabled).

When two layers are used in a first DMRS configuration type, codeword 0 is used as antenna ports #0~#1, #2~#3, #4~#5, or #6~#7. When a Comb pattern is configured with one symbol, considering that a Comb pattern A is assigned to antenna ports {#0, #1}, and a Comb pattern B is assigned to antenna ports {#2, #3}, DMRS antenna ports for two layers may be {#0, #1} or {#2, #3}. In addition, when a Comb pattern is configured with two symbols, considering that a Comb pattern A is assigned to antenna ports {#0, #1, #4, #5}, and a Comb pattern B is assigned to antenna ports {#2, #3, #6, #7}, DMRS antenna ports for two layer may be {#0, #1}, {#4, #5}, {#2, #3}, or {#6, #7}. Herein, codeword 1 is not used.

When three layers are used in a first DMRS configuration type, codeword 0 may be used as antenna ports #0~#2, #0/#1/#4, or #2/#3/#6. When a Comb pattern is configured with one symbol, considering that a Comb pattern A is assigned to antenna ports {#0, #1}, and a Comb pattern B is assigned to antenna ports {#2, #3}, DMRS antenna ports for three layers may be {#0, #1, #2}. In addition when a Comb pattern is configured with two symbols, considering that a Comb pattern A is assigned to antenna ports {#0, #1, #4, #5}, and a Comb pattern B is assigned to antenna ports {#2, #3, #6, #7}, DMRS antenna ports for three layers may be {#0, #1, #4}, or {#2, #3, #6}. Herein, codeword 1 is not used.

When four layers are used in a first DMRS configuration type, codeword 0 may be used as antenna ports #0~#3, #0/#1/#4/#5, or #2/#3/#6/#7. When a Comb pattern is configured with one symbol, considering that a Comb pattern A is assigned to antenna ports {#0, #1}, and a Comb pattern B is assigned to antenna ports {#2, #3}, DMRS antenna ports for four layers may be {#0, #1, #2, #3}. In addition, when a Comb pattern is configured with two symbols, considering that a Comb pattern A is assigned to antenna ports {#0, #1, #4, #5}, and a Comb pattern B is assigned to antenna ports {#2, #3, #6, #7}, DMRS antenna ports for three layers may be {#0, #1, #4, #5}, or {#2, #3, #6, #7}. Herein, codeword 1 is not used.

When five layers are used in a first DMRS configuration type, codeword 0 may be used as antenna ports #0~#1, and codeword 1 may be used as antenna ports #2/#3/#6. When a Comb pattern is configured with two symbols, considering that a Comb pattern A is assigned to antenna ports {#0, #1, #4, #5}, and a Comb pattern B is assigned to antenna ports {#2, #3, #6, #7}, DMRS antenna ports for five layers may be {#0, #1} for codeword 0, and {#2, #3, #6} for codeword 1. In other words, antenna ports transmitted through codeword 0 may correspond to two antenna ports in order from the lowest antenna port index among antenna ports corresponding to a Comb pattern A, and antenna ports transmitted through codeword 1 may correspond to three antenna ports in order from the lowest antenna port index among antenna ports corresponding to a Comb pattern B.

When six layers are used in a first DMRS configuration type, codeword 0 may be used as antenna ports #0/#1/#4 and codeword 1 may be used as antenna ports #2/#3/#6. When a Comb pattern is configured with two symbols, considering that a Comb pattern A is assigned to antenna ports {#0, #1, #4, #5}, and a Comb pattern B assigned to antenna ports {#2, #3, #6, #7}, DMRS antenna ports for six layers may be {#0, #1, #4} for codeword 0 and {#2, #3, #6} for codeword 1. In other words, antenna ports transmitted through codeword 0 may correspond to three antenna ports in order from the lowest antenna port index among antenna ports corresponding to a Comb pattern A, and antenna ports transmitted through codeword 1 may correspond to three antenna ports in order from the lowest antenna port index among antenna ports corresponding to a Comb pattern B.

When seven layers are used in a first DMRS configuration type, codeword 0 may be used as antenna ports #0/#1/#4 and codeword 1 may be used as antenna ports #2/#3/#6/#7. When a Comb pattern is configured with two symbols, considering that a Comb pattern A is assigned to antenna ports {#0, #1, #4, #5}, and a Comb pattern B is assigned to antenna ports {#2, #3, #6, #7}, DMRS antenna port for seven layers may be {#0, #1, #4} for codeword 0 and {#2, #3, #6, #7} for codeword 1. In other words, antenna ports transmitted through codeword 0 may correspond to three antenna ports in order from the lowest antenna port index among antenna ports corresponding to a Comb pattern A, and antenna ports transmitted through codeword 1 may correspond to four antenna ports in order from the lowest antenna port index among antenna ports corresponding to a Comb pattern B.

When eight layers are used in a first DMRS configuration type, codeword 0 may be used as antenna ports #0/#1/#4/#5 and codeword 1 may be used as antenna ports #2/#3/#6/#7. When a Comb pattern is configured with two symbols, considering that a Comb pattern A is assigned to antenna ports {#0, #1, #4, #5}, and a Comb pattern B is assigned to antenna ports {#2, #3, #6, #7}, DMRS antenna ports for eight layers may be {#0, #1, #4, #5} for codeword 0 and {#2, #3, #6, #7} for codeword 1. In other words, antenna ports transmitted through codeword 0 may correspond to four antenna ports in order from the lowest antenna port index among antenna ports corresponding to a Comb pattern A, and antenna ports transmitted through codeword 1 may correspond to four antenna ports in order from the lowest antenna port index among antenna ports corresponding to a Comb pattern B.

Meanwhile, when one layer is used in a second DMRS configuration type based on a CDM, codeword 0 may be used as any one of DMRS antenna ports #0 to #11 (#1, #2, #3, #4, #5, #6, #7, #8, #9, #10, or #11). Herein, codeword 1 is not used.

When two layers are used in a second DMRS configuration type, codeword 0 may be used as antenna ports #0~#1, #2~#3, #4~#5, #6~#7, #8~#9, or #10~#11. When a CDM group is configured with one symbol, considering that a CDM group A is assigned to antenna ports {#0, #1}, a CDM group B is assigned to antenna ports {#2, #3}, and a CDM group C is assigned to antenna ports {#4, #5}, DMRS antenna ports for two layers may be {#0, #1}, {#2, #3}, or {#4, #5}. In addition, when a CDM group is configured with two symbols, considering that a CDM group A is assigned to antenna ports {#0, #1, #6, #7}, a CDM group B is assigned to antenna ports {#2, #3, #8, #9}, and a CDM group C is assigned to antenna ports {#4, #5, #10, #11}, DMRS antenna ports for two layers may be {#0, #1}, {#6, #7}, {#2, #3}, {#8, #9}, {#4, #5}, or {#10, #11}. Herein, codeword 1 is not used.

When three layers are used in a second DMRS configuration type, codeword 0 may be used as antenna ports #0~#2, #3~#5, #0/#1/#6, #2/#3/#8, #4/#5/#10, or #7/#9/#11. When a CDM group is configured with one symbol, considering that a CDM group A is assigned to antenna ports {#0, #1}, a CDM group B is assigned to antenna ports {#2, #3}, and a CDM group C is assigned to antenna ports {#4, #5}, DMRS antenna port for three layers may be {#0, #1, #2}, or {#3, #4, #5}. In addition, when a CDM group is configured with two symbols, considering that a CDM group A is assigned to antenna ports {#0, #1, #6, #7}, a CDM group B is assigned to antenna ports {#2, #3, #8, #9}, and a CDM group C is assigned to antenna ports {#4, #5, #10, #11}, DMRS antenna ports for three layers may be {#0, #1, #6}, {#2, #3, #8}, {#4, #5, #10}, or {#7, #9, #11}. Herein, antenna ports {#7, #9, #11} may not be used. Herein, codeword 1 is not used.

When four layers are used in a second DMRS configuration type, codeword 0 may be used as antenna ports #0~#3, #0/#1/#6/#7, #2/#3/#8/#9, or #4/#5/#10/#11. When a CDM group is configured with one symbol, considering that a CDM group A is assigned to antenna ports {#0, #1}, a CDM group B is assigned antenna ports {#2, #3}, and a CDM group C is assigned to antenna ports {#4, #5}, DMRS antenna ports for four layers may be {#0, #1, #2, #3}. In addition, when a CDM group is configured with two symbols, considering that a CDM group A is assigned to antenna ports {#0, #1, #6, #7}, a CDM group B is assigned to antenna ports {#2, #3, #8, #9}, and a CDM group C is assigned to antenna ports {#4, #5, #10, #11}, DMRS antenna ports for four layers may be {#0, #1, #6, #7}, {#2, #3, #8, #9}, or {#4, #5, #10, #11}. Herein, codeword 1 is not used.

When five layers are used in a second DMRS configuration type, codeword 0 may be used as antenna ports #0~#1, and codeword 1 may be used as antenna ports #2~#4. This corresponds to a case where a CDM group is configured with one symbol, considering that CDM group A is assigned to antenna ports {#0, #1}, a CDM group B is assigned to antenna ports {#2, #3}, and a CDM group C is assigned to antenna ports {#4, #5}, DMRS antenna ports for five layers may be {#0, #1, #2, #3, #4}.

Alternatively, when five layers are used in a second DMRS configuration type, codeword 0 may be used as antenna ports #0~#1 and codeword 1 may be used as antenna ports #2/#3/#8. This correspond to a case where a CDM group is configured with two symbols, considering that a CDM group A is assigned to antenna ports {#0, #1, #6, #7}, a CDM group B is assigned to antenna ports {#2, #3, #8, #9}, and a CDM group C is assigned to antenna ports {#4, #5, #10, #11}, DMRS antenna ports for five layers may be {#0, #1, #2, #3, #8}. In other words, antenna ports transmitted through codeword 0 may correspond to two antenna ports in order from the lowest antenna port index among antenna ports corresponding to a CDM group A, and antenna ports transmitted through codeword 1 may correspond to three antenna ports in order from the lowest antenna port index among antenna ports corresponding to a CDM group B.

When six layers are used in a second DMRS configuration type, codeword 0 may be used as antenna ports #0~#2 and codeword 1 may be used as antenna port #3~#5. This corresponds to a case where a CDM group is configured with one symbol, considering that a CDM group A is assigned to antenna ports {#0, #1}, a CDM group B is assigned to antenna ports {#2, #3}, and a CDM group C is assigned to antenna ports {#4, #5}, DMRS antenna ports for six layers may be {#0, #1, #2, #3, #4, #5}.

Alternatively, when six layers are used in a second DMRS configuration type, codeword 0 may be used as antenna ports #0/#1/#6 and codeword 1 is used as antenna ports #2/#3/#8. This corresponds to a case where a CDM group is configured with two symbols, considering that a CDM group A is assigned to antenna ports {#0, #1, #6, #7}, a CDM group B is assigned to antenna ports {#2, #3, #8, #9}, and a CDM group C is assigned to antenna ports {#4, #5, #10, #11}, DMRS antenna ports for six layers may be {#0, #1, #6, #2, #3, #8}. In other words, antenna ports transmitted through codeword 0 may correspond to three antenna ports in order from the lowest antenna port index among antenna ports corresponding to a CDM group A, and antenna ports transmitted through codeword 1 may correspond three antenna ports in order from the lowest antenna port index among antenna ports corresponding to a CDM group B.

When seven layers are used in a second DMRS configuration type, codeword 0 may be used as antenna ports #0/#1/#6 and codeword 1 may be used as antenna ports #2/#3/#8/#9. This corresponds to a case where a CDM group is configured with two symbols, considering that a CDM group A is assigned to antenna ports {#0, #1, #6, #7}, a CDM group B is assigned to antenna ports {#2, #3, #8, #9}, and a CDM group C is assigned to antenna ports {#4, #5, #10, #11}, DMRS antenna ports for seven layers may be {#0, #1, #6, #2, #3, #8, #9}. In other words, antenna ports transmitted through codeword 0 may correspond to three antenna ports in order from the lowest antenna port index among antenna ports corresponding to a CDM group A, and antenna ports transmitted through codeword 1 may correspond to four antenna ports in order from the lowest antenna port index among antenna ports corresponding to a CDM group B.

When eight layers are used in a second DMRS configuration type, codeword 0 may be used as antenna ports #0/#1/#6/#7 and codeword 1 may be used as antenna ports #2/#3/#8/#9. This corresponds to a case where a CDM group is configured with two symbols, considering that a CDM group A is assigned to antenna ports {#0, #1, #6, #7}, a CDM group B is assigned to antenna ports {#2, #3, #8, #9}, and a CDM group C is assigned to antenna ports {#4, #5, #10, #11}, DMRS antenna ports for eight layers may be {#0, #1, #6, #7, #2, #3, #8, #9}. In other words, antenna ports transmitted through codeword 0 may correspond to four antenna ports in order from the lowest antenna port index among antenna ports corresponding to a CDM group A, and antenna ports transmitted through codeword 1 may correspond to four antenna ports in order from the lowest antenna port index among antenna ports corresponding to a CDM group B.

Among the above cases, in a first DMRS configuration type using two symbols, when a specific terminal transmits N DMRSs by using two codewords (N=5, 6, 7, 8), antenna ports transmitted through codeword 0 and antenna ports transmitted through codeword 1 of the two codewords are antenna ports belonging to CDM groups different from each other. In detail, antenna ports transmitted through codeword 0 may correspond to $\lfloor N/2 \rfloor$ antenna ports in order from the lowest antenna port index among antenna ports corresponding to a Comb pattern A, and antenna ports transmitted through codeword 1 may correspond to $\lceil N/2 \rceil$ antenna ports in order from the lowest antenna port index among antenna ports corresponding to a Comb pattern B.

In addition, among the above cases, in a second DMRS configuration type using two symbols, when a specific terminal transmits N DMRSs by using two codewords (N=5, 6, 7, 8), antenna ports transmitted through codeword 0 and antenna ports transmitted through codeword 1 of the two codewords are antenna ports belonging to CDM groups different from each other. In detail, antenna port transmitted through codeword 0 may correspond to $\lfloor N/2 \rfloor$ antenna ports in order from the lowest antenna port index among antenna ports corresponding to a CDM group A, and antenna port transmitted through codeword 1 may corresponds to $\lceil N/2 \rceil$ antenna ports in order from the lowest antenna port index among antenna ports corresponding to a CDM group B.

Hereinafter, a method of configuring, by the base station, DMRS information in the NR system, and indicating the same will be described.

As a first embodiment, in case of a first DMRS configuration type based on an IFDMA, the base station may indicate by using one table a number of DMRS symbols (one or two), a number of layers, an antenna port number, a co-scheduled CDM group (or a number of co-scheduled CDM groups) which are used by the terminal. Herein, a number of layers and an antenna port number in accordance therewith may consider the below cases.

In a SU-MIMO, for a DMRS configuration using one symbol, up to four layers an antenna port number in accordance therewith, and for a DMRS configuration using two symbols, up to eight layers an antenna port number in accordance therewith may be classified.

In an MU-MIMO, for a DMRS configuration using one symbol, up to two layers an antenna port number in accordance therewith, and for a DMRS configuration using two symbols, up to four layers and an antenna port number in accordance therewith may be classified for each terminal.

In an MU-MIMO, for a DMRS configuration using one symbol, up to four layers and an antenna port number in accordance therewith, and for a DMRS configuration using two symbols, up to eight layers and an antenna port number in accordance therewith may be classified for across all terminals.

For rate-matching, a co-scheduled CDM group may be indicated. However, herein, rather than indicating all co-scheduled CDM groups for another terminals, when the base station indicates a scheduled CDM group for a corresponding terminal, and the base station may indicate co-scheduled CDM groups (or a number of co-scheduled CDM groups) according to the ruled mentioned in Tables 7 and 8.

Herein, the table may be indicated by being included in a signaling field of downlink control information (DCI) for each terminal.

When indicating one codeword (when codeword 0 is used and codeword 1 is not used), the table may be as Table 77 below.

TABLE 77

| Bit value | Number of Symbol(s) | Number of layer(s) | Antenna port number | (Number of) Co-scheduled CDM group(s) |
|---|---|---|---|---|
| 0 | 1 | 1 | #0 | 0 |
| 1 | 1 | 1 | #0 | 1 (Comb pattern B) |

TABLE 77-continued

| Bit value | Number of Symbol(s) | Number of layer(s) | Antenna port number | (Number of) Co-scheduled CDM group(s) |
|---|---|---|---|---|
| 2 | 1 | 1 | #1 | 0 |
| 3 | 1 | 1 | #1 | 1 (Comb pattern B) |
| 4 | 1 | 1 | #2 | 1 (Comb pattern A) |
| 5 | 1 | 1 | #3 | 1 (Comb pattern A) |
| 6 | 1 | 2 | #0, #1 | 0 |
| 7 | 1 | 2 | #0, #1 | 1 (Comb pattern B) |
| 8 | 1 | 2 | #2, #3 | 1 (Comb pattern A) |
| 9 | 1 | 3 | #0~#2 | 0 |
| 10 | 1 | 4 | #0~#3 | 0 |
| 11 | 2 | 1 | #0 | 0 |
| 12 | 2 | 1 | #0 | 1 (Comb pattern B) |
| 13 | 2 | 1 | #1 | 0 |
| 14 | 2 | 1 | #1 | 1 (Comb pattern B) |
| 15 | 2 | 1 | #2 | 1 (Comb pattern A) |
| 16 | 2 | 1 | #3 | 1 (Comb pattern A) |
| 17 | 2 | 1 | #4 | 0 |
| 18 | 2 | 1 | #4 | 1 (Comb pattern B) |
| 19 | 2 | 1 | #5 | 0 |
| 20 | 2 | 1 | #5 | 1 (Comb pattern B) |
| 21 | 2 | 1 | #6 | 1 (Comb pattern A) |
| 22 | 2 | 1 | #7 | 1 (Comb pattern A) |
| 23 | 2 | 2 | #0, #1 | 0 |
| 24 | 2 | 2 | #0, #1 | 1 (Comb pattern B) |
| 25 | 2 | 2 | #2, #3 | 1 (Comb pattern A) |
| 26 | 2 | 2 | #4, #5 | 0 |
| 27 | 2 | 2 | #4, #5 | 1 (Comb pattern B) |
| 28 | 2 | 2 | #6, #7 | 1 (Comb pattern A) |
| 29 | 2 | 3 | #0, #1, #4 | 0 |
| 30 | 2 | 3 | #0, #1, #4 | 1 (Comb pattern B) |
| 31 | 2 | 3 | #2, #3, #6 | 1 (Comb pattern A) |
| 32 | 2 | 4 | #0, #1, #4, #5 | 0 |
| 33 | 2 | 4 | #0, #1, #4, #5 | 1 (Comb pattern B) |
| 34 | 2 | 4 | #2, #3, #6, #7 | 1 (Comb pattern A) |
| 35 | | | Reserved | |
| ... | | | ... | |
| 63 | | | Reserved | |

In Table 77, bit values may be out of order, and messages included in Table 77 may be identical. Detailed content thereof may follow content of FIGS. 22 to 26 and Tables 70 to 76.

In Table 77, a DMRS antenna port corresponding to a Comb pattern A and a Comb pattern B are as follows.

In case of a first DMRS configuration type using one symbol, DMRS antenna ports corresponding to a Comb pattern A is #0 and #1, and DMRS antenna ports corresponding to a Comb pattern B are #2 and #3.

In case of a first DMRS configuration type using two symbols, DMRS antenna ports corresponding to a Comb pattern A are #0, #1, #4, and #5, and DMRS antenna ports corresponding to a Comb pattern B are #2, #3, #6, and #7.

Herein, a Comb pattern group is configured with antenna ports using the same RE pattern. The antenna ports may share the same RE resources, classified into CS values or FD-OCCs or both, and may be defined as a CDM group as like as a second DMRS configuration type.

Meanwhile, when indicating two codewords (when codeword 0 and codeword 1 are used), the table is as Table 78 below.

TABLE 78

| Bit value | Number of Symbol(s) | Number of layer(s) | Antenna port number | (Number of) Co-scheduled CDM group(s) |
|---|---|---|---|---|
| 0 | 2 | 5 | #0, #1, #2, #3, #6 | 0 |
| 1 | 2 | 6 | #0, #1, #4, #2, #3, #6 | 0 |
| 2 | 2 | 7 | #0, #1, #4, #2, #3, #6, #7 | 0 |
| 3 | 2 | 8 | #0, #1, #4, #5, #2, #3, #6, #2 | 0 |
| 4 | | | Reserved | |
| ... | | | ... | |
| 63 | | | Reserved | |

In Table 78, bit values may be out of order, but messages included in Table 78 may be identical. Detailed content thereof may follow content of FIGS. 22 to 26 and Tables 70 to 76.

Meanwhile, in a case of a first DMRS configuration type based on an IFDMA, the base station may indicate a number of DMRS symbols (one or two), a number of layers, an antenna port number and a co-scheduled CDM group (or a number of co-scheduled CDM groups) which are used for a corresponding terminal by using two tables by codewords (a first according to Table 9, and a second table according to Table 10). Herein, the first table actually includes 35 types of bit values excluding a "Reserved" bit value (bit value 0~bit value 34). The second table actually includes four types of bit values excluding a "Reserved" bit value (bit value 0~bit value 3). Values of the respective tables may be indicated by using a signaling field of 6 bits and which is included in DCI. This is because, signaling of 6 bits is required in order to configure up to 35 types configurations of Table 77.

In addition, in a case of a first DMRS configuration type based on an IFDMA, the base station may indicate a number of DMRS symbols (one or two), a number layers, an antenna port number, and a co-scheduled CDM group (or a number of co-scheduled CDM groups) which are used for a corresponding terminal by using three tables by codewords. Herein, a first table may be configured with cases of using one symbol in Table 77. In other words, in the first table, a configuration of using one symbol and using one codeword among configurations of Table 77 may be included. Herein, the first table actually includes 11 types of bit values excluding a "Reserved" bit value (bit value 0~bit value 10). A second table may be configured with cases using two symbols in Table 77. In other words, in the second table, a configuration using two symbols and using one codeword may be included. Herein, the second table actually includes 24 types of bit values excluding a "Reserved" bit value (bit value 11~bit value 34). A third table may be configured as Table 78. Herein, the third table actually includes 4 types of bit values excluding a "Reserved" bit value (bit value 0~bit value 3). Values of the respective tables may be indicated by using a signaling field with 5 bits and which is included in DCI. This is because signaling of 5 bits is required in order to configure up to 24 types configurations of Table 77. Herein, by using an additional signaling field having 1 bit and which is included in DCI, whether a corresponding table is configured with one symbol or with two symbols may be indicated.

Meanwhile, in case of a second DMRS configuration type based on a CDM, the base station may indicate a number of DMRS symbols (one or two), a number layers, an antenna port number, and a co-scheduled CDM group (or a number of co-scheduled CDM groups) which are used for a corresponding terminal by using one table. Herein, a number layers and an antenna port number in association therewith may consider the cases below.

- In a SU-MIMO, for a DMRS configuration using one symbol, up to six layers and an antenna port number in association therewith, and for a DMRS configuration using two symbols, up to eight layers and an antenna port number in association therewith may be respectively classified.
- In an MU-MIMO, for a DMRS configuration using one symbol, up to four layers and an antenna port number in association therewith, and for a DMRS configuration using two symbols, up to four layers and an antenna port number in association therewith may be respectively classified for each terminal.
- In an MU-MIMO, for a DMRS configuration using one symbol, up to six layers and an antenna port number in association therewith, and for a DMRS configuration using two symbols, up to twelve layers and an antenna port number in association therewith may be classified for across all terminals.
- For rate-matching, a co-scheduled CDM group may be indicated. However, herein, rather than indicating all co-scheduled CDM groups for another terminal when the base station indicates a scheduled CDM group for a corresponding terminal, the base terminal may indicate a scheduled CDM group according to the rule mentioned with Tables 75 and 76 (or a number of co-scheduled CDM groups).
- Herein, the table may be indicated by being including in a signaling field of DCI for each terminal.

When indicating one codeword (when codeword 0 is used and codeword 1 is not used), the table becomes as Table 79 below.

TABLE 79

| Bit value | Number of Symbol(s) | Number of layer(s) | Antenna port number | (Number of) Co-scheduled CDM group(s) |
|---|---|---|---|---|
| 0 | 1 | 1 | #0 | 0 |
| 1 | 1 | 1 | #0 | 1 (CDM group B) |
| 2 | 1 | 1 | #0 | 2 (CDM group B, C) |
| 3 | 1 | 1 | #1 | 0 |
| 4 | 1 | 1 | #1 | 1 (CDM group B) |
| 5 | 1 | 1 | #1 | 2 (CDM group B, C) |
| 6 | 1 | 1 | #2 | 1 (CDM group A) |
| 7 | 1 | 1 | #2 | 2 (CDM group A, C) |
| 8 | 1 | 1 | #3 | 1 (CDM group A) |
| 9 | 1 | 1 | #3 | 2 (CDM group A, C) |
| 10 | 1 | 1 | #4 | 2 (CDM group A, B) |
| 11 | 1 | 1 | #5 | 2 (CDM group A, B) |
| 12 | 1 | 2 | #0, #1 | 0 |
| 13 | 1 | 2 | #0, #1 | 1 (CDM group B) |
| 14 | 1 | 2 | #0, #1 | 2 (CDM group B, C) |
| 15 | 1 | 2 | #2, #3 | 1 (CDM group A) |
| 16 | 1 | 2 | #2, #3 | 2 (CDM group A, C) |
| 17 | 1 | 2 | #4, #5 | 2 (CDM group A, B) |
| 18 | 1 | 3 | #0, #1, #2 | 0 |
| 19 | 1 | 3 | #0, #1, #2 | 1 (CDM group C) |
| 20 | 1 | 3 | #3, #4, #5 | 1 (CDM group A) |
| 21 | 1 | 4 | #0, #1, #2, #3 | 0 |
| 22 | 1 | 4 | #0, #1, #2, #3 | 1 (CDM group C) |
| 23 | 2 | 1 | #0 | 0 |
| 24 | 2 | 1 | #0 | 1 (CDM group B) |
| 25 | 2 | 1 | #0 | 2 (CDM group B, C) |
| 26 | 2 | 1 | #1 | 0 |
| 27 | 2 | 1 | #1 | 1 (CDM group B) |
| 28 | 2 | 1 | #1 | 2 (CDM group B, C) |
| 29 | 2 | 1 | #2 | 1 (CDM group A) |
| 30 | 2 | 1 | #2 | 2 (CDM group A, C) |
| 31 | 2 | 1 | #3 | 1 (CDM group A) |
| 32 | 2 | 1 | #3 | 2 (CDM group A, C) |

TABLE 79-continued

| Bit value | Number of Symbol(s) | Number of layer(s) | Antenna port number | (Number of) Co-scheduled CDM group(s) |
|---|---|---|---|---|
| 33 | 2 | 1 | #4 | 2 (CDM group A, B) |
| 34 | 2 | 1 | #5 | 2 (CDM group A, B) |
| 35 | 2 | 1 | #6 | 0 |
| 36 | 2 | 1 | #6 | 1 (CDM group B) |
| 37 | 2 | 1 | #6 | 2 (CDM group B, C) |
| 38 | 2 | 1 | #7 | 0 |
| 39 | 2 | 1 | #7 | 1 (CDM group B) |
| 40 | 2 | 1 | #7 | 2 (CDM group B, C) |
| 41 | 2 | 1 | #8 | 1 (CDM group A) |
| 42 | 2 | 1 | #8 | 2 (CDM group A, C) |
| 43 | 2 | 1 | #9 | 1 (CDM group A) |
| 44 | 2 | 1 | #9 | 2 (CDM group A, C) |
| 45 | 2 | 1 | #10 | 2 (CDM group A, B) |
| 46 | 2 | 1 | #11 | 2 (CDM group A, B) |
| 47 | 2 | 2 | #0, #1 | 0 |
| 48 | 2 | 2 | #0, #1 | 1 (CDM group B) |
| 49 | 2 | 2 | #0, #1 | 2 (CDM group B, C) |
| 50 | 2 | 2 | #2, #3 | 1 (CDM group A) |
| 51 | 2 | 2 | #2, #3 | 2 (CDM group A, C) |
| 52 | 2 | 2 | #4, #5 | 2 (CDM group B, C) |
| 53 | 2 | 2 | #6, #7 | 0 |
| 54 | 2 | 2 | #6, #7 | 1 (CDM group B) |
| 55 | 2 | 2 | #6, #7 | 2 (CDM group B, C) |
| 56 | 2 | 2 | #8, #9 | 1 (CDM group A) |
| 57 | 2 | 2 | #8, #9 | 2 (CDM group A, C) |
| 58 | 2 | 2 | #10, #11 | 2 (CDM group B, C) |
| 59 | 2 | 3 | #0, #1, #6 | 0 |
| 60 | 2 | 3 | #0, #1, #6 | 1 (CDM group B) |
| 61 | 2 | 3 | #0, #1, #6 | 2 (CDM group B, C) |
| 62 | 2 | 3 | #2, #3, #8 | 1 (CDM group A) |
| 63 | 2 | 3 | #2, #3, #8 | 2 (CDM group A, C) |
| 64 | 2 | 3 | #4, #5, #10 | 2 (CDM group A, B) |
| 65 | 2 | 3 | #7, #9, #11 | 0 |
| 66 | 2 | 4 | #0, #1, #6, #7 | 0 |
| 67 | 2 | 4 | #0, #1, #6, #7 | 1 (CDM group B) |
| 68 | 2 | 4 | #0, #1, #6, #7 | 2 (CDM group B, C) |
| 69 | 2 | 4 | #2, #3, #8, #9 | 1 (CDM group A) |
| 70 | 2 | 4 | #2, #3, #8, #9 | 2 (CDM group A, C) |
| 71 | 2 | 4 | #4, #5, #10, #11 | 2 (CDM group A, B) |
| 72 | | | Reserved | |
| ... | | | ... | |
| 127 | | | Reserved | |

In Table 79, bit values may be out of order, but messages include in Table 79 may be identical. Detailed content thereof may follow content of FIGS. 22 to 26 and Tables 70 to 76.

In Table 79, a DMRS antenna port corresponding to a CDM group A, a CDM group B, and a CDM group C may be as follows.

In case of a second DMRS configuration type using one symbol, DMRS antenna ports corresponding to a CDM group A are #0 and #1, DMRS antenna ports corresponding to a CDM group B are #2 and #3, and DMRS antenna ports corresponding to a CDM group C are #4 and #5.

In case of a second DMRS configuration type using two symbols, DMRS antenna ports corresponding to a CDM group A are #0, #1, #6, and #7, DMRS antenna ports corresponding to a CDM group B are #2, #3, #8, and #9, and DMRS antenna ports corresponding to a CDM group C are #4, #5, #10, and #11.

Herein, a CDM group is configured with antenna ports using the same RE pattern. The antenna ports may share the same RE resources, and may be classified into FD-OCCs or FD-OCCs or both.

Meanwhile, when indicating two codewords (when codeword 0 and codeword 1 are used), the table becomes as Table 80 below.

TABLE 80

| Bit value | Number of Symbol(s) | Number of layer(s) | Antenna port number | (Number of) Co-scheduled CDM group(s) |
|---|---|---|---|---|
| 0 | 1 | 5 | #0, #1, #2, #3, #4 | 0 |
| 1 | 1 | 6 | #0, #1, #2, #3, #4, #5 | 0 |
| 2 | 2 | 5 | #0, #1, #2, #3, #8 | 0 |
| 3 | 2 | 6 | #0, #1, #6, #2, #3, #8 | 0 |
| 4 | 2 | 7 | #0, #1, #6, #2, #3, #8, #9 | 0 |
| 5 | 2 | 8 | #0, #1, #6, #7 #2, #3, #8, #9 | 0 |
| 6 | | | Reserved | |
| ... | | | ... | |
| 127 | | | Reserved | |

In Table 80, bit values may be out of order, but messages included in Table 12 may be identical. Detailed content thereof may follow contents of FIGS. 22 to 26 and Tables 70 to 76.

Meanwhile, in case of a second DMRS configuration type based on a CDM, the base station may indicate a number of DMRS symbols (one or two), a number layers, an antenna port number, and a co-scheduled CDM group (or a number of co-scheduled CDM groups) which are used for a corresponding terminal by using two tables by codewords (a first table according to Table 79 and a second table according to Table 80). Herein, the first table actually includes 72 types of bit values excluding a "Reserved" bit value (bit value 0~bit value 71). The second table actually includes 6 types of bit values excluding a "Reserved" bit value (bit value 0~bit value 5). Values of the respective tables may be indicated by using signaling filed with 7 bits and which is included in DCI. This is because, signaling of 7 bits is required in order to configure up 72 types of configurations of Table 79.

In addition, in case of a second DMRS configuration type based on a CDM, the base station may indicate a number of DMRS symbols (one or two), a number layers, an antenna port number, and a co-scheduled CDM group (or a number of co-scheduled CDM groups) which are used for a corresponding terminal by using four tables by symbols and codewords. Herein, a first table may be configured with cases using one symbol in Table 79. In other words, the first table may include configurations using one symbol and using one codeword among configurations of Table 79. Herein, the first table actually includes 23 types of bit value excluding a "Reserved" bit value (bit value 0~bit value 22). A second table may be configured with cases using two symbols in Table 79. In other words, the second table may include configurations using two symbols and using one codeword among configurations of Table 79. Herein, the second table actually includes 49 types of bit values excluding a "Reserved" bit value (bit value 23~bit value 71). A third table may be configured with cases using one symbol in Table 80. In other words, the third table may include configurations using one symbol and using two codewords of Table 80. Herein, the third table actually includes 2 types of bit values excluding a "Reserved" bit value (bit value 0 bit value 1). A fourth table may be configured with cases using two symbols in Table 80. In other words, the fourth table includes configurations using two symbols and using two codewords of Table 80. Herein, the fourth table actually includes four types of bit value excluding a "Reserved" bit value (bit value 2~bit value 5). Values of the respective tables may be indicated by using a signaling field with 6 bits and which is included in DCI. This is because, signaling of 6 bits is required to configure up 49 types of configurations using two symbols in Table 11. Herein, by using an additional signaling field of 1 bit, whether a corresponding table is configured with one symbol or two symbols may be indicated.

Meanwhile, in a case of a second DMRS configuration type based on a CDM, the remaining factors are identical. However, the base station may follow the rule mentioned with Table 81 below when indicating a co-scheduled CDM group for rate-matching.

TABLE 81

| Case | DMRS configuration | CDM group used by specific terminal | Number of additionally considered co-scheduled CDM groups |
|---|---|---|---|
| Case 1 | Configuration type 1 | Comb pattern A | 0 |
| Case 2 | | Comb pattern A | 1 (Comb pattern B) |
| Case 3 | | Comb pattern B | 1 (Comb pattern A) |
| Case 4 | | Comb pattern A, B | 0 |
| Case 5 | Configuration type 2 | CDM group A | 0 |
| Case 6 | | CDM group A | 2 (CDM group B, C) |
| Case 7 | | CDM group B | 1 (CDM group A) |
| Case 8 | | CDM group B | 2 (CDM group A, C) |
| Case 9 | | CDM group C | 2 (CDM group A, B) |
| Case 10 | | CDM group A, B | 0 |
| Case 11 | | CDM group A, B | 1 (CDM group C) |
| Case 12 | | CDM group A, B, C | 0 |

In Table 76, for a second DMRS configuration type, when a CDM group used by a specific terminal is a CDM group A, a number of additionally considered co-scheduled CDM groups is classified into three cases: may be 0, may be 1 (herein, a CDM group B is co-scheduled), or may be 2 (herein, a CDM group B and a CDM group C are co-scheduled).

However, in Table 81, for a second DMRS configuration type, when a CDM group used by a specific terminal is a CDM group A, a number of additionally considered co-scheduled CDM groups is classified into two cases: may be 0, or may be 1 or 2 (herein, a CDM group B is co-scheduled, or a CDM group B and a CDM group C are co-scheduled).

In other words, in Table 81, in order to reduce a number of cases, for a second DMRS configuration type, when a CDM group used by a specific terminal is a CDM group A, a number of additionally considered co-scheduled CDM groups may be signaled by combining a case where a number of co-scheduled CDM groups is one and a case of being two. Herein, the terminal may not obtain information of whether a co-scheduled CDM group is one or two, thus rate-matching is performed by assuming that the co-scheduled CDM group is two. Accordingly, Table 79 may be changed to Table 82 below according to the rule mentioned in Table 81. However, herein, Table 80 may be used as it is.

TABLE 82

| Bit value | Number of Symbol(s) | Number of layer(s) | Antenna port number | (Number of) Co-scheduled CDM group(s) |
|---|---|---|---|---|
| 0 | 1 | 1 | #0 | 0 |
| 1 | 1 | 1 | #0 | 2 (CDM group B, C) |
| 2 | 1 | 1 | #1 | 0 |
| 3 | 1 | 1 | #1 | 2 (CDM group B, C) |
| 4 | 1 | 1 | #2 | 1 (CDM group A) |
| 5 | 1 | 1 | #2 | 2 (CDM group A, C) |

TABLE 82-continued

| Bit value | Number of Symbol(s) | Number of layer(s) | Antenna port number | (Number of) Co-scheduled CDM group(s) |
|---|---|---|---|---|
| 6 | 1 | 1 | #3 | 1 (CDM group A) |
| 7 | 1 | 1 | #3 | 2 (CDM group A, C) |
| 8 | 1 | 1 | #4 | 2 (CDM group A, B) |
| 9 | 1 | 1 | #5 | 2 (CDM group A, B) |
| 10 | 1 | 2 | #0, #1 | 0 |
| 11 | 1 | 2 | #0, #1 | 2 (CDM group B, C) |
| 12 | 1 | 2 | #2, #3 | 1 (CDM group A) |
| 13 | 1 | 2 | #2, #3 | 2 (CDM group A, C) |
| 14 | 1 | 2 | #4, #5 | 2 (CDM group A, B) |
| 15 | 1 | 3 | #0, #1, #2 | 0 |
| 16 | 1 | 3 | #0, #1, #2 | 1 (CDM group C) |
| 17 | 1 | 3 | #3, #4, #5 | 1 (CDM group A) |
| 18 | 1 | 4 | #0, #1, #2, #3 | 0 |
| 19 | 1 | 4 | #0, #1, #2, #3 | 1 (CDM group C) |
| 20 | 2 | 1 | #0 | 0 |
| 21 | 2 | 1 | #0 | 2 (CDM group B, C) |
| 22 | 2 | 1 | #1 | 0 |
| 23 | 2 | 1 | #1 | 2 (CDM group B, C) |
| 24 | 2 | 1 | #2 | 1 (CDM group A) |
| 25 | 2 | 1 | #2 | 2 (CDM group A, C) |
| 26 | 2 | 1 | #3 | 1 (CDM group A) |
| 27 | 2 | 1 | #3 | 2 (CDM group A, C) |
| 28 | 2 | 1 | #4 | 2 (CDM group A, B) |
| 29 | 2 | 1 | #5 | 2 (CDM group A, B) |
| 30 | 2 | 1 | #6 | 0 |
| 31 | 2 | 1 | #6 | 2 (CDM group B, C) |
| 32 | 2 | 1 | #7 | 0 |
| 33 | 2 | 1 | #7 | 2 (CDM group B, C) |
| 34 | 2 | 1 | #8 | 1 (CDM group A) |
| 35 | 2 | 1 | #8 | 2 (CDM group A, C) |
| 36 | 2 | 1 | #9 | 1 (CDM group A) |
| 37 | 2 | 1 | #9 | 2 (CDM group A, C) |
| 38 | 2 | 1 | #10 | 2 (CDM group A, B) |
| 39 | 2 | 1 | #11 | 2 (CDM group A, B) |
| 40 | 2 | 2 | #0, #1 | 0 |
| 41 | 2 | 2 | #0, #1 | 2 (CDM group B, C) |
| 42 | 2 | 2 | #2, #3 | 1 (CDM group A) |
| 43 | 2 | 2 | #2, #3 | 2 (CDM group A, C) |
| 44 | 2 | 2 | #4, #5 | 2 (CDM group B, C) |
| 45 | 2 | 2 | #6, #7 | 0 |
| 46 | 2 | 2 | #6, #7 | 2 (CDM group B, C) |
| 47 | 2 | 2 | #8, #9 | 1 (CDM group A) |
| 48 | 2 | 2 | #8, #9 | 2 (CDM group A, C) |
| 49 | 2 | 2 | #10, #11 | 2 (CDM group B, C) |
| 50 | 2 | 3 | #0, #1, #6 | 0 |
| 51 | 2 | 3 | #0, #1, #6 | 2 (CDM group B, C) |
| 52 | 2 | 3 | #2, #3, #8 | 1 (CDM group A) |
| 53 | 2 | 3 | #2, #3, #8 | 2 (CDM group A, C) |
| 54 | 2 | 3 | #4, #5, #10 | 2 (CDM group A, B) |
| 55 | 2 | 3 | #7, #9, #11 | 0 |
| 56 | 2 | 4 | #0, #1, #6, #7 | 0 |
| 57 | 2 | 4 | #0, #1, #6, #7 | 2 (CDM group B, C) |
| 58 | 2 | 4 | #2, #3, #8, #9 | 1 (CDM group A) |
| 59 | 2 | 4 | #2, #3, #8, #9 | 2 (CDM group A, C) |
| 60 | 2 | 4 | #4, #5, #10, #11 | 2 (CDM group A, B) |
| 61 | | | Reserved | |
| 62 | | | Reserved | |
| 63 | | | Reserved | |

Meanwhile, in case of a second DMRS configuration type, the base station may indicate a number of DMRS symbols (one or two), a number layers, an antenna port number, and a co-scheduled CDM group (or a number of co-scheduled CDM groups) which are used by a corresponding terminal by using two tables by codewords (a first table according to Table 82 and a second table according to Table 13). Herein, the first table actually includes 61 types of bit value excluding a "Reserved" bit value (bit value 0~bit value 60). The second table actually includes 6 types of bit values excluding a "Reserved" bit value (bit value 0~bit value 5). Values of the respective tables may be indicated by using a signaling field with 6 bits which is included in DCI. This is because signaling of 6 bits is required in order to configure up to 61 types of configurations of Table 82.

As a second embodiment, the second embodiment is identical to the first embodiment for a first DMRS configuration type. For a second DMRS configuration type, the base station follows the rule mentioned in Tables 81 and 82. However, when indicating a co-scheduled CDM group for rate-matching, the base station may follow the rule mentioned in Table 83 below rather than following the rule mentioned in Tables 75 and 76.

TABLE 83

| Case | DMRS configuration | CDM group used by specific terminal | Additionally considered co-scheduled CDM group type |
|---|---|---|---|
| Case 1 | Configuration type 1 | Comb pattern A | 0 |
| Case 2 | | Comb pattern A | 1 |
| Case 3 | | Comb pattern B | 0 |
| Case 4 | | Comb pattern A, B | 0 |
| Case 5 | Configuration type 2 | CDM group A | 0 |
| Case 6 | | CDM group A | 1 |
| Case 7 | | CDM group B | 0 |
| Case 8 | | CDM group B | 1 |
| Case 9 | | CDM group C | 0 |
| Case 10 | | CDM group A, B | 0 |
| Case 11 | | CDM group A, B | 1 |
| Case 12 | | CDM group A, B, C | 0 |

Referring to Table 83, as a value for an additionally considered co-scheduled CDM group type, 0 or 1 is indicated. When the value is 0, for a first DMRS configuration type, 1) when a CDM group used by a specific terminal is a Comb pattern A, it is considered that a Comb pattern A is used for all terminals paired for an MU-MIMO (Case 1), 2) when a CDM group used by a specific terminal is a Comb pattern B, it is considered that a Comb pattern A and a Comb pattern B are used for all terminals paired for an MU-M (Case 3, it is assumed that a Comb pattern A is assigned, and then a Comb pattern B is assigned), 3) when a CDM group used by a specific terminal is a Comb pattern A and a Comb pattern B, it is considered that a Comb pattern A and a Comb pattern B are used for all terminals paired for an MU-MIMO (Case 4).

In addition, when the value is 0, for a second DMRS configuration type, 1) when a CDM group used by a specific terminal is a CDM group A, it is considered that a CDM group A is used for all terminals paired for an MU-MIMO (Case 5), 2) when a CDM group used by a specific terminal is a CDM group B, it is considered that a CDM group A and a CDM group B are used for all terminals paired for an MU-MI (Case 7, it is assumed that a CDM group A is assigned, and then a CDM group B is assigned), 3) when a CDM group used by a specific terminal is a CDM group C, it is considered that a CDM group A, a CDM group B, and a CDM group C are used for all terminals paired for an MU-MI (Case 9, it is assumed that a CDM group A is assigned, then a CDM group B is assigned, and then a CDM group C is assigned), 4) when a CDM group used by a specific terminal is a CDM group A and a CDM group B, it is considered that a CDM group A and a CDM group B are used for all terminals paired in an MU-MIMO (Case 10), 5) when a CDM group used by a specific terminal is a CDM group A, a CDM group B, and a CDM group C, it is considered that a CDM group A, a CDM group B, and a CDM group C are used for all terminal paired for an MU-MIMO (Case 11).

In other words, when a value for an additionally considered co-scheduled CDM group type is indicated as 0, until a CDM group used by a specific terminal may be used for all terminals paired for an MU-MIMO. For example, when a CDM group used by a specific terminal is a CDM group A, until a CDM group A is assigned. When a CDM group used by a specific terminal is a CDM group B, a CDM group A is assigned and then a CDM group B is assigned, thus until a CDM group A and a CDM group B. When a CDM group used by a specific terminal is a CDM group C, a CDM group A is assigned, then a CDM group B is assigned, and then a CDM group C is assigned, thus a CDM group A, a CDM group B, and a CDM group C are all corresponded.

When the value is 1, it is considered that a CDM group is used for all terminals paired for an MU-MIMO. In other words, in case of a first DMRS configuration type, it is considered that a Comb pattern A and a Comb pattern B are both used (Case 2), and in case of a second DMRS configuration type, it is considered that a CDM group A, a CDM group B, and a CDM group C are all used (Case 6, Case 8, and Case 11).

Accordingly, when Table 15 is considered, for the second embodiment, Tables 84 and 85 below may be used for a first DMRS configuration type, and Tables 86 and 87 below may be used for a second DMRS configuration type.

Table 85 below shows cases of indicating one codeword (codeword 0 is used and codeword 1 is not used) for a first DMRS configuration type.

TABLE 84

| Bit value | Number of Symbol(s) | Number of layer(s) | Antenna port number | Type of Co-scheduled CDM group(s) |
|---|---|---|---|---|
| 0 | 1 | 1 | #0 | 0 |
| 1 | 1 | 1 | #0 | 1 |
| 2 | 1 | 1 | #1 | 0 |
| 3 | 1 | 1 | #1 | 1 |
| 4 | 1 | 1 | #2 | 0 |
| 5 | 1 | 1 | #3 | 0 |
| 6 | 1 | 2 | #0, #1 | 0 |
| 7 | 1 | 2 | #0, #1 | 1 |
| 8 | 1 | 2 | #2, #3 | 0 |
| 9 | 1 | 3 | #0~#2 | 0 |
| 10 | 1 | 4 | #0~#3 | 0 |
| 11 | 2 | 1 | #0 | 0 |
| 12 | 2 | 1 | #0 | 1 |
| 13 | 2 | 1 | #1 | 0 |
| 14 | 2 | 1 | #1 | 1 |
| 15 | 2 | 1 | #2 | 0 |
| 16 | 2 | 1 | #3 | 0 |
| 17 | 2 | 1 | #4 | 0 |
| 18 | 2 | 1 | #4 | 1 |
| 19 | 2 | 1 | #5 | 0 |
| 20 | 2 | 1 | #5 | 1 |
| 21 | 2 | 1 | #6 | 0 |
| 22 | 2 | 1 | #7 | 0 |
| 23 | 2 | 2 | #0, #1 | 0 |
| 24 | 2 | 2 | #0, #1 | 1 |
| 25 | 2 | 2 | #2, #3 | 0 |
| 26 | 2 | 2 | #4, #5 | 0 |
| 27 | 2 | 2 | #4, #5 | 1 |
| 28 | 2 | 2 | #6, #7 | 0 |
| 29 | 2 | 3 | #0, #1, #4 | 0 |
| 30 | 2 | 3 | #0, #1, #4 | 1 |
| 31 | 2 | 3 | #2, #3, #6 | 0 |
| 32 | 2 | 4 | #0, #1, #4, #5 | 0 |
| 33 | 2 | 4 | #0, #1, #4, #5 | 1 |
| 34 | 2 | 4 | #2, #3, #6, #7 | 0 |
| 35 | | | Reserved | |
| ... | | | ... | |
| 63 | | | Reserved | |

In Table 84, bit values may be out of order, but messages included in Table 16 may be identical. Detailed content thereof ma follow contents of FIGS. 22 to 26 and Tables 70 to 73, and 83.

In Table 84, a DMRS antenna port corresponding to a Comb pattern A and a Comb pattern B are as follows.

In case of a first DMRS configuration type using one symbol, DMRS antenna ports corresponding to a Comb pattern A are #0 and #1, DMRS antenna ports corresponding to a Comb pattern B are #2 and #3.

In case of a first DMRS configuration type using two symbols, DMRS antenna ports corresponding to a Comb pattern A are #0, #1, #4, and #5, DMRS antenna ports corresponding to a Comb pattern B are #2, #3, #6, and #7.

Herein, a Comb pattern group is configured with antenna ports using the same RE pattern. The antenna ports may share the same RE resources, may be classified into CS values or FD-OCCs or both, and may be defined as a CDM group as like as a second DMRS configuration pattern.

Table 85 below shows cases of indicating two codewords (codeword 0 and codeword 1 are used) for a first DMRS configuration type.

TABLE 85

| Bit value | Number of Symbol(s) | Number of layer(s) | Antenna port number | Type of Co-scheduled CDM group(s) |
|---|---|---|---|---|
| 0 | 2 | 5 | #0, #1, #2, #3, #6 | 0 |
| 1 | 2 | 6 | #0, #1, #4, #2, #3, #6 | 0 |
| 2 | 2 | 7 | #0, #1, #4, #2, #3, #6, #7 | 0 |
| 3 | 2 | 8 | #0, #1, #4, #5, #2, #3, #6, #7 | 0 |
| 4 | | | Reserved | |
| ... | | | ... | |
| 63 | | | Reserved | |

In Table 85, bit values may be out of order, but messages included in Table 85 may be identical. Detailed content thereof may follow content of FIGS. 22 to 26 and Tables 70 to 76, and 83.

Table 86 below shows cases of indicating one codeword (codeword 0 is used and codeword 1 is not used) for a second DMRS configuration type.

TABLE 86

| Bit value | Number of Symbol(s) | Number of layer(s) | Antenna port number | Type of Co-scheduled CDM group(s) |
|---|---|---|---|---|
| 0 | 1 | 1 | #0 | 0 |
| 1 | 1 | 1 | #0 | 1 |
| 2 | 1 | 1 | #1 | 0 |
| 3 | 1 | 1 | #1 | 1 |
| 4 | 1 | 1 | #2 | 0 |
| 5 | 1 | 1 | #2 | 1 |
| 0 | 1 | 1 | #3 | |
| 1 | 1 | 1 | #3 | |
| 0 | 1 | 1 | #4 | |
| 0 | 1 | 1 | #5 | |
| 0 | 1 | 2 | #0, #1 | |
| 11 | 1 | 2 | #0, #1 | 1 |
| 12 | 1 | 2 | #2, #3 | 0 |
| 13 | 1 | 2 | #2, #3 | 1 |
| 14 | 1 | 2 | #4, #5 | 0 |
| 15 | 1 | 3 | #0, #1, #2 | 0 |
| 16 | 1 | 3 | #0, #1, #2 | 1 |
| 17 | 1 | 3 | #3, #4, #5 | 0 |

TABLE 86-continued

| Bit value | Number of Symbol(s) | Number of layer(s) | Antenna port number | Type of Co-scheduled CDM group(s) |
|---|---|---|---|---|
| 18 | 1 | 4 | #0, #1, #2, #3 | 0 |
| 19 | 1 | 4 | #0, #1, #2, #3 | 1 |
| 20 | 2 | 1 | #0 | 0 |
| 21 | 2 | 1 | #0 | 1 |
| 22 | 2 | 1 | #1 | 0 |
| 23 | 2 | 1 | #1 | 1 |
| 24 | 2 | 1 | #2 | 0 |
| 25 | 2 | 1 | #2 | 1 |
| 26 | 2 | 1 | #3 | 0 |
| 27 | 2 | 1 | #3 | 1 |
| 28 | 2 | 1 | #4 | 0 |
| 29 | 2 | 1 | #5 | 0 |
| 30 | 2 | 1 | #6 | 0 |
| 31 | 2 | 1 | #6 | 1 |
| 32 | 2 | 1 | #7 | 0 |
| 33 | 2 | 1 | #7 | 1 |
| 34 | 2 | 1 | #8 | 0 |
| 35 | 2 | 1 | #8 | 1 |
| 36 | 2 | 1 | #9 | 0 |
| 37 | 2 | 1 | #9 | 1 |
| 38 | 2 | 1 | #10 | 0 |
| 39 | 2 | 1 | #11 | 0 |
| 40 | 2 | 2 | #0, #1 | 0 |
| 41 | 2 | 2 | #0, #1 | 1 |
| 42 | 2 | 2 | #2, #3 | 0 |
| 43 | 2 | 2 | #2, #3 | 1 |
| 44 | 2 | 2 | #4, #5 | 0 |
| 45 | 2 | 2 | #6, #7 | 0 |
| 46 | 2 | 2 | #6, #7 | 1 |
| 47 | 2 | 2 | #8, #9 | 0 |
| 48 | 2 | 2 | #8, #9 | 1 |
| 49 | 2 | 2 | #10, #11 | 0 |
| 50 | 2 | 3 | #0, #1, #6 | 0 |
| 51 | 2 | 3 | #0, #1, #6 | 1 |
| 52 | 2 | 3 | #2, #3, #8 | 0 |
| 53 | 2 | 3 | #2, #3, #8 | 1 |
| 54 | 2 | 3 | #4, #5, #10 | 0 |
| 55 | 2 | 3 | #7, #9, #11 | 0 |
| 56 | 2 | 4 | #0, #1, #6, #7 | 0 |
| 57 | 2 | 4 | #0, #1, #6, #7 | 1 |
| 58 | 2 | 4 | #2, #3, #8, #9 | 0 |
| 59 | 2 | 4 | #2, #3, #8, #9 | 1 |
| 60 | 2 | 4 | #4, #5, #10, #11 | 0 |
| 61 | | | Reserved | |
| 62 | | | Reserved | |
| 63 | | | Reserved | |

In Table 86, bit values may be out of order, but messages included in Table 18 may be identical. Detailed content thereof may follow content of FIGS. 2 to 6 and Tables 2 to 5, and 15.

In Table 86, a DMRS antenna port corresponding to a CDM group A, a CDM group B, and a CDM group C is as follows.

In case of a second DMRS configuration type using one symbol, DMRS antenna ports corresponding to a CDM group A are #0 and #1, DMRS antenna ports corresponding to a CDM group B are #2 and #3, and DMRS antenna ports corresponding to a CDM group C are #4 and #5.

In case of a second DMRS configuration type using two symbols, DMRS antenna ports corresponding to a CDM group A are #0, #1, #6, and #7, DMRS antenna ports corresponding to a CDM group B are #2, #3, #8, and #9, and DMRS antenna ports corresponding to a CDM group C are #4, #5, #10, and #11.

Herein, a CDM group may be configured with antenna ports using the same RE pattern. The antenna ports may share the same RE resources, and may be classified into FD-OCCs or FD-OCCs or both.

Table 87 below shows cases of indicate two codewords (codeword 0 and codeword 1 are used) for a second DMRS configuration type.

TABLE 87

| Bit value | Number of Symbol(s) | Number of layer(s) | Antenna port number | (Number of) Co-scheduled CDM group(s) |
|---|---|---|---|---|
| 0 | 1 | 5 | #0, #1, #2, #3, #4 | 0 |
| 1 | 1 | 6 | #0, #1, #2, #3, #4, #5 | 0 |
| 2 | 2 | 5 | #0, #1, #2, #3, #8 | 0 |
| 3 | 2 | 6 | #0, #1, #6, #2, #3, #8 | 0 |
| 4 | 2 | 7 | #0, #1, #6, #2, #3, #8, #9 | 0 |
| 5 | 2 | 8 | #0, #1, #6, #7, #2, #3, #8, #9 | 0 |
| 6 | | | Reserved | |
| ... | | | ... | |
| 127 | | | Reserved | |

In Table 87, bit values may be out of order, but messages included in Table 19 may be identical. Detailed content thereof may follow content of FIGS. 22 to 26 and Tables 70 to 73, and 83.

FIG. 27 is a view showing a method of transmitting a downlink DMRS in an embodiment of the present invention.

Referring to FIG. 27, for a downlink case, in step S2710, the base station may determine a DMRS configuration type of a DMRS (DL DMRS) to be transmitted to the terminal among a first DMRS configuration type and a second DMRS configuration type. In step S2720, the base station may transmit to the terminal information of the determined DMRS configuration type by using high layer signaling such as radio resource control (RRC). In addition, in step S2730, the base station may determine a number layers, an antenna port number, a number of symbols, and CDM group(s) used according to an MU-MIMO of the DMRS to be transmitted to the terminal within the determined DMRS configuration type. In step S2730, the base station may transmit the same to the terminal by using DCI. Herein, the base station may configure the DCI according to at least one specific rule mentioned in Tables 69 to 879.

Then, in step S2750, the base station configures a downlink DMRS based on information of the determined DMR configuration type, and information of the number layers, antenna port number, the number of symbols, the CDM group(s) used according to an MU-MIMO which are determined within the determined DMRS configuration type. Then, in step S2760, the base station may transmit the configured downlink DMRS to the terminal.

Herein, in step S2770, the terminal may check the DMRS configuration type of the DMRS received from the base station by using an RRC message received from the base station, configure s DMRS based on the information of the number layers, the antenna port number, the number of symbols, and the co-scheduled CDM group of the DMRS transmitted from the base station within the DMRS configuration type by using DCI received from the base station, and estimate a channel by comparing the configured DMRS with the DMRS received from the base station.

FIG. 28 is a view showing a method of transmitting an uplink DMRS in an embodiment of the present invention.

Referring to FIG. 28, for an uplink case, in step S2810, the base station may determine a DMRS configuration type of a DMRS (UL DMRS) to be transmitted from the terminal to the base station among a first DMRS configuration type and a second DMRS configuration type. In step S2820, the based terminal may transmit to the terminal information of the DMRS configuration type by using high layer signaling such as RRC. In addition, in step S2830, the base station may determine a number layers, an antenna port number, a number of symbols, and a CDM group(s) used according to an MU-MIMO of a DMRS to be transmitted from the terminal to the base station within the determined DMRS configuration type. In step S2840, the base station may transmit the same to the terminal by using DCI.

In step S2850, the terminal may check the DMRS configuration type of the DMRS to be transmitted to the base station by using an RRC message received from the base station, configure a DMRS based on information of the number layers, the antenna port number, the number of symbols, and the co-scheduled CDM group of the DMRS to be transmitted to the base station within the DMRS configuration type by using and checking DCI received from the base station. In step S860, the terminal may transmit the configured DMRS to the base station.

Then, in step S2870, the base station may configure a DMRS according to the information, and estimate a channel by comparing the configured DMRS with the DMRS transmitted from the terminal.

FIG. 29 is a view showing a block diagram of a wireless communication system according to an embodiment of the present invention.

Referring to FIG. 29, the wireless communication system according to the present invention includes a base station 2900 and a terminal 2950.

The base station 2900 includes a processor 2905, a radio frequency (RF) unit 2910, and a memory 2915. The memory 2915 is connected to the processor 905 and stores various types of information for operating the processor 2905. The RF unit 2910 is connected to the processor 2905, and transmits or receives or both a wireless signal. For example, the RF unit 2910 may transmit a downlink signal including information of a DMRS configuration described in the present description, or may transmit a DMRS configured according to the same. In addition, the RF unit 2910 may receive an uplink DMRS from the terminal 2950.

The processor 2905 implements at least one of a function, a process, and a method which is purposed in the present description. In detail, the processor 2905 may control such that operations of the base station 2900 described above to be performed.

For example, the processor 2905 may include a DMRS configuration type determining unit 2906, a DCI information generating unit 2907, and a channel estimating unit 2908.

The DMRS configuration type determining unit 2906 may determine a DMRS configuration type used for the terminal 2950 among a first DMRS configuration type and a second DMRS configuration type.

The DCI information generating unit 2907 may determine a number layers, an antenna port number, a number of symbols, and a CDM group(s) according to an MU-MIMO of a DMRS to be transmitted to the terminal 2950 or received from the terminal within the DMRS configuration type determined in the DMRS configuration type determining unit 2906. For this, the DCI information generating unit 2907 may use at least one of the mentioned specific rules through Tables 69 to 87 described in the present description.

The channel estimating unit 2908 may estimate a channel by comparing the DMRS configured based on information determined in the DMRS configuration type determining unit 906 and the DCI information generating unit 2907 with a DMRS (UL DMRS) received through the RF unit 2910.

The memory 2915 may store at least one piece of information of Tables 69 to 87 described in the present description, and provide to the processor 905 the information according to a request of the processor 2905.

The terminal 2950 includes an RF unit 2955, a processor 2960, and a memory 2965. The memory 2965 is connected to the processor 2960 and stores various types of information for operating the processor 2960. The RF unit 2955 is connected to the processor 2960 and transmits or receives or both a wireless signal. The processor 2960 implements at least one of a function, a process, and a method which is purposed in the present description. In the above described embodiment, operations of the terminal 2950 may be implemented by the processor 2960. The processor 2960 may configure a DMRS according to DMRS information received from the base station 2900, and estimate a channel.

In one embodiment, the processor 2960 may include a DMRS configuration checking unit 2961, a DMRS configuration unit 962, and a channel estimating unit 2963.

The DMRS configuration checking unit 961 may check a DMRS configuration applied to the terminal 2950 by using a RRC message or DCI received from the base station 2900.

The DMRS configuration unit 2962 may configure a DMRS to be transmitted based on information checked in the DMRS configuration checking unit 2961.

The channel estimating unit 2963 may estimate a channel by comparing the DMRS configured based on the information checked in the DMRS configuration checking unit 961 with the DMRS received from the base station 2900.

The descriptions provided in the embodiments of a method of transmitting a DMRS, wherein the method transmits a demodulation reference signal (DMRS) from a wireless communication system to a terminal.

The method may further comprise determining a DMRS configuration type of a DMRS to be transmitted to the terminal among a plurality of DMRS configuration types; transmitting information of the determined DMRS configuration type to the terminal by using high layer signaling; determining a number of layers, an antenna port number, a number of symbols, and a code division multiplexing (CDM) group according to an MU-MIMO of the DMRS to be transmitted to the terminal within the determined DMRS configuration type, and transmitting the determined information to the terminal; and configuring the DMRS according to the determined information and transmitting the configured DMRS to the terminal.

An example method of indicating a DMRS layer, and antenna port, and rate-matching in a wireless communication system and an apparatus may be shown. For example, a method of transmitting a demodulation reference signal (DMRS) from the wireless communication system to a terminal may include: determining a DMRS configuration type of a DMRS to be transmitted to the terminal among a plurality of DMRS configuration types; transmitting information of the determined DMRS configuration type to the terminal by using high layer signaling; determining a number of layers, an antenna port number, a number of symbols, and a code division multiplexing (CDM) group according to an MU-MIMO of the DMRS to be transmitted to the terminal within the determined DMRS configuration type, and transmitting the determined information to the terminal; and configuring the DMRS according to the determined information and transmitting the configured DMRS to the terminal.

In the exemplary system described above, processes are described as a series of steps or blocks based on a flowchart, aspects of the present invention are not limited to the illustrated order or sequence. Some steps may be processed in a different order or may be processed substantially simultaneously. Further, it will be understood that the illustrated steps in a flowchart do not necessarily exclude other steps, other steps may be included and one or more steps in a flowchart may be omitted without departing from the spirit and scope of the present invention.

The above description is to explain the technical aspects of exemplary embodiments of the present invention, and it will be apparent to those skills in the art that modifications and variations can be made without departing from the spirit and scope of the present invention. Thus, it is intended that the present invention cover the modifications and variations of this invention provided they come within the scope of the appended claims and their equivalents.

The processors may include an application-specific integrated circuit (ASIC), another chipset, a logic circuit, and/or a data processing device. The memories may include a Read-Only Memory (ROM), a Random Access Memory (RAM), a flash memory, a memory card, a storage medium and/or another storage device. The RF units may include a baseband circuit for processing a wireless signal. When an embodiment is embodied as software, the described scheme may be embodied as a module (process, function, or the like) that executes the described function. The module may be stored in a memory, and may be executed by a processor. The memory may be disposed inside or outside the processor, and may be connected to the processor through various well-known means.

In the described exemplary system, although methods are described based on a flowchart as a series of steps or blocks, aspects of the present invention are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present invention.

What is claimed is:

1. An apparatus comprising:
   one or more processors; and
   memory storing instructions that, when executed by the one or more processors, cause the apparatus to:
      determine a plurality of sets of antenna ports associated with demodulation reference signal (DM-RS) transmission, wherein a first code division multiplexing (CDM) group is associated with a first set of the plurality of sets of antenna ports, a second CDM group is associated with a second set of the plurality of sets of antenna ports, and a third CDM group is associated with a third set of the plurality of sets of antenna ports;
      determine, for the first CDM group, first adjacent resource elements corresponding to two adjacent symbols in a time axis and to first two adjacent subcarriers in a frequency axis;
      determine, for the second CDM group, second adjacent resource elements corresponding to the two adjacent symbols in the time axis and to second two adjacent subcarriers in the frequency axis; and
      determine, for the third CDM group, third adjacent resource elements corresponding to the two adjacent symbols in the time axis and to third two adjacent subcarriers in the frequency axis; and
   a wireless transceiver to transmit at least one of:
      based on a plurality of first orthogonal cover code values and via the first adjacent resource elements, a DM-RS associated with at least one antenna port of the first set, wherein the plurality of first orthogonal cover code values comprise:
         orthogonal cover code values associated with a first subcarrier of the first two adjacent subcarriers; and
         orthogonal cover code values associated with a second subcarrier of the first two adjacent subcarriers;
      based on a plurality of second orthogonal cover code values and via the second adjacent resource elements, a DM-RS associated with at least one antenna port of the second set, wherein the plurality of second orthogonal cover code values comprise:
         orthogonal cover code values associated with a first subcarrier of the second two adjacent subcarriers; and
         orthogonal cover code values associated with a second subcarrier of the second two adjacent subcarriers; or
      based on a plurality of third orthogonal cover code values and via the third adjacent resource elements, a DM-RS associated with at least one antenna port of the third set, wherein the plurality of third orthogonal cover code values comprise:
         orthogonal cover code values associated with a first subcarrier of the third two adjacent subcarriers; and
         orthogonal cover code values associated with a second subcarrier of the third two adjacent subcarriers.

2. The apparatus of claim 1, wherein each of the first CDM group, the second CDM group, and the third CDM group is associated with four different antenna ports.

3. The apparatus of claim 1, wherein the first adjacent resource elements comprise a first resource element having a symbol index x and a subcarrier index y, a second resource element having a symbol index x and a subcarrier index (y+1), a third resource element having a symbol index (x+1) and a subcarrier index y, and a fourth resource element having a symbol index (x+1) and a subcarrier index (y+1) where x and y are positive integers, and
   wherein a sequence of four orthogonal cover code values for the first resource element, the second resource element, the third resource element, and the fourth resource element is differently determined for each antenna port in the first set.

4. The apparatus of claim 1, wherein the instructions, when executed by the one or more processors, cause the apparatus to:
   determine, for the first CDM group, fourth adjacent resource elements corresponding to additional two adjacent symbols in the time axis and to the first two adjacent subcarriers in the frequency axis; and
   transmit, based on the plurality of first orthogonal cover code values and via the fourth adjacent resource elements, the DM-RS associated with the at least one antenna port of the first set,
   wherein at least one symbol exists between the two adjacent symbols and the additional two adjacent symbols, and
   wherein the two adjacent symbols and the additional two adjacent symbols are comprised in one slot.

5. The apparatus of claim 1, wherein the DM-RS associated with the at least one antenna port of the first set comprises a DM-RS for a physical downlink shared channel (PDSCH), and
wherein transmitting the DM-RS associated with the at least one antenna port of the first set comprises transmitting, from a base station and to a wireless user device, the DM-RS associated with the at least one antenna port of the first set.

6. The apparatus of claim 1, wherein the DM-RS associated with the at least one antenna port of the first set comprises a DM-RS for a physical sidelink shared channel (PSSCH), and
wherein transmitting the DM-RS associated with the at least one antenna port of the first set comprises transmitting, from a wireless user device and to another wireless user device, the DM-RS associated with the at least one antenna port of the first set.

7. The apparatus of claim 1, wherein the DM-RS associated with the at least one antenna port of the first set comprises a DM-RS for a physical uplink shared channel (PUSCH), and
wherein transmitting the DM-RS associated with the at least one antenna port of the first set comprises transmitting, from a wireless user device and to a base station, the DM-RS associated with the at least one antenna port of the first set.

8. The apparatus of claim 1, wherein at least one of the first adjacent resource elements is adjacent to at least one of the second adjacent resource elements, and
wherein at least one of the second adjacent resource elements is adjacent to at least one of the third adjacent resource elements.

9. The apparatus of claim 1, wherein at least one orthogonal cover code comprises a length-2 orthogonal cover code associated with:
the first two adjacent subcarriers;
the second two adjacent subcarriers; and
the third two adjacent subcarriers.

10. The apparatus of claim 1, wherein the orthogonal cover code values associated with the first subcarrier of the first two adjacent subcarriers comprise at least one of:
[+1, +1] associated with a first antenna port of the first set;
[+1, +1] associated with a second antenna port of the first set;
[+1, −1] associated with a third antenna port of the first set; or
[+1, −1] associated with a fourth antenna port of the first set.

11. The apparatus of claim 10, wherein the orthogonal cover code values associated with the second subcarrier of the first two adjacent subcarriers comprise at least one of:
[+1, +1] associated with a first antenna port of the first set;
[−1, −1] associated with a second antenna port of the first set;
[+1, −1] associated with a third antenna port of the first set; or
[−1, +1] associated with a fourth antenna port of the first set.

12. An apparatus comprising:
one or more processors; and
memory storing instructions that, when executed by the one or more processors, cause the apparatus to:
determine a plurality of sets of antenna ports associated with demodulation reference signal (DM-RS) transmission, wherein a first code division multiplexing (CDM) group is associated with a first set of the plurality of sets of antenna ports, a second CDM group is associated with a second set of the plurality of sets of antenna ports, and a third CDM group is associated with a third set of the plurality of sets of antenna ports;
determine, for the first CDM group, first four adjacent resource elements corresponding to two adjacent orthogonal frequency division multiplexing (OFDM) symbols in a time axis and to first two adjacent subcarriers in a frequency axis;
determine, for the second CDM group, second four adjacent resource elements corresponding to the two adjacent OFDM symbols in the time axis and to second two adjacent subcarriers in the frequency axis; and
determine, for the third CDM group, third four adjacent resource elements corresponding to the two adjacent OFDM symbols in the time axis and to third two adjacent subcarriers in the frequency axis; and
a wireless transceiver to transmit at least one of:
based on at least one first orthogonal cover code and via the first four adjacent resource elements, a first DM-RS associated with at least one antenna port of the first set, wherein the at least one first orthogonal cover code is associated with the first two adjacent subcarriers;
based on at least one second orthogonal cover code and via the second four adjacent resource elements, a second DM-RS associated with at least one antenna port of the second set, wherein the at least one second orthogonal cover code is associated with the second two adjacent subcarriers; and
based on at least one third orthogonal cover code and via the third four adjacent resource elements, a third DM-RS associated with at least one antenna port of the third set, wherein the at least one third orthogonal cover code is associated with the third two adjacent sub carriers.

13. The apparatus of claim 12, wherein:
the at least one first orthogonal cover code is associated with four orthogonal cover code values corresponding to the first four adjacent resource elements;
the at least one second orthogonal cover code is associated with four orthogonal cover code values corresponding to the second four adjacent resource elements; and
the at least one third orthogonal cover code is associated with four orthogonal cover code values corresponding to the third four adjacent resource elements.

14. The apparatus of claim 13, wherein the four orthogonal cover code values corresponding to the first four adjacent resource elements comprise at least one of:
[+1, +1, +1, +1] associated with a first antenna port of the first set;
[+1, −1, +1, −1] associated with a second antenna port of the first set;
[+1, +1, −1, −1] associated with a third antenna port of the first set; or
[+1, −1, −1, +1] associated with a fourth antenna port of the first set.

15. The apparatus of claim 12, wherein antenna ports associated with the second CDM group are configured to be selected for DM-RS transmission after selecting at least one antenna port, associated with the first CDM group, for DM-RS transmission, and
wherein antenna ports associated with the third CDM group are configured to be selected for DM-RS transmission after selecting at least one antenna port, associated with the second CDM group, for DM-RS transmission.

16. An apparatus comprising:
one or more processors; and
memory storing instructions that, when executed by the one or more processors, cause the apparatus to:
receive, from a base station, a type of demodulation reference signal (DM-RS) configuration and information indicating a quantity of code division multiplexing (CDM) groups for DM-RS transmission, wherein a first CDM group is associated with a first set of a plurality of sets of antenna ports and a second CDM group is associated with a second set of the plurality of sets of antenna ports;
determine, for the first CDM group, first four adjacent resource elements corresponding to two adjacent symbols in a time axis and to first two adjacent subcarriers in a frequency axis;
determine, for the second CDM group, second four adjacent resource elements corresponding to the two adjacent symbols in the time axis and to second two adjacent subcarriers in the frequency axis;
transmit, based on at least one first orthogonal cover code and via the first four adjacent resource elements, a DM-RS associated with at least one antenna port of the first set, wherein the at least one first orthogonal cover code is associated with orthogonal cover code values for the first two adjacent subcarriers; and
transmit, based on at least one second orthogonal cover code and via the second four adjacent resource elements, a DM-RS associated with at least one antenna port of the second set, wherein the at least one second orthogonal cover code is associated with orthogonal cover code values for the second two adjacent subcarriers.

17. The apparatus of claim 16, wherein the instructions, when executed by the one or more processors, cause the apparatus to:
determine, based on the information indicating the quantity of CDM groups for DM-RS transmission, whether to map a physical uplink shared channel (PUSCH) to third four adjacent resource elements, wherein the third four adjacent resource elements correspond to the two adjacent symbols in the time axis and to third two adjacent subcarriers in the frequency axis.

18. The apparatus of claim 17, wherein the instructions, when executed by the one or more processors, cause the apparatus to:
determine that the quantity of CDM groups for DM-RS transmission corresponds to two or three,
wherein determining whether to map the PUSCH to the third four adjacent resource elements comprises: determining not to map the PUSCH to the third four adjacent resource elements.

19. The apparatus of claim 16, wherein the second set of the plurality of sets of antenna ports are configured to be selected for DM-RS transmission after selecting at least one antenna port, associated with the first CDM group, for DM-RS transmission.

20. The apparatus of claim 16, wherein a first value associated with the at least one first orthogonal cover code is associated with a first subcarrier of the first two adjacent subcarriers, and
wherein a second value associated with the at least one first orthogonal cover code is associated with a second subcarrier of the first two adjacent subcarriers.

21. The apparatus of claim 16, wherein the at least one first orthogonal cover code is associated with at least one of:
[+1, +1, +1, +1] associated with a first antenna port of the first set;
[+1, −1, +1, −1] associated with a second antenna port of the first set;
[+1, +1, −1, −1] associated with a third antenna port of the first set; or
[+1, −1, −1, +1] associated with a fourth antenna port of the first set.

22. The apparatus of claim 16, wherein the at least one second orthogonal cover code is associated with at least one of:
[+1, +1, +1, +1] associated with a first antenna port of the second set;
[+1, −1, +1, −1] associated with a second antenna port of the second set;
[+1, +1, −1, −1] associated with a third antenna port of the second set; or
[+1, −1, −1, +1] associated with a fourth antenna port of the second set.

* * * * *